United States Patent
Desai et al.

(10) Patent No.: US 12,462,006 B2
(45) Date of Patent: Nov. 4, 2025

(54) MODULAR ANALYTE CONNECTIVITY SYSTEM FOR EXTENDIBLE COMMUNICATION WITH DIFFERENT TYPES OF PHYSIOLOGICAL SENSORS

(71) Applicant: ABBOTT DIABETES CARE INC., Alameda, CA (US)

(72) Inventors: Nikhil Desai, San Francisco, CA (US); Justin Williams, Oakland, CA (US)

(73) Assignee: ABBOTT DIABETES CARE INC., Alameda, CA (US)

( * ) Notice: Subject to any disclaimer, the term of this patent is extended or adjusted under 35 U.S.C. 154(b) by 274 days.

(21) Appl. No.: 17/944,976

(22) Filed: Sep. 14, 2022

(65) Prior Publication Data

US 2023/0083633 A1    Mar. 16, 2023

Related U.S. Application Data

(60) Provisional application No. 63/316,906, filed on Mar. 4, 2022, provisional application No. 63/295,726, filed
(Continued)

(51) Int. Cl.
*G06F 21/32*    (2013.01)
*A61B 5/145*    (2006.01)
(Continued)

(52) U.S. Cl.
CPC .......... *G06F 21/32* (2013.01); *A61B 5/14532* (2013.01); *G16H 10/60* (2018.01);
(Continued)

(58) Field of Classification Search
CPC ..... G06F 21/32; G06F 21/44; A61B 5/14532; A61B 5/14503; A61B 5/14546;
(Continued)

(56) References Cited

U.S. PATENT DOCUMENTS

| | | |
|---|---|---|
| 4,561,443 A | 12/1985 | Hogrefe et al. |
| 5,390,671 A | 2/1995 | Lord et al. |
| (Continued) | | |

FOREIGN PATENT DOCUMENTS

| | | |
|---|---|---|
| EP | 2 407 094 | 1/2012 |
| EP | 3 158 922 A1 | 4/2017 |
| (Continued) | | |

OTHER PUBLICATIONS

IEC 62304, ED. 1.1, Medical Device Software—Software Life Cycle Processes, 2015.
(Continued)

*Primary Examiner* — Chinyere Mpamugo
(74) *Attorney, Agent, or Firm* — Workman Nydegger

(57) ABSTRACT

A medical device communication system with a modular design to communicate with different types of medical devices, such as physiological sensors. The modular design is implemented using an extensible software library that provides a uniform framework for various applications or third party applications access to medical device data. The modular design also allows for regulated and unregulated portions of the system to be integrated into the system while allowing each portion to be updated separately. The regulated portion of the system may include components, such as sensors and the software library, that are subject to regulatory approval while the unregulated portion may include applications that are not subject to regulatory approval. Thus, the system enables a third party application developer to avoid having to submit the application to a regulatory agency for an application making use of the sensor data.

21 Claims, 42 Drawing Sheets

Related U.S. Application Data on Dec. 31, 2021, provisional application No. 63/244,694, filed on Sep. 15, 2021.

(51) Int. Cl.
*G16H 10/60* (2018.01)
*G16H 40/63* (2018.01)

(52) U.S. Cl.
CPC .......... *G16H 40/63* (2018.01); *A61B 5/14503* (2013.01); *A61B 5/14546* (2013.01); *A61B 2560/045* (2013.01)

(58) Field of Classification Search
CPC ...... A61B 2560/045; A61B 2560/0238; A61B 5/14865; A61B 5/6833; G16H 10/60; G16H 40/63; G16H 20/17; G16H 40/40; G16H 40/67; G16H 50/20; G16H 50/70; H04L 2209/88; H04L 9/3263; H04L 9/3273; H04L 67/12; H04W 88/06; H04W 12/009; H04W 84/18; H04W 12/069; H04W 12/50

See application file for complete search history.

(56) References Cited

U.S. PATENT DOCUMENTS

| | | |
|---|---|---|
| 5,391,250 A | 2/1995 | Cheney, II et al. |
| 5,482,473 A | 1/1996 | Lord et al. |
| 5,660,163 A | 8/1997 | Schulman et al. |
| 5,690,119 A | 11/1997 | Rytky et al. |
| 5,899,855 A | 5/1999 | Brwon |
| 5,954,643 A | 9/1999 | VanAntwerp et al. |
| 6,096,268 A | 8/2000 | Inbar |
| 6,134,461 A | 10/2000 | Say et al. |
| 6,159,181 A | 12/2000 | Crossman et al. |
| 6,175,752 B1 | 1/2001 | Say et al. |
| 6,266,551 B1 | 7/2001 | Osadchy et al. |
| 6,270,455 B1 | 8/2001 | Brown |
| 6,293,925 B1 | 9/2001 | Safabash et al. |
| 6,298,255 B1 | 10/2001 | Cordero et al. |
| 6,424,847 B1 | 7/2002 | Mastrototaro et al. |
| 6,424,874 B1 | 7/2002 | Mastrototaro et al. |
| 6,560,471 B1 | 5/2003 | Heller et al. |
| 6,565,509 B1 | 5/2003 | Say et al. |
| 6,579,690 B1 | 6/2003 | Bonnecaze et al. |
| 6,600,997 B2 | 7/2003 | Deweese et al. |
| 6,641,533 B2 | 11/2003 | Causey, III et al. |
| 6,689,056 B1 | 2/2004 | Kilcoyne et al. |
| 6,695,860 B1 | 2/2004 | Ward et al. |
| 6,746,582 B2 | 6/2004 | Heller et al. |
| 6,749,740 B2 | 6/2004 | Liamos et al. |
| 6,809,653 B1 | 10/2004 | Mann et al. |
| 6,942,518 B2 | 9/2005 | Liamos et al. |
| 7,098,803 B2 | 8/2006 | Mann et al. |
| 7,299,082 B2 | 11/2007 | Feldman et al. |
| 7,324,012 B2 | 1/2008 | Mann et al. |
| 7,344,500 B2 | 3/2008 | Talbot et al. |
| 7,643,798 B2 | 1/2010 | Ljung |
| 7,693,485 B2 | 4/2010 | Parys |
| 8,401,194 B2 | 3/2013 | Nierzwick et al. |
| 8,764,651 B2 | 7/2014 | Tran |
| 8,771,183 B2 | 7/2014 | Sloan |
| 8,864,651 B2 | 10/2014 | Kuyava et al. |
| 9,000,914 B2 | 4/2015 | Baker et al. |
| 9,211,065 B2 | 12/2015 | Marsh et al. |
| 9,241,631 B2 | 1/2016 | Valdes et al. |
| 9,344,777 B2 | 5/2016 | He et al. |
| 9,577,934 B2 | 2/2017 | Gross |
| 9,980,140 B1 | 5/2018 | Spencer et al. |
| 9,996,668 B2 | 6/2018 | Reihman et al. |
| 10,085,640 B2 | 10/2018 | Mensinger et al. |
| 10,375,222 B2 | 8/2019 | Mandapaka et al. |
| 10,827,954 B2 | 11/2020 | Hoss et al. |
| 10,945,647 B2 | 3/2021 | Mazza et al. |
| 10,973,443 B2 | 4/2021 | Funderburk et al. |
| 10,980,461 B2 | 4/2021 | Simpson et al. |
| 11,000,213 B2 | 5/2021 | Kamath et al. |
| 11,064,917 B2 | 7/2021 | Simpson et al. |
| 11,116,431 B1 | 9/2021 | Harper |
| 11,141,084 B2 | 10/2021 | Funderburk et al. |
| 11,298,056 B2 | 4/2022 | Harper |
| 11,991,175 B2 | 5/2024 | Rolfe et al. |
| 2002/0109621 A1 | 8/2002 | Khair et al. |
| 2003/0050009 A1 | 3/2003 | Kurisko et al. |
| 2003/0065536 A1 | 4/2003 | Hansen et al. |
| 2003/0100821 A1 | 5/2003 | Heller et al. |
| 2003/0144581 A1 | 7/2003 | Conn et al. |
| 2003/0153900 A1 | 8/2003 | Aceti et al. |
| 2003/0208113 A1 | 11/2003 | Mault et al. |
| 2004/0106860 A1 | 6/2004 | Say et al. |
| 2004/0117204 A1 | 6/2004 | Mazar et al. |
| 2004/0122353 A1 | 6/2004 | Shahmirian et al. |
| 2004/0127958 A1 | 7/2004 | Mazar et al. |
| 2004/0133164 A1 | 7/2004 | Funderburk et al. |
| 2004/0186365 A1 | 9/2004 | Jin et al. |
| 2004/0193025 A1 | 9/2004 | Steil et al. |
| 2005/0027463 A1 | 2/2005 | Goode, Jr. et al. |
| 2005/0049501 A1 | 3/2005 | Conero et al. |
| 2005/0101912 A1 | 5/2005 | Faust et al. |
| 2005/0177398 A1 | 8/2005 | Watanabe et al. |
| 2005/0182306 A1 | 8/2005 | Sloan |
| 2005/0204134 A1 | 9/2005 | Von Arx et al. |
| 2005/0240245 A1 | 10/2005 | Bange et al. |
| 2005/0242479 A1 | 11/2005 | Petisce et al. |
| 2005/0261563 A1 | 11/2005 | Zhou et al. |
| 2005/0283114 A1 | 12/2005 | Bresina et al. |
| 2006/0016700 A1 | 1/2006 | Brister et al. |
| 2006/0019327 A1 | 1/2006 | Brister et al. |
| 2006/0025663 A1 | 2/2006 | Talbot et al. |
| 2006/0081469 A1 | 4/2006 | Lee |
| 2006/0202859 A1 | 9/2006 | Mastrototaro et al. |
| 2006/0224109 A1 | 10/2006 | Steil et al. |
| 2007/0038044 A1 | 2/2007 | Dobbles et al. |
| 2007/0043279 A1 | 2/2007 | Mannheimer et al. |
| 2007/0060801 A1 | 3/2007 | Neinast |
| 2007/0073129 A1 | 3/2007 | Shah et al. |
| 2007/0093786 A1 | 4/2007 | Goldsmith et al. |
| 2007/0142727 A1 | 6/2007 | Zhang et al. |
| 2007/0173708 A9 | 7/2007 | Dobbles et al. |
| 2007/0173710 A1 | 7/2007 | Petisce et al. |
| 2007/0219480 A1 | 9/2007 | Kamen et al. |
| 2007/0255116 A1 | 11/2007 | Mehta et al. |
| 2007/0288265 A1 | 12/2007 | Quinian et al. |
| 2008/0009805 A1 | 1/2008 | Ethelfeld |
| 2008/0081977 A1 | 4/2008 | Hayter et al. |
| 2008/0092638 A1 | 4/2008 | Brenneman et al. |
| 2008/0097246 A1 | 4/2008 | Stafford |
| 2008/0119705 A1 | 5/2008 | Patel et al. |
| 2008/0129486 A1 | 6/2008 | Jeckelmann et al. |
| 2008/0161666 A1 | 7/2008 | Feldman et al. |
| 2008/0172205 A1 | 7/2008 | Breton et al. |
| 2008/0214900 A1 | 9/2008 | Fennell et al. |
| 2008/0228045 A1 | 9/2008 | Gao et al. |
| 2008/0269687 A1 | 10/2008 | Chong et al. |
| 2008/0275313 A1 | 11/2008 | Brister et al. |
| 2008/0278333 A1 | 11/2008 | Fennell et al. |
| 2008/0300476 A1 | 12/2008 | Stafford |
| 2008/0312512 A1 | 12/2008 | Brukalo et al. |
| 2008/0319414 A1 | 12/2008 | Yodfat et al. |
| 2009/0018424 A1 | 1/2009 | Kamath et al. |
| 2009/0033482 A1 | 2/2009 | Hayter et al. |
| 2009/0033485 A1 | 2/2009 | Hayter et al. |
| 2009/0054748 A1 | 2/2009 | Feldman |
| 2009/0085768 A1 | 4/2009 | Patel et al. |
| 2009/0112626 A1 | 4/2009 | Talbot et al. |
| 2009/0198118 A1 | 8/2009 | Hayter et al. |
| 2009/0240193 A1 | 9/2009 | Mensinger et al. |
| 2009/0247857 A1 | 10/2009 | Harper et al. |
| 2010/0014626 A1 | 1/2010 | Fennell et al. |
| 2010/0045425 A1 | 2/2010 | Chivallier |
| 2010/0198034 A1 | 8/2010 | Thomas et al. |
| 2010/0198142 A1 | 8/2010 | Sloan et al. |
| 2010/0213057 A1 | 8/2010 | Feldman et al. |

(56) References Cited

U.S. PATENT DOCUMENTS

| | | |
|---|---|---|
| 2010/0230285 A1 | 9/2010 | Hoss et al. |
| 2010/0274218 A1 | 10/2010 | Yodfat et al. |
| 2010/0302979 A1 | 12/2010 | Reunamäki |
| 2010/0327063 A1 | 12/2010 | Medina et al. |
| 2011/0002223 A1 | 1/2011 | Gross |
| 2011/0125000 A1 | 5/2011 | Rantala |
| 2011/0177780 A1 | 7/2011 | Sato et al. |
| 2011/0193704 A1 | 8/2011 | Harper et al. |
| 2011/0213225 A1 | 9/2011 | Bernstein et al. |
| 2011/0282671 A1 | 11/2011 | Dicks et al. |
| 2011/0320130 A1 | 12/2011 | Valdes et al. |
| 2012/0003933 A1 | 1/2012 | Baker et al. |
| 2012/0078071 A1 | 3/2012 | Bohm et al. |
| 2012/0108931 A1 | 5/2012 | Taub et al. |
| 2012/0123227 A1 | 5/2012 | Sun et al. |
| 2012/0182917 A1 | 7/2012 | Edlund |
| 2012/0237022 A1 | 9/2012 | Berson et al. |
| 2012/0255875 A1 | 10/2012 | Vicente et al. |
| 2012/0260323 A1 | 10/2012 | San Vicente et al. |
| 2012/0265035 A1 | 10/2012 | Bohm et al. |
| 2013/0078912 A1 | 3/2013 | San Vicente et al. |
| 2013/0127627 A1 | 5/2013 | Hayter et al. |
| 2013/0150691 A1 | 6/2013 | Pace et al. |
| 2013/0310896 A1 | 11/2013 | Mass |
| 2014/0171771 A1 | 6/2014 | Feldman et al. |
| 2014/0176338 A1 | 6/2014 | He et al. |
| 2014/0266776 A1 | 9/2014 | Miller et al. |
| 2014/0266785 A1 | 9/2014 | Miller et al. |
| 2014/0273858 A1 | 9/2014 | Panther et al. |
| 2014/0313052 A1 | 10/2014 | Yarger et al. |
| 2014/0350883 A1 | 11/2014 | Carter et al. |
| 2014/0379273 A1 | 12/2014 | Petisce et al. |
| 2015/0038818 A1 | 2/2015 | Cole |
| 2015/0089222 A1 | 3/2015 | White et al. |
| 2015/0118658 A1 | 4/2015 | Mayou et al. |
| 2015/0123810 A1 | 5/2015 | Hernandez-Rosas et al. |
| 2015/0164391 A1 | 6/2015 | Hernandez-Rosas et al. |
| 2015/0205947 A1* | 7/2015 | Berman ............... G06F 21/44 726/16 |
| 2015/0207796 A1 | 7/2015 | Love et al. |
| 2015/0289124 A1 | 10/2015 | Palin et al. |
| 2016/0066826 A1 | 3/2016 | Larvenz et al. |
| 2016/0081597 A1 | 3/2016 | Bhavaraju et al. |
| 2016/0165649 A1 | 6/2016 | Polo et al. |
| 2016/0210099 A1 | 7/2016 | Hampapuram et al. |
| 2016/0234020 A1 | 8/2016 | Nix |
| 2016/0331283 A1 | 11/2016 | Rao et al. |
| 2017/0220745 A1 | 8/2017 | Lee et al. |
| 2018/0226150 A1* | 8/2018 | Hayter ............... G16H 40/63 |
| 2018/0235520 A1 | 8/2018 | Rao et al. |
| 2019/0216373 A1 | 7/2019 | Harper |
| 2019/0274598 A1 | 9/2019 | Scott et al. |
| 2019/0349346 A1 | 11/2019 | Curtis et al. |
| 2020/0139140 A1 | 5/2020 | Crawford |
| 2020/0196919 A1 | 6/2020 | Rao et al. |
| 2020/0375455 A1 | 12/2020 | Van Tassel et al. |

FOREIGN PATENT DOCUMENTS

| | | |
|---|---|---|
| EP | 3240352 A1 | 11/2017 |
| EP | 3 435 866 | 11/2020 |
| EP | 3 730 045 | 3/2022 |
| EP | 3 797 685 | 5/2022 |
| WO | WO 99/58190 | 11/1999 |
| WO | WO 00/62664 A1 | 10/2000 |
| WO | WO 02/15778 | 2/2002 |
| WO | WO 03/026728 | 4/2003 |
| WO | WO 03/026728 A1 | 4/2003 |
| WO | WO 2004/006982 | 1/2004 |
| WO | WO 2005/018450 | 3/2005 |
| WO | WO 2005/046780 | 5/2005 |
| WO | WO 2005/046780 A1 | 5/2005 |
| WO | WO 2006/040083 | 4/2006 |
| WO | WO 2006/094513 | 9/2006 |
| WO | WO 2006/121921 | 11/2006 |
| WO | WO 2006/121921 A2 | 11/2006 |
| WO | WO 2007/002189 A2 | 1/2007 |
| WO | WO 2007/097754 | 8/2007 |
| WO | WO 2007/104755 A1 | 9/2007 |
| WO | WO 2008/065646 | 6/2008 |
| WO | WO 2008/065646 A1 | 6/2008 |
| WO | WO 2008/073813 | 6/2008 |
| WO | WO 2008/114223 | 9/2008 |
| WO | WO 2008/115409 | 9/2008 |
| WO | WO 2008/144325 A1 | 11/2008 |
| WO | WO 2008/157821 | 12/2008 |
| WO | WO 2008/157821 A1 | 12/2008 |
| WO | WO 2009/005952 A2 | 1/2009 |
| WO | WO 2009/007287 | 1/2009 |
| WO | WO 2009/035773 | 3/2009 |
| WO | WO 2009/039013 | 3/2009 |
| WO | WO 2009/039013 A1 | 3/2009 |
| WO | WO 2013/044153 A1 | 3/2013 |
| WO | WO 2013/069894 A1 | 5/2013 |
| WO | WO 2013/090731 A1 | 6/2013 |
| WO | WO 2013/090791 A1 | 6/2013 |
| WO | WO 2014/011488 A2 | 1/2014 |
| WO | WO 2014/158405 A2 | 10/2014 |
| WO | WO 2014/165172 A1 | 10/2014 |
| WO | WO 2014/179343 A1 | 11/2014 |
| WO | WO 2015/069797 A1 | 5/2015 |
| WO | WO 2016/064184 A1 | 4/2016 |
| WO | WO 2016/092448 A1 | 6/2016 |
| WO | WO 2016/101774 A1 | 6/2016 |
| WO | WO 2017/172781 A1 | 10/2017 |
| WO | WO 2018/017484 | 1/2018 |
| WO | WO 2018/075333 A2 | 4/2018 |
| WO | WO 2018/136898 A1 | 7/2018 |
| WO | WO 2019/236850 A1 | 12/2019 |
| WO | WO 2019/236859 A1 | 12/2019 |
| WO | WO 2019/236876 A1 | 12/2019 |

OTHER PUBLICATIONS

International Standard, ISO 13485, Medical devices Quality management systems—Requirements for regulatory purposes, 2016.
International Standard, ISO 14971, Medical devices—Application of risk management to medical devices, 2012, 97 pages.
Almurashi et al., "Emerging Diabetes Technologies: Continuous Glucose Monitors/Artificial Pancreases," J. Indian Inst. Sci, 2023, 27 pgs.
Atmel Datasheet for ATmega 169P, 2010, 198 pgs. (Part 1).
Atmel Datasheet for ATmega 169P, 2010, 198 pgs. (Part 2).
Cappon et al., "Continuous Glucose Monitoring Sensors for Diabetes Management: A Review of Technologies and Applications," Diabetes Metab J 43:383-397 (2019).
CDC National Diabetes Statistics Report, Nov. 29, 2023, 17 pgs.
Das et al., "Review—Electrochemistry and Other Emerging Technologies for Continuous Glucose Monitoring Devices," ECS Sensors Plus 1:031601 (2022) 20 pgs.
Dexcom G5 Mobile CGM System User Guide 1, 2016, 186 pgs.
Dexcom G5 Mobile CGM System User Guide 2, 2016, 187 pgs.
Dexcom G6 CGM Users Guide, 2022, 347 pgs., Revised Nov. 2022.
Dexcom G6 CGM Users Guide, 2022, 347 pgs., Revised Mar. 2022.
Dexcom Seven Plus Users Guide, 2010, 145 pgs.
DXCM STS-7 CGM User Guide FCC Submission, 2006, 4 pgs.
Freestyle Libre 3 Users Manual, 2023, 249 pgs.
Freestyle Navigator Users Guide, 2008, 197 pgs.
Garg et al., "Flash Glucose Monitoring: The Future Is Here," Diabetes Technology & Therapeutics 19(2):S1-S3 (2017).
Gomez et al., "Overview and Evaluation of Bluetooth Low Energy: An Emerging Low-Power Wireless Technology," Sensors 12:11734-11753 (2012).
Hirsch et al., Role of Continuous Glucose Monitoring in Diabetes Treatment, 2018, 29 pgs.
MiniMed Paradigm Insulin Pump User Guide, 2007, 181 pgs.
Morak et al., "Design and Evaluation of a Telemonitoring Concept Based on NFC-Enabled Mobile Phones and Sensor Devices," IEEE Transactions on Information Technology in Biomedicine, Nov. 2011, 8 pgs.

(56) References Cited

OTHER PUBLICATIONS

Padgette et al., "Guide to Bluetooth Security. Recommendations of the National Institute of Standards and Technology," NIST Special Publication 800-121, Revision 1, Jun. 2012, 47 pgs.

Winter 2008, Atmel Product Guide, 91 pgs.

U.S. Appl. No. 60/614,683, filed Sep. 30, 2004, Brister, et al.

"Setting Your Sensor Settings" retrieved from "https://web.archive.org/web/20160803065621/http://www.medtronicdiabetes.com:80/customer-support/device-settings-and-features/sensor-settings/setting-sensor-settings" on Nov. 18, 2022, 5 pages.

Dexcom G5 Mobile Continuous Glucose Monitoring System, Advisory Committee Briefing Materials, Clinical Chemistry and Clinical Toxicology Devices Panel, 283 pages (2016).

Dowla, "The Basics of Radio Frequency Identification (RFID) Technology", Handbook of RF & Wireless Technologies, Chapter 14, 44 pages (2004).

Evans, et al., "Clinical temperature acquisition using proximity telemetry", J. Biomed. Eng., 13:83-86 (1991).

Finkenzeller, "RFID Handbook: Fundamentals and Applications in Contactless Smart Cards and Identification", Second Edition, 114 pages (2003).

Heller, et al., "Electrochemical Glucose Sensors and Their Applications in Diabetes Management", Chemical Reviews, 108(7):2482-2505 (2008).

Lee, "RFID Coil Design", Microchip Technology Inc., DS00678B, pp. 1-19 (1998).

Liang, et al., "An implantable bi-directional wireless transmission system for transcutaneous biological signal recording", Physiological Measurement, 26:83-97 (2005).

Radio Frequency Identification RFID, AIM Inc., White Paper, Document Version 1.2, 17 pages (2001).

Sorrells, "Passive RFID Basics", Microchip Technology Inc., DS00680B, pp. 1-5 (1998).

Partial International Search Report mailed Jan. 9, 2023 in International Application No. PCT/US2022/043493.

Breton, et al., "Optimum Subcutaneous Glucose Sampling and Fourier Analysis of Continuous Glucose Monitors", Journal of Diabetes Science and Technology, 2(3):495-500 (2008).

Declaration of Brian D. Gross, 150 pages (2023).

Declaration of Morten O. Jensen, Ph.D., Dr.Med, 67 pages (2023).

Dexcom, Inserting Sensor, Instructions for Use, Dexcom, Inc., 2 pages (2021).

DexcomG7, Operational Manual, User Guide, Dexcom, Inc., 179 pages (2022) (with an English Abstract).

DexcomG7, Receiver: Start Here, Operational Manual, Dexcom, Inc., 8 pages (2022).

DexcomG7, Start Here, Operational Manual, Dexcom, Inc. 9 pages (2022) (with an English Abstract).

U.S. Appl. No. 17/245,719, filed Apr. 30, 2021, 168 pages.

U.S. Appl. No. 17/411,154, filed Aug. 25, 2021, 54 pages.

U.S. Appl. No. 60/587,787, filed Jul. 13, 2004, 69 pages.

Medtronic MiniMed, Inc., Fact Sheet, Features and Benefits for the MiniMed Paradigm® Real-Time System—https://web.archive.org/web/20071030065834/http://www.medtronicdiabetes.com/pdf/dtc_features_glance.pdf, 7 pages (2007) and Affidavit of Nathaniel E Frank-White, Internet Archive, 3 pages (2023).

Medtronic MiniMed, Inc., Features for the MiniMed Paradigm® Real-Time System, the Wayback Machine—http://www.medtronicdiabetes.com/products/insulinpumps/features/index.html, 3 pages (2007) and Affidavit of Nathaniel E Frank-White, Internet Archive, 3 pages (2023).

Medtronic MiniMed, Inc., Frequently Asked Questions About the MiniMed Paradigm Real-Time System, the Wayback Machine—https://web.archive.org/web/20071023121607/http://www.medtronicdiabetes.com/product s/insulinpumps/features/index.html, 9 pages (2007) and Affidavit of Nathaniel E Frank-White, Internet Archive, 3 pages (2023).

Medtronic MiniMed, Inc., Request Information for the MiniMed Paradigm® Real-Time Insulin Pump and Continuous Glucose Monitoring System, the Wayback Machine—https://web.archive.org/web/20071009144413/http://www.medtronicdiabetes.com/index.html, 3 pages (2007) and Affidavit of Nathaniel E Frank-White, Internet Archive, 3 pages (2023).

Microchip, microID® 13.56 MHz RFID, System Design Guide, Microchip Technology Inc., 214 pages (2004).

Pantelopoulos, et al., "A Survey on Wearable Biosensor Systems for Health Monitoring", 2008 30th Annual International Conference of the IEEE Engineering in Medicine and Biology Society, Vancouver, British Columbia, Canada, pp. 4887-4890 (2008).

The MiniMed Paradigm® Insulin Pump and Continuous Glucose Monitoring System, Sensor Features User Guide, Paradigm® 522 and 722 Sensor Features, Medtronic MiniMed, 76 pages (2006) and Affidavit of Nathaniel E Frank-White, Internet Archive, 3 pages (2023).

United States Patent and Trademark Office, Before the Patent Trial and Appeal Board, *Dexcom, Inc.* v. *Abbott Diabetes Care Inc.*, Petitioner's Explanation of Material Differences Between Petitions in U.S. Pat. No. 11,298,056 issued on Apr. 12, 2022, 8 pages (2023).

United States Patent and Trademark Office, Before the Patent Trial and Appeal Board, *Dexcom, Inc.* v. *Abbott Diabetes Care Inc.*, Petition for Inter Partes Review of U.S. Pat. No. 11,298,056 issued on Apr. 12, 2022, 132 pages (2023).

United States Patent and Trademark Office, Before the Patent Trial and Appeal Board, *Dexcom, Inc.* v. *Abbott Diabetes Care Inc.*, Notice of Filing Date Accorded to Petition and Time for Filing Patent Owner Preliminary Response in U.S. Pat. No. 11,298,056 issued on Apr. 12, 2022, 6 pages (2023).

United States Patent and Trademark Office, Before the Patent Trial and Appeal Board, *Dexcom, Inc.* v. *Abbott Diabetes Care Inc.*, Petition for Inter Partes Review of U.S. Pat. No. 11,298,056 issued on Apr. 12, 2022, 76 pages (2023).

Chuang et al., "Pilot Studies of Transdermal Continuous Glucose Measurement in Outpatient Diabetic Patients and in Patients during and after Cardiac Surgery," Journal of Diabetes Science and Technology, 595-602 (2008).

Exhibit B-22.pdf—Opponent's Written Response in Opposition of EP 3 730 045, Sep. 27, 2023, 43 pages.

FreeStyle Navigator Continuous Glucose Monitoring System, Dept of Health & Human Services, Food and Drug Administration, Mar. 12, 2008, 8 pages.

McCartney et al., "In vivo glucose sensing for diabetes management: progress towards non-invasive monitoring," BMJ, vol. 319, 4 pages (1999).

Townsend et al., "Getting Started with Bluetooth Low Energy—Tools and Techniques for Low-Power Networking," O'Reilly Media, Inc., 180 pages (2014).

Wang et al. "A Feasible IMD Communication Protocol: Security without Obscurity," School of Engineering and Computing Sciences, NYIT Research Experience for Undergraduates (REU), May 26-Jul. 30, 2015, 1 page.

Bluetooth Specification, Encryption and Authentication Overview, vol. 6, Version 4.0, page (2010).

Cornelius, "Usable Security for Wireless Body-Area Networks," Dartmouth College PhD Dissertations. 42 (2013).

Cunningham et al., "In Vivo Glucose Sensing," Wiley & Sons (2010).

Diallo et al., "A Secure Authentication Scheme for Bluetooth Connection," 5th International Conference on Computer & Communication Engineering, DOI 10.1109/ICCCE.2014.29, 60-63 (2014).

Ellmerer et al., "Measurement of interstitial albumin in human skeletal muscle and adipose tissue by open-flow microperfusion," Am. J. Physiol. Endocrinol. Metab., 278: E352-E356 (2000).

Finkenzeller, "RFID Handbook: Fundamentals and Applications in Contactless Smart Cards, Radio Frequency Identification and Near-Field Communication", Third Edition, 4 pages (2010).

German Infringement Complaint (2021) with English Abstract.

German Infringement Complaint Service addressed to Dexcom Deutschland GmbH (2021).

Guardian® Real-Time, Continuous Glucose Monitoring System, User Guide, Medtronic MiniMed, Inc., 181 pages (2006).

Guardian® RT, Continuous Glucose Monitoring System, Ref MMT-7900, User Guide, Medtronic MiniMed, 128 pages (2005).

(56) References Cited

OTHER PUBLICATIONS

Guder et al., "Samples: From the Patient to the Laboratory, the impact of preanalytical variables on the quality of laboratory results," Wiley-Vch GmbH & Co. KGaA (2003).
Higson et al., "Biosensors: a viable monitoring technology?" Med. & Biol. Eng. & Comput., 32, 601-609 (1994).
Mohanty et al., Biosensors: A tutorial review, IEEE Potentials, 35-40 (2006).
Near Field Communication (NFC) Technology and Measurements, White Paper, Rohde & Schwarz, 18 pages (2011).
Near Field Communication (NFC) Technology and Measurements, White Paper, Rohde & Schwarz, 1 page (2011).
Padgette et al., "Guide to Bluetooth Security, Recommendations of the National Institute of Standards and Technology," Nist, U.S. Dept. of Commerce, Special Publication 800-121 Revision 1 (2012).
Rivest et al., "A Method for Obtaining Digital Signatures and Public-Key Cryptosystems," MIT, 15 pages (1977).
Schaupp et al., "Direct access to interstitial fluid in adipose tissue in humans by use of open-flow microperfusion," E401-E408, Downloaded from journals.physiology.org/journal/ajpendo (092.040.147.197) on Oct. 4, 2021.
Seymour et al., Bluetooth Master/Slave Communications and Sniff/Sniff Sub-rating Modes White Paper, Aug. 14, 2008.
Sola-Gazagnes, et al., "Emergent technologies applied to diabetes: What do we need to integrate continuous glucose monitoring into daily practice? Where the long-term use of continuous glucose monitoring stands in 2011", Diabetes & Metabolism, vol. 37, pages S65-S70 (2011).
Specification of the Bluetooth System, Experience More, Specification vol. 0, Covered Core Package Version: 4.0, 2302 pages (2010).
Specification of the Bluetooth System, Experience More, Specification vol. 0, Covered Core Package Version: 4.0, 89 pages (2010).
Specification of the Bluetooth System, Master Table of Contents & Compliance Requirements, Version 4.2 (2014).
Specification of the Bluetooth System, Master Table of Contents & Compliance Requirements, Version 4.1 (2013).
Stallings, "Cryptography and Network Security, Principles and Practice," 5th Ed., Prentice Hall (2011).
Strickland et al., "Continuous Glucose Monitoring Profile Bluetooth® Profile Specification," Interest Group, v1.0.1 (2015).
The New Shorter Oxford English Dictionary, p. 50 (1993).
Townsend et al., "Getting Started with Bluetooth Low Energy," O'Reilly (2014).
Wikipedia, "Analyte" retrieved from https://en.wikipedia.org/w/index.php?title=Analyte&oldid=527866671 (2012).
Wikipedia, "In vivo" retrieved from https://en.wikipedia.org/w/index.php?title=In_vivo&oldid=524960105 (2012).
Wikipedia page for "Challenge-response authentication" retrieved from https://en.wikipedia.org/w/index.php?title=Challenge-response authentication&oldid=567947229 (2013).
Wikipedia, Digital Signature, 10 pages retrieved from https://en.wikipedia.org/wiki/Digital_signature (2021).
Wikipedia page for "RSA (cryptosystem)" retrieved from https://en.wikipedia.org/w/index.php?title=RSA_(cryptosystem)&oldid=582212268, 17 pages retrieved from https://en.wikipedia.org/wiki/RSA_(cryptosystem) (2021).
Wikipedia page for "Bluetooth" retrieved from https://en.wikipedia.org/w/index.php?title=Bluetooth&oldid=744565671, 25 pages retrieved from https://en.wikipedia.org/wiki/Bluetooth (2022).
Wikipedia page for "Bluetooth Low Energy" retrieved from https://en.wikipedia.org/w/index.php?title=Bluetooth_Low_Energy&oldid=744163272, 11 pages retrieved from https://en.wikipedia.org/wiki/Bluetooth_Low_Energy (2022).
Wikipedia, "Near-field communication" retrieved from https://en.wikipedia.org/w/index.php?title=Near-field_communication&oldid=525308529 (2012).
International Search Report and Written Opinion mailed Mar. 30, 2023 corresponding to International Patent Application No. PCT/US2022/043493.
Zendehdel Ghazale Amel Gamel@UNB CA et al: "Automated Security Assessment Framework for Wearable BLE-enabled Health Monitoring Devices," ACM Transactions on Internet Technology, ACM, New York, NY, US, vol. 22, No. 1, Sep. 14, 2021 (Sep. 14, 2021), pp. 1-31, XP058662598, ISSN: 1533-5399, DOI: 10.1145/344864.9.
Buckingham et al., "Real-time continuous glucose monitoring," Current Opinion in Endocrinology, Diabetes & Obesity, 288-295 (2007)—20 pages Appendix I.
Buckingham, "Clinical Overview of Continuous Glucose Monitoring," Journal of Diabetes Science and Technology, vol. 2, Issue 2, 300-306 (2008)—26 pages Appendix J.
Diabetes Forecast, "Continuous Glucose Monitors for Kids," Practical Living, 1 page (Aug. 2007).
Diabetes Forecast, "Continuous Glucose Monitors for Kids," Practical Living, 10 pages (Aug. 2007).
File History of U.S. Pat. No. 10,194,844, issued Feb. 5, 2019, 151 pages.
File History of U.S. Pat. No. 11,013,431, issued May 25, 2021, 212 pages.
File History of U.S. Pat. No. 11,116,431, issued Sep. 14, 2021, 168 pages.
File History of U.S. Pat. No. 8,483,967, issued Jul. 9, 2013, 140 pages.
File History of U.S. Pat. No. 9,310,230, issued Apr. 12, 2016, 214 pages.
File History of U.S. Appl. No. 15/651,310, filed Oct. 4, 2019, 442 pages.
Medtronic, The MiniMed Paradigm® Real-Time Insulin Pump and Continuous Glucose Monitoring System, Sensor Features User Guide, https://web.archive.org/web/20071028164026/http://www.medtronicdiabetes.com/pdf/x22_sensor_features.pdf 77 pages (2007).
NFC Forum Bluetooth Special Interest Group, Bluetooth® Secure Simple Pairing Using NFC, 39 pages (2014).
Omre, Bluetooth Low Energy: Wireless Connectivity for Medical Monitoring, Journal of Diabetes Science and Technology, vol. 4, No. 2, pp. 457-463 (2010).
Premarket Approval (PMA), Paradigm Real Time System, FDA, P980032, 3 pages, Apr. 7, 2006.
Specification vol. 0, Specification of the Bluetooth System, Experience More, Master Table of Contents & Compliance Requirements, 134 pages (2010).
Specification vol. 0, Specification of the Bluetooth System, Wireless connections made easy, Master Table of Contents & Compliance Requirements, 92 pages (2003).
Strömmer, et al., Application of Near Field Communication for Health Monitoring in Daily Life, Proceedings of the 28$^{th}$ IEEE, EMBS Annual International Conference, pp. 3246-3249 (2006).
U.S. Appl. No. 15/651,310, filed Oct. 4, 2019, 442 pages.
WaybackMachine, Medtronic, *User Guides*, https://web.archive.org/web/20071009143917/http://www.medtronicdiabetes.com/products/iinsulinpumps/ 2 pages (2007).
WaybackMachine, Medtronic, *User Guides*, https://web.archive.org/web/20071009144413/http://www.medtronicdiabetes.com/index.html 2 pages (2007).
WaybackMachine, Medtronic, *User Guides*, https://web.archive.org/web/20071023121437/http://www.medtronicdiabetes.com/products/insulinpumps/userguides.html 9 pages (2007).
WaybackMachine, Medtronic, *User Guides*, https://web.archive.org/web/20071023121553/http://www.medtronicdiabetes.com/products/insulinpumps/userguides.html, 3 pages (2007).
WaybackMachine, Medtronic, *User Guides*, https://web.archive.org/web/20071023121607/http://www.medtronicdiabetes.com/products/insulinpumps/userguides.html, 3 pages (2007).
WaybackMachine, Medtronic, *User Guides*, https://web.archive.org/web/20071030065834/http://www.medtronicdiabetes.com/pdf/dtc_features_glance.pdf, 7 pages (2007).
Zhang, et al., Bluetooth Low Energy for Wearable Sensor-based Healthcare Systems, 2014 Health Innovations and Point-of-Care Technologies Conference, pp. 251-254 (2014).
Bluetooth Specification, Version 4.0, 2,303 pages (2010).

(56) References Cited

OTHER PUBLICATIONS

Bluetooth, Bluetooth Basics, Benefits of Bluetooth Technology, https://web.archive.org/web/20060611161103/http://www.bluetooth.com/Bluetooth/Learn/Basics/, 2006, 1 page.
Compare Specification—Apple iphone 6 vs. Apple iphone 6 Plus—https://www.gsmarena.com/compare.php3?idPhone1=6378&&idPhone2=6665, 2 pages, Jan. 31, 2022.
Declaration of Nathaniel E. Frank-White, Nov. 9, 2023, 28 pages.
Dexcom Continuous Glucose Monitoring, Discover Dexcom G5 Mobile Continuous Glucose Monitoring (CGM) System, CGM unveils what no meter can . . . , Oct. 17, 2023, 18 pages.
Dexcom Continuous Glucose Monitoring, FDA Approves Dexcom G5® Mobile Continuous Glucose Monitoring System, Aug. 24, 2015, 6 pages.
Dexcom G4 Platinum Pediatric, User's Guide Dexcom G4® Platinum (Pediatric) Continuous Glucose Monitoring System Received with Share™, 2015, 234 pages.
Dexcom G4® Platinum, Continuous Glucose Monitoring System, User's Guide, Dexcom, Inc., 161 pages (2015).
Dexcom G5 User Guide, Dexcom, Inc., 265 pages (2015).
Dexcom G5™ Mobile, Continuous Glucose Monitoring System, User Guide, Dexcom, Inc., 264 pages (2015).
Dexcom News Releases—FDA Approves Dexcom G4 Platinum Continuous Glucose Monitoring System with Share—https://www.dexcom.com/en-us/news/fda-approves-dexcom-g4-platinum-continuous-glucose-monitoring-system-share, Dexcom, Inc., 2 pages, Jan. 26, 2015.
Dexcom Press Release—FDA Approves Dexcom G5® Mobile Continuous Glucose Monitoring System—https://www.dexcom.com/news/1257506247-fda-approves-dexcom-g5®-mobile-continuous-glucose-monitoring-system, Dexcom, Inc., 4 pages, Aug. 24, 2015.
Encyclopedia Britannica, Science & Tech, Bluetooth Definition, 5 pages, (Oct. 14, 2023).
Excerpts from the "German Health Report Diabetes 2023" of the German Diabetes Society, 14 pages (2022) (with an English Abstract).
FDA U.S. Food & Drug Administration, Premarket Approval (PMA), Sep. 16, 2006, https://www.accessdata.fda.gov/scripts/cdrh/cfdocs/cfpma/pma.cfm?ID=388585, 4 pages.
Federal Communications Commission Office of Engineering and Technology Policy and Rules Division, FCC Online Table of Frequency Allocations, Revised on Jul. 1, 2022, 180 pages.
Ferro, et al., "Bluetooth and Wi-fi Wireless Protocols: A Survey and a Comparison", IEEE Wireless Communications, pp. 1-24 (2004).
Ferro, et al., "Bluetooth and Wi-fi Wireless Protocols: A Survey and a Comparison", IEEE Wireless Communications, 12(1):12-26 (2005).
FreeStyle Libre Flash Glucose Monitoring System, User's Manual, Abbott Diabetes Care Ltd., 124 pages (2014).
Hamblen, "A short history of NFC: Where Near Field Communication has come from.", 2 pages, Dec. 19, 2012.
IPhone User Guide for iOS 8.4 Software, 2015, 196 pages.
Klueh, et al., "Inflammation and Glucose Sensors: Use of Dexamethasone to Extend Glucose Sensor Function and Life Span in Vivo", Journal of Diabetes Science and Technology, 1(4):496-504 (2007).
Medtronic, CareLink Personal Therapy Management Software for Diabetes, 2007, 20 pages.
Memorandum Opinion, *Abbott Diabetes* v. *Dexcom, Inc.*, Mar. 22, 2023, 47 pages.
Press Coverage of FreeStyle Libre launch, Antonia Giese, retrieved from https://www.bild.de/ratgeber/gesundheit/diabetes/hightech-zucker-sensor-diabetes-test-freestyle-libre-flash-37732134.bild.html, 8 pages Sep. 20, 2014 (with an English Translation).
Seven STS® Continuous Glucose Monitoring System User's Guide, 2007, 74 pages.
Specification of the Bluetooth System, Experience More, Specification vol. 0, Covered Core Package Version: 4.0, 41 pages (2010).
Specification of the Samsung Galaxy Alpha, Samsung Newsroom Deutschland—http://www.samsung.de/galaxyalpha, 7 pages, Aug. 13, 2014 (with an English Abstract).
Wikipedia, the Free Encyclopedia, "Continuous glucose monitor", retrieved from https://en.wikipedia.org/w/index.php?title=Continuous_glucose_monitor&oldid=1180606331, 10 pages (Oct. 1, 2023).
Wikipedia, the Free Encyclopedia, "Radio-frequency identification", retrieved from https://en.wikipedia.org/wiki/Radio-frequency_identification, 30 pages (Oct. 23, 2023).
U.S. Appl. No. 60/587,787, filed Jul. 13, 2004, Brister et al.
CareLinkTMUsb, User Guide Medtronic MiniMed, 11pages (2007).
Ocean Systems Test and Evaluation Program, Data Communications Plan, NOAA, U.S. Department of Commerce, National Ocean Service Center for Operational Oceanographic Products and Services, 199 pages, May 2006.
The MiniMed Paradign Real-Time System: A Practical Guide to Continuous Glucose Monitoring, 18 pages (2006).
The MiniMed Paradign Real-Time Insulin Pump and Continuous Glucose Monitoring System, Fact Sheet, 2 pages (2006).
The MiniMed Paradign Real-Time Insulin Pump and Continuous Glucose Monitoring System, 522 and 722 Insulin Pumps User Guide, 262 pages (2008).
"Within Definition & Meaning" retrieved from "https://www.dictionary.com/browse/within" on Sep. 9, 2022, 5 pages.
Almurashi, A.M., et al., "Emerging Diabetes Technologies: Continuous Glucose Monitors/ Artificial Pancreases" J. Indian Inst. Sci, 2023, 26 pages.
Atmel® 8-bit AVR® Microcontroller with 16K Bytes In-System Programmable Flash, Atmega169P, 2010, 395 pages.
Atmel® Product Guide, 2008, 90 pages.
Cappon, G., et al., "Continuous Glucose Monitoring Sensors for Diabetes Management: A Review of Technologies and Applications" Diabetes Metabolism Journal, 2019;43:383-397.
Certified U.S. Pat. No. 11,000,216, Issued May 11, 2021, 86 pages.
CGM Frustration Survey, Dexcom, 2020, 37 pages.
Clinical Trials Competitor and Ecosystem Players, Abbott, 2020, 29 pages.
Das, S.K., et al., "Review-Electrochemistry and Other Emerging Technologies for Continuous Glucose Monitoring Devices" ECS Sensors Plus, 2022, 19 pages.
Declaration of Dr. Sayfe Kiael, Ph.D., Inter Partes Review of U.S. Pat. No. 10,375,222, 100 pages (2024).
Declaration of Karl R. Leinsng, MSME, PE, in Support of Abbott's Motion for Summary Judgement, 2023, 81 pages.
Dexcom G6 Continuous Glucose Monitoring System, User Guide, 2022, 346 pages.
Dexcom® User Guide for Dexcom G5® Mobile Continuous Glucose Monitoring (CGM) System, 2016, 372 pages.
Dexcom™ STS™-7 Continuous Glucose Monitoring System, Transmitter model No. 9400-02, 2006, 3 pages.
File History of U.S. Pat. No. 10,375,222 issued Aug. 6, 2019, Parts 1-2 (422 pages).
FreeStyle Libre 2 HCP Pulse, Abbott, 2021, 14 pages.
FreeStyle Libre 3 Continuous Glucose Monitoring System, User's Manual, 2023, 248 pages.
FreeStyle Navigator® Continuous Glucose Monitoring System, User Guide, 2008, 196 pages.
Garg, S.K., et al., "Flash Glucose Monitoring: The Future is Here" Diabetes Technology & Therapeutics, vol. 19, Supplement 2, 2017, 3 pages.
Global Commercial Insights Meeting, Abbott, 2019, 69 pages.
Glucose Sensor Applicator, Project Status Update, design concept, Dexcom, 2014, 6 pages.
Hirsch, I.B, et al., "Role of Continuous Glucose Monitoring in Diabetes Treatment" American Diabetes Association, Abbott, 2018, 28 pages.
International Diabetes Device, 2022 Blue Book, Seagrove Partners, Globeview™, 143 Pages.
National Diabetes Statistics Report, Estimates of Diabetes and Its Burden in the United States, 2023, 15 pages.
Seven®+Plus continuous glucose monitoring system, Users Guide, Dexcom, 2010, 144 pages.
The Minimed Paradigm® Real-Time Insulin Pump and Continuous Glucose Monitoring System, Insulin Pump User Guide, Medtronic, 2007, 180 pages.

(56) References Cited

OTHER PUBLICATIONS

"Abbott Receives CE Mark for Freestyle® Libre, a Revolutionary Glucose Monitoring System for People with Diabetes," 8 pages (2023).
Armstrong, "Wireless connectivity for health and sports monitoring: a review," Br J Sports Med, 41:285-289 (2007).
ATTD Program, 4 pages (2009).
Boise, Interview with Dexcom CEO, Dexcom CEO Kevin Sayer Explains G6, 9 pages (2018).
Breton et al., "Optimum Subcutaneous Glucose Sampling and Fourier," Journal of Diabetes Science and Technology, vol. 2, Issue 3, 495-500, May 2008.
Buckingham et al., "Real-time continuous glucose monitoring," Curr Opinion Endocrinology, Diabetes & Obesity, 14:288-295 (2007).
Buckingham, "Clinical Overview of Continuous Glucose Monitoring," Journal of Diabetes Science and Technology, vol. 2, Issue 2, 300-306 (2008).
Burge et al., "Continuous Glucose Monitoring: The Future of Diabetes Management," Diabetes Spectrum, vol. 21, No. 2, 112-119 (2008).
Choleau et al., "Calibration of a subcutaneous amperometric glucose sensor implanted for 7 days in diabetic patients Part 2. Superiority of the one-point calibration method," Biosensors and Bioelectronics 17, 647-654 (2002).
Dexcom (DXCM) Company Profile, 2017 /Q4 Earnings call transcript, 12 pages (2017).
Dexcom G6 Continuous Glucose Monitoring System User Guide, 7 pages (2020).
Email communication from Sophie Hood, Jan. 24, 2023, 6 pages.
Excerpts from Diabetes Forecast, 18 pages, Nov. 2007.
Excerpts F. White Affidavit, Medronic MiniMed, Inc., Questions regarding MiniMed Paradigm, 94 pages (2007).
Excerpts F. White Affidavit, Medronic MiniMed, Inc., MiniMed User Guides, 11 pages (2007).
FDA, Premarket Approval (PMA), 3 pages, Apr. 7, 2006.
File History, U.S. Appl. No. 17/411,154, 320 pages, filed Aug. 25, 2021.
File History, U.S. Appl. No. 17/411,154, 182 pages, filed Aug. 25, 2021.
File History, U.S. Appl. No. 17/411,154, 138 pages, filed Aug. 25, 2021.
File History, U.S. Appl. No. 17/245,719, 168 pages, filed Mar. 30, 2021.
File History, U.S. Appl. No. 16/228,910, 212 pages, filed Dec. 21, 2018.
File History, U.S. Appl. No. 15/061,774, 151 pages, filed Mar. 4, 2016.
File History, U.S. Appl. No. 13/925,694, 214 pages, filed Jun. 24, 2013.
File History, U.S. Appl. No. 12/769,635, 280 pages, filed Apr. 28, 2010.
File History, U.S. Appl. No. 12/056,651, 323 pages, filed Mar. 27, 2008.
File History, U.S. Appl. No. 11/931,363, 72 pages, filed Oct. 31, 2007.
File History, U.S. Appl. No. 11/322,568, 94 pages, filed Dec. 30, 2005.
File History, U.S. Appl. No. 10/335,256, 103 pages, filed Dec. 31, 2002.
File History, U.S. Appl. No. 09/935,827, 97 pages, filed Aug. 23, 2001.
Hall, Interview with Kevin Sayer, President and CEO of Dexcom About the New Dexcom G6, College Diabetes Network, 6 pages (2021).
Heller et al., "Electrochemical Glucose Sensors and Their Applications in Diabetes Management," Chem. Rev, 108, 2482-2505 (2008).
Hoss et al., "Continuous glucose monitoring in the tissue: Do we really need to calibrate in-vivo?," Diabetes Technology & Therapeutics, vol. II, No. 2, (2009).
Keenan et al., "Delays in Minimally Invasive Continuous Glucose Monitoring Devices: A Review of Current Technology," J Diabetes Sci Technol, vol. 3, Issue 5, 1207-1214 (2009).
Mastrototaro, "The MiniMed Continuous Glucose Monitoring System" Diabetes Technology & Therapeutics, vol. 2, Suppl 1, S-13-S-18 (2000).
McGarraugh, "The Chemistry of Commercial Continuous Glucose Monitors," Diatebes Technology & Theraputics, vol. 11, Suppl. 1, S-17-S-24 (2009).
Omnipod image, Exhibit 182, 2 pages, Sep. 22, 2022.
News Release, "Medtronic Receives FDA Approval for World's First Insulin Pump with Real-Time Continuous Glucose Monitoring—MiniMed Paradigm® Real-Time System Allows Patients to Make Immediate Diabetes Management Decisions; Marks Major Step Toward an Artificial Pancreas," The Wayback Machine—https://web.archive.org/web/20060427084431/http://wwwp.medtronic.com:80/Newsroom/NewsReleaseDetails.do?itemld=114487, 2 pages (2006).
Pantelopoulos et al., "A Survey on Wearable Biosensor Systems for Health Monitoring," 30th Annual International IEEE EMBS Conference, Vancouver, British Columbia, Canada, Aug. 20-24, 2008, 4887-4890 (2018).
Poitout et al., "A glucose monitoring system for on line estimation in man of blood glucose concentration using a miniaturized glucose sensor implanted in the subcutaneous tissue and a wearable control unit," Diabetologia, 36: 658-663 (1993).
Ruder, "Continuous Glucose Monitors for Kids," Diabetes Forecast, 1 page, Aug. 2007.
Sayer, CGMS Changing Diabetes Management: Kevin Sayer, DIC Interview Transcript, Featuring Steve Freed, 11 pages (2019).
Shenoi, "Introduction to Digital Signal Processing and Filter Design," Wiley & Sons, 46 pages (2006).
S&P Global Market Intelligence "DexCom, Inc. NasdaqGS:DXCM, Company Conference Presentation," 17 pages (2021).
S&P Global Market Intelligence "DexCom, Inc. NasdaqGS:DXCM, Company Conference Presentation," 10 pages (2020).
S&P Global Market Intelligence "DexCom, Inc. NasdaqGS:DXCM, Company Conference Presentation," 11 pages (2019).
Smith, The Science and Engineer's Guide to Digital Signal Processing, $2^{nd}$ Ed., 46 pages (1999).
U.S. Appl. No. 10/335,256 Specification and Drawings for "Relay device for transferring information between a sensor system and a fluid delivery system," filed Dec. 31, 2002, 88 pages.
U.S. Appl. No. 11/322,568 Specification and Drawings for "Telemetered characteristic monitor system and method of using the same," filed Dec. 30, 2005, 50 pages.
Sonix, Dexcom CEO—Prime Position in Our Market—Mad Money—CNBC.mp4, 4 pages (2023).
U.S. Food & Drug Administration, "Deciding When to Submit a 510(k) for a Change to an Existing Device, Guidance for Industry and Food and Drug Administration Staff," 78 pages (2017).
U.S. Food & Drug Administration, "Deciding When to Submit a 510(k) for a Change to an Existing Device, Guidance for Industry and Food and Drug Administration Staff," 32 pages (2017).
U.S. Appl. No. 17/245,719, filed Apr. 30, 2021, 51 pages.
U.S. Appl. No. 16/228,910, filed Dec. 21, 2018, 37 pages.
U.S. Appl. No. 60/976,886, filed Oct. 2, 2007, 62 pages.
Velho et al., "In vivo calibration of a subcutaneous glucose sensor for determination of subcutaneous glucose kinetics," Diabetes, American Diabetes Association, 1 (3), pp. 227-233. hal-01179359 (1988).
Watkin, "An Introduction to Flash Glucose Monitoring," 16 pages (2013).
A Dictionary of Computer Science for "authentication", Seventh Edition, Oxford University Press, 3 pages (2016).
BBC News, Technology, Bluetooth rival unveiled by Nokia, 2 pgs. (Oct. 4, 2006).
Bergenstal et al., "Effectiveness of Sensor-Augmented Insulin-Pump Therapy in Type 1 Diabetes," N Engl J Med 363:311-320 (2010).

(56) References Cited

OTHER PUBLICATIONS

Bloodborne pathogens, Occupational Safety and Health Admin., Labor, 29 CFR Ch. XVII (Jul. 1, 2003 Edition) § 1910.1030, pp. 260-273.
Bluetooth Specification V 2.1, Jul. 26, 2007, pp. 1-541.
Bluetooth Specification V 2.1, Jul. 26, 2007, pp. 542-906.
Burr, et al., Electronic Authentication Guideline, NIST Special Publication 800-63-2, Computer Security, NIST National Institute of Standards and Technology, U.S. Department of Commerce, 123 pages (2013).
Dexcom STS 7 Plus User's Guide, 2011, 144 pgs.
Dexcom STS 7 User Guide, 2007, 74 pgs.
Diglas et al., "Reduced pain perception with Pen Mate™ an automatic needle insertion device for use with an insulin pen," Practical Diabetes Int 16(2):39-41 (1999).
Expert Statement of Professor Pantelis Georgiou, Aug. 9, 2024, 52 pgs.
FDA Center for Drug Evaluation and Research, Jul. 18, 2005, 6 pgs.
FDA Medtronic Mini Guardian RT, Jul. 18, 2005, 13 pgs.
Freestyle Navigator User Guide, 2008, 195 pgs.
Guardian Real Time User Guide, 2006, 181 pgs.
Hirsch, "Realistic Expectations and Practical Use of Continuous Glucose Monitoring for the Endocrinologist," J Clin Endocrinol Metab 94:2232-2238 (2009).
Hughes, "The Business of Self-Monitoring of Blood Glucose: A Market Profile," Journal of Diabetes Science and Technology, 3(5):1219-1223 (2009).
IEEE 100, The Authoritative Dictionary of IEEE Standards Terms for "authentication", Seventh Edition, Standards Information Network IEEE Press, 3 pages (2000).
Mastrototaro et al., "Accuracy of Real-Time Continuous Glucose Monitoring in the MiniMed Paradigm System," Diabetes 56(1):A112 (2007).
Moore, "The Potential Use of Radio Frequency Identification Devices for Active Monitoring of Blood Glucose Levels," Journal of Diabetes Science and Technology 3(1):180-183 (2009).
Newton's Telecom Dictionary for "authenticate", 30th Updated, Expanded, Anniversary Edition, Harry Newton, 4 pages (2016).
Pellikaan Declaration, Abbotts Opening Claim, Jul. 13, 2022, 51 pgs.
Pellikaan Declaration, Bergenstal, Jul. 22, 2010, 11 pgs.
Pellikaan Declaration, Expert Declaration of Sarrafzadeh, Sep. 6, 2024, 100 pgs.
Pellikaan Declaration, JDR CGM Study Group, Oct. 2, 2008, 14 pgs.
Pellikaan Declaration, Mastrototaro, Part 1, Jun. 22-26, 2007, 6 pgs.
Pellikaan Declaration, Mastrototaro, Part 2, 2008, 5 pgs.
Pellikaan Declaration, US FDA, Jul. 18, 2005, 14 pgs.
Pellikaan Declaration, Wolpert, Mar. 2008, 5 pgs.

The Juvenile Diabetes Research Foundation Continuous Glucose Monitoring Study Group, "Continuous Glucose Monitoring and Intensive Treatment of Type 1 Diabetes," Engl J Med 359:1464-1476 (2008).
Wolpert, "Establishing a Continuous Glucose Monitoring Program," Journal of Diabetes Science and Technology 2(2):307-310 (2008).
Wright Jr. et al., "Ambulatory Glucose Profiling," Supplement to the Journal of Family Practice, 64(12):S44-S47 (2015).
Bergenstal, et al., Recommendations for Standardizing Glucose Reporting and Analysis to Optimize Clinical Decision Making in Diabetes: The Ambulatory Glucose Profile (AGP), Diabetes Technology & Therapeutics, vol. 15, No. 3, pp. 198-211 (2013).
CareLink Personal Software Quick Start Guide, 2015, 2 pgs.
Continuous Glucose Monitoring System Receiver with Share™ User's Guide Dexcom G4® Platinum (Pediatric), 234 pages (2015).
Dawson, "The Integration of Ground-based Real-time Telemetry Processing, On-board Chapter 10 Aircraft Data Recorders, and 802.11G Links," International Telemetering Conference Proceedings, Aug. 31, 2024, 5 pgs.
Dexcom, Inc.'s Initial Proposed Claim Constructions, C.A. No. 23-239-KAJ, 10 pages (Feb. 28, 2024).
Dexcom User Guide for Dexcom G5® Mobile Continuous Glucose Monitoring (CGM) System, 372 pages (2016).
FDA U.S. Food & Drug Administration, Premarket Approval (PMA), Dexcom G5 Mobile Continuous Glucose Monitoring System (Decision date: Sep. 16, 2016) 4 pages.
Getting Started, CareLink™ Personal, Therapy Management Software for Diabetes, Medtronic, 20 pages (2007).
Grace et al., "Vehicle Network Concept Demonstration," International Telemetering Conference Proceedings, Aug. 31, 2024, 11 pgs.
Kumar Das, et al., Review-Electrochemistry and Other Emerging Technologies for Continuous Glucose Monitoring Devices, ECS Sensors Plus, 1 031601, 19 pages (2022).
HDP Spec, Health Device Profile, Jun. 26, 2008, 44 pgs.
Hodack, "Implementing iNET and the Operational Issues Involved," International Telemetering Conference Proceedings, Aug. 31, 2024, 8 pgs.
Johnson et al., "Chapter 20, Telemetry for Biosensor Systems," Electrochemical Methods of Neuroscience, 13 pgs. (2007).
Mathis et al., "TCP Selective Acknowledgment Options," Sun Microsystems, Oct. 1996, 14 pgs.
National Diabetes Statistics Report, CDC Diabetes, 14 pages (May 15, 2024).
Role of Continuous Glucose Monitoring in Diabetes Treatment, American Diabetes Association, 28 pages (2018).
Sohraby et al., "Wireless Sensor Networks. Technology, Protocols, and Applications," 2007, 326 pgs.
Standards of Medical Care in Diabetes-2007, American Diabetes Association, Diabetes Care, vol. 30, Supplement 1, pp. S4-S41 (2007).
User's Manual, Continuous Glucose Monitoring System FreeStyle Libre 3 app, 248 pages (2022-2023).
ZigBee Specification, Jan. 17, 2008, 604 pgs.

\* cited by examiner

MODULAR ANALYTE CONNECTIVITY SYSTEM FOR EXTENDIBLE COMMUNICATION WITH DIFFERENT TYPES OF PHYSIOLOGICAL SENSORS

CROSS-REFERENCE TO RELATED APPLICATIONS

This application claims the benefit, under 35 U.S.C. § 119(e), of U.S. Provisional Patent Application No. 63/316, 906, filed Mar. 4, 2022, U.S. Provisional Patent Application No. 63/295,726, filed Dec. 31, 2021, and U.S. Provisional Patent Application No. 63/244,694, filed Sep. 15, 2021, each of which is incorporated herein by reference in its entirety and for all purposes.

FIELD

The subject matter described herein relates generally to systems, devices, and methods for obtaining, monitoring and management of analyte levels of a user, including communication between an analyte sensor and external applications.

BACKGROUND

The frequent monitoring and management of analyte levels, such as glucose, ketones, lactate, oxygen, hemoglobin A1C, or the like, can improve the overall health of people and, in particular, people with diabetes. Patients with diabetes mellitus can experience complications including loss of consciousness, cardiovascular disease, retinopathy, neuropathy, and nephropathy. Diabetics are generally required to monitor their glucose levels to ensure that they are being maintained within a clinically safe range, and can also use this information to determine if and/or when insulin is needed to reduce glucose levels in their bodies, or when additional glucose is needed to raise the level of glucose in their bodies.

Clinical data demonstrates a strong correlation between the frequency of glucose monitoring and glycemic control. Despite such correlation, however, many individuals diagnosed with a diabetic condition do not monitor their glucose levels as frequently as they should due to a combination of factors including convenience, testing discretion, pain associated with glucose testing, and cost.

To increase patient adherence to a plan of frequent glucose monitoring, in vivo analyte monitoring systems can be utilized, in which a sensor control device can be worn on the body of an individual who requires analyte monitoring. To increase comfort and convenience for the individual, the sensor control device can have a small form-factor, and can be assembled and applied by the individual with a sensor applicator. The application process includes inserting a sensor, such as an in vivo sensor that senses a user's analyte level in a bodily fluid located in the dermal layer of the human body, using an applicator or insertion mechanism, such that the sensor comes into contact with a bodily fluid. The sensor control device can also be configured to transmit analyte data to another device, from which the individual or her health care provider ("HCP") can review the data and make therapy decisions. During the life cycle of a sensor, context information can be generated that help improve performance.

Furthermore, the benefits of analyte monitoring system are not limited to persons with diabetes. For instance, analyte monitoring systems can provide useful information and insights to individuals interested in improving their health and wellness. As one example, to improve performance, athletes can utilize a sensor control device worn on the body to collect data relating to one or more analytes such as, for example, glucose and/or lactate.

Various applications make use of the sensor data to perform various functions, including wellness functions. However, each software that desires to use the sensor data can become subject to regulatory standards or require regulatory clearance and be viewed as software as a medical device. Any new application desiring to make a use-case for the physiological data that can be obtained from sensors can face regulatory hurdles under the Food and Drug Administration. Thus, there exists a need to provide a framework that can communicate with physiological sensors and receive analyte data for use by various applications, including third party applications, but avoids the need for regulatory approval for every use-case for the data.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter is directed to a medical device communication system that provides communications between sensors and applications. The medical device system utilizes a novel modular and extensible design that allows new sensors to be integrated into the system without requiring reconfiguration of the medical device system. The medical device communication system utilizes a software library for use by applications to obtain and relay sensor data.

The medical device communication system can be configured to include a regulated and unregulated portion. The regulated portion includes components that are subject to regulatory approval. Examples of these regulated components include the sensors and certain aspects of the software that are responsible for relaying data from the sensor such as the software library. The unregulated portion includes components that do not require regulatory approval. Examples of these unregulated components include third-party applications which can interface with the software library to communicate with sensors. In accordance with the disclosed subject matter, the plurality of physiological sensors and the software library are subject to regulatory approval, including as software as a medical device. The output indicative of the physiological signal from the physiological sensors is also subject to regulatory approval. However, third party applications running on the computing device is not subject to regulatory approval and can be configured to run in conjunction with the software library.

The medical device communication system described herein provides a number of advantages over prior art systems. For example, the system allows third-party applications to be integrated without subjecting those applications to regulatory approval because the core communications and processing features are part of the software library. Accordingly, third-party applications can be developed and utilized quickly. Additionally, conventional software libraries were not future-proof because they could not be easily upgraded to accommodate new types of sensors.

The software library can include a sensor control module, a remote management module, and include software logic for communication with a plurality of physiological sensors and applications. The sensor control module can authenticate the receiving device to allow the receiving device to receive sensor data, including by enabling communication with each of the plurality of physiological sensors to receive sensor data including data indicative of a different physiological signal. The sensor control module can further store the sensor data in a memory of the computing device. The sensor control module can obtain an output indicative of the different physiological signals from the sensor data of each of the plurality of physiological sensors. The sensor control module can provide the output of the different physiological signals from the physiological sensors to the authenticated third party application running on the computing device.

In accordance with the disclosed subject matter, the physiological sensors can comprise an analyte sensor configured to detect an analyte level in a bodily fluid of a user. The output of the different physiological signals can also comprise an analyte value. The output can further comprise a notification of a physiological condition. The output can further indicate information about delivery of a medicament to a user.

In accordance with the disclosed subject matter, the communication session within the computing device and between the computing device and the physiological sensors can comprise a near-field communication (NFC), Bluetooth low energy (BLE), or any suitable wireless communication protocol known in the art.

The software library can further include a remote data management module including instructions to transmit sensor data to a remote server over a network. The remote management module can be configured to communicate with the remote server to authenticate the sensor control module, third party application, or any other application. The authentication can use a uniform user interface irrespective of the application accessing the software library.

The software library can be configured to be implemented as a component of the authenticated third party application. Because of the modular architecture and shared functionality, sensor data can be substantially simultaneously received, interpreted, and displayed from a plurality of physiological sensors.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Figure 1A:
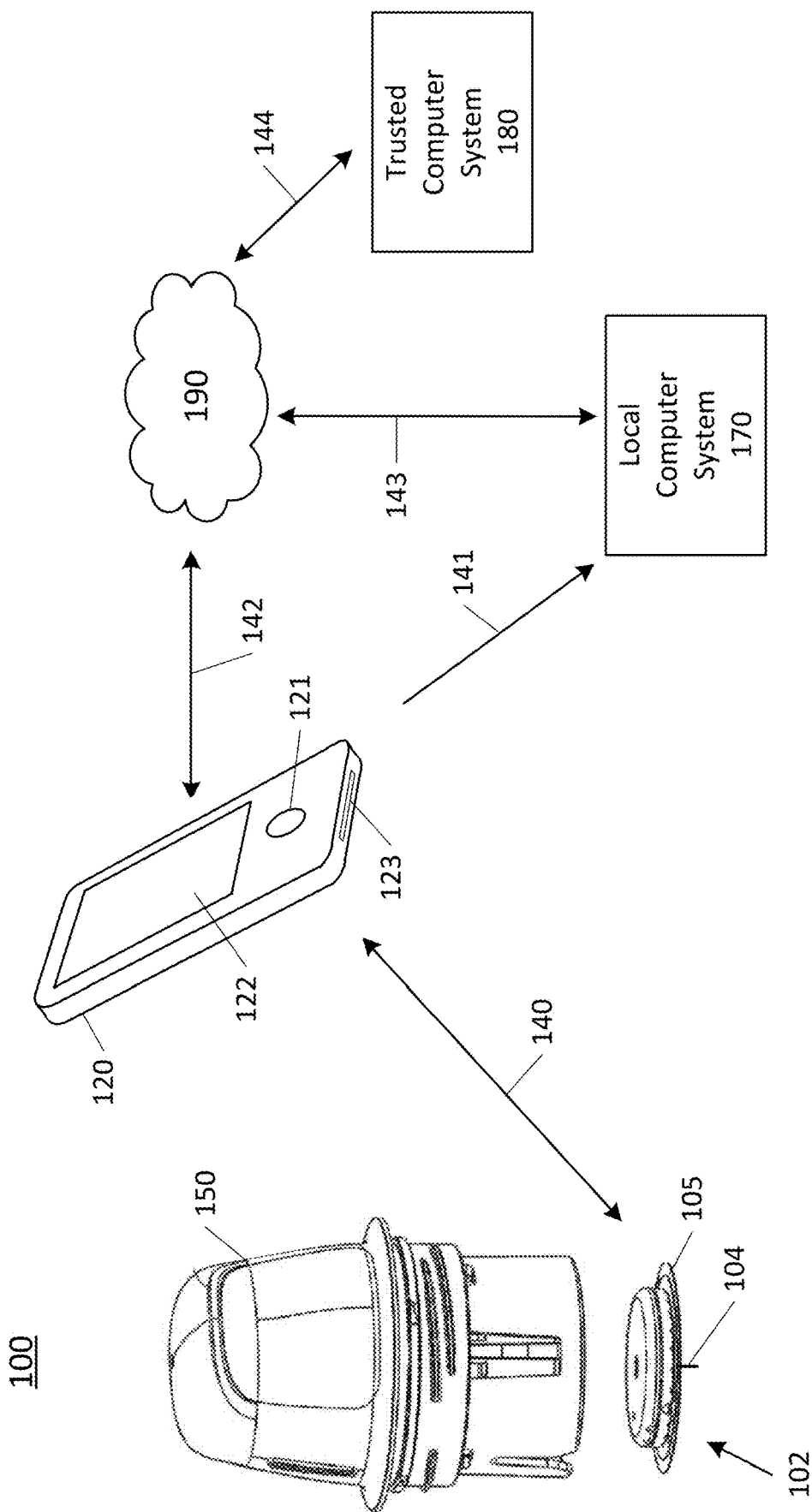
FIG. 1A is a system overview of a sensor applicator, reader device, monitoring system, network, and remote system.

Reference will now be made in detail to the various exemplary embodiments of the disclosed subject matter, exemplary embodiments of which are illustrated in the accompanying drawings.

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

As used herein and in the appended claims, the singular forms "a," "an," and "the" include plural referents unless the context clearly dictates otherwise.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

Generally, embodiments of the present disclosure include systems, devices, and methods for the use of analyte sensor insertion applicators for use with in vivo analyte monitoring systems. An applicator can be provided to the user in a sterile package with an electronics housing of the sensor control device contained therein. According to some embodiments, a structure separate from the applicator, such as a container, can also be provided to the user as a sterile package with a sensor module and a sharp module contained therein. The user can couple the sensor module to the electronics housing, and can couple the sharp to the applicator with an assembly process that involves the insertion of the applicator into the container in a specified manner. In other embodiments, the applicator, sensor control device, sensor module, and sharp module can be provided in a single package. The applicator can be used to position the sensor control device on a human body with a sensor in contact with the wearer's bodily fluid. The embodiments provided herein are improvements to reduce the likelihood that a sensor is improperly inserted or damaged, or elicits an adverse physiological response. Other improvements and advantages are provided as well. The various configurations of these devices are described in detail by way of the embodiments which are only examples.

Furthermore, many embodiments include in vivo analyte sensors structurally configured so that at least a portion of the sensor is, or can be, positioned in the body of a user to obtain information about at least one analyte of the body. It should be noted, however, that the embodiments disclosed herein can be used with in vivo analyte monitoring systems that incorporate in vitro capability, as well as purely in vitro or ex vivo analyte monitoring systems, including systems that are entirely non-invasive.

Furthermore, for each and every embodiment of a method disclosed herein, systems and devices capable of performing each of those embodiments are covered within the scope of the present disclosure. For example, embodiments of sensor control devices are disclosed and these devices can have one or more sensors, analyte monitoring circuits (e.g., an analog circuit), memories (e.g., for storing instructions), power sources, communication circuits, transmitters, receivers, processors and/or controllers (e.g., for executing instructions) that can perform any and all method steps or facilitate the execution of any and all method steps. These sensor control device embodiments can be used and can be capable of use to implement those steps performed by a sensor control device from any and all of the methods described herein.

Furthermore, the systems and methods presented herein can be used for operations of a sensor used in an analyte monitoring system, such as but not limited to wellness, fitness, dietary, research, information or any purposes involving analyte sensing over time. As used herein, "sensor" can refer to any device capable of receiving sensor information from a user, including for purpose of illustration but not limited to, body temperature sensors, blood pressure sensors, pulse or heart-rate sensors, glucose level sensors, analyte sensors, physical activity sensors, body movement sensors, or any other sensors for collecting physical or biological information. Analytes measured by the analyte sensors can include, by way of example and not limitation, glucose, ketones, lactate, oxygen, hemoglobin A1C, albumin, alcohol, alkaline phosphatase, alanine transaminase, aspartate aminotransferase, bilirubin, blood urea nitrogen, calcium, carbon dioxide, chloride, creatinine, hematocrit, lactate, magnesium, oxygen, pH, phosphorus, potassium, sodium, total protein, uric acid, etc.

Before describing these aspects of the embodiments in detail, however, it is first desirable to describe examples of devices that can be present within, for example, an in vivo analyte monitoring system, as well as examples of their operation, all of which can be used with the embodiments described herein.

There are various types of in vivo analyte monitoring systems. "Continuous Analyte Monitoring" systems (or "Continuous Glucose Monitoring" systems), for example, can transmit data from a sensor control device to a reader device continuously without prompting, e.g., automatically according to a schedule. "Flash Analyte Monitoring" systems (or "Flash Glucose Monitoring" systems or simply "Flash" systems), as another example, can transfer data from a sensor control device in response to a scan or request for data by a reader device, such as with a Near Field Communication (NFC) or Radio Frequency Identification (RFID) protocol. In vivo analyte monitoring systems can also operate without the need for finger stick calibration.

In vivo analyte monitoring systems can be differentiated from "in vitro" systems that contact a biological sample outside of the body (or "ex vivo") and that typically include a meter device that has a port for receiving an analyte test strip carrying bodily fluid of the user, which can be analyzed to determine the user's blood sugar level.

In vivo monitoring systems can include a sensor that, while positioned in vivo, makes contact with the bodily fluid of the user and senses the analyte levels contained therein. The sensor can be part of the sensor control device that resides on the body of the user and contains the electronics and power supply that enable and control the analyte sensing. The sensor control device, and variations thereof, can also be referred to as a "sensor control unit," an "on-body electronics" device or unit, an "on-body" device or unit, or a "sensor data communication" device or unit, to name a few.

In vivo monitoring systems can also include a device that receives sensed analyte data from the sensor control device and processes and/or displays that sensed analyte data, in any number of forms, to the user. This device, and variations thereof, can be referred to as a "handheld reader device," "reader device" (or simply a "reader"), "handheld electronics" (or simply a "handheld"), a "portable data processing" device or unit, a "data receiver," a "receiver" device or unit (or simply a "receiver"), or a "remote" device or unit, to name a few. Other devices such as personal computers have also been utilized with or incorporated into in vivo and in vitro monitoring systems.

FIG. 1A is a conceptual diagram depicting an example embodiment of an analyte monitoring system 100 that includes a sensor applicator 150, a sensor control device 102, and a data receiving device 120. Here, sensor applicator 150 can be used to deliver sensor control device 102 to a monitoring location on a user's skin where a sensor 104 is maintained in position for a period of time by an adhesive patch 105. Sensor control device 102 is further described in FIGS. 2B and 2C, and can communicate with data receiving device 120 via a communication path 140 using a wired or wireless technique. Example wireless protocols include Bluetooth, Bluetooth Low Energy (BLE, BTLE, Bluetooth SMART, etc.), Near Field Communication (NFC) and others. Users can monitor applications installed in memory on data receiving device 120 using screen 122 and input 121 and the device battery can be recharged using power port 123. More detail about data receiving device 120 is set forth with respect to FIG. 2A below. Data receiving device 120 can communicate with local computer system 170 via a communication path 141 using a wired or wireless technique. Local computer system 170 can include one or more of a laptop, desktop, tablet, phablet, smartphone, set-top box, video game console, or other computing device and wireless communication can include any of a number of applicable wireless networking protocols including Bluetooth, Bluetooth Low Energy (BTLE), Wi-Fi or others. Local computer system 170 can communicate via communications path 143 with a network 190 similar to how data receiving device 120 can communicate via a communications path 142 with network 190, by wired or wireless technique as described previously. Network 190 can be any of a number of networks, such as private networks and public networks, local area or wide area networks, and so forth. A trusted computer system 180 can include a server and can provide authentication services and secured data storage and can communicate via communications path 144 with network 190 by wired or wireless technique.

Figure 1B:
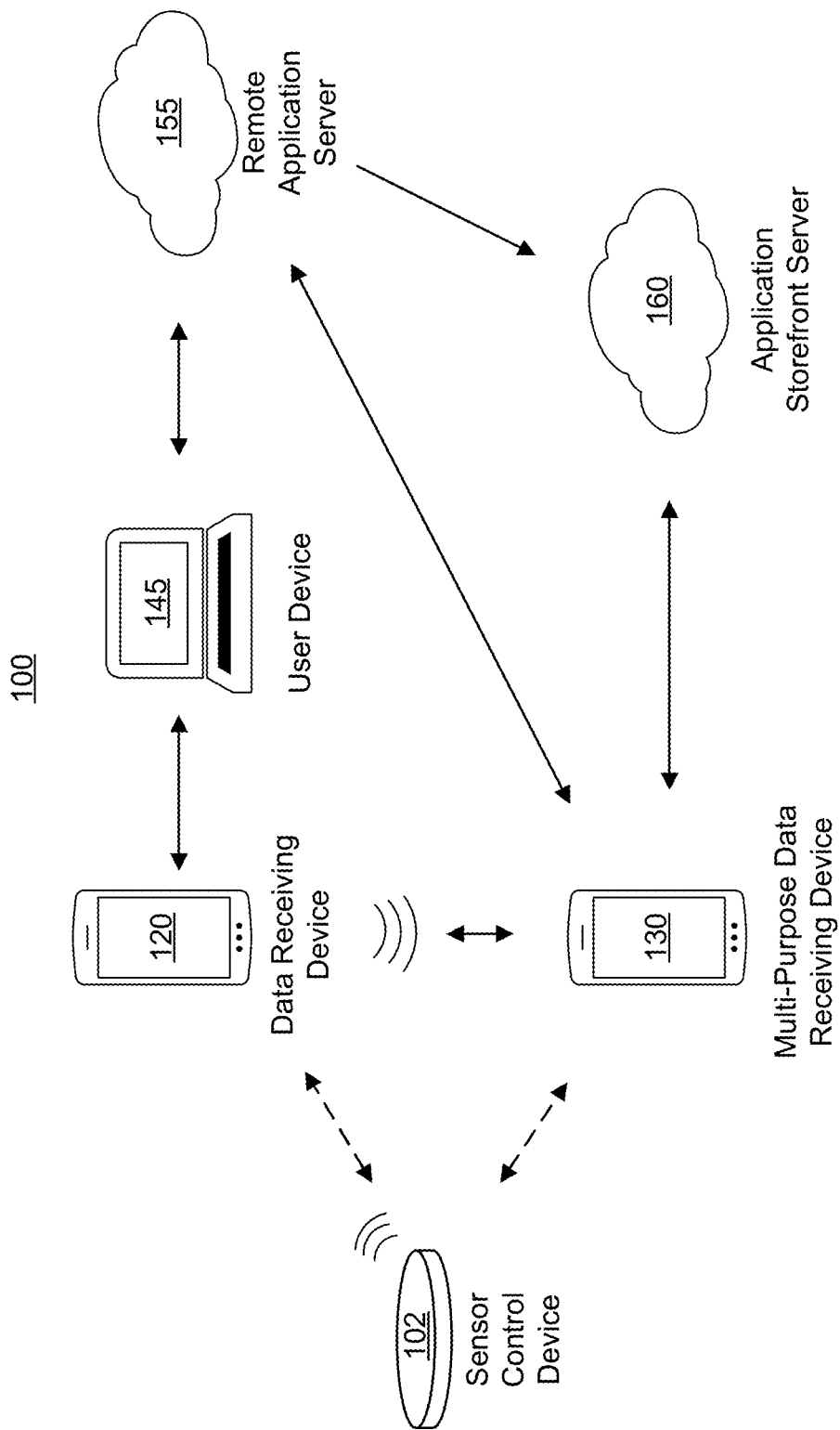
FIG. 1B is a diagram illustrating an operating environment of an example analyte monitoring system for use with the techniques described herein.

FIG. 1B illustrates another example embodiment of an operating environment of an analyte monitoring system 100 capable of embodying the techniques described herein. As illustrated, the analyte monitoring system 100 can include a system of components designed to provide monitoring of parameters, such as analyte levels, of a human or animal body or can provide for other operations based on the configurations of the various components. As embodied herein, the system can include a low-power sensor control device 102 worn by the user or attached to the body for which information is being collected. As embodied herein, the sensor control device 102 can be a sealed, disposable device with a predetermined active use lifetime (e.g., 1 day, 14 days, 30 days, etc.). Sensors 110 can be applied to the skin of the user body and remain adhered over the duration of the sensor lifetime or can be designed to be selectively removed and remain functional when reapplied. The low-power analyte monitoring system 100 can further include a data reading device 120 or multi-purpose data receiving device 130 configured as described herein to facilitate retrieval and delivery of data, including analyte data, from the sensor control device 102.

As embodied herein, the analyte monitoring system 100 can include a software or firmware library or application provided, for example via a remote application server 155 or application storefront server 160, to a third-party and incorporated into a multi-purpose hardware device 130 such as a mobile phone, tablet, personal computing device, or other similar computing device capable of communicating with the sensor control device 102 over a communication link. Multi-purpose hardware can further include embedded devices, including, but not limited to insulin pumps or insulin pens, having an embedded library configured to communicate with the sensor control device 102. Although the illustrated embodiments of the analyte monitoring system 100 include only one of each of the illustrated devices, this disclosure contemplates the analyte monitoring system 100 incorporate multiples of each components interacting throughout the system. For example and without limitation, as embodied herein, data receiving device 120 and/or multi-purpose data receiving device 130 can include multiples of each. As embodied herein, multiple data receiving devices 130 can communicate directly with sensor control device 102 as described herein. Additionally or alternatively, a data receiving device 130 can communicate with secondary data receiving devices 130 to provide analyte data, or visualization or analysis of the data, for secondary display to the user or other authorized parties.

Figure 2A:
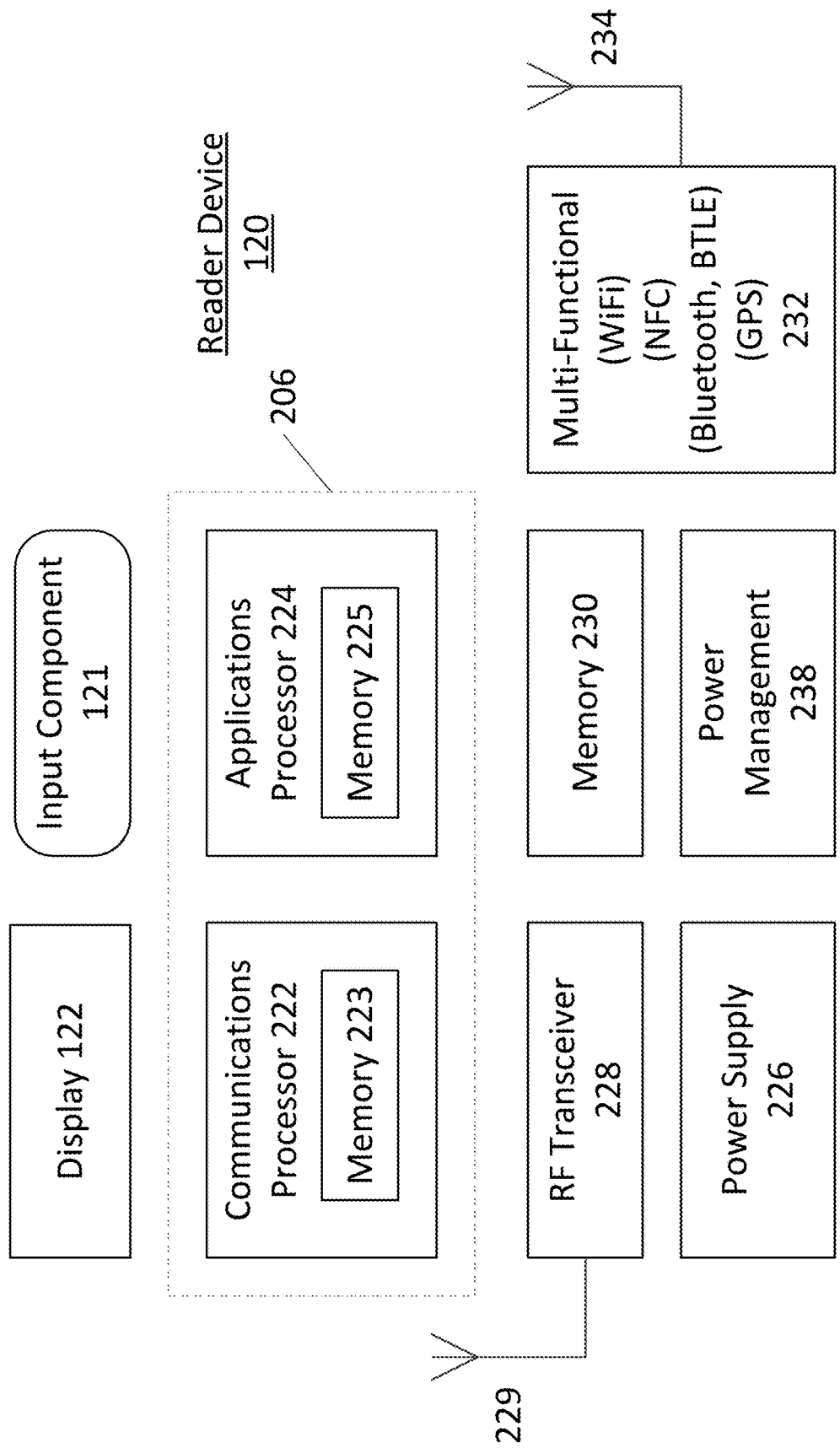
FIG. 2A is a block diagram depicting an example embodiment of a reader device.

FIG. 2A is a block diagram depicting an example embodiment of a data receiving device 120 configured as a smartphone. Here, data receiving device 120 can include a display 122, input component 121, and a processing core 206 including a communications processor 222 coupled with memory 223 and an applications processor 224 coupled with memory 225. Also included can be separate memory 230, RF transceiver 228 with antenna 229, and power supply 226 with power management module 238. Further included can be a multi-functional transceiver 232 which can communicate over Wi-Fi, NFC, Bluetooth, BTLE, and GPS with an antenna 234. As understood by one of skill in the art, these components are electrically and communicatively coupled in a manner to make a functional device.

Data receiving device 120 can be a mobile communication device such as, for example, a Wi-Fi or internet enabled smartphone, tablet, or personal digital assistant (PDA). Examples of smartphones can include, but are not limited to, those phones based on a WINDOWS operating system, ANDROID operating system, IPHONE operating system, PALM, WEBOS, BLACKBERRY operating system, or SYMBIAN operating system, with data network connectivity functionality for data communication over an internet connection and/or a local area network (LAN).

Data receiving device 120 can also be configured as a mobile smart wearable electronics assembly, such as an optical assembly that is worn over or adjacent to the user's eye (e.g., a smart glass or smart glasses, such as GOOGLE GLASSES). This optical assembly can have a transparent display that displays information about the user's analyte level (as described herein) to the user while at the same time allowing the user to see through the display such that the user's overall vision is minimally obstructed. The optical assembly can be capable of wireless communications similar to a smartphone. Other examples of wearable electronics include devices that are worn around or in the proximity of the user's wrist (e.g., a smart watch, etc.), neck (e.g., a necklace, etc.), head (e.g., a headband, hat, etc.), chest, or the like.

Figure 2B:
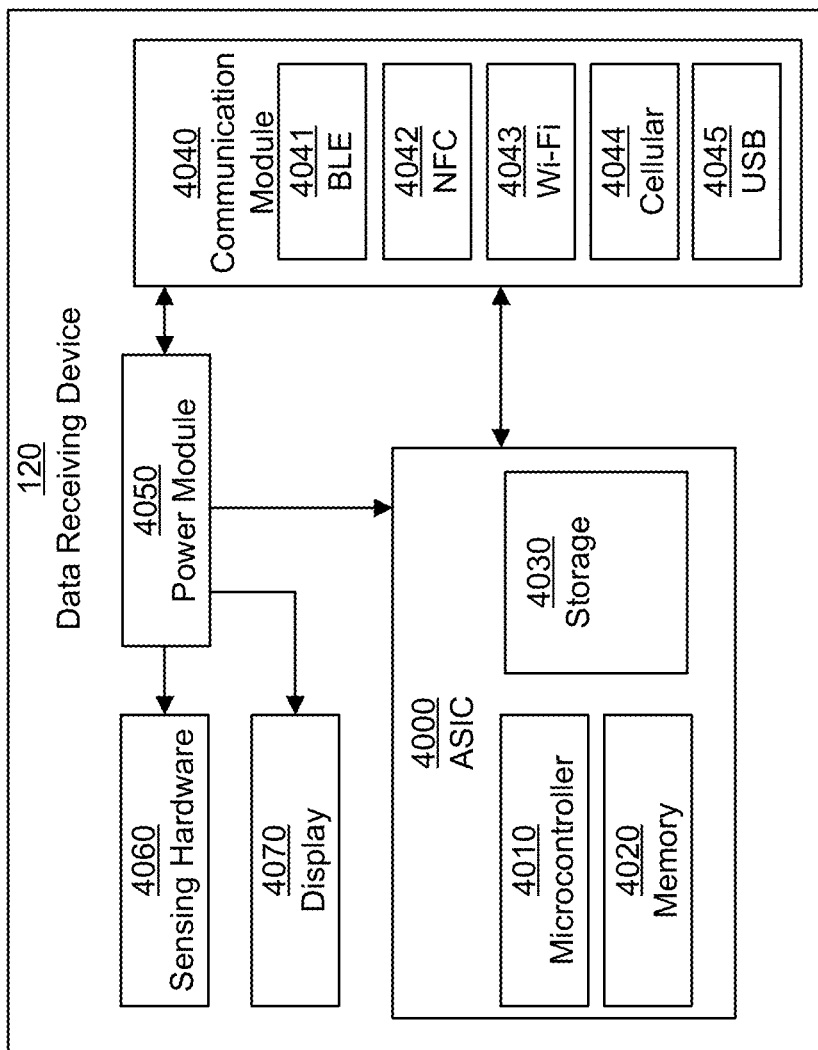
FIG. 2B is a block diagram illustrating an example data receiving device for communicating with the sensor according to exemplary embodiments of the disclosed subject matter.

For purpose of illustration and not limitation, reference is made to another exemplary embodiment of a data receiving device 120 for use with the disclosed subject matter as shown in FIG. 2B. The data receiving device 120, and the related multi-purpose data receiving device 130, includes components germane to the discussion of the sensor control device 102 and its operations and additional components can be included. In particular embodiments, the data receiving device 120 and multi-purpose data receiving device 130 can be or include components provided by a third party and are not necessarily restricted to include devices made by the same manufacturer as the sensor control device 102.

As illustrated in FIG. 2B, the data receiving device 120 includes an ASIC 4000 including a microcontroller 4010, memory 4020, and storage 4030 and communicatively coupled with a communication module 4040. Power for the components of the data receiving device 120 can be delivered by a power module 4050, which as embodied herein can include a rechargeable battery. The data receiving device 120 can further include a display 4070 for facilitating review of analyte data received from an sensor control device 102 or other device (e.g., user device 145 or remote application server 155). The data receiving device 120 can include separate user interface components (e.g., physical keys, light sensors, microphones, etc.).

The communication module 4040 can include a BLE module 4041 and an NFC module 4042. The data receiving device 120 can be configured to wirelessly couple with the sensor control device 102 and transmit commands to and receive data from the sensor control device 102. As embodied herein, the data receiving device 120 can be configured to operate, with respect to the sensor control device 102 as described herein, as an NFC scanner and a BLE end point via specific modules (e.g., BLE module 4042 or NFC module 4043) of the communication module 4040. For example, the data receiving device 120 can issue commands (e.g., activation commands for a data broadcast mode of the sensor; pairing commands to identify the data receiving device 120) to the sensor control device 102 using a first module of the communication module 4040 and receive data from and transmit data to the sensor control device 102 using a second module of the communication module 4040. The data receiving device 120 can be configured for communication with a user device 145 via a Universal Serial Bus (USB) module 4045 of the communication module 4040.

As another example, the communication module 4040 can include, for example, a cellular radio module 4044. The cellular radio module 4044 can include one or more radio transceivers for communicating using broadband cellular networks, including, but not limited to third generation (3G), fourth generation (4G), and fifth generation (5G) networks. Additionally, the communication module 4040 of the data receiving device 120 can include a Wi-Fi radio module 4043 for communication using a wireless local area network according to one or more of the IEEE 802.11 standards (e.g., 802.11a, 802.11b, 802.11g, 802.11n (aka Wi-Fi 4), 802.11ac (aka Wi-Fi 5), 802.11ax (aka Wi-Fi 6)). Using the cellular radio module 4044 or Wi-Fi radio module 4043, the data receiving device 120 can communicate with the remote application server 155 to receive analyte data or provide updates or input received from a user (e.g., through one or more user interfaces). Although not illustrated, the communication module 5040 of the analyte sensor 120 can similarly include a cellular radio module or Wi-Fi radio module.

As embodied herein, the on-board storage 4030 of the data receiving device 120 can store analyte data received from the sensor control device 102. Further, the data receiving device 120, multi-purpose data receiving device 130, or a user device 145 can be configured to communicate with a remote application server 155 via a wide area network. As embodied herein, the sensor control device 102 can provide data to the data receiving device 120 or multi-purpose data receiving device 130. The data receiving device 120 can transmit the data to the user computing device 145. The user computing device 145 (or the multi-purpose data receiving device 130) can in turn transmit that data to a remote application server 155 for processing and analysis.

As embodied herein, the data receiving device 120 can further include sensing hardware 4060 similar to, or expanded from, the sensing hardware 5060 of the sensor control device 102. In particular embodiments, the data receiving device 120 can be configured to operate in coordination with the sensor control device 102 and based on analyte data received from the sensor control device 102. As an example, where the sensor control device 102 glucose sensor, the data receiving device 120 can be or include an insulin pump or insulin injection pen. In coordination, the compatible device 130 can adjust an insulin dosage for a user based on glucose values received from the analyte sensor.

Figure 2C:
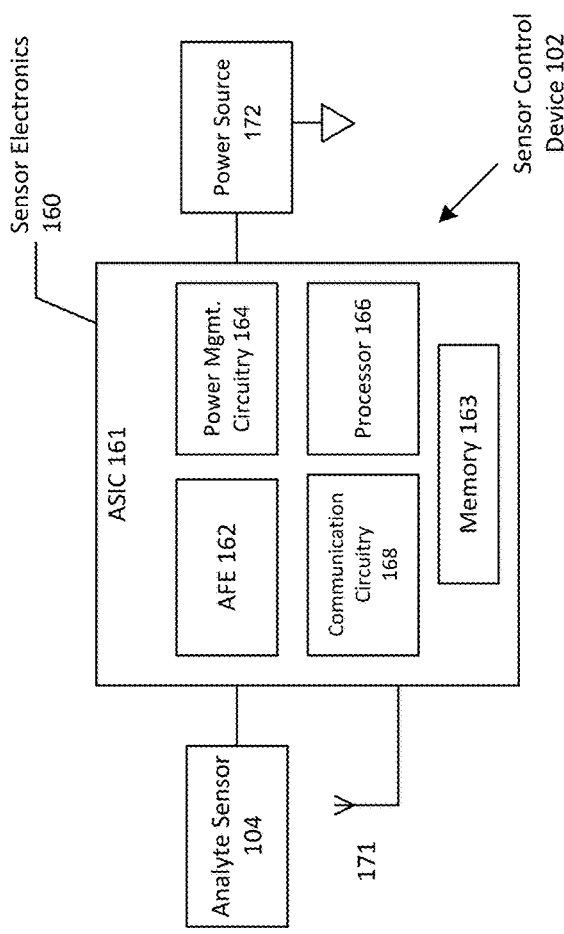
FIGS. 2C and 2D are block diagrams depicting example embodiments of sensor control devices.
Figure 2D:
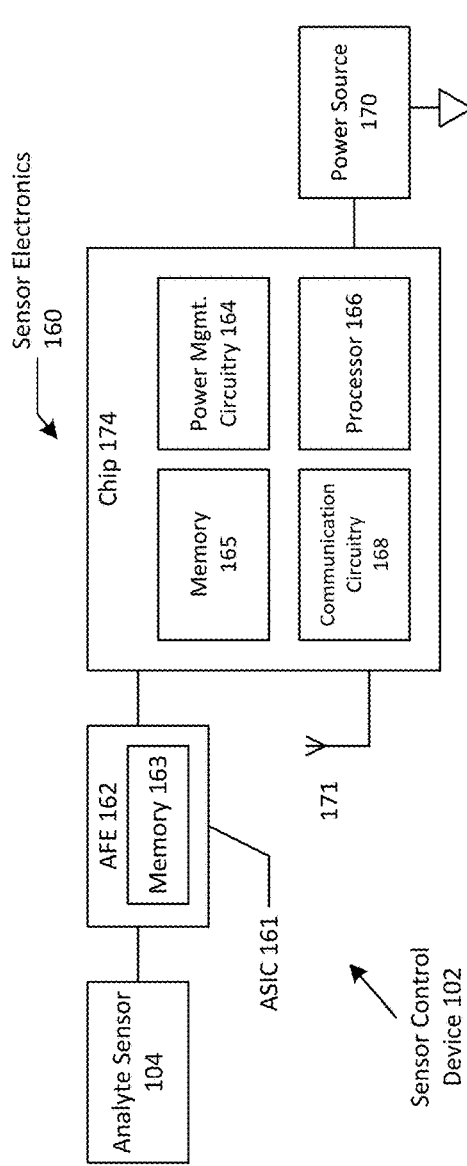

FIGS. 2C and 2D are block diagrams depicting example embodiments of sensor control device 102 having analyte sensor 104 and sensor electronics 160 (including analyte monitoring circuitry) that can have the majority of the processing capability for rendering end-result data suitable for display to the user. In FIG. 2C, a single semiconductor chip 161 is depicted that can be a custom application specific integrated circuit (ASIC). Shown within ASIC 161 are certain high-level functional units, including an analog front end (AFE) 162, power management (or control) circuitry 164, processor 166, and communication circuitry 168 (which can be implemented as a transmitter, receiver, transceiver, passive circuit, or otherwise according to the communication protocol). In this embodiment, both AFE 162 and processor 166 are used as analyte monitoring circuitry, but in other embodiments either circuit can perform the analyte monitoring function. Processor 166 can include one or more processors, microprocessors, controllers, and/or microcontrollers, each of which can be a discrete chip or distributed amongst (and a portion of) a number of different chips.

A memory 163 is also included within ASIC 161 and can be shared by the various functional units present within ASIC 161, or can be distributed amongst two or more of them. Memory 163 can also be a separate chip. Memory 163 can be volatile and/or non-volatile memory. In this embodiment, ASIC 161 is coupled with power source 172, which can be a coin cell battery, or the like. AFE 162 interfaces with in vivo analyte sensor 104 and receives measurement data therefrom and outputs the data to processor 166 in digital form, which in turn processes the data to arrive at the end-result glucose discrete and trend values, etc. This data can then be provided to communication circuitry 168 for sending, by way of antenna 171, to data receiving device 120 (not shown), for example, where minimal further processing is needed by the resident software application to display the data.

FIG. 2D is similar to FIG. 2C but instead includes two discrete semiconductor chips 162 and 174, which can be packaged together or separately. Here, AFE 162 is resident on ASIC 161. Processor 166 is integrated with power management circuitry 164 and communication circuitry 168 on chip 174. AFE 162 includes memory 163 and chip 174 includes memory 165, which can be isolated or distributed within. In one example embodiment, AFE 162 is combined with power management circuitry 164 and processor 166 on one chip, while communication circuitry 168 is on a separate chip. In another example embodiment, both AFE 162 and communication circuitry 168 are on one chip, and processor 166 and power management circuitry 164 are on another chip. It should be noted that other chip combinations are possible, including three or more chips, each bearing responsibility for the separate functions described, or sharing one or more functions for fail-safe redundancy.

Figure 2E:
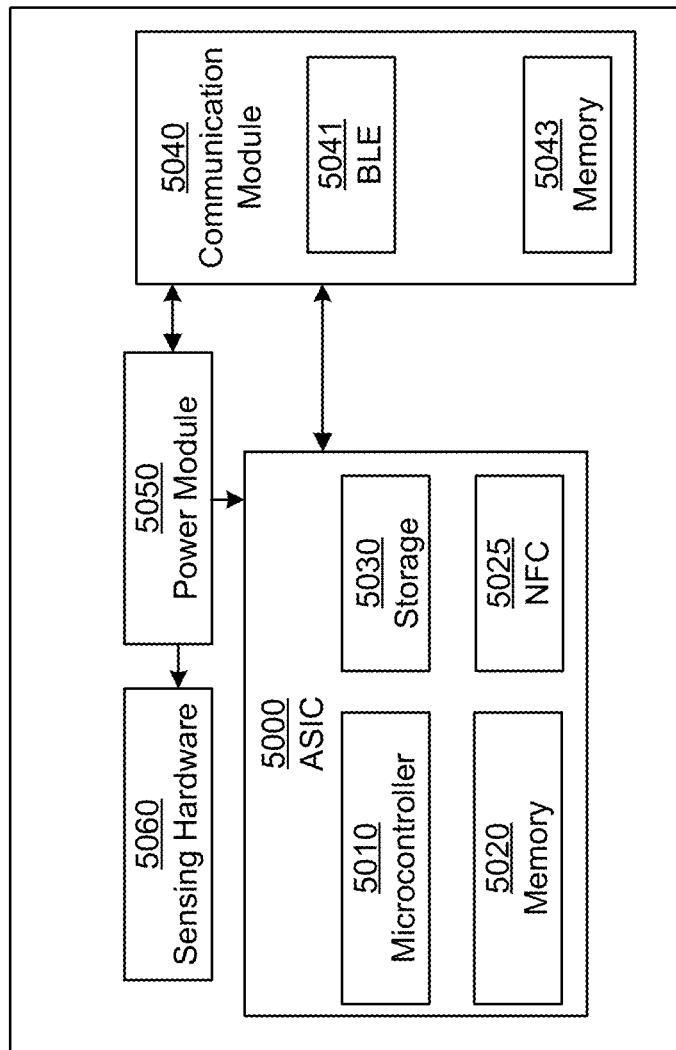
FIG. 2E is a block diagram illustrating an example analyte sensor according to exemplary embodiments of the disclosed subject matter.

For purpose of illustration and not limitation, FIG. 2E depicts another exemplary embodiment of a sensor control device 102 compatible with the security architecture and communication schemes described herein.

As embodied herein, the sensor control device 102 can include an Application-Specific Integrated Circuit ("ASIC") 5000 communicatively coupled with a communication module 5040. The ASIC 5000 can include a microcontroller core 5010, on-board memory 5020, and storage memory 5030. The storage memory 5030 can store data used in an authentication and encryption security architecture. The storage memory 5030 can store programming instructions for sensor control device 102. As embodied herein, certain communication chipsets can be embedded in the ASIC 5000 (e.g., an NFC transceiver 5025). The ASIC 5000 can receive power from a power module 5050, such as an on-board battery or from an NFC pulse. The storage memory 5030 of the ASIC 5000 can be programmed to include information such as an identifier for sensor control device 102 for identification and tracking purposes. The storage memory 5030 can also be programmed with configuration or calibration parameters for use by sensor control device 102 and its various components. The storage memory 5030 can include rewritable or one-time programming (OTP) memory. The storage memory 5030 can be updated using techniques described herein to extend the usefulness of sensor control device 102.

As embodied herein, the communication module 5040 of sensor control device 102 can be or include one or more modules to support communications with other devices of an analyte monitoring system 100. As an example only, and not by way of limitation, example communication modules 5040 can include a Bluetooth Low-Energy ("BLE") module 5041 As used throughout this disclosure, BLE refers to a short-range communication protocol optimized to make pairing of Bluetooth devices simple for end users. The communication module 5040 can transmit and receive data and commands via interaction with similarly-capable communication modules of a data receiving device 120 or user device 145. The communication module 5040 can include additional or alternative chipsets for use with similar short-range communication schemes, such as a personal area network according to IEEE 802.15 protocols, IEEE 802.11 protocols, infrared communications according to the Infrared Data Association standards (IrDA), etc.

To perform its functionalities, the sensor control device 102 can further include suitable sensing hardware 5060 appropriate to its function. As embodied herein, the sensing hardware 5060 can include an analyte sensor transcutaneously or subcutaneously positioned in contact with a bodily fluid of a subject. The analyte sensor can generate sensor data containing values corresponding to levels of one or more analytes within the bodily fluid.

The components of sensor control device 102 can be acquired by a user in multiple packages requiring final assembly by the user before delivery to an appropriate user location. FIGS. 3A-3D depict an example embodiment of an assembly process for sensor control device 102 by a user, including preparation of separate components before coupling the components in order to ready the sensor for delivery. FIGS. 3E-3F depict an example embodiment of delivery of sensor control device 102 to an appropriate user location by selecting the appropriate delivery location and applying device 102 to the location.

Figure 3A:
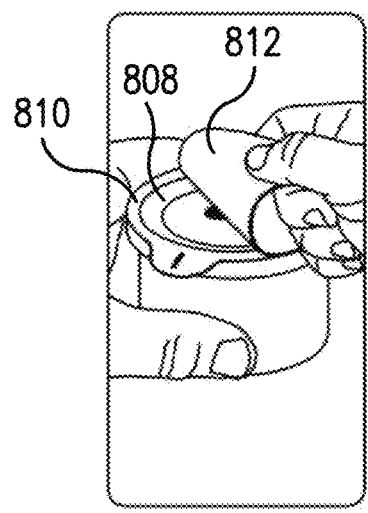
FIG. 3A is a proximal perspective view depicting an example embodiment of a user preparing a tray for an assembly.

FIG. 3A is a proximal perspective view depicting an example embodiment of a user preparing a container 810, configured here as a tray (although other packages can be used), for an assembly process. The user can accomplish this preparation by removing lid 812 from tray 810 to expose platform 808, for instance by peeling a non-adhered portion of lid 812 away from tray 810 such that adhered portions of lid 812 are removed. Removal of lid 812 can be appropriate in various embodiments so long as platform 808 is adequately exposed within tray 810. Lid 812 can then be placed aside.

Figure 3B:
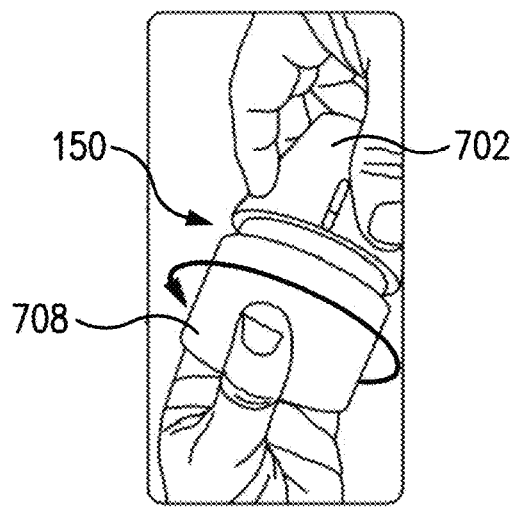
FIG. 3B is a side view depicting an example embodiment of a user preparing an applicator device for an assembly.
Figure 3C:
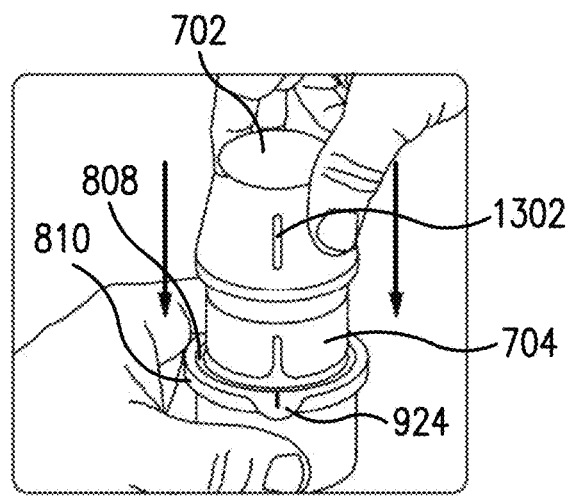
FIG. 3C is a proximal perspective view depicting an example embodiment of a user inserting an applicator device into a tray during an assembly.

FIG. 3B is a side view depicting an example embodiment of a user preparing an applicator device 150 for assembly. Applicator device 150 can be provided in a sterile package sealed by an applicator cap 708. Preparation of applicator device 150 can include uncoupling housing 702 from applicator cap 708 to expose sheath 704 (FIG. 3C). This can be accomplished by unscrewing (or otherwise uncoupling) applicator cap 708 from housing 702. Applicator cap 708 can then be placed aside.

FIG. 3C is a proximal perspective view depicting an example embodiment of a user inserting an applicator device 150 into a tray 810 during an assembly. Initially, the user can insert sheath 704 into platform 808 inside tray 810 after aligning housing orienting feature 1302 (or slot or recess) and tray orienting feature 924 (an abutment or detent). Inserting sheath 704 into platform 808 temporarily unlocks sheath 704 relative to housing 702 and also temporarily unlocks platform 808 relative to tray 810. At this stage, removal of applicator device 150 from tray 810 will result in the same state prior to initial insertion of applicator device 150 into tray 810 (i.e., the process can be reversed or aborted at this point and then repeated without consequence).

Sheath 704 can maintain position within platform 808 with respect to housing 702 while housing 702 is distally advanced, coupling with platform 808 to distally advance platform 808 with respect to tray 810. This step unlocks and collapses platform 808 within tray 810. Sheath 704 can contact and disengage locking features (not shown) within tray 810 that unlock sheath 704 with respect to housing 702 and prevent sheath 704 from moving (relatively) while housing 702 continues to distally advance platform 808. At the end of advancement of housing 702 and platform 808, sheath 704 is permanently unlocked relative to housing 702. A sharp and sensor (not shown) within tray 810 can be coupled with an electronics housing (not shown) within housing 702 at the end of the distal advancement of housing 702. Operation and interaction of the applicator device 150 and tray 810 are further described below.

Figure 3D:
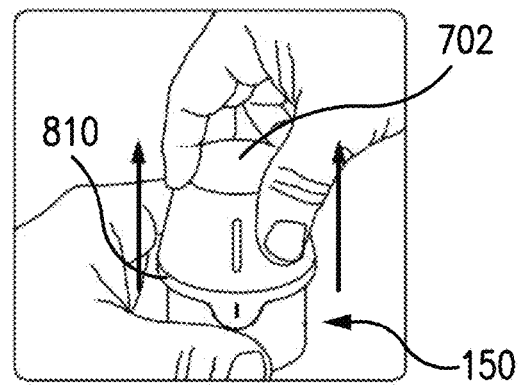
FIG. 3D is a proximal perspective view depicting an example embodiment of a user removing an applicator device from a tray during an assembly.
Figure 3E:
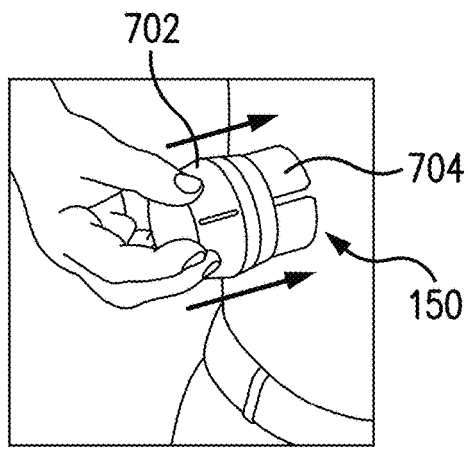
FIG. 3E is a proximal perspective view depicting an example embodiment of a patient applying a sensor using an applicator device.
Figure 3F:
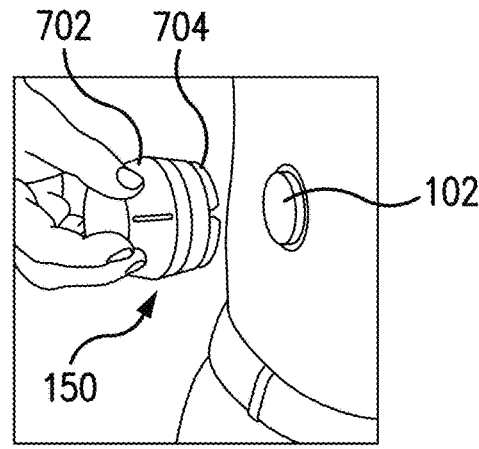
FIG. 3F is a proximal perspective view depicting an example embodiment of a patient with an applied sensor and a used applicator device.

FIG. 3D is a proximal perspective view depicting an example embodiment of a user removing an applicator device 150 from a tray 810 during an assembly. A user can remove applicator 150 from tray 810 by proximally advancing housing 702 with respect to tray 810 or other motions having the same end effect of uncoupling applicator 150 and tray 810. The applicator device 150 is removed with sensor control device 102 (not shown) fully assembled (sharp, sensor, electronics) therein and positioned for delivery.

FIG. 3E is a proximal perspective view depicting an example embodiment of a patient applying sensor control device 102 using applicator device 150 to a target area of skin, for instance, on an abdomen or other appropriate location. Advancing housing 702 distally collapses sheath 704 within housing 702 and applies the sensor to the target location such that an adhesive layer on the bottom side of sensor control device 102 adheres to the skin. The sharp is automatically retracted when housing 702 is fully advanced, while the sensor (not shown) is left in position to measure analyte levels.

FIG. 3F is a proximal perspective view depicting an example embodiment of a patient with sensor control device 102 in an applied position. The user can then remove applicator 150 from the application site.

System 100, described with respect to FIGS. 3A-3F and elsewhere herein, can provide a reduced or eliminated chance of accidental breakage, permanent deformation, or incorrect assembly of applicator components compared to prior art systems. Since applicator housing 702 directly engages platform 808 while sheath 704 unlocks, rather than indirect engagement via sheath 704, relative angularity between sheath 704 and housing 702 will not result in breakage or permanent deformation of the arms or other components. The potential for relatively high forces (such as in conventional devices) during assembly will be reduced, which in turn reduces the chance of unsuccessful user assembly.

Figure 4C:
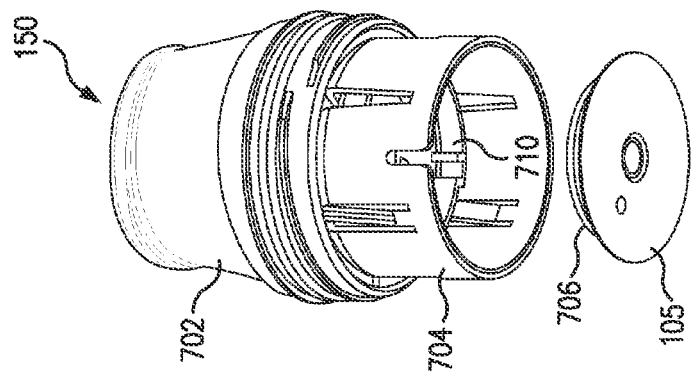
FIG. 4C is a perspective view depicting an example embodiment of a distal end of an applicator device and electronics housing.
Figure 4B:
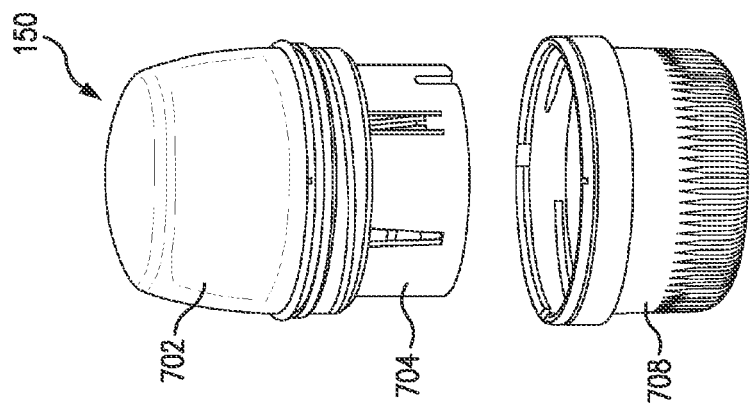
FIG. 4B is a side perspective view depicting an example embodiment of an applicator device and cap decoupled.
Figure 4A:
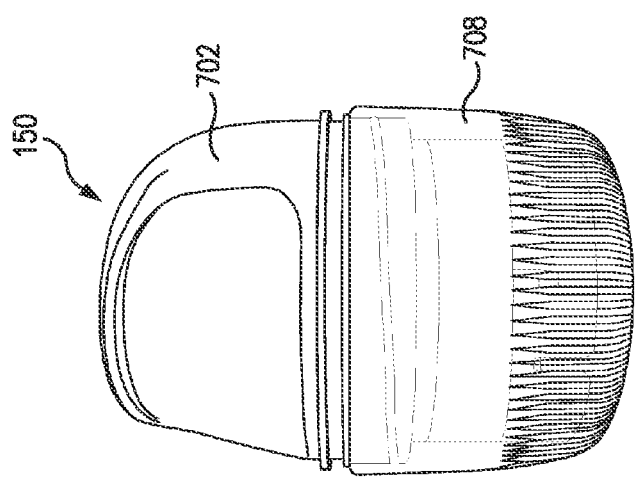
FIG. 4A is a side view depicting an example embodiment of an applicator device coupled with a cap.

FIG. 4A is a side view depicting an example embodiment of an applicator device 150 coupled with a screw applicator cap 708. This is an example of how applicator 150 is shipped to and received by a user, prior to assembly by the user with a sensor. FIG. 4B is a side perspective view depicting applicator 150 and applicator cap 708 after being decoupled. FIG. 4C is a perspective view depicting an example embodiment of a distal end of an applicator device 150 with electronics housing 706 and adhesive patch 105 removed from the position they would have retained within sensor carrier 710 of sheath 704, when applicator cap 708 is in place.

Figure 4E:
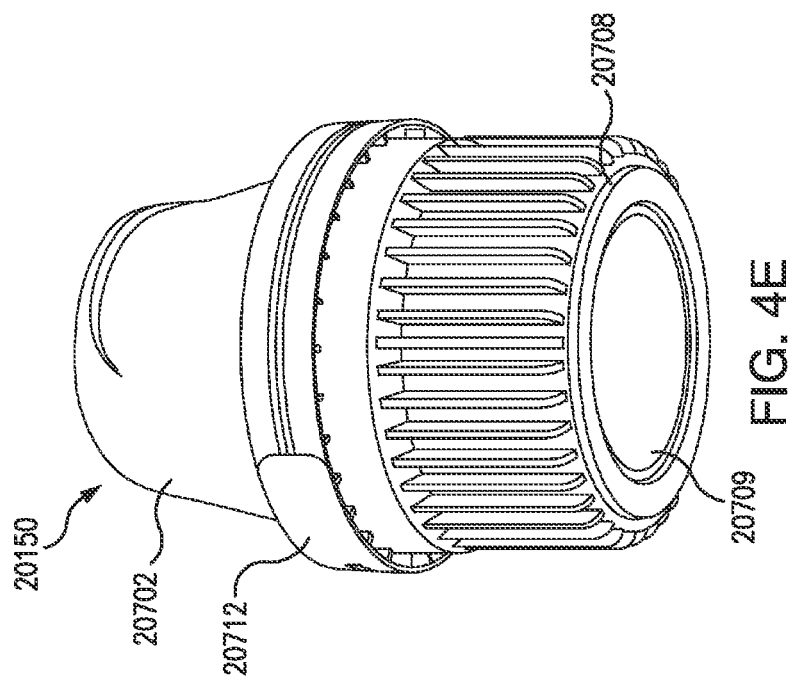
FIG. 4E is a bottom perspective view of the applicator device of FIG. 4D.
Figure 4D:
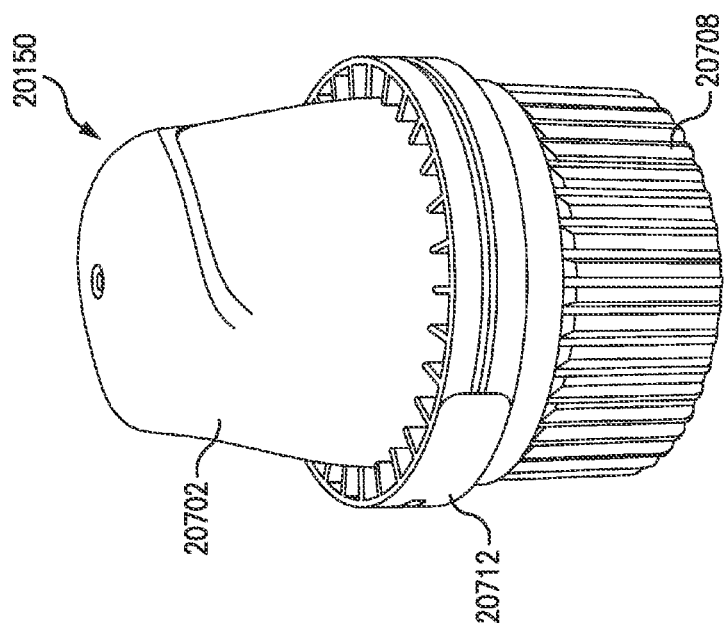
FIG. 4D is a top perspective view of an exemplary applicator device in accordance with the disclosed subject matter.
Figure 4F:
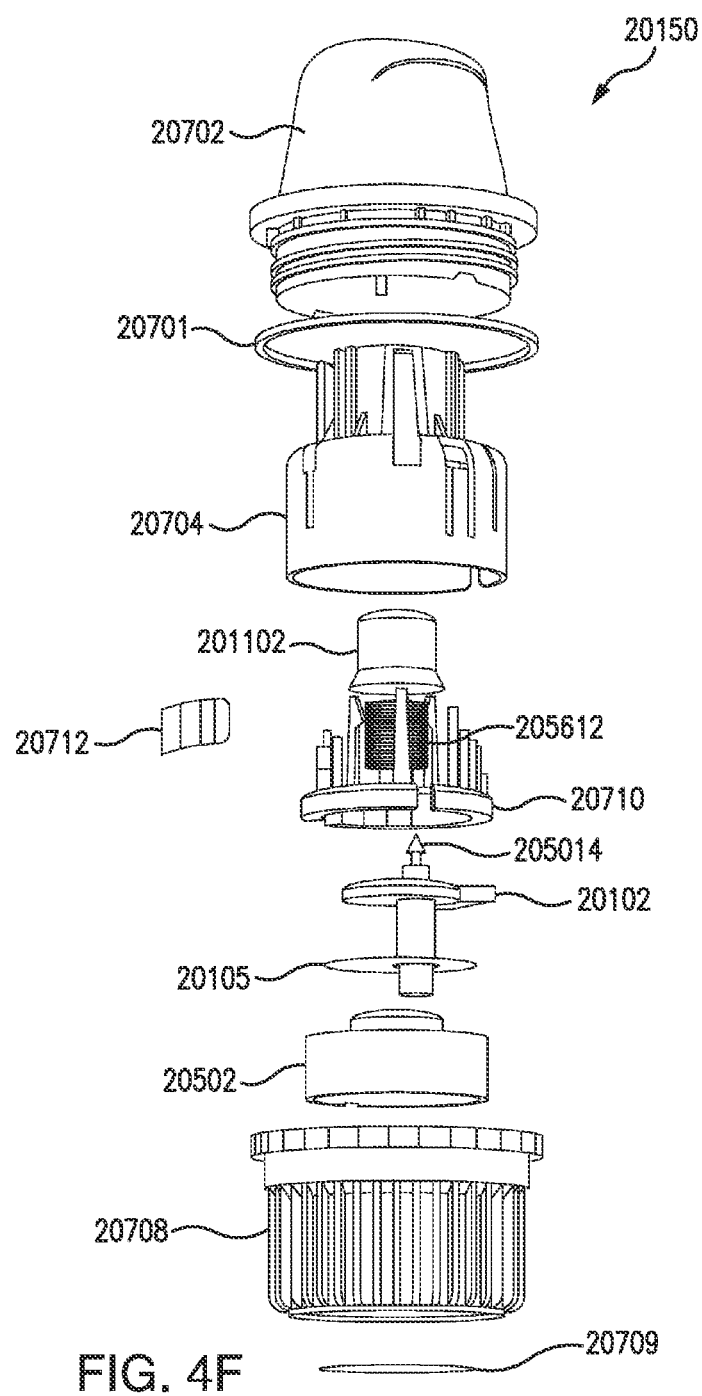
FIG. 4F is an exploded view of the applicator device of FIG. 4D.
Figure 4G:
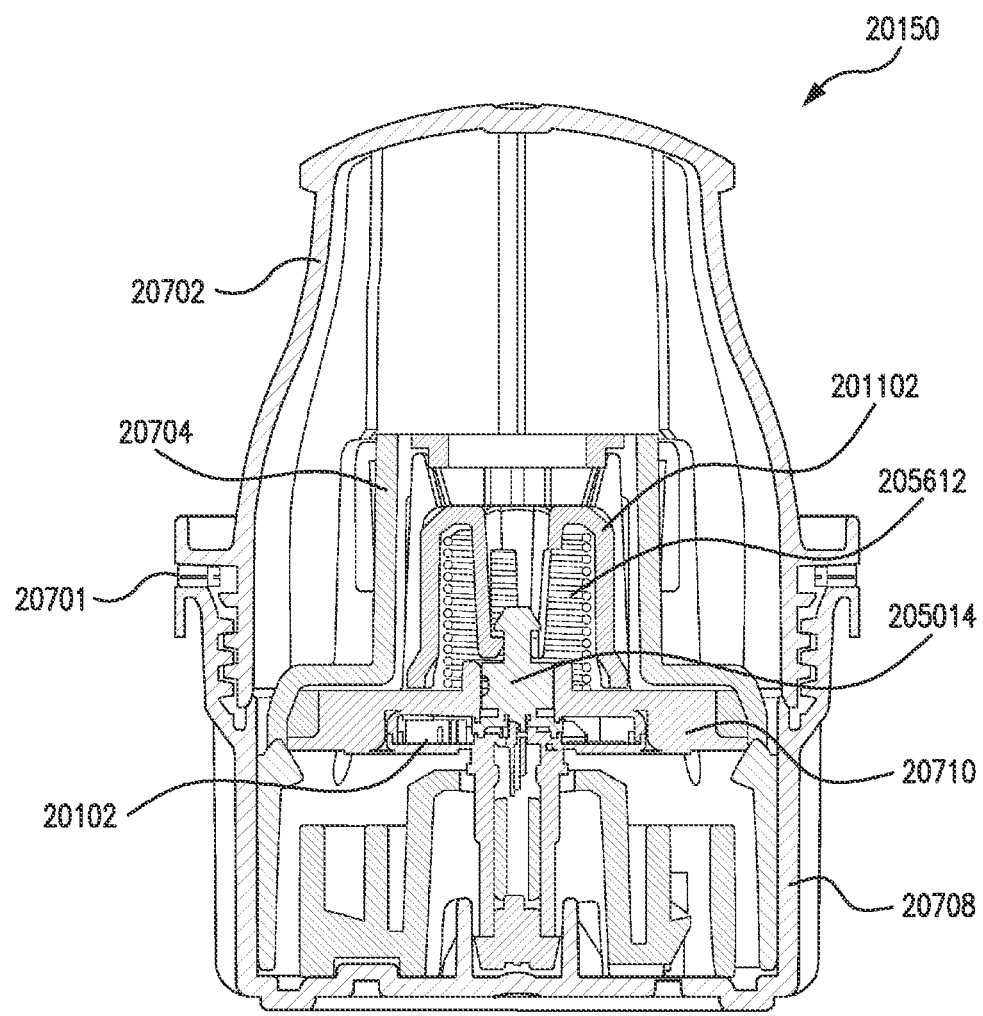
FIG. 4G is a side cutaway view of the applicator device of FIG. 4D.

Referring to FIGS. 4D-G for purpose of illustration and not limitation, another example embodiment of an applicator device 20150 can be provided to a user as a single integrated assembly. FIGS. 4D and 4E provide perspective top and bottom views, respectively, of the applicator device 20150, FIG. 4F provides an exploded view of the applicator device 20150 and FIG. 4G provides a side cut-away view. The perspective views illustrate how applicator 20150 is shipped to and received by a user. The exploded and cut-away views illustrate the components of the applicator device 20150. The applicator device 20150 can include a housing 20702, gasket 20701, sheath 20704, sharp carrier 201102, spring 205612, sensor carrier 20710 (also referred to as a "puck carrier"), sharp hub 205014, sensor control device (also referred to as a "puck") 20102, adhesive patch 20105, desiccant 20502, applicator cap 20708, serial label 20709, and tamper evidence feature 20712. In some embodiments, as received by a user, only the housing 20702, applicator cap 20708, tamper evidence feature 20712, and label 20709 are visible. The tamper evidence feature 20712 can be, for example, a sticker coupled to each of the housing 20702 and the applicator cap 20708, and tamper evidence feature 20712 can be damaged, for example, irreparably, by uncoupling housing 20702 and applicator cap 20708, thereby indicating to a user that the housing 20702 and applicator cap 20708 have been previously uncoupled. These features are described in greater detail below.

Figure 5:
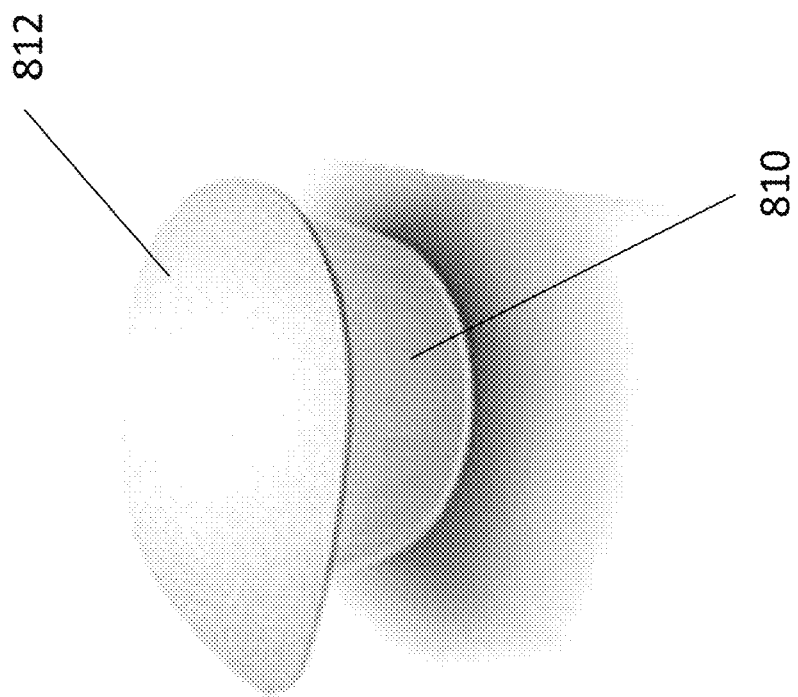
FIG. 5 is a proximal perspective view depicting an example embodiment of a tray with sterilization lid coupled.

FIG. 5 is a proximal perspective view depicting an example embodiment of a tray 810 with sterilization lid 812 removably coupled thereto, which can be representative of how the package is shipped to and received by a user prior to assembly.

Figure 6A:
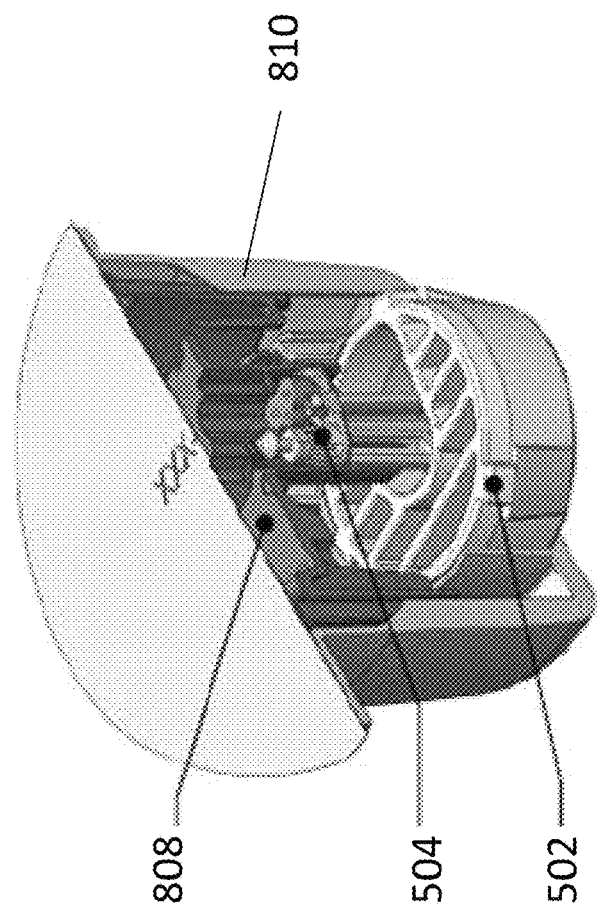
FIG. 6A is a proximal perspective cutaway view depicting an example embodiment of a tray with sensor delivery components.

FIG. 6A is a proximal perspective cutaway view depicting sensor delivery components within tray 810. Platform 808 is slidably coupled within tray 810. Desiccant 502 is stationary with respect to tray 810. Sensor module 504 is mounted within tray 810.

Figure 6B:
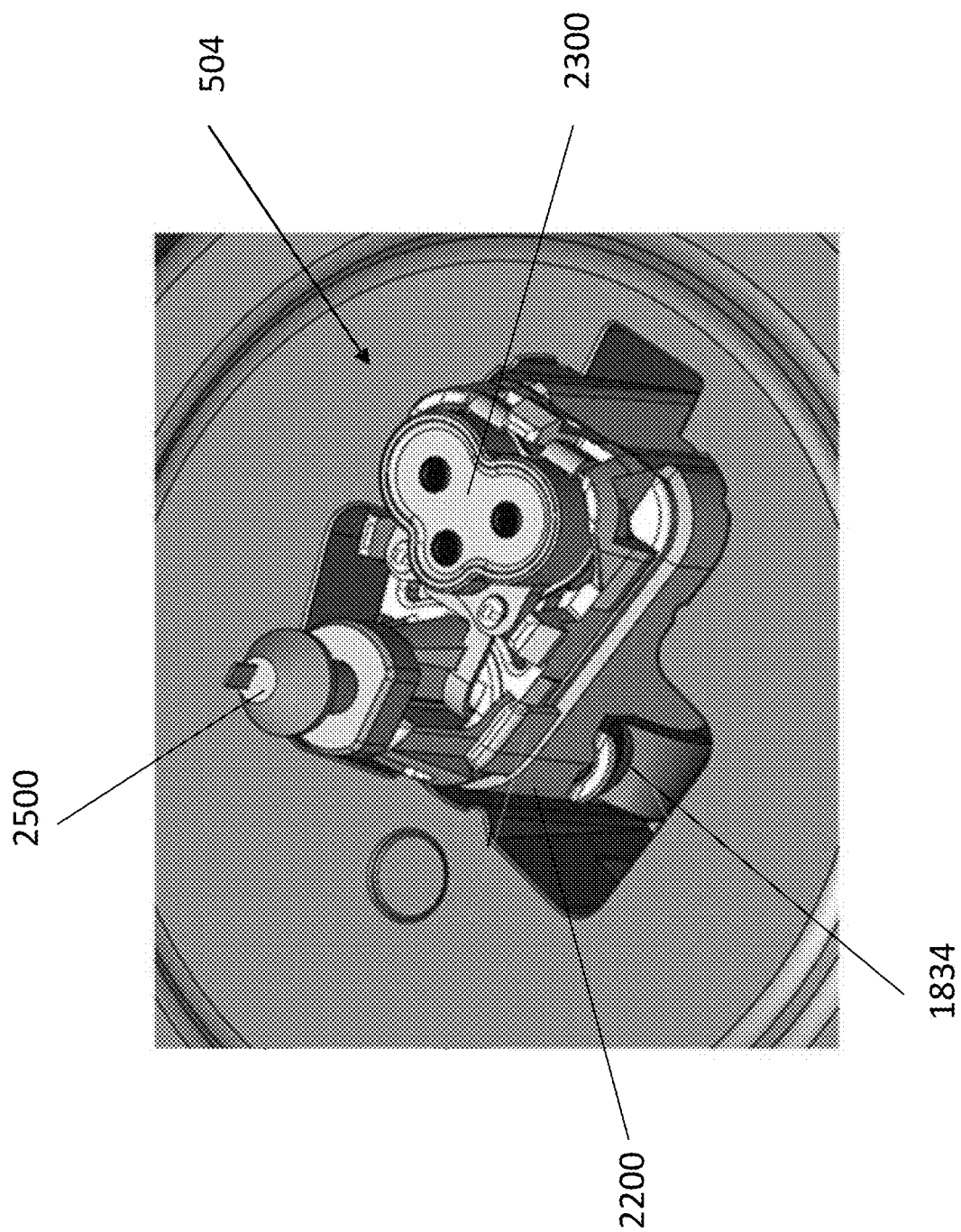
FIG. 6B is a proximal perspective view depicting sensor delivery components.

FIG. 6B is a proximal perspective view depicting sensor module 504 in greater detail. Here, retention arm extensions 1834 of platform 808 releasably secure sensor module 504 in position. Module 2200 is coupled with connector 2300, sharp module 2500 and sensor (not shown) such that during assembly they can be removed together as sensor module 504.

Referring briefly again to FIGS. 1A and 3A-3G, for the two-piece architecture system, the sensor tray 810 and the sensor applicator 150 are provided to the user as separate packages, thus requiring the user to open each package and finally assemble the system. In some applications, the discrete, sealed packages allow the sensor tray 810 and the sensor applicator 150 to be sterilized in separate sterilization processes unique to the contents of each package and otherwise incompatible with the contents of the other. More specifically, the sensor tray 810, which includes the plug assembly 207, including the sensor 104 and the sharp 220, can be sterilized using radiation sterilization, such as electron beam (or "e-beam") irradiation. Suitable radiation sterilization processes include, but are not limited to, e-beam irradiation, gamma ray irradiation, X-ray irradiation, or any combination thereof. Radiation sterilization, however, can damage the electrical components arranged within the electronics housing of the sensor control device 102. Consequently, if the sensor applicator 150, which contains the electronics housing of the sensor control device 102, needs to be sterilized, it can be sterilized via another method, such as gaseous chemical sterilization using, for example, ethylene oxide. Gaseous chemical sterilization, however, can damage the enzymes or other chemistry and biologies included on the sensor 104. Because of this sterilization incompatibility, the sensor tray 810 and the sensor applicator 150 are commonly sterilized in separate sterilization processes and subsequently packaged separately, which requires the user to finally assemble the components for use.

Figure 7A:
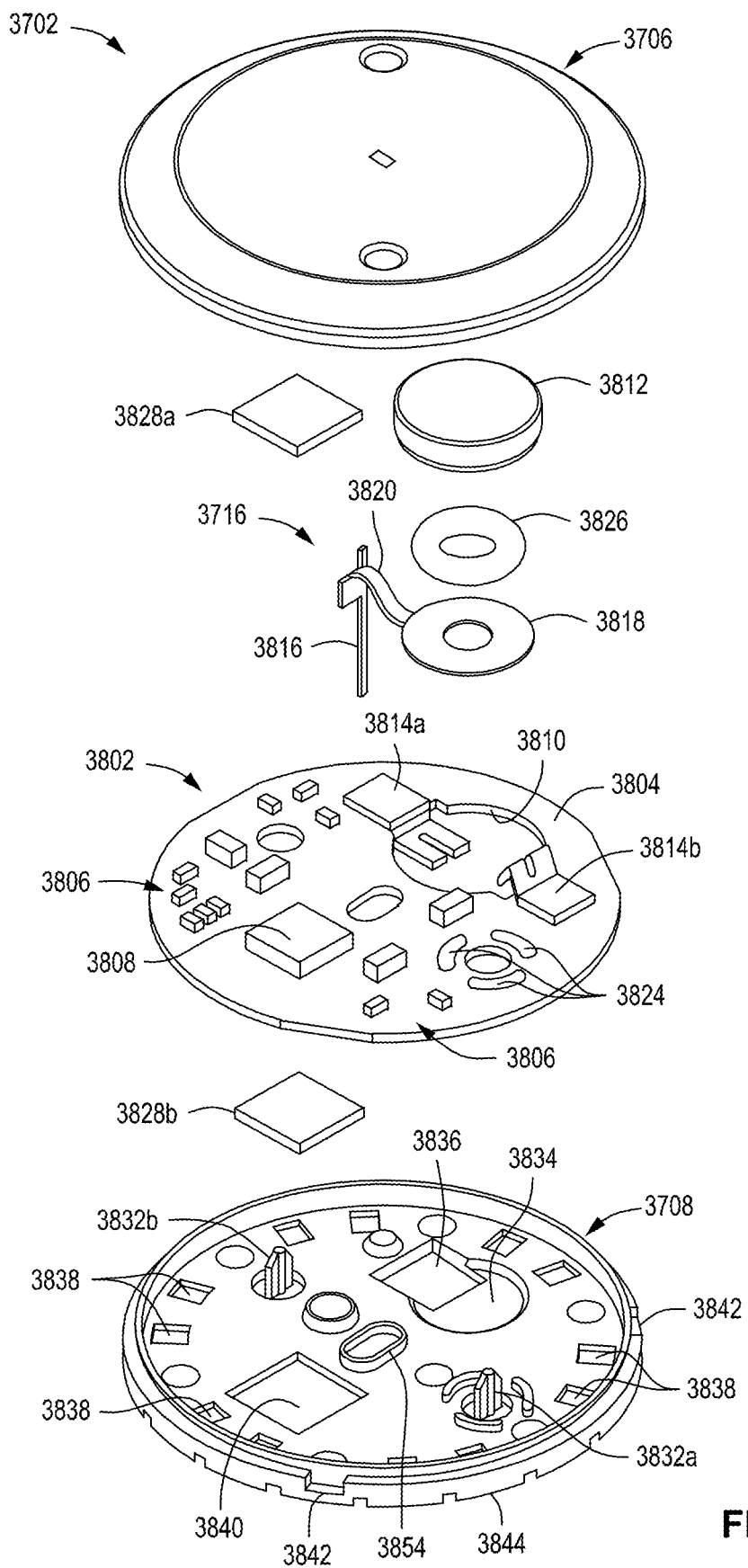
FIGS. 7A and 7B are isometric exploded top and bottom views, respectively, of an exemplary sensor control device.
Figure 7B:
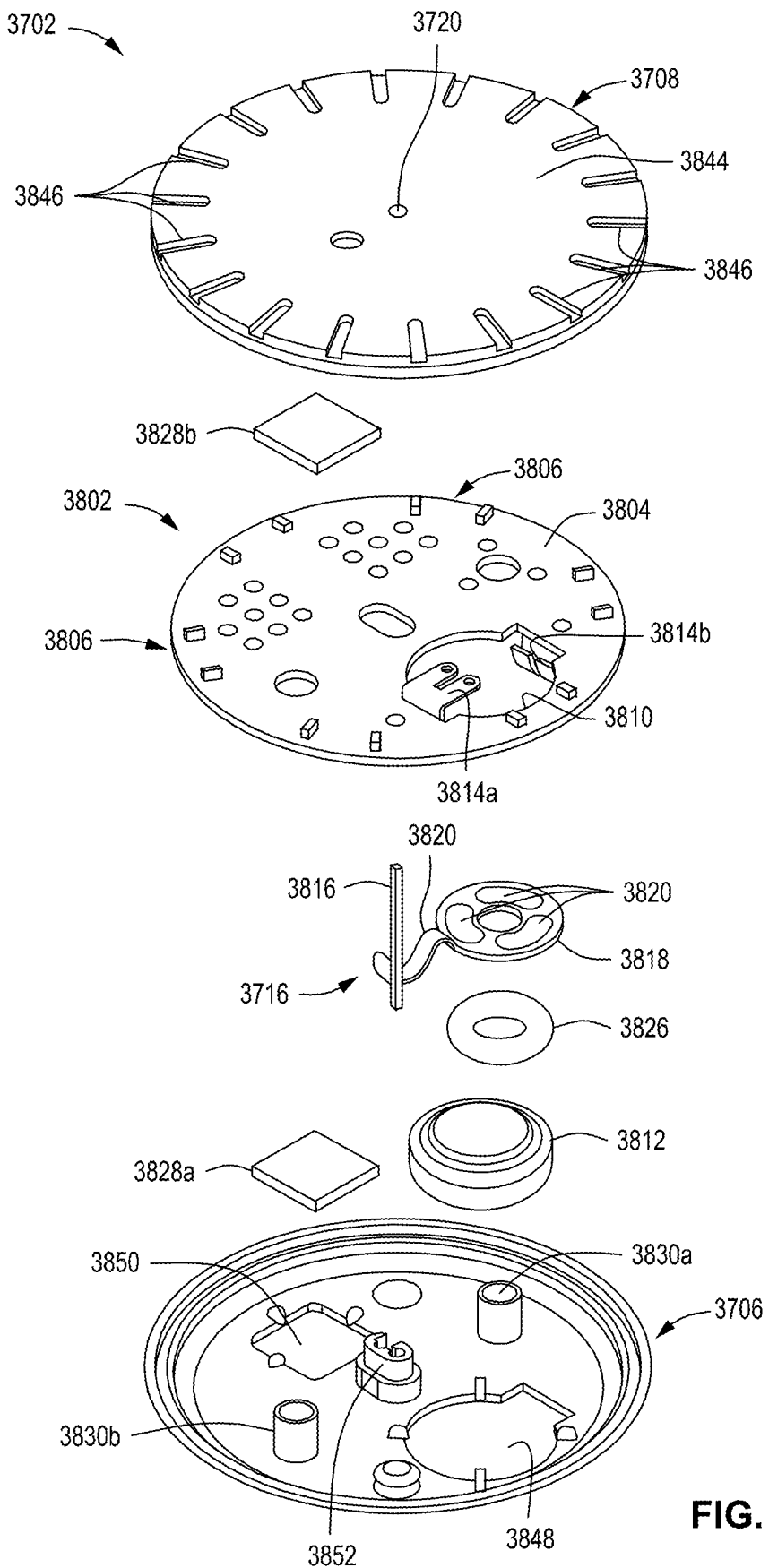

FIGS. 7A and 7B are exploded top and bottom views, respectively, of the sensor control device 3702, according to one or more embodiments. The shell 3706 and the mount 3708 operate as opposing clamshell halves that enclose or otherwise substantially encapsulate the various electronic components of the sensor control device 3702. As illustrated, the sensor control device 3702 can include a printed circuit board assembly (PCBA) 3802 that includes a printed circuit board (PCB) 3804 having a plurality of electronic modules 3806 coupled thereto. Example electronic modules 3806 include, but are not limited to, resistors, transistors, capacitors, inductors, diodes, and switches. Prior sensor control devices commonly stack PCB components on only one side of the PCB. In contrast, the PCB components 3806 in the sensor control device 3702 can be dispersed about the surface area of both sides (i.e., top and bottom surfaces) of the PCB 3804.

Besides the electronic modules 3806, the PCBA 3802 can also include a data processing unit 3808 mounted to the PCB 3804. The data processing unit 3808 can comprise, for example, an application specific integrated circuit (ASIC) configured to implement one or more functions or routines associated with operation of the sensor control device 3702. More specifically, the data processing unit 3808 can be configured to perform data processing functions, where such functions can include but are not limited to, filtering and encoding of data signals, each of which corresponds to a sampled analyte level of the user. The data processing unit 3808 can also include or otherwise communicate with an antenna for communicating with the reader device 106.

A battery aperture 3810 can be defined in the PCB 3804 and sized to receive and seat a battery 3812 configured to power the sensor control device 3702. An axial battery contact 3814a and a radial battery contact 3814b can be coupled to the PCB 3804 and extend into the battery aperture 3810 to facilitate transmission of electrical power from the battery 3812 to the PCB 3804. As their names suggest, the axial battery contact 3814a can be configured to provide an axial contact for the battery 3812, while the radial battery contact 3814b can provide a radial contact for the battery 3812. Locating the battery 3812 within the battery aperture 3810 with the battery contacts 3814a,b helps reduce the height H of the sensor control device 3702, which allows the PCB 3804 to be located centrally and its components to be dispersed on both sides (i.e., top and bottom surfaces). This also helps facilitate the chamfer 3718 provided on the electronics housing 3704.

The sensor 3716 can be centrally located relative to the PCB 3804 and include a tail 3816, a flag 3818, and a neck 3820 that interconnects the tail 3816 and the flag 3818. The tail 3816 can be configured to extend through the central aperture 3720 of the mount 3708 to be transcutaneously received beneath a user's skin. Moreover, the tail 3816 can have an enzyme or other chemistry included thereon to help facilitate analyte monitoring.

The flag 3818 can include a generally planar surface having one or more sensor contacts 3822 (three shown in FIG. 7B) arranged thereon. The sensor contact(s) 3822 can be configured to align with and engage a corresponding one or more circuitry contacts 3824 (three shown in FIG. 7A) provided on the PCB 3804. In some embodiments, the sensor contact(s) 3822 can comprise a carbon impregnated polymer printed or otherwise digitally applied to the flag 3818. Prior sensor control devices typically include a connector made of silicone rubber that encapsulates one or more compliant carbon impregnated polymer modules that serve as electrical conductive contacts between the sensor and the PCB. In contrast, the presently disclosed sensor contacts(s) 3822 provide a direct connection between the sensor 3716 and the PCB 3804 connection, which eliminates the need for the prior art connector and advantageously reduces the height H. Moreover, eliminating the compliant carbon impregnated polymer modules eliminates a significant circuit resistance and therefor improves circuit conductivity.

The sensor control device 3702 can further include a compliant member 3826, which can be arranged to interpose the flag 3818 and the inner surface of the shell 3706. More specifically, when the shell 3706 and the mount 3708 are assembled to one another, the compliant member 3826 can be configured to provide a passive biasing load against the flag 3818 that forces the sensor contact(s) 3822 into continuous engagement with the corresponding circuitry contact (s) 3824. In the illustrated embodiment, the compliant member 3826 is an elastomeric O-ring, but could alternatively comprise any other type of biasing device or mechanism, such as a compression spring or the like, without departing from the scope of the disclosure.

The sensor control device 3702 can further include one or more electromagnetic shields, shown as a first shield 3828a and a second shield The shell 3706 can provide or otherwise define a first clocking receptacle 3830a (FIG. 7B) and a second clocking receptacle 3830b (FIG. 7B), and the mount 3708 can provide or otherwise define a first clocking post 3832a (FIG. 7A) and a second clocking post 3832b (FIG. 7A). Mating the first and second clocking receptacles 3830a,b with the first and second clocking posts 3832a,b, respectively, will properly align the shell 3706 to the mount 3708.

Referring specifically to FIG. 7A, the inner surface of the mount 3708 can provide or otherwise define a plurality of pockets or depressions configured to accommodate various component parts of the sensor control device 3702 when the shell 3706 is mated to the mount 3708. For example, the inner surface of the mount 3708 can define a battery locator 3834 configured to accommodate a portion of the battery 3812 when the sensor control device 3702 is assembled. An adjacent contact pocket 3836 can be configured to accommodate a portion of the axial contact 3814a.

Moreover, a plurality of module pockets 3838 can be defined in the inner surface of the mount 3708 to accommodate the various electronic modules 3806 arranged on the bottom of the PCB 3804. Furthermore, a shield locator 3840 can be defined in the inner surface of the mount 3708 to accommodate at least a portion of the second shield 3828*b* when the sensor control device 3702 is assembled. The battery locator 3834, the contact pocket 3836, the module pockets 3838, and the shield locator 3840 all extend a short distance into the inner surface of the mount 3708 and, as a result, the overall height H of the sensor control device 3702 can be reduced as compared to prior sensor control devices. The module pockets 3838 can also help minimize the diameter of the PCB 3804 by allowing PCB components to be arranged on both sides (i.e., top and bottom surfaces).

Still referring to FIG. 7A, the mount 3708 can further include a plurality of carrier grip features 3842 (two shown) defined about the outer periphery of the mount 3708. The carrier grip features 3842 are axially offset from the bottom 3844 of the mount 3708, where a transfer adhesive (not shown) can be applied during assembly. In contrast to prior sensor control devices, which commonly include conical carrier grip features that intersect with the bottom of the mount, the presently disclosed carrier grip features 3842 are offset from the plane (i.e., the bottom 3844) where the transfer adhesive is applied. This can prove advantageous in helping ensure that the delivery system does not inadvertently stick to the transfer adhesive during assembly. Moreover, the presently disclosed carrier grip features 3842 eliminate the need for a scalloped transfer adhesive, which simplifies the manufacture of the transfer adhesive and eliminates the need to accurately clock the transfer adhesive relative to the mount 3708. This also increases the bond area and, therefore, the bond strength.

Referring to FIG. 7B, the bottom 3844 of the mount 3708 can provide or otherwise define a plurality of grooves 3846, which can be defined at or near the outer periphery of the mount 3708 and equidistantly spaced from each other. A transfer adhesive (not shown) can be coupled to the bottom 3844 and the grooves 3846 can be configured to help convey (transfer) moisture away from the sensor control device 3702 and toward the periphery of the mount 3708 during use. In some embodiments, the spacing of the grooves 3846 can interpose the module pockets 3838 (FIG. 7A) defined on the opposing side (inner surface) of the mount 3708. As will be appreciated, alternating the position of the grooves 3846 and the module pockets 3838 ensures that the opposing features on either side of the mount 3708 do not extend into each other. This can help maximize usage of the material for the mount 3708 and thereby help maintain a minimal height H of the sensor control device 3702. The module pockets 3838 can also significantly reduce mold sink, and improve the flatness of the bottom 3844 that the transfer adhesive bonds to.

Still referring to FIG. 7B, the inner surface of the shell 3706 can also provide or otherwise define a plurality of pockets or depressions configured to accommodate various component parts of the sensor control device 3702 when the shell 3706 is mated to the mount 3708. For example, the inner surface of the shell 3706 can define an opposing battery locator 3848 arrangeable opposite the battery locator 3834 (FIG. 7A) of the mount 3708 and configured to accommodate a portion of the battery 3812 when the sensor control device 3702 is assembled. The opposing battery locator 3848 extends a short distance into the inner surface of the shell 3706, which helps reduce the overall height H of the sensor control device 3702.

A sharp and sensor locator 3852 can also be provided by or otherwise defined on the inner surface of the shell 3706. The sharp and sensor locator 3852 can be configured to receive both the sharp (not shown) and a portion of the sensor 3716. Moreover, the sharp and sensor locator 3852 can be configured to align and/or mate with a corresponding sharp and sensor locator 2054 (FIG. 7A) provided on the inner surface of the mount 3708.

Figure 8A:
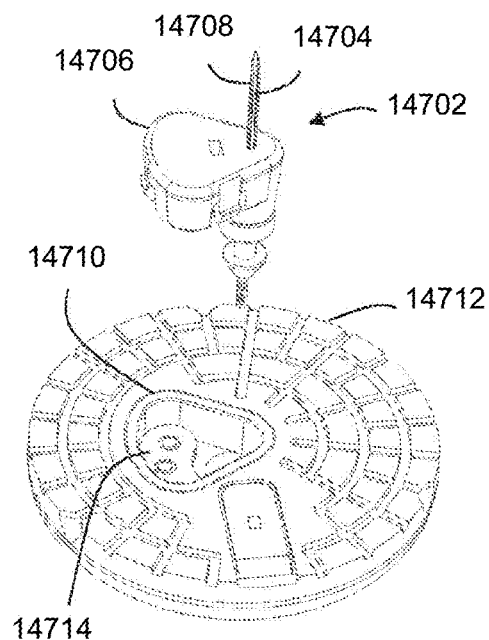
FIG. 8A-8C are assembly and cross-sectional views of an on-body device including an integrated connector for the sensor assembly.
Figure 8B:
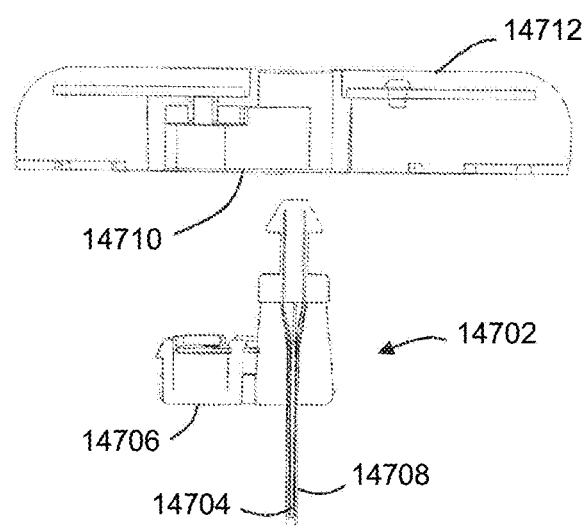
Figure 8C:
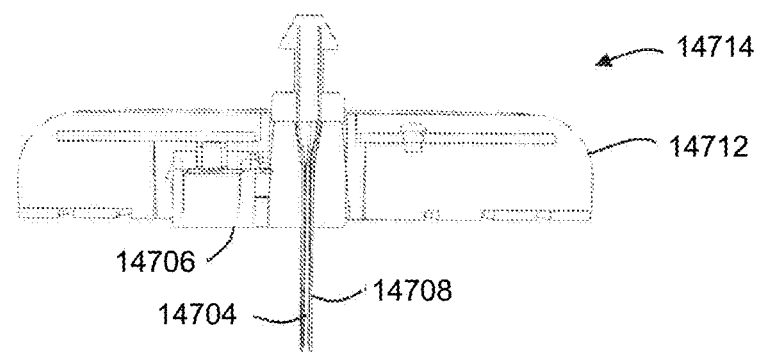

According to embodiments of the present disclosure, an alternative sensor assembly/electronics assembly connection approach is illustrated in FIGS. 8A to 8C. As shown, the sensor assembly 14702 includes sensor 14704, connector support 14706, and sharp 14708. Notably, a recess or receptacle 14710 can be defined in the bottom of the mount of the electronics assembly 14712 and provide a location where the sensor assembly 14702 can be received and coupled to the electronics assembly 14712, and thereby fully assemble the sensor control device. The profile of the sensor assembly 14702 can match or be shaped in complementary fashion to the receptacle 14710, which includes an elastomeric sealing member 14714 (including conductive material coupled to the circuit board and aligned with the electrical contacts of the sensor 14704). Thus, when the sensor assembly 14702 is snap fit or otherwise adhered to the electronics assembly 14712 by driving the sensor assembly 14702 into the integrally formed recess 14710 in the electronics assembly 14712, the on-body device 14714 depicted in FIG. 8C is formed. This embodiment provides an integrated connector for the sensor assembly 14702 within the electronics assembly 14712.

Additional information regarding sensor assemblies is provided in U.S. Publication No. 2013/0150691 and U.S. Publication No. 2021/0204841, each of which is incorporated by reference herein in its entirety.

According to embodiments of the present disclosure, the sensor control device 102 can be modified to provide a one-piece architecture that can be subjected to sterilization techniques specifically designed for a one-piece architecture sensor control device. A one-piece architecture allows the sensor applicator 150 and the sensor control device 102 to be shipped to the user in a single, sealed package that does not require any final user assembly steps. Rather, the user need only open one package and subsequently deliver the sensor control device 102 to the target monitoring location. The one-piece system architecture described herein can prove advantageous in eliminating component parts, various fabrication process steps, and user assembly steps. As a result, packaging and waste are reduced, and the potential for user error or contamination to the system is mitigated.

Figure 9B:
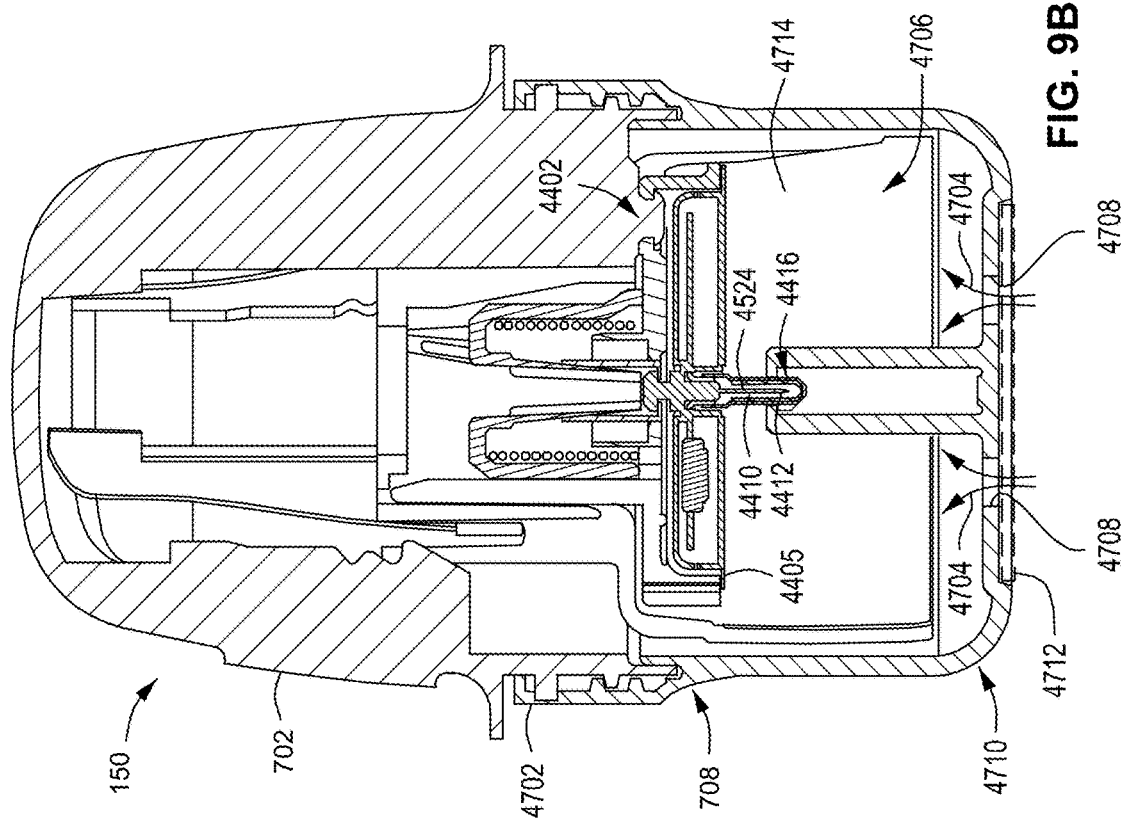
FIGS. 9A and 9B are side and cross-sectional side views, respectively, of an example embodiment of the sensor applicator of FIG. 1A with the cap of FIG. 2C coupled thereto.
Figure 9A:
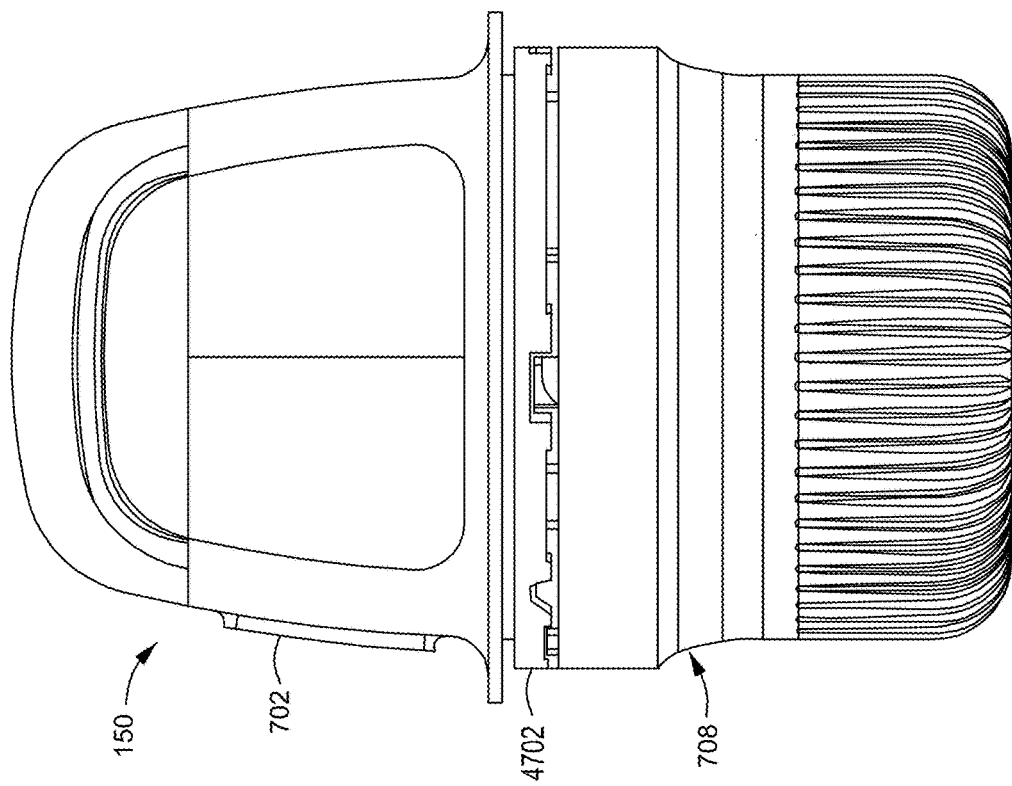

FIGS. 9A and 9B are side and cross-sectional side views, respectively, of an example embodiment of the sensor applicator 150 with the applicator cap 708 coupled thereto. More specifically, FIG. 9A depicts how the sensor applicator 150 might be shipped to and received by a user, and FIG. 9B depicts the sensor control device 4402 arranged within the sensor applicator 150. Accordingly, the fully assembled sensor control device 4402 can already be assembled and installed within the sensor applicator 150 prior to being delivered to the user, thus removing any additional assembly steps that a user would otherwise have to perform.

The fully assembled sensor control device 4402 can be loaded into the sensor applicator 150, and the applicator cap 708 can subsequently be coupled to the sensor applicator 150. In some embodiments, the applicator cap 708 can be threaded to the housing 702 and include a tamper ring 4702. Upon rotating (e.g., unscrewing) the applicator cap 708 relative to the housing 702, the tamper ring 4702 can shear and thereby free the applicator cap 708 from the sensor applicator 150.

According to the present disclosure, while loaded in the sensor applicator 150, the sensor control device 4402 can be subjected to gaseous chemical sterilization 4704 configured to sterilize the electronics housing 4404 and any other exposed portions of the sensor control device 4402. To accomplish this, a chemical can be injected into a sterilization chamber 4706 cooperatively defined by the sensor applicator 150 and the interconnected cap 210. In some applications, the chemical can be injected into the sterilization chamber 4706 via one or more vents 4708 defined in the applicator cap 708 at its proximal end 610. Example chemicals that can be used for the gaseous chemical sterilization 4704 include, but are not limited to, ethylene oxide, vaporized hydrogen peroxide, nitrogen oxide (e.g., nitrous oxide, nitrogen dioxide, etc.), and steam.

Since the distal portions of the sensor 4410 and the sharp 4412 are sealed within the sensor cap 4416, the chemicals used during the gaseous chemical sterilization process do not interact with the enzymes, chemistry, and biologics provided on the tail 4524 and other sensor components, such as membrane coatings that regulate analyte influx.

Once a desired sterility assurance level has been achieved within the sterilization chamber 4706, the gaseous solution can be removed and the sterilization chamber 4706 can be aerated. Aeration can be achieved by a series of vacuums and subsequently circulating a gas (e.g., nitrogen) or filtered air through the sterilization chamber 4706. Once the sterilization chamber 4706 is properly aerated, the vents 4708 can be occluded with a seal 4712 (shown in dashed lines).

In some embodiments, the seal 4712 can comprise two or more layers of different materials. The first layer can be made of a synthetic material (e.g., a flash-spun high-density polyethylene fiber), such as Tyvek® available from DuPont®. Tyvek® is highly durable and puncture resistant and allows the permeation of vapors. The Tyvek® layer can be applied before the gaseous chemical sterilization process, and following the gaseous chemical sterilization process, a foil or other vapor and moisture resistant material layer can be sealed (e.g., heat sealed) over the Tyvek® layer to prevent the ingress of contaminants and moisture into the sterilization chamber 4706. In other embodiments, the seal 4712 can comprise only a single protective layer applied to the applicator cap 708. In such embodiments, the single layer can be gas permeable for the sterilization process, but can also be capable of protection against moisture and other harmful elements once the sterilization process is complete.

With the seal 4712 in place, the applicator cap 708 provides a barrier against outside contamination, and thereby maintains a sterile environment for the assembled sensor control device 4402 until the user removes (unthreads) the applicator cap 708. The applicator cap 708 can also create a dust-free environment during shipping and storage that prevents the adhesive patch 4714 from becoming dirty.

Figure 10A:
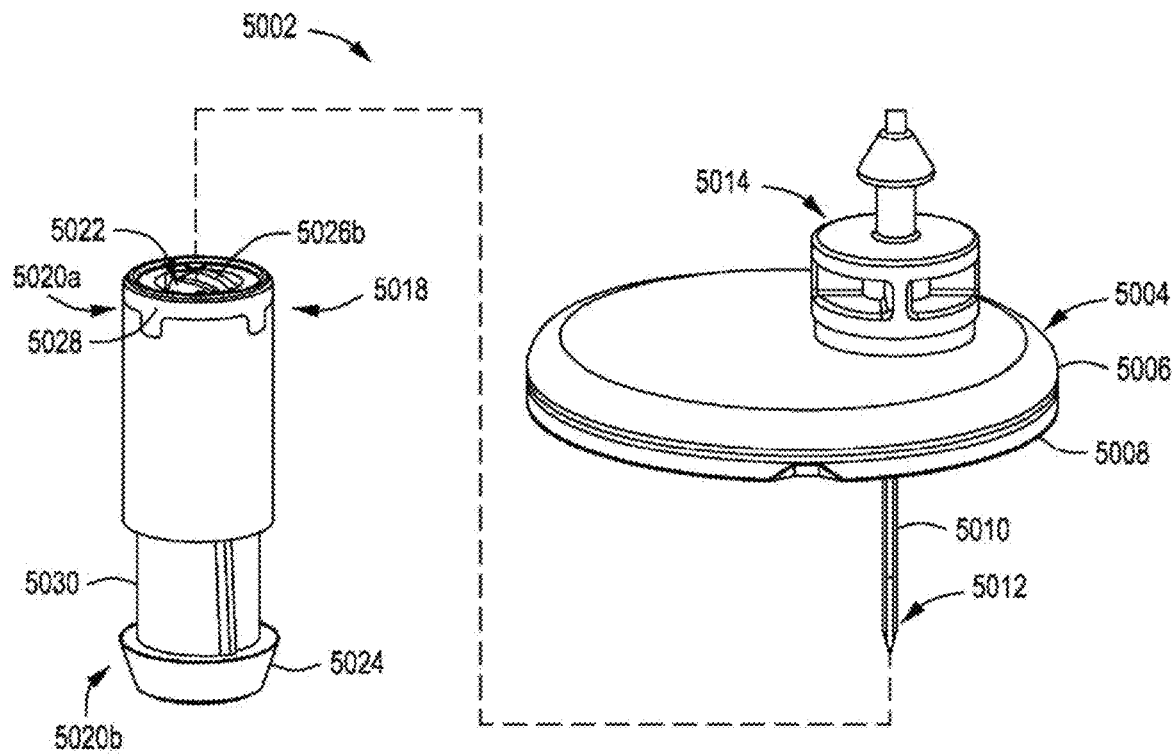
FIGS. 10A and 10B are isometric and side views, respectively, of another example sensor control device.
Figure 10B:
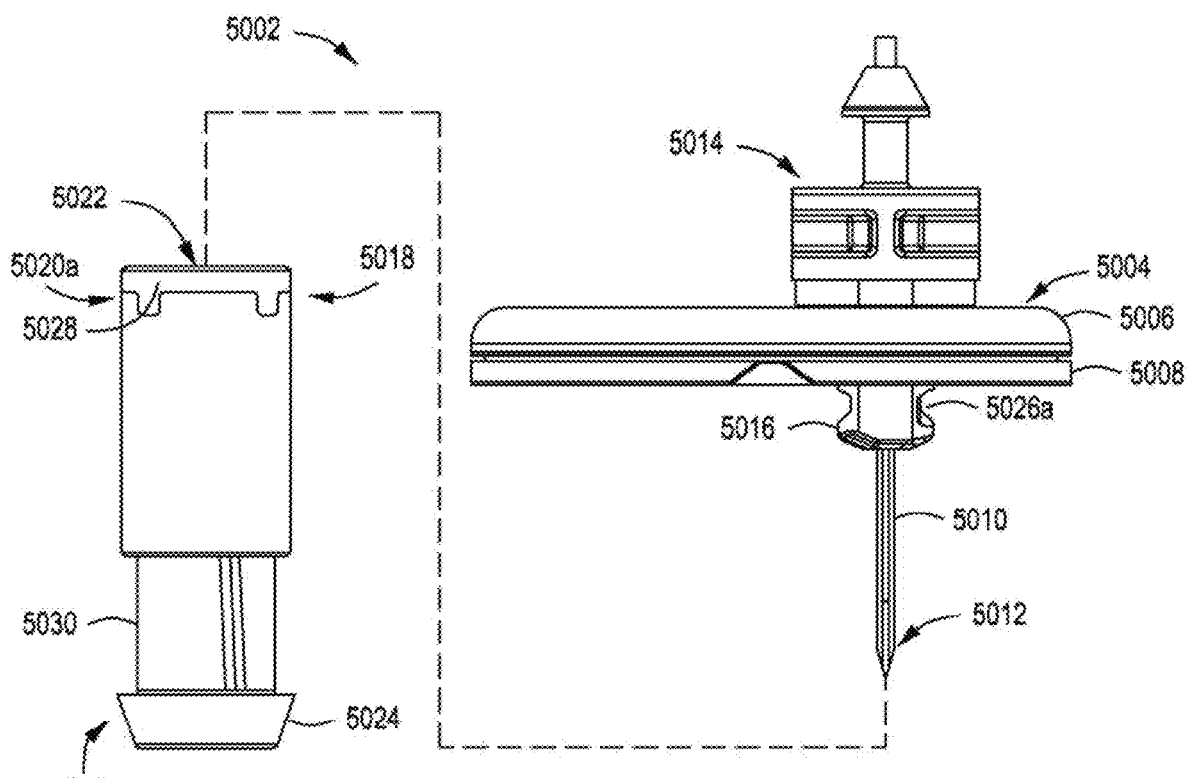

FIGS. 10A and 10B are isometric and side views, respectively, of another example sensor control device 5002, according to one or more embodiments of the present disclosure. The sensor control device 5002 can be similar in some respects to the sensor control device 102 of FIG. 1A and therefore can be best understood with reference thereto. Moreover, the sensor control device 5002 can replace the sensor control device 102 of FIG. 1A and, therefore, can be used in conjunction with the sensor applicator 150 of FIG. 1A, which can deliver the sensor control device 5002 to a target monitoring location on a user's skin.

Unlike the sensor control device 102 of FIG. 1A, however, the sensor control device 5002 can comprise a one-piece system architecture not requiring a user to open multiple packages and finally assemble the sensor control device 5002 prior to application. Rather, upon receipt by the user, the sensor control device 5002 can already be fully assembled and properly positioned within the sensor applicator 150 (FIG. 1A). To use the sensor control device 5002, the user need only open one barrier (e.g., the applicator cap 708 of FIG. 3B) before promptly delivering the sensor control device 5002 to the target monitoring location for use.

As illustrated, the sensor control device 5002 includes an electronics housing 5004 that is generally disc-shaped and can have a circular cross-section. In other embodiments, however, the electronics housing 5004 can exhibit other cross-sectional shapes, such as ovoid or polygonal, without departing from the scope of the disclosure. The electronics housing 5004 can be configured to house or otherwise contain various electrical components used to operate the sensor control device 5002. In at least one embodiment, an adhesive patch (not shown) can be arranged at the bottom of the electronics housing 5004. The adhesive patch can be similar to the adhesive patch 105 of FIG. 1A, and can thus help adhere the sensor control device 5002 to the user's skin for use.

As illustrated, the sensor control device 5002 includes an electronics housing 5004 that includes a shell 5006 and a mount 5008 that is mateable with the shell 5006. The shell 5006 can be secured to the mount 5008 via a variety of ways, such as a snap fit engagement, an interference fit, sonic welding, one or more mechanical fasteners (e.g., screws), a gasket, an adhesive, or any combination thereof. In some cases, the shell 5006 can be secured to the mount 5008 such that a sealed interface is generated therebetween.

The sensor control device 5002 can further include a sensor 5010 (partially visible) and a sharp 5012 (partially visible), used to help deliver the sensor 5010 transcutaneously under a user's skin during application of the sensor control device 5002. As illustrated, corresponding portions of the sensor 5010 and the sharp 5012 extend distally from the bottom of the electronics housing 5004 (e.g., the mount 5008). The sharp 5012 can include a sharp hub 5014 configured to secure and carry the sharp 5012. As best seen in FIG. 10B, the sharp hub 5014 can include or otherwise define a mating member 5016. To couple the sharp 5012 to the sensor control device 5002, the sharp 5012 can be advanced axially through the electronics housing 5004 until the sharp hub 5014 engages an upper surface of the shell 5006 and the mating member 5016 extends distally from the bottom of the mount 5008. As the sharp 5012 penetrates the electronics housing 5004, the exposed portion of the sensor 5010 can be received within a hollow or recessed (arcuate) portion of the sharp 5012. The remaining portion of the sensor 5010 is arranged within the interior of the electronics housing 5004.

The sensor control device 5002 can further include a sensor cap 5018, shown exploded or detached from the electronics housing 5004 in FIGS. 10A-10B. The sensor cap 5018 can be removably coupled to the sensor control device 5002 (e.g., the electronics housing 5004) at or near the bottom of the mount 5008. The sensor cap 5018 can help provide a sealed barrier that surrounds and protects the exposed portions of the sensor 5010 and the sharp 5012 from gaseous chemical sterilization. As illustrated, the sensor cap 5018 can comprise a generally cylindrical body having a first end 5020a and a second end 5020b opposite the first end 5020a. The first end 5020a can be open to provide access into an inner chamber 5022 defined within the body. In contrast, the second end 5020b can be closed and can provide or otherwise define an engagement feature 5024. As described herein, the engagement feature 5024 can help mate the sensor cap 5018 to the cap (e.g., the applicator cap 708 of FIG. 3B) of a sensor applicator (e.g., the sensor applicator 150 of FIGS. 1 and 3A-3G), and can help remove the sensor cap 5018 from the sensor control device 5002 upon removing the cap from the sensor applicator 150.

The sensor cap 5018 can be removably coupled to the electronics housing 5004 at or near the bottom of the mount 5008. More specifically, the sensor cap 5018 can be removably coupled to the mating member 5016, which extends distally from the bottom of the mount 5008. In at least one embodiment, for example, the mating member 5016 can define a set of external threads 5026a (FIG. 10B) mateable with a set of internal threads 5026b (FIG. 10A) defined by the sensor cap 5018. In some embodiments, the external and internal threads 5026a, b can comprise a flat thread design (e.g., lack of helical curvature), which can prove advantageous in molding the parts. Alternatively, the external and internal threads 5026a,b can comprise a helical threaded engagement. Accordingly, the sensor cap 5018 can be threadably coupled to the sensor control device 5002 at the mating member 5016 of the sharp hub 5014. In other embodiments, the sensor cap 5018 can be removably coupled to the mating member 5016 via other types of engagements including, but not limited to, an interference or friction fit, or a frangible member or substance that can be broken with minimal separation force (e.g., axial or rotational force).

In some embodiments, the sensor cap 5018 can comprise a monolithic (singular) structure extending between the first and second ends 5020a, b. In other embodiments, however, the sensor cap 5018 can comprise two or more component parts. In the illustrated embodiment, for example, the sensor cap 5018 can include a seal ring 5028 positioned at the first end 5020a and a desiccant cap 5030 arranged at the second end 5020b. The seal ring 5028 can be configured to help seal the inner chamber 5022, as described in more detail below. In at least one embodiment, the seal ring 5028 can comprise an elastomeric O-ring. The desiccant cap 5030 can house or comprise a desiccant to help maintain preferred humidity levels within the inner chamber 5022. The desiccant cap 5030 can also define or otherwise provide the engagement feature 5024 of the sensor cap 5018.

Figure 11B:
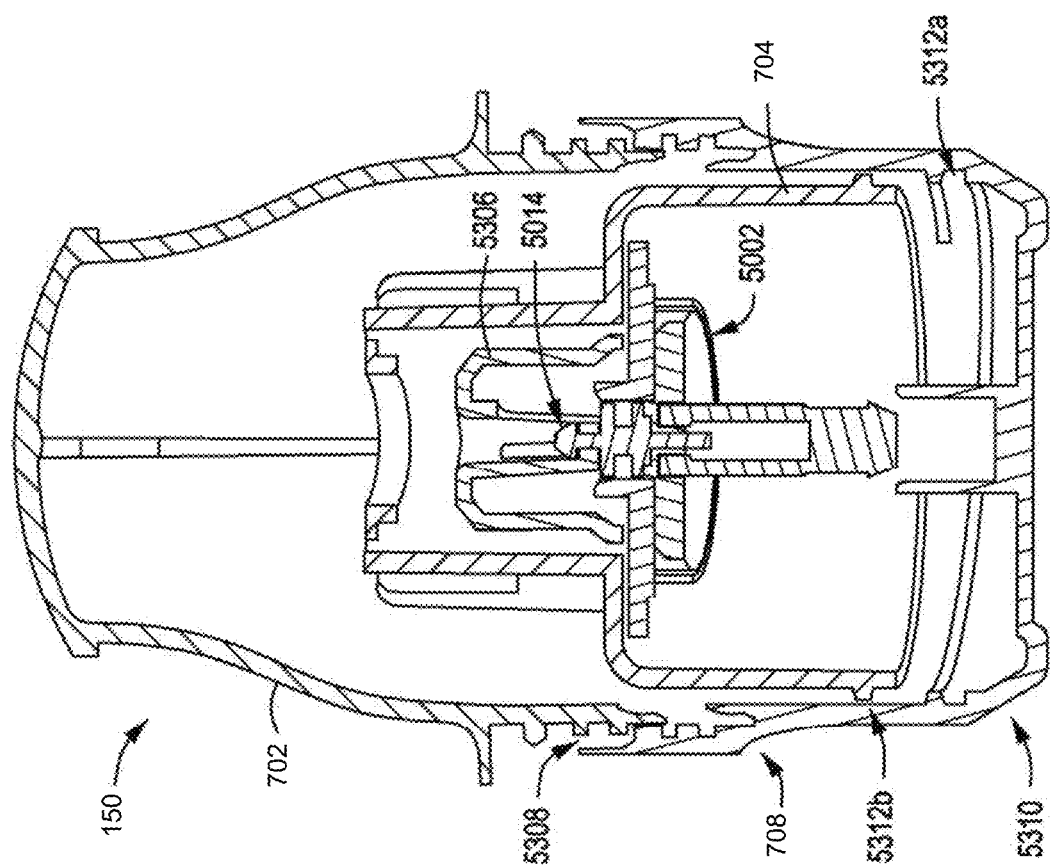
FIGS. 11A-11C are progressive cross-sectional side views showing assembly of the sensor applicator with the sensor control device of FIGS. 10A-10B.
Figure 11A:
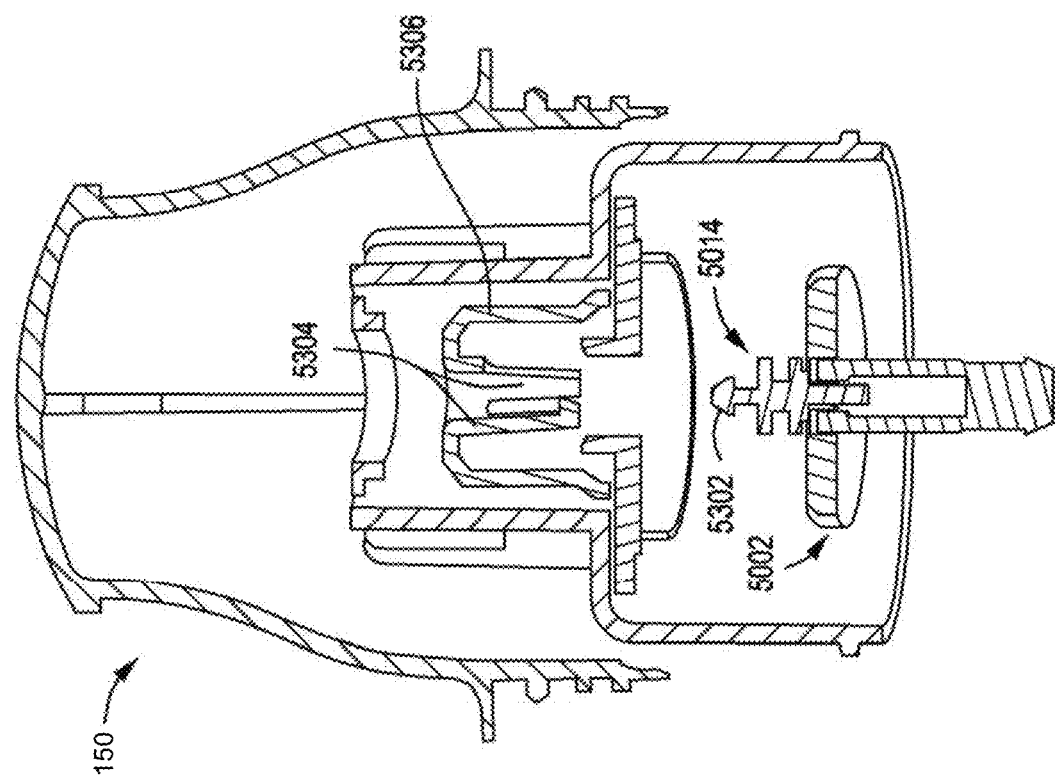
Figure 11C:
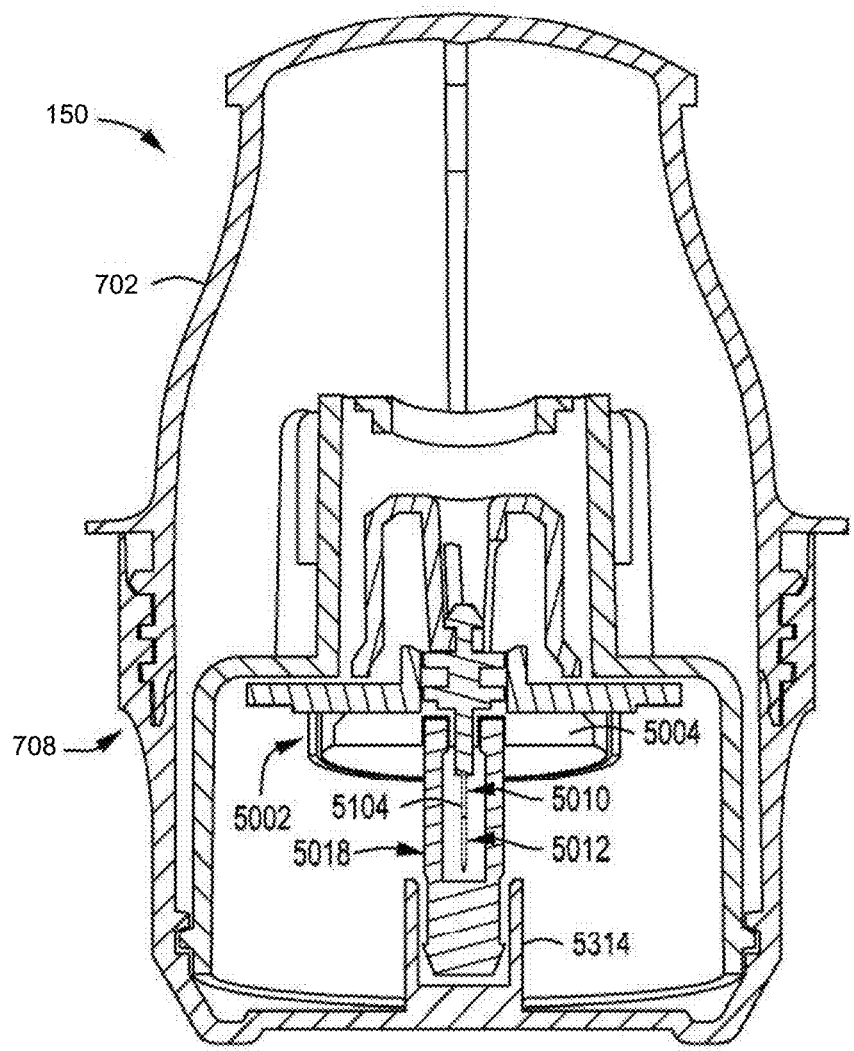

FIGS. 11A-11C are progressive cross-sectional side views showing assembly of the sensor applicator 150 with the sensor control device 5002, according to one or more embodiments. Once the sensor control device 5002 is fully assembled, it can then be loaded into the sensor applicator 150. With reference to FIG. 11A, the sharp hub 5014 can include or otherwise define a hub snap pawl 5302 configured to help couple the sensor control device 5002 to the sensor applicator 150. More specifically, the sensor control device 5002 can be advanced into the interior of the sensor applicator 150 and the hub snap pawl 5302 can be received by corresponding arms 5304 of a sharp carrier 5306 positioned within the sensor applicator 150.

In FIG. 11B, the sensor control device 5002 is shown received by the sharp carrier 5306 and, therefore, secured within the sensor applicator 150. Once the sensor control device 5002 is loaded into the sensor applicator 150, the applicator cap 708 can be coupled to the sensor applicator 150. In some embodiments, the applicator cap 708 and the housing 702 can have opposing, mateable sets of threads 5308 that enable the applicator cap 708 to be screwed onto the housing 702 in a clockwise (or counter-clockwise) direction and thereby secure the applicator cap 708 to the sensor applicator 150.

As illustrated, the sheath 704 is also positioned within the sensor applicator 150, and the sensor applicator 150 can include a sheath locking mechanism 5310 configured to ensure that the sheath 704 does not prematurely collapse during a shock event. In the illustrated embodiment, the sheath locking mechanism 5310 can comprise a threaded engagement between the applicator cap 708 and the sheath 704. More specifically, one or more internal threads 5312a can be defined or otherwise provided on the inner surface of the applicator cap 708, and one or more external threads 5312b can be defined or otherwise provided on the sheath 704. The internal and external threads 5312a,b can be configured to threadably mate as the applicator cap 708 is threaded to the sensor applicator 150 at the threads 5308. The internal and external threads 5312a,b can have the same thread pitch as the threads 5308 that enable the applicator cap 708 to be screwed onto the housing 702.

In FIG. 11C, the applicator cap 708 is shown fully threaded (coupled) to the housing 702. As illustrated, the applicator cap 708 can further provide and otherwise define a cap post 5314 centrally located within the interior of the applicator cap 708 and extending proximally from the bottom thereof. The cap post 5314 can be configured to receive at least a portion of the sensor cap 5018 as the applicator cap 708 is screwed onto the housing 702.

With the sensor control device 5002 loaded within the sensor applicator 150 and the applicator cap 708 properly secured, the sensor control device 5002 can then be subjected to a gaseous chemical sterilization configured to sterilize the electronics housing 5004 and any other exposed portions of the sensor control device 5002. Since the distal portions of the sensor 5010 and the sharp 5012 are sealed within the sensor cap 5018, the chemicals used during the gaseous chemical sterilization process are unable to interact with the enzymes, chemistry, and biologies provided on the tail 5104, and other sensor components, such as membrane coatings that regulate analyte influx.

Figure 12B:
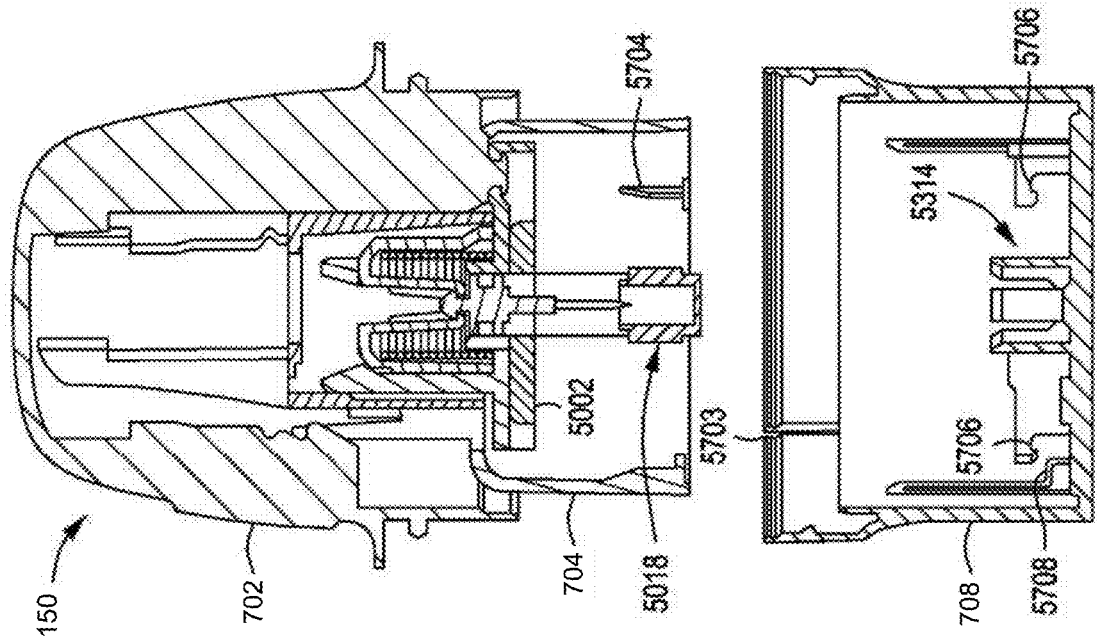
FIGS. 12A-12C are progressive cross-sectional side views showing assembly and disassembly of an example embodiment of the sensor applicator with the sensor control device of FIGS. 10A-10B.
Figure 12A:
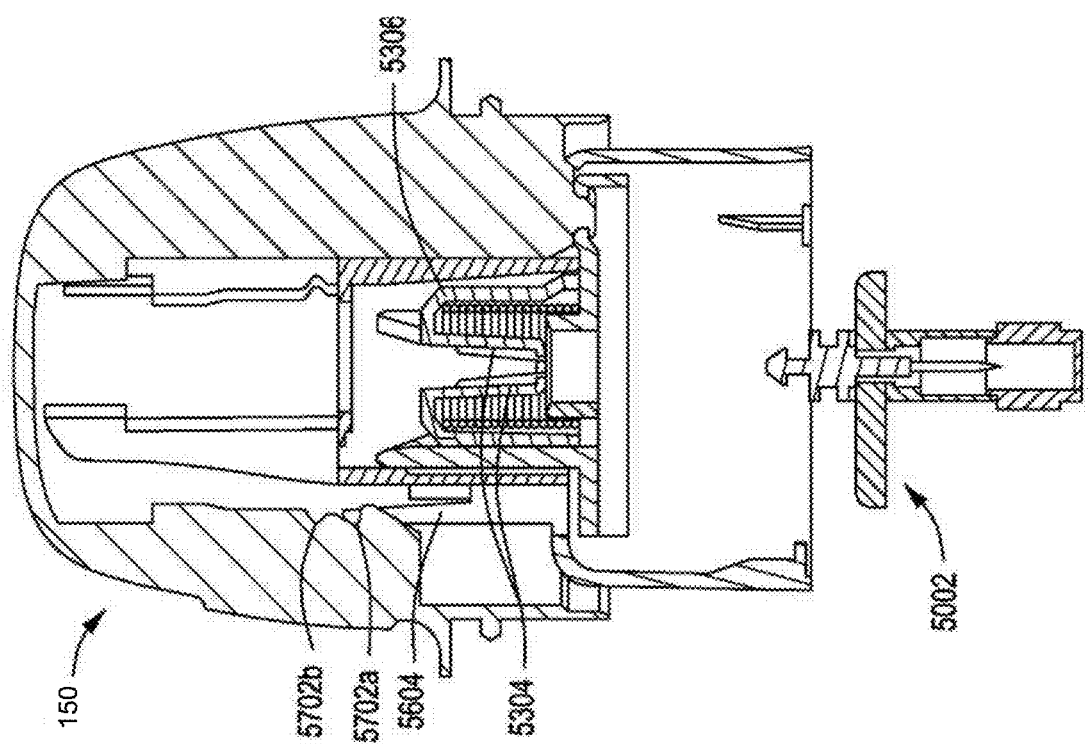
Figure 12C:
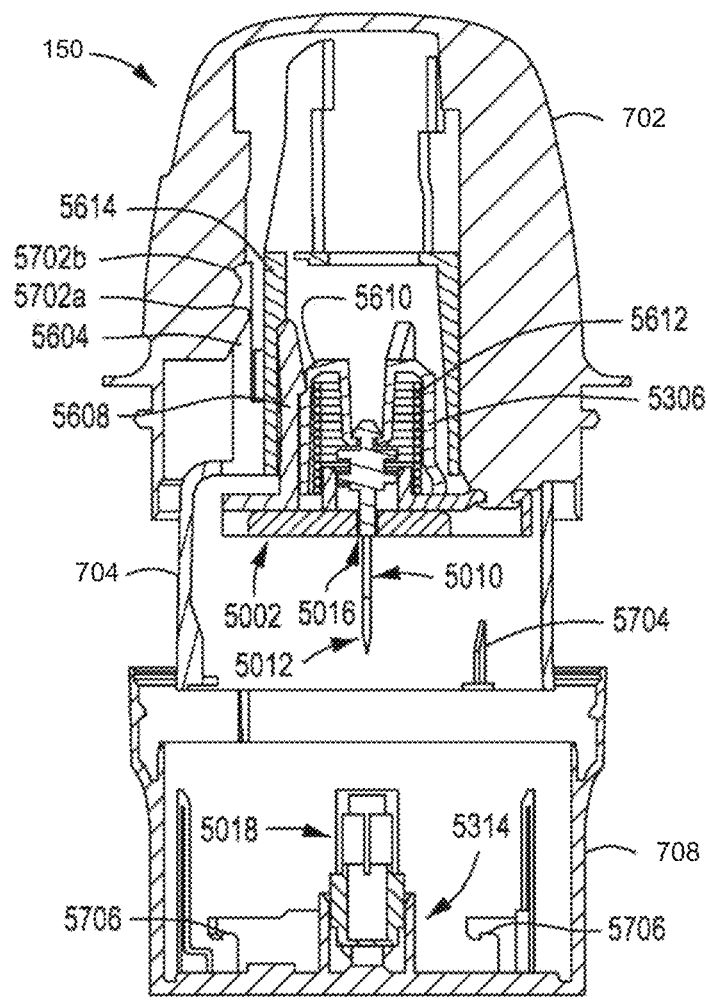

FIGS. 12A-12C are progressive cross-sectional side views showing assembly and disassembly of an alternative embodiment of the sensor applicator 150 with the sensor control device 5002, according to one or more additional embodiments. A fully assembled sensor control device 5002 can be loaded into the sensor applicator 150 by coupling the hub snap pawl 5302 into the arms 5304 of the sharp carrier 5306 positioned within the sensor applicator 150, as generally described above.

In the illustrated embodiment, the sheath arms 5604 of the sheath 704 can be configured to interact with a first detent 5702a and a second detent 5702b defined within the interior of the housing 702. The first detent 5702a can alternately be referred to a "locking" detent, and the second detent 5702b can alternately be referred to as a "firing" detent. When the sensor control device 5002 is initially installed in the sensor applicator 150, the sheath arms 5604 can be received within the first detent 5702a. As discussed below, the sheath 704 can be actuated to move the sheath arms 5604 to the second detent 5702b, which places the sensor applicator 150 in firing position.

In FIG. 12B, the applicator cap 708 is aligned with the housing 702 and advanced toward the housing 702 so that the sheath 704 is received within the applicator cap 708. Instead of rotating the applicator cap 708 relative to the housing 702, the threads of the applicator cap 708 can be snapped onto the corresponding threads of the housing 702 to couple the applicator cap 708 to the housing 702. Axial cuts or slots 5703 (one shown) defined in the applicator cap 708 can allow portions of the applicator cap 708 near its threading to flex outward to be snapped into engagement with the threading of the housing 702. As the applicator cap 708 is snapped to the housing 702, the sensor cap 5018 can correspondingly be snapped into the cap post 5314.

Similar to the embodiment of FIGS. 11A-11C, the sensor applicator 150 can include a sheath locking mechanism configured to ensure that the sheath 704 does not prematurely collapse during a shock event. In the illustrated embodiment, the sheath locking mechanism includes one or more ribs 5704 (one shown) defined near the base of the sheath 704 and configured to interact with one or more ribs 5706 (two shown) and a shoulder 5708 defined near the base of the applicator cap 708. The ribs 5704 can be configured to inter-lock between the ribs 5706 and the shoulder 5708 while attaching the applicator cap 708 to the housing 702. More specifically, once the applicator cap 708 is snapped onto the housing 702, the applicator cap 708 can be rotated (e.g., clockwise), which locates the ribs 5704 of the sheath 704 between the ribs 5706 and the shoulder 5708 of the applicator cap 708 and thereby "locks" the applicator cap 708 in place until the user reverse rotates the applicator cap 708 to remove the applicator cap 708 for use. Engagement of the ribs 5704 between the ribs 5706 and the shoulder 5708 of the applicator cap 708 can also prevent the sheath 704 from collapsing prematurely.

In FIG. 12C, the applicator cap 708 is removed from the housing 702. As with the embodiment of FIGS. 12A-12C, the applicator cap 708 can be removed by reverse rotating the applicator cap 708, which correspondingly rotates the cap post 5314 in the same direction and causes sensor cap 5018 to unthread from the mating member 5016, as generally described above. Moreover, detaching the sensor cap 5018 from the sensor control device 5002 exposes the distal portions of the sensor 5010 and the sharp 5012.

As the applicator cap 708 is unscrewed from the housing 702, the ribs 5704 defined on the sheath 704 can slidingly engage the tops of the ribs 5706 defined on the applicator cap 708. The tops of the ribs 5706 can provide corresponding ramped surfaces that result in an upward displacement of the sheath 704 as the applicator cap 708 is rotated, and moving the sheath 704 upward causes the sheath arms 5604 to flex out of engagement with the first detent 5702*a* to be received within the second detent 5702*b*. As the sheath 704 moves to the second detent 5702*b*, the radial shoulder 5614 moves out of radial engagement with the carrier arm(s) 5608, which allows the passive spring force of the spring 5612 to push upward on the sharp carrier 5306 and force the carrier arm(s) 5608 out of engagement with the groove(s) 5610. As the sharp carrier 5306 moves upward within the housing 702, the mating member 5016 can correspondingly retract until it becomes flush, substantially flush, or sub-flush with the bottom of the sensor control device 5002. At this point, the sensor applicator 150 in firing position. Accordingly, in this embodiment, removing the applicator cap 708 correspondingly causes the mating member 5016 to retract.

FIGS. 13A-13F illustrate example details of embodiments of the internal device mechanics of "firing" the applicator 150 to apply sensor control device 102 to a user and including retracting sharp 1030 safely back into used applicator 150. All together, these drawings represent an example sequence of driving sharp 1030 (supporting a sensor coupled to sensor control device 102) into the skin of a user, withdrawing the sharp while leaving the sensor behind in operative contact with interstitial fluid of the user, and adhering the sensor control device to the skin of the user with an adhesive. Modification of such activity for use with the alternative applicator assembly embodiments and components can be appreciated in reference to the same by those with skill in the art. Moreover, applicator 150 can be a sensor applicator having one-piece architecture or a two-piece architecture as disclosed herein.

Figure 13A:
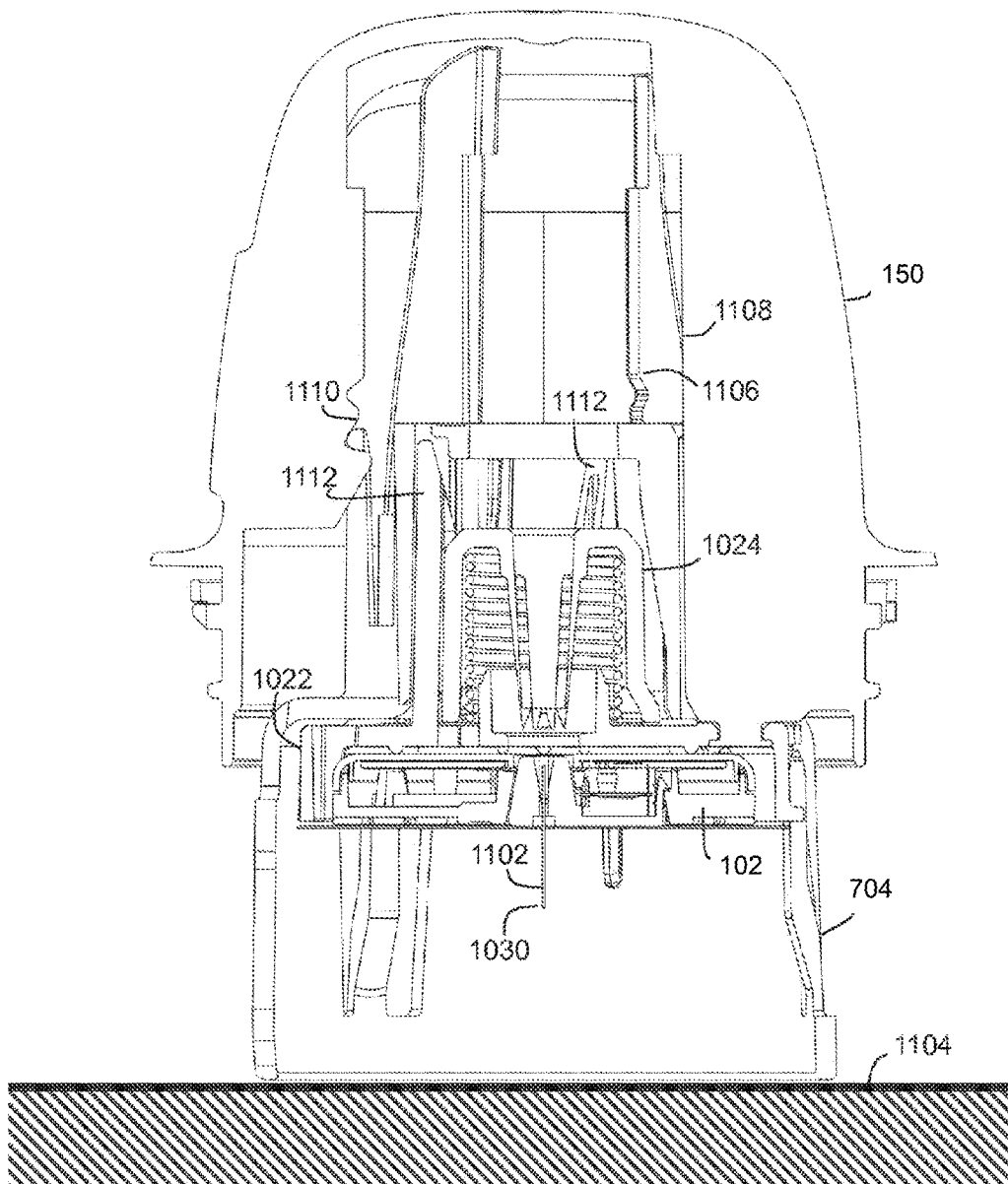
FIGS. 13A-13F illustrate cross-sectional views depicting an example embodiment of an applicator during a stage of deployment.

Turning now to FIG. 13A, a sensor 1102 is supported within sharp 1030, just above the skin 1104 of the user. Rails 1106 (optionally three of them) of an upper guide section 1108 can be provided to control applicator 150 motion relative to sheath 704. The sheath 704 is held by detent features 1110 within the applicator 150 such that appropriate downward force along the longitudinal axis of the applicator 150 will cause the resistance provided by the detent features 1110 to be overcome so that sharp 1030 and sensor control device 102 can translate along the longitudinal axis into (and onto) skin 1104 of the user. In addition, catch arms 1112 of sensor carrier 1022 engage the sharp retraction assembly 1024 to maintain the sharp 1030 in a position relative to the sensor control device 102.

Figure 13B:
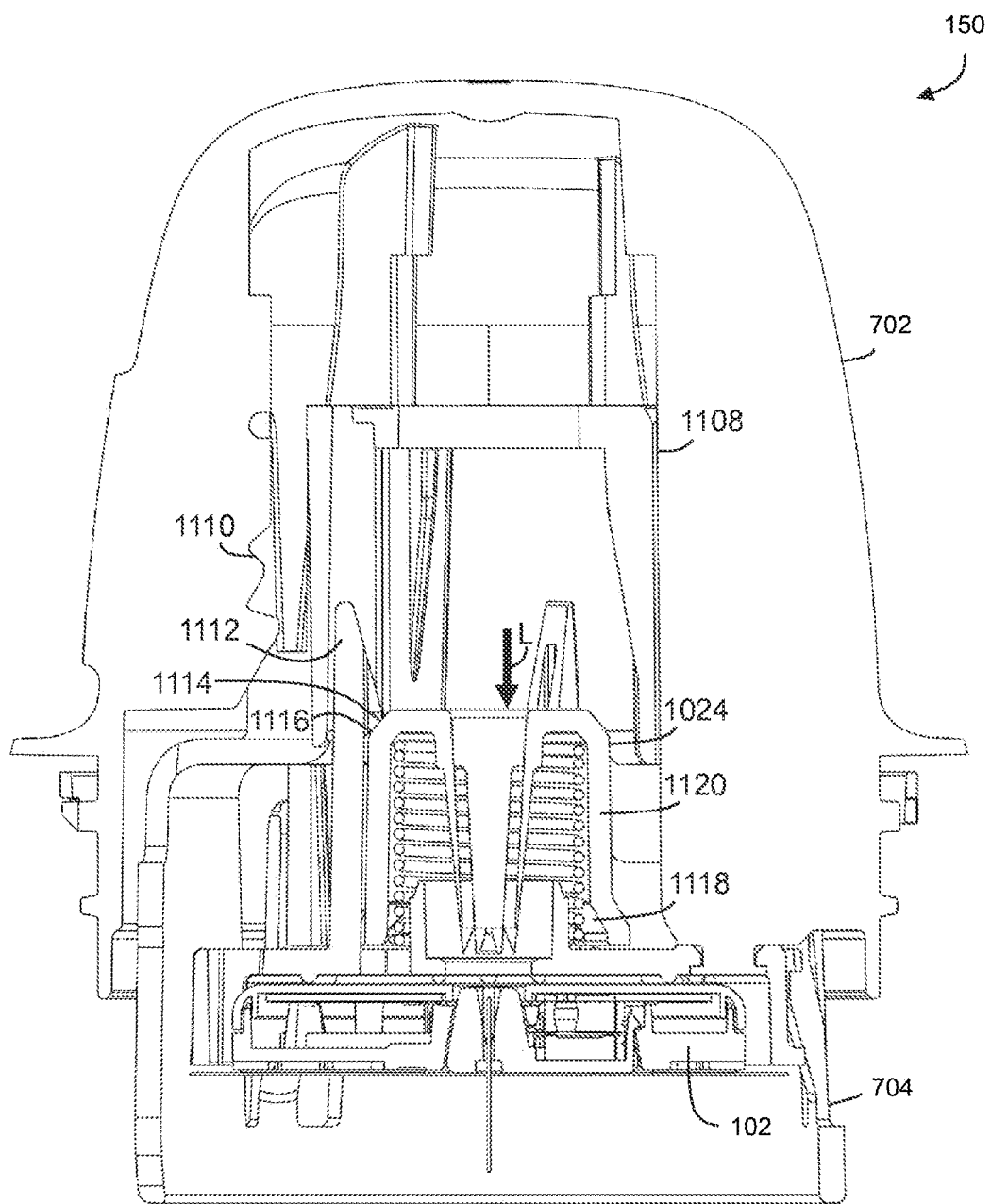

In FIG. 13B, user force is applied to overcome or override detent features 1110 and sheath 704 collapses into housing 702 driving the sensor control device 102 (with associated parts) to translate down as indicated by the arrow L along the longitudinal axis. An inner diameter of the upper guide section 1108 of the sheath 704 constrains the position of carrier arms 1112 through the full stroke of the sensor/sharp insertion process. The retention of the stop surfaces 1114 of carrier arms 1112 against the complimentary faces 1116 of the sharp retraction assembly 1024 maintains the position of the members with return spring 1118 fully energized. According to embodiments, rather than employing user force to drive the sensor control device 102 to translate down as indicated by the arrow L along the longitudinal axis, housing 702 can include a button (for example, not limitation, a push button) which activates a drive spring (for example, not limitation, a coil spring) to drive the sensor control device 102.

Figure 13C:
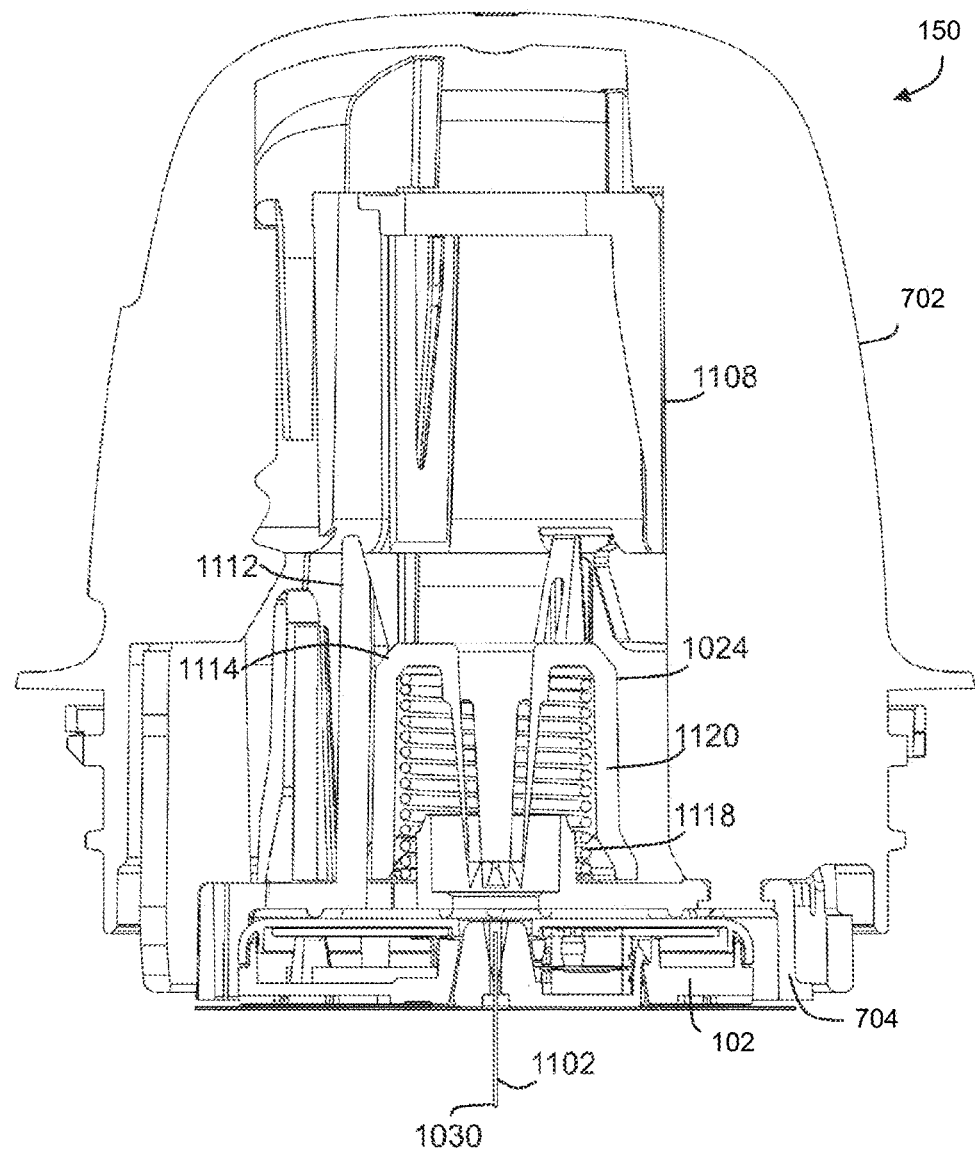
Figure 13D:
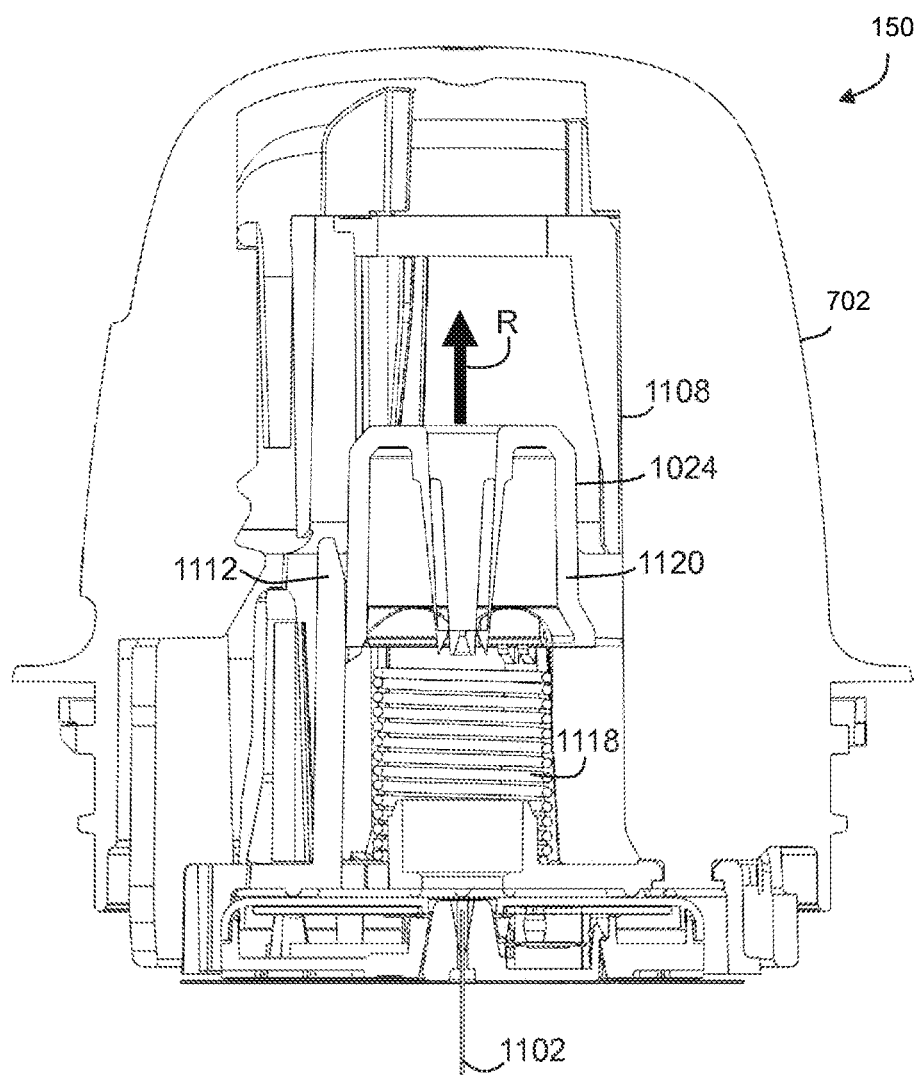

In FIG. 13C, sensor 1102 and sharp 1030 have reached full insertion depth. In so doing, the carrier arms 1112 clear the upper guide section 1108 inner diameter. Then, the compressed force of the coil return spring 1118 drives angled stop surfaces 1114 radially outward, releasing force to drive the sharp carrier 1102 of the sharp retraction assembly 1024 to pull the (slotted or otherwise configured) sharp 1030 out of the user and off of the sensor 1102 as indicated by the arrow R in FIG. 13D.

Figure 13E:
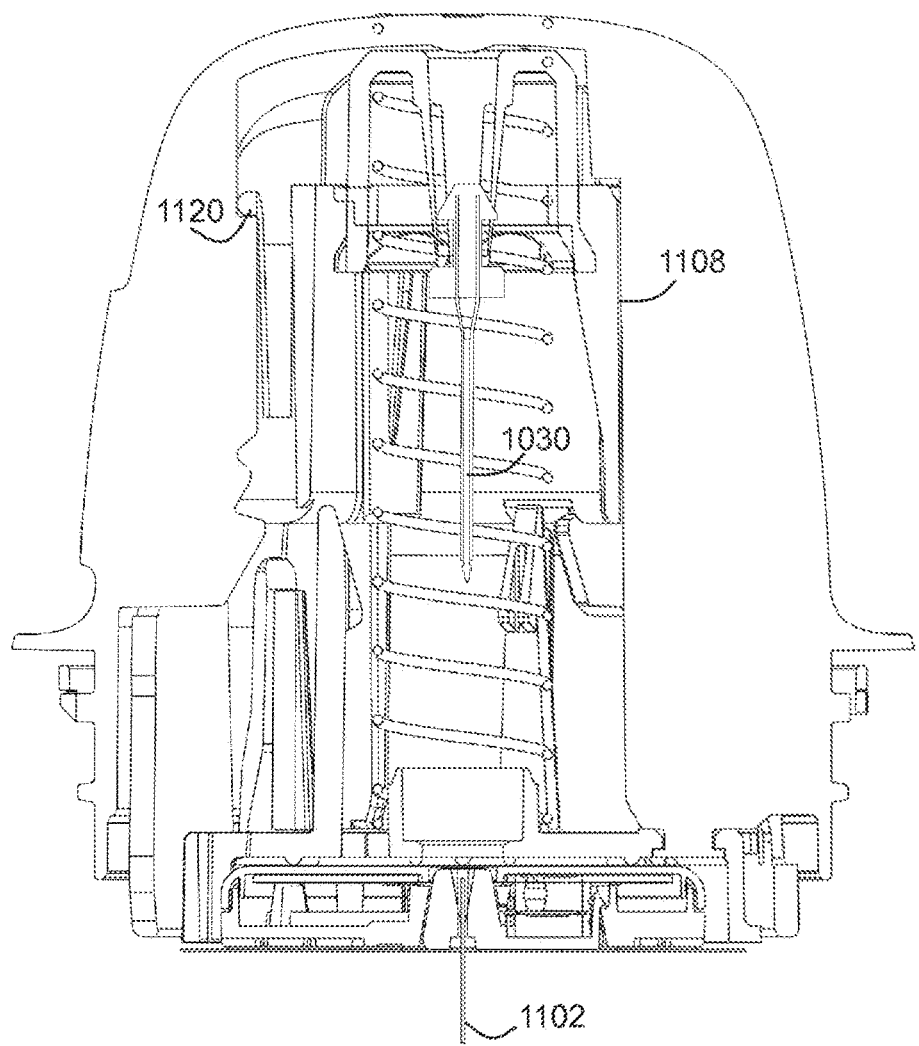
Figure 13F:
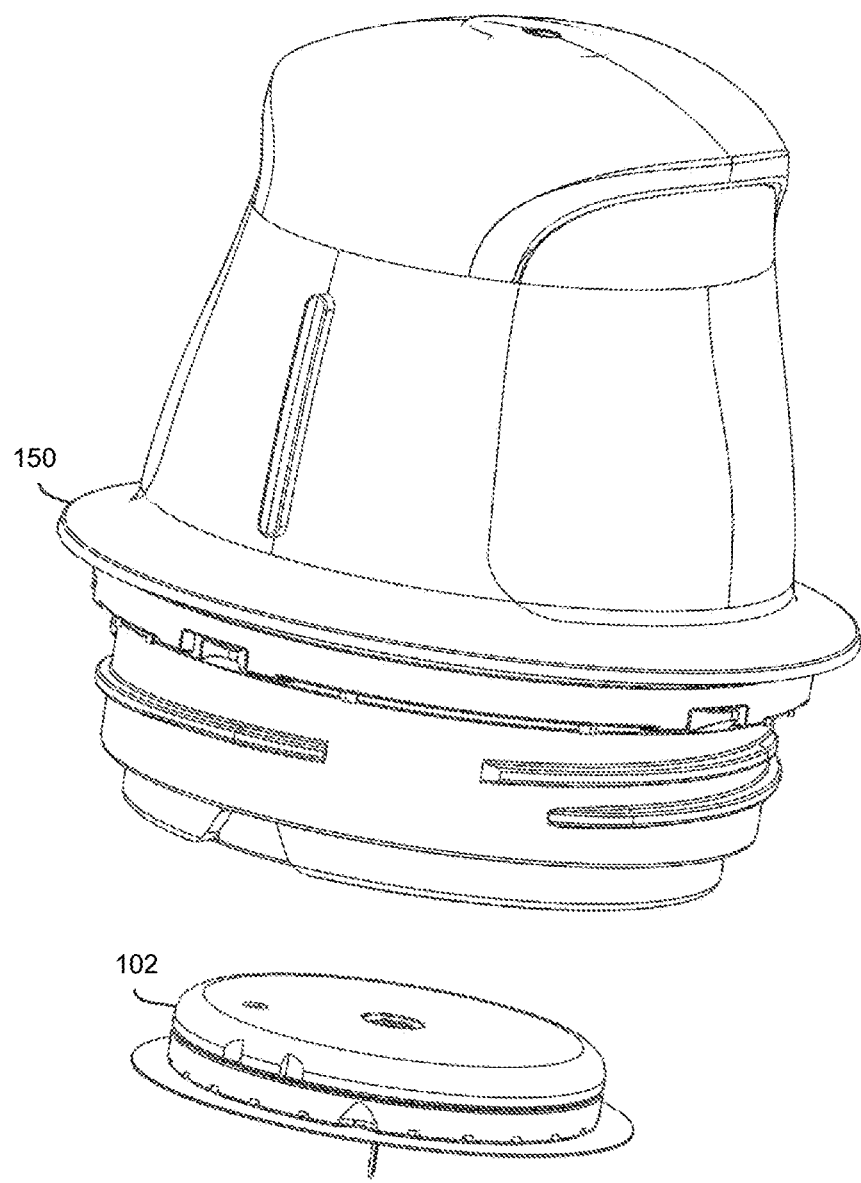

With the sharp 1030 fully retracted as shown in FIG. 13E, the upper guide section 1108 of the sheath 704 is set with a final locking feature 1120. As shown in FIG. 13F, the spent applicator assembly 150 is removed from the insertion site, leaving behind the sensor control device 102, and with the sharp 1030 secured safely inside the applicator assembly 150. The spent applicator assembly 150 is now ready for disposal.

Operation of the applicator 150 when applying the sensor control device 102 is designed to provide the user with a sensation that both the insertion and retraction of the sharp 1030 is performed automatically by the internal mechanisms of the applicator 150. In other words, the present invention avoids the user experiencing the sensation that he is manually driving the sharp 1030 into his skin. Thus, once the user applies sufficient force to overcome the resistance from the detent features of the applicator 150, the resulting actions of the applicator 150 are perceived to be an automated response to the applicator being "triggered." The user does not perceive that he is supplying additional force to drive the sharp 1030 to pierce his skin despite that all the driving force is provided by the user and no additional biasing/driving means are used to insert the sharp 1030. As detailed above in FIG. 13C, the retraction of the sharp 1030 is automated by the coil return spring 1118 of the applicator 150.

With respect to any of the applicator embodiments described herein, as well as any of the components thereof, including but not limited to the sharp, sharp module and sensor module embodiments, those of skill in the art will understand that said embodiments can be dimensioned and configured for use with sensors configured to sense an analyte level in a bodily fluid in the epidermis, dermis, or subcutaneous tissue of a subject. In some embodiments, for example, sharps and distal portions of analyte sensors disclosed herein can both be dimensioned and configured to be positioned at a particular end-depth (i.e., the furthest point of penetration in a tissue or layer of the subject's body, e.g., in the epidermis, dermis, or subcutaneous tissue). With respect to some applicator embodiments, those of skill in the art will appreciate that certain embodiments of sharps can be dimensioned and configured to be positioned at a different end-depth in the subject's body relative to the final end-depth of the analyte sensor. In some embodiments, for example, a sharp can be positioned at a first end-depth in the subject's epidermis prior to retraction, while a distal portion of an analyte sensor can be positioned at a second end-depth in the subject's dermis. In other embodiments, a sharp can be positioned at a first end-depth in the subject's dermis prior to retraction, while a distal portion of an analyte sensor can be positioned at a second end-depth in the subject's subcutaneous tissue. In still other embodiments, a sharp can be positioned at a first end-depth prior to retraction and the analyte sensor can be positioned at a second end-depth, wherein the first end-depth and second end-depths are both in the same layer or tissue of the subject's body.

Additionally, with respect to any of the applicator embodiments described herein, those of skill in the art will understand that an analyte sensor, as well as one or more structural components coupled thereto, including but not limited to one or more spring-mechanisms, can be disposed within the applicator in an off-center position relative to one or more axes of the applicator. In some applicator embodiments, for example, an analyte sensor and a spring mechanism can be disposed in a first off-center position relative to an axis of the applicator on a first side of the applicator, and the sensor electronics can be disposed in a second off-center position relative to the axis of the applicator on a second side of the applicator. In other applicator embodiments, the analyte sensor, spring mechanism, and sensor electronics can be disposed in an off-center position relative to an axis of the applicator on the same side. Those of skill in the art will appreciate that other permutations and configurations in which any or all of the analyte sensor, spring mechanism, sensor electronics, and other components of the applicator are disposed in a centered or off-centered position relative to one or more axes of the applicator are possible and fully within the scope of the present disclosure.

Additional details of suitable devices, systems, methods, components and the operation thereof along with related features are set forth in International Publication No. WO2018/136898 to Rao et. al., International Publication No. WO2019/236850 to Thomas et. al., International Publication No. WO2019/236859 to Thomas et. al., International Publication No. WO2019/236876 to Thomas et. al., and U.S. Patent Publication No. 2020/0196919, filed Jun. 6, 2019, each of which is incorporated by reference in its entirety herein. Further details regarding embodiments of applicators, their components, and variants thereof, are described in U.S. Patent Publication Nos. 2013/0150691, 2016/0331283, and 2018/0235520, all of which are incorporated by reference herein in their entireties and for all purposes. Further details regarding embodiments of sharp modules, sharps, their components, and variants thereof, are described in U.S. Patent Publication No. 2014/0171771, which is incorporated by reference herein in its entirety and for all purposes.

Biochemical sensors can be described by one or more sensing characteristics. A common sensing characteristic is referred to as the biochemical sensor's sensitivity, which is a measure of the sensor's responsiveness to the concentration of the chemical or composition it is designed to detect. For electrochemical sensors, this response can be in the form of an electrical current (amperometric) or electrical charge (coulometric). For other types of sensors, the response can be in a different form, such as a photonic intensity (e.g., optical light). The sensitivity of a biochemical analyte sensor can vary depending on a number of factors, including whether the sensor is in an in vitro state or an in vivo state.

Figure 14:
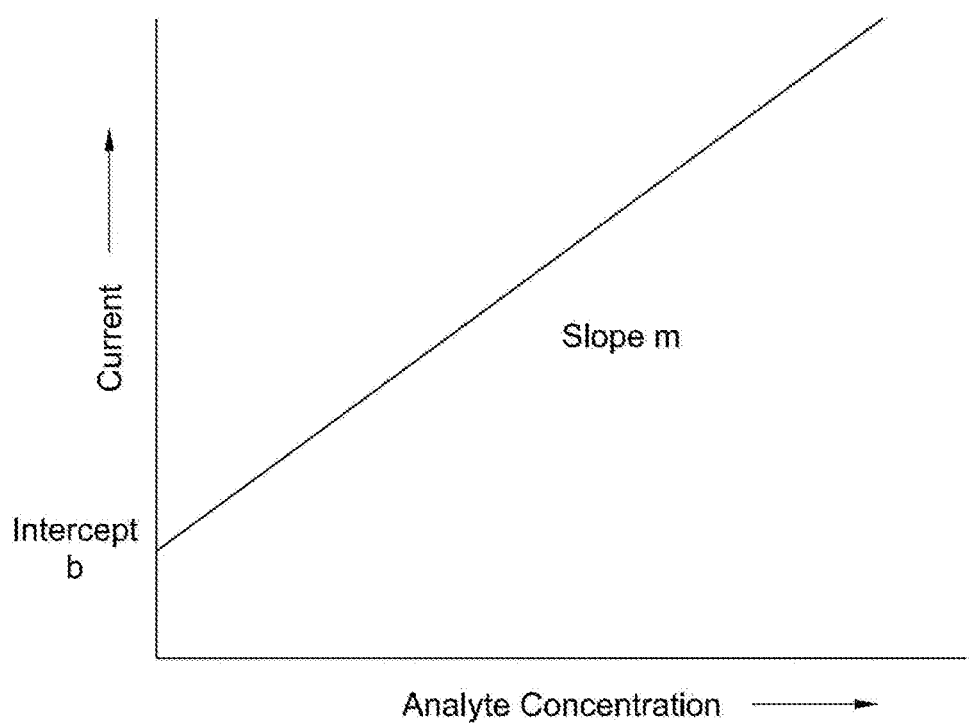
FIG. 14 is a graph depicting an example of an in vitro sensitivity of an analyte sensor.

FIG. 14 is a graph depicting the in vitro sensitivity of an amperometric analyte sensor. The in vitro sensitivity can be obtained by in vitro testing the sensor at various analyte concentrations and then performing a regression (e.g., linear or non-linear) or other curve fitting on the resulting data. In this example, the analyte sensor's sensitivity is linear, or substantially linear, and can be modeled according to the equation $y=mx+b$, where y is the sensor's electrical output current, x is the analyte level (or concentration), m is the slope of the sensitivity and b is the intercept of the sensitivity, where the intercept generally corresponds to a background signal (e.g., noise). For sensors with a linear or substantially linear response, the analyte level that corresponds to a given current can be determined from the slope and intercept of the sensitivity. Sensors with a non-linear sensitivity require additional information to determine the analyte level resulting from the sensor's output current, and those of ordinary skill in the art are familiar with manners by which to model non-linear sensitivities. In certain embodiments of in vivo sensors, the in vitro sensitivity can be the same as the in vivo sensitivity, but in other embodiments a transfer (or conversion) function is used to translate the in vitro sensitivity into the in vivo sensitivity that is applicable to the sensor's intended in vivo use.

Calibration is a technique for improving or maintaining accuracy by adjusting a sensor's measured output to reduce the differences with the sensor's expected output. One or more parameters that describe the sensor's sensing characteristics, like its sensitivity, are established for use in the calibration adjustment.

Certain in vivo analyte monitoring systems require calibration to occur after implantation of the sensor into the user or patient, either by user interaction or by the system itself in an automated fashion. For example, when user interaction is required, the user performs an in vitro measurement (e.g., a blood glucose (BG) measurement using a finger stick and an in vitro test strip) and enters this into the system, while the analyte sensor is implanted. The system then compares the in vitro measurement with the in vivo signal and, using the differential, determines an estimate of the sensor's in vivo sensitivity. The in vivo sensitivity can then be used in an algorithmic process to transform the data collected with the sensor to a value that indicates the user's analyte level. This and other processes that require user action to perform calibration are referred to as "user calibration." Systems can require user calibration due to instability of the sensor's sensitivity, such that the sensitivity drifts or changes over time. Thus, multiple user calibrations (e.g., according to a periodic (e.g., daily) schedule, variable schedule, or on an as-needed basis) can be required to maintain accuracy. While the embodiments described herein can incorporate a degree of user calibration for a particular implementation, generally this is not preferred as it requires the user to perform a painful or otherwise burdensome BG measurement, and can introduce user error.

Some in vivo analyte monitoring systems can regularly adjust the calibration parameters through the use of automated measurements of characteristics of the sensor made by the system itself (e.g., processing circuitry executing software). The repeated adjustment of the sensor's sensitivity based on a variable measured by the system (and not the user) is referred to generally as "system" (or automated) calibration, and can be performed with user calibration, such as an early BG measurement, or without user calibration. Like the case with repeated user calibrations, repeated system calibrations are typically necessitated by drift in the sensor's sensitivity over time. Thus, while the embodiments described herein can be used with a degree of automated system calibration, preferably the sensor's sensitivity is relatively stable over time such that post-implantation calibration is not required.

Some in vivo analyte monitoring systems operate with a sensor that is factory calibrated. Factory calibration refers to the determination or estimation of the one or more calibration parameters prior to distribution to the user or healthcare professional (HCP). The calibration parameter can be determined by the sensor manufacturer (or the manufacturer of the other components of the sensor control device if the two entities are different). Many in vivo sensor manufacturing processes fabricate the sensors in groups or batches referred to as production lots, manufacturing stage lots, or simply lots. A single lot can include thousands of sensors.

Sensors can include a calibration code or parameter which can be derived or determined during one or more sensor manufacturing processes and coded or programmed, as part of the manufacturing process, in the data processing device of the analyte monitoring system or provided on the sensor itself, for example, as a bar code, a laser tag, an RFID tag, or other machine readable information provided on the sensor. User calibration during in vivo use of the sensor can be obviated, or the frequency of in vivo calibrations during sensor wear can be reduced if the code is provided to a receiver (or other data processing device). In embodiments where the calibration code or parameter is provided on the sensor itself, prior to or at the start of the sensor use, the calibration code or parameter can be automatically transmitted or provided to the data processing device in the analyte monitoring system.

Some in vivo analyte monitoring system operate with a sensor that can be one or more of factory calibrated, system calibrated, and/or user calibrated. For example, the sensor can be provided with a calibration code or parameter which can allow for factory calibration. If the information is provided to a receiver (for example, entered by a user), the sensor can operate as a factory calibrated sensor. If the information is not provided to a receiver, the sensor can operate as a user calibrated sensor and/or a system calibrated sensor.

In a further aspect, programming or executable instructions can be provided or stored in the data processing device of the analyte monitoring system, and/or the receiver/controller unit, to provide a time varying adjustment algorithm to the in vivo sensor during use. For example, based on a retrospective statistical analysis of analyte sensors used in vivo and the corresponding glucose level feedback, a predetermined or analytical curve or a database can be generated which is time based, and configured to provide additional adjustment to the one or more in vivo sensor parameters to compensate for potential sensor drift in stability profile, or other factors.

In accordance with the disclosed subject matter, the analyte monitoring system can be configured to compensate or adjust for the sensor sensitivity based on a sensor drift profile. A time varying parameter $\beta(t)$ can be defined or determined based on analysis of sensor behavior during in vivo use, and a time varying drift profile can be determined. In certain aspects, the compensation or adjustment to the sensor sensitivity can be programmed in the receiver unit, the controller or data processor of the analyte monitoring system such that the compensation or the adjustment or both can be performed automatically and/or iteratively when sensor data is received from the analyte sensor. In accordance with the disclosed subject matter, the adjustment or compensation algorithm can be initiated or executed by the user (rather than self-initiating or executing) such that the adjustment or the compensation to the analyte sensor sensitivity profile is performed or executed upon user initiation or activation of the corresponding function or routine, or upon the user entering the sensor calibration code.

In accordance with the disclosed subject matter, each sensor in the sensor lot (in some instances not including sample sensors used for in vitro testing) can be examined non-destructively to determine or measure its characteristics such as membrane thickness at one or more points of the sensor, and other characteristics including physical characteristics such as the surface area/volume of the active area can be measured or determined. Such measurement or determination can be performed in an automated manner using, for example, optical scanners or other suitable measurement devices or systems, and the determined sensor characteristics for each sensor in the sensor lot is compared to the corresponding mean values based on the sample sensors for possible correction of the calibration parameter or code assigned to each sensor. For example, for a calibration parameter defined as the sensor sensitivity, the sensitivity is approximately inversely proportional to the membrane thickness, such that, for example, a sensor having a measured membrane thickness of approximately 4% greater than the mean membrane thickness for the sampled sensors from the same sensor lot as the sensor, the sensitivity assigned to that sensor in one embodiment is the mean sensitivity determined from the sampled sensors divided by 1.04. Likewise, since the sensitivity is approximately proportional to active area of the sensor, a sensor having measured active area of approximately 3% lower than the mean active area for the sampled sensors from the same sensor lot, the sensitivity assigned to that sensor is the mean sensitivity multiplied by 0.97. The assigned sensitivity can be determined from the mean sensitivity from the sampled sensors, by multiple successive adjustments for each examination or measurement of the sensor. In certain embodiments, examination or measurement of each sensor can additionally include measurement of membrane consistency or texture in addition to the membrane thickness and/or surface are or volume of the active sensing area.

Additional information regarding sensor calibration is provided in U.S. Publication No. 2010/00230285 and U.S. Publication No. 2019/0274598, each of which is incorporated by reference herein in its entirety.

The storage memory 5030 of the sensor control device 102 can include the software blocks related to communication protocols of the communication module. For example, the storage memory 5030 can include a BLE services software block with functions to provide interfaces to make the BLE module 5041 available to the computing hardware of the sensor control device 102. These software functions can include a BLE logical interface and interface parser. BLE services offered by the communication module 5040 can include the generic access profile service, the generic attribute service, generic access service, device information service, data transmission services, and security services. The data transmission service can be a primary service used for transmitting data such as sensor control data, sensor status data, analyte measurement data (historical and current), and event log data. The sensor status data can include error data, current time active, and software state. The analyte measurement data can include information such as current and historical raw measurement values, current and historical values after processing using an appropriate algorithm or model, projections and trends of measurement levels, comparisons of other values to patient-specific averages, calls to action as determined by the algorithms or models and other similar types of data.

According to aspects of the disclosed subject matter, and as embodied herein, a sensor control device 102 can be configured to communicate with multiple devices concurrently by adapting the features of a communication protocol or medium supported by the hardware and radios of the sensor control device 102. As an example, the BLE module 5041 of the communication module 5040 can be provided with software or firmware to enable multiple concurrent connections between the sensor control device 102 as a central device and the other devices as peripheral devices, or as a peripheral device where another device is a central device.

Connections, and ensuing communication sessions, between two devices using a communication protocol such as BLE can be characterized by a similar physical channel operated between the two devices (e.g., a sensor control device 102 and data receiving device 120). The physical channel can include a single channel or a series of channels, including for example and without limitation using an agreed upon series of channels determined by a common clock and channel- or frequency-hopping sequence. Communication sessions can use a similar amount of the available communication spectrum, and multiple such communication sessions can exist in proximity. In certain embodiment, each collection of devices in a communication session uses a different physical channel or series of channels, to manage interference of devices in the same proximity.

For purpose of illustration and not limitation, reference is made to an exemplary embodiment of a procedure for a sensor-receiver connection for use with the disclosed subject matter. First, the sensor control device 102 repeatedly advertises its connection information to its environment in a search for a data receiving device 120. The sensor control device 102 can repeat advertising on a regular basis until a connection established. The data receiving device 120 detects the advertising packet and scans and filters for the sensor control device 102 to connect to through the data provided in the advertising packet. Next, data receiving device 120 sends a scan request command and the sensor control device 102 responds with a scan response packet providing additional details. Then, the data receiving device 120 sends a connection request using the Bluetooth device address associated with the data receiving device 120. The data receiving device 120 can also continuously request to establish a connection to a sensor control device 102 with a specific Bluetooth device address. Then, the devices establish an initial connection allowing them to begin to exchange data. The devices begin a process to initialize data exchange services and perform a mutual authentication procedure.

During a first connection between the sensor control device 102 and data receiving device 120, the data receiving device 120 can initialize a service, characteristic, and attribute discovery procedure. The data receiving device 120 can evaluate these features of the sensor control device 102 and store them for use during subsequent connections. Next, the devices enable a notification for a customized security service used for mutual authentication of the sensor control device 102 and data receiving device 120. The mutual authentication procedure can be automated and require no user interaction. Following the successful completion of the mutual authentication procedure, the sensor control device 102 sends a connection parameter update to request the data receiving device 120 to use connection parameter settings preferred by the sensor control device 102 and configured to maximum longevity.

The data receiving device 120 then performs sensor control procedures to backfill historical data, current data, event log, and factory data. As an example, for each type of data, the data receiving device 120 sends a request to initiate a backfill process. The request can specify a range of records defined based on, for example, the measurement value, timestamp, or similar, as appropriate. The sensor control device 102 responds with requested data until all previously unsent data in the memory of the sensor control device 102 is delivered to the data receiving device 120. The sensor control device 102 can respond to a backfill request from the data receiving device 120 that all data has already been sent. Once backfill is completed, the data receiving device 120 can notify sensor control device 102 that it is ready to receive regular measurement readings. The sensor control device 102 can send readings across multiple notifications result on a repeating basis. As embodied herein, the multiple notifications can be redundant notifications to ensure that data is transmitted correctly. Alternatively, multiple notifications can make up a single payload.

For purpose of illustration and not limitation, reference is made to an exemplary embodiment of a procedure to send a shutdown command to the sensor control device 102. The shutdown operation is executed if the sensor control device 102 is in, for example, an error state, insertion failed state, or sensor expired state. If the sensor control device 102 is not in those states, the sensor control device 102 can log the command and execute the shutdown when sensor control device 102 transitions into the error state or sensor expired state. The data receiving device 120 sends a properly formatted shutdown command to the sensor control device 102. If the sensor control device 102 is actively processing another command, the sensor control device 102 will respond with a standard error response indicating that the sensor control device 102 is busy. Otherwise, the sensor control device 102 sends a response as the command is received. Additionally, the sensor control device 102 sends a success notification through the sensor control characteristic to acknowledge the sensor control device 102 has received the command. The sensor control device 102 registers the shutdown command. At the next appropriate opportunity (e.g., depending on the current sensor state, as described herein), the sensor control device 102 will shut down.

Figure 15:
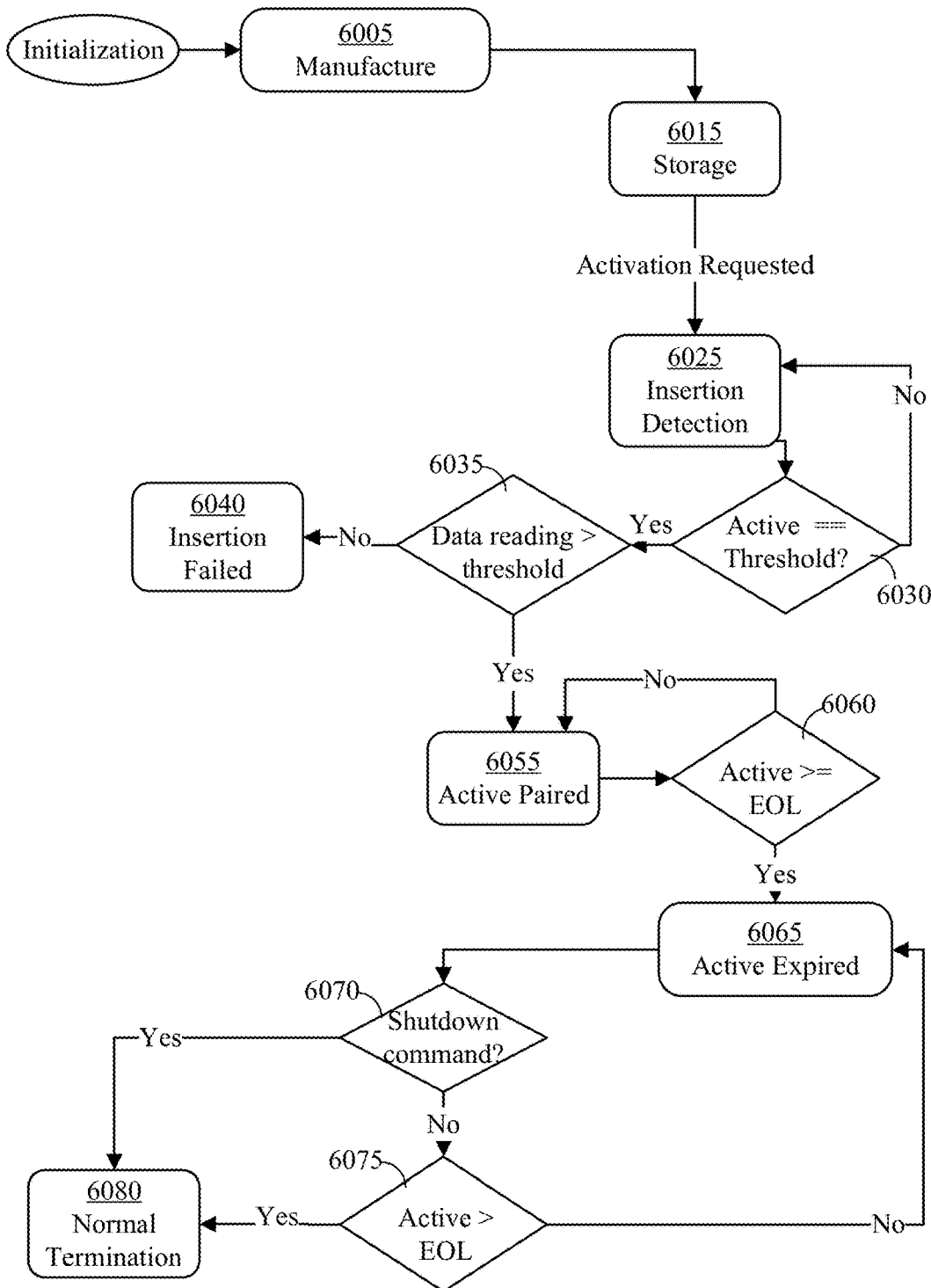
FIG. 15 is a diagram illustrating example operational states of the sensor according to exemplary embodiments of the disclosed subject matter.

For purpose of illustration and not limitation, reference is made to the exemplary embodiment of a high-level depiction of a state machine representation 6000 of the actions that can be taken by the sensor control device 102 as shown in FIG. 15. After initialization, the sensor enters state 6005, which relates to the manufacture of the sensor control device 102. In the manufacture state 6005 the sensor control device 102 can be configured for operation, for example, the storage memory 5030 can be written. At various times while in state 6005, the sensor control device 102 checks for a received command to go to the storage state 6015. Upon entry to the storage state 6015, the sensor performs a software integrity check. While in the storage state 6015, the sensor can also receive an activation request command before advancing to the insertion detection state 6025.

Upon entry to state 6025, the sensor control device 102 can store information relating to devices authenticated to communicate with the sensor as set during activation or initialize algorithms related to conducting and interpreting measurements from the sensing hardware 5060. The sensor control device 102 can also initialize a lifecycle timer, responsible for maintaining an active count of the time of operation of the sensor control device 102 and begin communication with authenticated devices to transmit recorded data. While in the insertion detection state 6025, the sensor can enter state 6030, where the sensor control device 102 checks whether the time of operation is equal to a predetermined threshold. This time of operation threshold can correspond to a timeout function for determining whether an insertion has been successful. If the time of operation has reached the threshold, the sensor control device 102 advances to state 6035, in which the sensor control device 102 checks whether the average data reading is greater than a threshold amount corresponding to an expected data reading volume for triggering detection of a successful insertion. If the data reading volume is lower than the threshold while in state 6035, the sensor advances to state 6040, corresponding to a failed insertion. If the data reading volume satisfies the threshold, the sensor advances to the active paired state 6055.

The active paired state 6055 of the sensor control device 102 reflects the state while the sensor control device 102 is operating as normal by recording measurements, processing the measurements, and reporting them as appropriate. While in the active paired state 6055, the sensor control device 102 sends measurement results or attempts to establish a connection with a receiving device 120. The sensor control device 102 also increments the time of operation. Once the sensor control device 102 reaches a predetermined threshold time of operation (e.g., once the time of operation reaches a predetermined threshold), the sensor control device 102 transitions to the active expired state 6065. The active expired state 6065 of the sensor control device 102 reflects the state while the sensor control device 102 has operated for its maximum predetermined amount of time.

While in the active expired state 6065, the sensor control device 102 can generally perform operations relating to winding down operation and ensuring that the collected measurements have been securely transmitted to receiving devices as needed. For example, while in the active expired state 6065, the sensor control device 102 can transmit collected data and, if no connection is available, can increase efforts to discover authenticated devices nearby and establish and connection therewith. While in the active expired state 6065, the sensor control device 102 can receive a shutdown command at state 6070. If no shutdown command is received, the sensor control device 102 can also, at state 6075, check if the time of operation has exceeded a final operation threshold. The final operation threshold can be based on the battery life of the sensor control device 102. The normal termination state 6080 corresponds to the final operations of the sensor control device 102 and ultimately shutting down the sensor control device 102.

Before a sensor is activated, the ASIC 5000 resides in a low power storage mode state. The activation process can begin, for example, when an incoming RF field (e.g., NFC field) drives the voltage of the power supply to the ASIC 5000 above a reset threshold, which causes the sensor control device 102 to enter a wake-up state. While in the wake-up state, the ASIC 5000 enters an activation sequence state. The ASIC 5000 then wakes the communication module 5040. The communication module 5040 is initialized, triggering a power on self-test. The power on self-test can include the ASIC 5000 communicating with the communication module 5040 using a prescribed sequence of reading and writing data to verify the memory and one-time programmable memory are not corrupted.

When the ASIC 5000 enters the measurement mode for the first time, an insertion detection sequence is performed to verify that the sensor control device 102 has been properly installed onto the patient's body before a proper measurement can take place. First, the sensor control device 102 interprets a command to activate the measurement configuration process, causing the ASIC 5000 to enter measurement command mode. The sensor control device 102 then temporarily enters the measurement lifecycle state to run a number of consecutive measurements to test whether the insertion has been successful. The communication module 5040 or ASIC 5000 evaluates the measurement results to determine insertion success. When insertion is deemed successful, the sensor control device 102 enters a measurement state, in which the sensor control device 102 begins taking regular measurements using sensing hardware 5060. If the sensor control device 102 determines that the insertion was not successful, sensor control device 102 is triggered into an insertion failure mode, in which the ASIC 5000 is commanded back to storage mode while the communication module 5040 disables itself.

FIG. 1B further illustrates an example operating environment for providing over-the-air ("OTA") updates for use with the techniques described herein. An operator of the analyte monitoring system 100 can bundle updates for the data receiving device 120 or sensor control device 102 into updates for an application executing on the multi-purpose data receiving device 130. Using available communication channels between the data receiving device 120, the multi-purpose data receiving device 130, and the sensor control device 102, the multi-purpose data receiving device 130 can receive regular updates for the data receiving device 120 or sensor control device 102 and initiate installation of the updates on the data receiving device 120 or sensor control device 102. The multi-purpose data receiving device 130 acts as an installation or update platform for the data receiving device 120 or sensor control device 102 because the application that enables the multi-purpose data receiving device 130 to communicate with an sensor control device 102, data receiving device 120 and/or remote application server 155 can update software or firmware on a data receiving device 120 or sensor control device 102 without wide-area networking capabilities.

As embodied herein, a remote application server 155 operated by the manufacturer of the sensor control device 102 and/or the operator of the analyte monitoring system 100 can provide software and firmware updates to the devices of the analyte monitoring system 100. In particular embodiments, the remote application server 155 can provides the updated software and firmware to a user device 145 or directly to a multi-purpose data receiving device. As embodied herein, the remote application server 155 can also provide application software updates to an application storefront server 160 using interfaces provided by the application storefront. The multi-purpose data receiving device 130 can contact the application storefront server 160 periodically to download and install the updates.

After the multi-purpose data receiving device 130 downloads an application update including a firmware or software update for a data receiving device 120 or sensor control device 102, the data receiving device 120 or sensor control device 102 and multi-purpose data receiving device 130 establish a connection. The multi-purpose data receiving device 130 determines that a firmware or software update is available for the data receiving device 120 or sensor control device 102. The multi-purpose data receiving device 130 can prepare the software or firmware update for delivery to the data receiving device 120 or sensor control device 102. As an example, the multi-purpose data receiving device 130 can compress or segment the data associated with the software or firmware update, can encrypt or decrypt the firmware or software update, or can perform an integrity check of the firmware or software update. The multi-purpose data receiving device 130 sends the data for the firmware or software update to the data receiving device 120 or sensor control device 102. The multi-purpose data receiving device 130 can also send a command to the data receiving device 120 or sensor control device 102 to initiate the update. Additionally or alternatively, the multi-purpose data receiving device 130 can provide a notification to the user of the multi-purpose data receiving device 130 and include instructions for facilitating the update, such as instructions to keep the data receiving device 120 and the multi-purpose data receiving device 130 connected to a power source and in close proximity until the update is complete.

The data receiving device 120 or sensor control device 102 receives the data for the update and the command to initiate the update from the multi-purpose data receiving device 130. The data receiving device 120 can then install the firmware or software update. To install the update, the data receiving device 120 or sensor control device 102 can place or restart itself in a so-called "safe" mode with limited operational capabilities. Once the update is completed, the data receiving device 120 or sensor control device 102 re-enters or resets into a standard operational mode. The data receiving device 120 or sensor control device 102 can perform one or more self-tests to determine that the firmware or software update was installed successfully. The multi-purpose data receiving device 130 can receive the notification of the successful update. The multi-purpose data receiving device 130 can then report a confirmation of the successful update to the remote application server 155.

In particular embodiments, the storage memory 5030 of the sensor control device 102 includes one-time programmable (OTP) memory. The term OTP memory can refer to memory that includes access restrictions and security to facilitate writing to particular addresses or segments in the memory a predetermined number of times. The memory 5030 can be prearranged into multiple pre-allocated memory blocks or containers. The containers are pre-allocated into a fixed size. If storage memory 5030 is one-time programming memory, the containers can be considered to be in a non-programmable state. Additional containers which have not yet been written to can be placed into a programmable or writable state. Containerizing the storage memory 5030 in this fashion can improve the transportability of code and data to be written to the storage memory 5030. Updating the software of a device (e.g., the sensor device described herein) stored in an OTP memory can be performed by superseding only the code in a particular previously-written container or containers with updated code written to a new container or containers, rather than replacing the entire code in the memory. In a second embodiment, the memory is not prearranged. Instead, the space allocated for data is dynamically allocated or determined as needed. Incremental updates can be issued, as containers of varying sizes can be defined where updates are anticipated.

Figure 16:
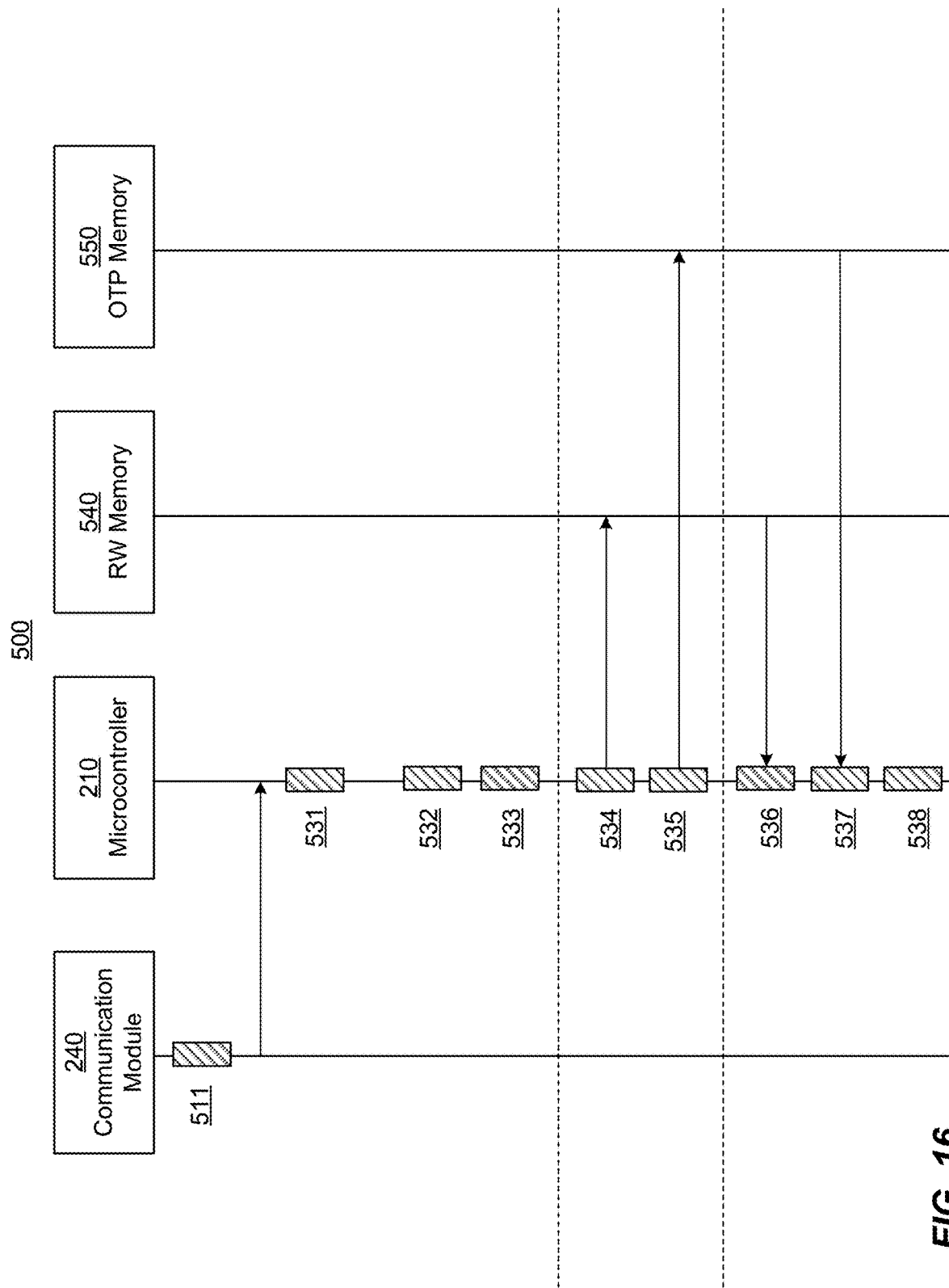
FIG. 16 is a diagram illustrating an example operational and data flow for over-the-air programming of a sensor according to the disclosed subject matter.

FIG. 16 is a diagram illustrating an example operational and data flow for over-the-air (OTA) programming of a storage memory 5030 in a sensor control device 102 as well as use of the memory after the OTA programming in execution of processes by the sensor device 110 according to the disclosed subject matter. In the example OTA programming 500 illustrated in FIG. 5, a request is sent from an external device (e.g., the data receiving device 130) to initiate OTA programming (or re-programming). At 511, a communication module 5040 of a sensor device 110 receives an OTA programming command. The communication module 5040 sends the OTA programming command to the microcontroller 5010 of the sensor device 110.

At 531, after receiving the OTA programming command, the microcontroller 5010 validates the OTA programming command. The microcontroller 5010 can determine, for example, whether the OTA programming command is signed with an appropriate digital signature token. Upon determining that the OTA programming command is valid, the microcontroller 5010 can set the sensor device into an OTA programming mode. At 532, the microcontroller 5010 can validate the OTA programming data. At 533, The microcontroller 5010 can reset the sensor device 110 to re-initialize the sensor device 110 in a programming state. Once the sensor device 110 has transitioned into the OTA programming state, the microcontroller 5010 can begin to write data to the rewriteable memory 540 (e.g., memory 5020) of the sensor device at 534 and write data to the OTP memory 550 of the sensor device at 535 (e.g., storage memory 5030). The data written by the microcontroller 5010 can be based on the validated OTA programming data. The microcontroller 5010 can write data to cause one or more programming blocks or regions of the OTP memory 550 to be marked invalid or inaccessible. The data written to the free or unused portion of the OTP memory can be used to replace invalidated or inaccessible programming blocks of the OTP memory 550. After the microcontroller 5010 writes the data to the respective memories at 534 and 535, the microcontroller 5010 can perform one or more software integrity checks to ensure that errors were not introduced into the programming blocks during the writing process. Once the microcontroller 5010 is able to determine that the data has been written without errors, the microcontroller 5010 can resume standard operations of the sensor device.

In execution mode, at 536, the microcontroller 5010 can retrieve a programming manifest or profile from the rewriteable memory 540. The programming manifest or profile can include a listing of the valid software programming blocks and can include a guide to program execution for the sensor control device 102. By following the programming manifest or profile, the microcontroller 5010 can determine which memory blocks of the OTP memory 550 are appropriate to execute and avoid execution of out-of-date or invalidated programming blocks or reference to out-of-date data. At 537, the microcontroller 5010 can selectively retrieve memory blocks from the OTP memory 550. At 538, the microcontroller 5010 can use the retrieved memory blocks, by executing programming code stored or using variable stored in the memory.

As embodied herein a first layer of security for communications between the sensor control device 102 and other devices can be established based on security protocols specified by and integrated in the communication protocols used for the communication. Another layer of security can be based on communication protocols that necessitate close proximity of communicating devices. Furthermore certain packets and/or certain data included within packets can be encrypted while other packets and/or data within packets is otherwise encrypted or not encrypted. Additionally or alternatively, application layer encryption can be used with one or more block ciphers or stream ciphers to establish mutual authentication and communication encryption with other devices in the analyte monitoring system 100.

The ASIC 5000 of the sensor control device 102 can be configured to dynamically generate authentication and encryption keys using data retained within the storage memory 5030. The storage memory 5030 can also be pre-programmed with a set of valid authentication and encryption keys to use with particular classes of devices. The ASIC 5000 can be further configured to perform authentication procedures with other devices using received data and apply the generated key to sensitive data prior to transmitting the sensitive data. The generated key can be unique to the sensor control device 102, unique to a pair of devices, unique to a communication session between an sensor control device 102 and other device, unique to a message sent during a communication session, or unique to a block of data contained within a message.

Both the sensor control device 102 and a data receiving device 120 can ensure the authorization of the other party in a communication session to, for example, issue a command or receive data. In particular embodiments, identity authentication can be performed through two features. First, the party asserting its identity provides a validated certificate signed by the manufacturer of the device or the operator of the analyte monitoring system 100. Second, authentication can be enforced through the use of public keys and private keys, and shared secrets derived therefrom, established by the devices of the analyte monitoring system 100 or established by the operator of the analyte monitoring system 100. To confirm the identity of the other party, the party can provide proof that the party has control of its private key.

The manufacturer of the sensor control device 102, data receiving device 120, or provider of the application for multi-purpose data receiving device 130 can provide information and programming necessary for the devices to securely communicate through secured programming and updates. For example, the manufacturer can provide information that can be used to generate encryption keys for each device, including secured root keys for the sensor control device 102 and optionally for the data receiving device 120 that can be used in combination with device-specific information and operational data (e.g., entropy-based random values) to generate encryption values unique to the device, session, or data transmission as need.

Analyte data associated with a user is sensitive data at least in part because this information can be used for a variety of purposes, including for health monitoring and medication dosing decisions. In addition to user data, the analyte monitoring system 100 can enforce security hardening against efforts by outside parties to reverse-engineering. Communication connections can be encrypted using a device-unique or session-unique encryption key. Encrypted communications or unencrypted communications between any two devices can be verified with transmission integrity checks built into the communications. Sensor control device 102 operations can be protected from tampering by restricting access to read and write functions to the memory 5020 via a communication interface. The sensor can be configured to grant access only to known or "trusted" devices, provided in a "whitelist" or only to devices that can provide a predetermined code associated with the manufacturer or an otherwise authenticated user. A whitelist can represent an exclusive range, meaning that no connection identifiers besides those included in the whitelist will be used, or a preferred range, in which the whitelist is searched first, but other devices can still be used. The sensor control device 102 can further deny and shut down connection requests if the requestor cannot complete a login procedure over a communication interface within a predetermined period of time (e.g., within four seconds). These characteristics safeguard against specific denial of service attacks, and in particular against denial of service attacks on a BLE interface.

As embodied herein, the analyte monitoring system 100 can employ periodic key rotation to further reduce the likelihood of key compromise and exploitation. A key rotation strategy employed by the analyte monitoring system 100 can be designed to support backward compatibility of field-deployed or distributed devices. As an example, the analyte monitoring system 100 can employ keys for downstream devices (e.g., devices that are in the field or cannot be feasibly provided updates) that are designed to be compatible with multiple generations of keys used by upstream devices.

Figure 17:
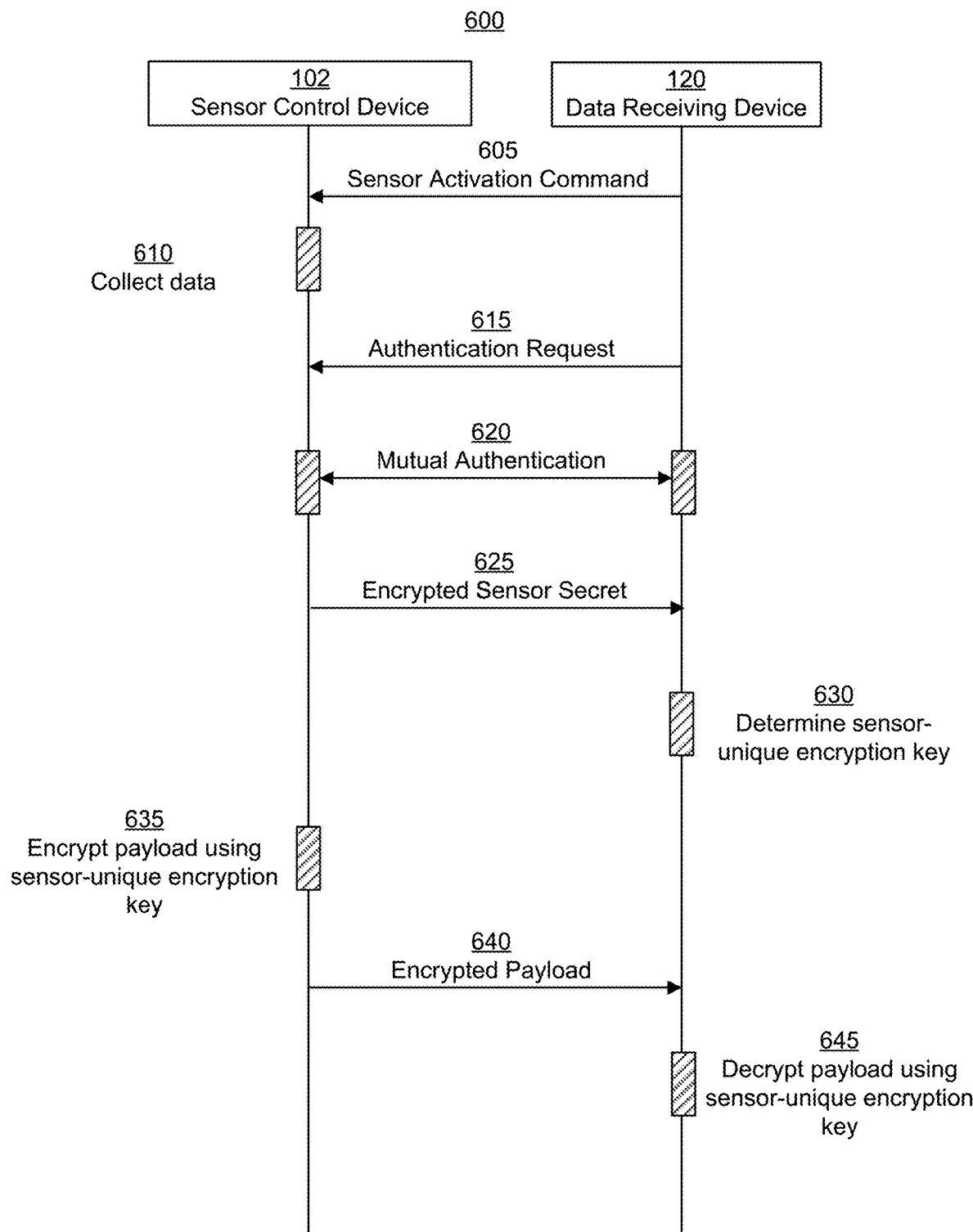
FIG. 17 is a diagram illustrating an example data flow for secure exchange of data between two devices according to the disclosed subject matter.

For purpose of illustration and not limitation, reference is made to the exemplary embodiment of a message sequence diagram 600 for use with the disclosed subject matter as shown in FIG. 17 and demonstrating an example exchange of data between a pair of devices, particularly a sensor control device 102 and a data receiving device 120. The data receiving device 120 can, as embodied herein, be a data receiving device 120 or a multi-purpose data receiving device 130. At step 605, the data receiving device 120 can transmit a sensor activation command 605 to the sensor control device 102, for example via a short-range communication protocol. The sensor control device 102 can, prior to step 605 be in a primarily dormant state, preserving its battery until full activation is needed. After activation during step 610, the sensor control device 102 can collect data or perform other operations as appropriate to the sensing hardware 5060 of the sensor control device 102. At step 615 the data receiving device 120 can initiate an authentication request command 615. In response to the authentication request command 615, both the sensor control device 102 and data receiving device 120 can engage in a mutual authentication process 620. The mutual authentication process 620 can involve the transfer of data, including challenge parameters that allow the sensor control device 102 and data receiving device 120 to ensure that the other device is sufficiently capable of adhering to an agreed-upon security framework described herein. Mutual authentication can be based on mechanisms for authentication of two or more entities to each other with or without on-line trusted third parties to verify establishment of a secret key via challenge-response. Mutual authentication can be performed using two-, three-, four-, or five-pass authentication, or similar versions thereof.

Following a successful mutual authentication process 620, at step 625 the sensor control device 102 can provide the data receiving device 120 with a sensor secret 625. The sensor secret can contain sensor-unique values and be derived from random values generated during manufacture. The sensor secret can be encrypted prior to or during transmission to prevent third-parties from accessing the secret. The sensor secret 625 can be encrypted via one or more of the keys generated by or in response to the mutual authentication process 620. At step 630, the data receiving device 120 can derive a sensor-unique encryption key from the sensor secret. The sensor-unique encryption key can further be session-unique. As such, the sensor-unique encryption key can be determined by each device without being transmitted between the sensor control device 102 or data receiving device 120. At step 635, the sensor control device 102 can encrypt data to be included in payload. At step 640, the sensor control device 102 can transmit the encrypted payload 640 to the data receiving device 120 using the communication link established between the appropriate communication models of the sensor control device 102 and data receiving device 120. At step 645, the data receiving device 120 can decrypt the payload using the sensor-unique encryption key derived during step 630. Following step 645, the sensor control device 102 can deliver additional (including newly collected) data and the data receiving device 120 can process the received data appropriately.

As discussed herein, the sensor control device 102 can be a device with restricted processing power, battery supply, and storage. The encryption techniques used by the sensor control device 102 (e.g., the cipher algorithm or the choice of implementation of the algorithm) can be selected based at least in part on these restrictions. The data receiving device 120 can be a more powerful device with fewer restrictions of this nature. Therefore, the data receiving device 120 can employ more sophisticated, computationally intense encryption techniques, such as cipher algorithms and implementations.

The sensor control device 102 can be configured to alter its discoverability behavior to attempt to increase the probability of the receiving device receiving an appropriate data packet and/or provide an acknowledgement signal or otherwise reduce restrictions that can be causing an inability to receive an acknowledgement signal. Altering the discoverability behavior of the sensor control device 102 can include, for example and without limitation, altering the frequency at which connection data is included in a data packet, altering how frequently data packets are transmitted generally, lengthening or shortening the broadcast window for data packets, altering the amount of time that the sensor control device 102 listens for acknowledgement or scan signals after broadcasting, including directed transmissions to one or more devices (e.g., through one or more attempted transmissions) that have previously communicated with the sensor control device 102 and/or to one or more devices on a whitelist, altering a transmission power associated with the communication module when broadcasting the data packets (e.g., to increase the range of the broadcast or decrease energy consumed and extend the life of the battery of the analyte sensor), altering the rate of preparing and broadcasting data packets, or a combination of one or more other alterations. Additionally, or alternatively, the receiving device can similarly adjust parameters relating to the listening behavior of the device to increase the likelihood of receiving a data packet including connection data.

As embodied herein, the sensor control device 102 can be configured to broadcast data packets using two types of windows. The first window refers to the rate at which the sensor control device 102 is configured to operate the communication hardware. The second window refers to the rate at which the sensor control device 102 is configured to be actively transmitting data packets (e.g., broadcasting). As an example, the first window can indicate that the sensor control device 102 operates the communication hardware to send and/or receive data packets (including connection data) during the first 2 seconds of each 60 second period. The second window can indicate that, during each 2 second window, the sensor control device 102 transmits a data packet every 60 milliseconds. The rest of the time during the 2 second window, the sensor control device 102 is scanning. The sensor control device 102 can lengthen or shorten either window to modify the discoverability behavior of the sensor control device 102.

In particular embodiments, the discoverability behavior of the analyte sensor can be stored in a discoverability profile, and alterations can be made based on one or more factors, such as the status of the sensor control device 102 and/or by applying rules based on the status of the sensor control device 102. For example, when the battery level of the sensor control device 102 is below a certain amount, the rules can cause the sensor control device 102 to decrease the power consumed by the broadcast process. As another example, configuration settings associated with broadcasting or otherwise transmitting packets can be adjusted based on the ambient temperature, the temperature of the sensor control device 102, or the temperature of certain components of communication hardware of the sensor control device 102. In addition to modifying the transmission power, other parameters associated with the transmission capabilities or processes of the communication hardware of the sensor control device 102 can be modified, including, but not limited to, transmission rate, frequency, and timing. As another example, when the analyte data indicates that the subject is, or is about to be, experiencing a negative health event, the rules can cause the sensor control device 102 to increase its discoverability to alert the receiving device of the negative health event.

As embodied herein, certain calibration features for the sensing hardware 5060 of the sensor control device 102 can be adjusted based on external or interval environment features as well as to compensate for the decay of the sensing hardware 5060 during expended period of disuse (e.g., a "shelf time" prior to use). The calibration features of the sensing hardware 5060 can be autonomously adjusted by the sensor control device 102 (e.g., by operation of the ASIC 5000 to modify features in the memory 5020 or storage 5030) or can be adjusted by other devices of the analyte monitoring system 100.

As an example, sensor sensitivity of the sensing hardware 5060 can be adjusted based on external temperature data or the time since manufacture. When external temperatures are monitored during the storage of the sensors, the disclosed subject matter can adaptively change the compensation to sensor sensitivity over time when the device experiences changing storage conditions. For purpose of illustration not limitations, adaptive sensitivity adjustment can be performed in an "active" storage mode where the sensor control device 102 wakes up periodically to measure temperature. These features can save the battery of the analyte device and extend the lifespan of the analyte sensors. At each temperature measurement, the sensor control device 102 can calculate a sensitivity adjustment for that time period based on the measured temperature. Then, the temperature-weighted adjustments can be accumulated over the active storage mode period to calculate a total sensor sensitivity adjustment value at the end of the active storage mode (e.g., at insertion). Similarly, at insertion, the sensor control device 102 can determine the time difference between manufacture of the sensor control device 102 (which can be written to the storage 5030 of the ASIC 5000) or the sensing hardware 5060 and modify sensor sensitivity or other calibration features according to one or more known decay rates or formulas.

Additionally, for purpose of illustration and not limitation, as embodied herein, sensor sensitivity adjustments can account for other sensor conditions, such as sensor drift. Sensor sensitivity adjustments can be hardcoded into the sensor control device 102 during manufacture, for example in the case of sensor drift, based on an estimate of how much an average sensor can drift. Sensor control device 102 can use a calibration function that has time-varying functions for sensor offset and gain, which can account for drift over a wear period of the sensor. Thus, sensor control device 102 can utilize a function used to transform an interstitial current to interstitial glucose utilizing device-dependent functions describing sensor control device 102 drift over time, and which can represent sensor sensitivity, and can be device specific, combined with a baseline of the glucose profile. Such functions to account for sensor sensitivity and drift can improve sensor control device 102 accuracy over a wear period and without involving user calibration.

The sensor control device 102 detects raw measurement values from sensing hardware 5060. On-sensor processing can be performed, such as by one or more models trained to interpret the raw measurement values. Models can be machine learned models trained off-device to detect, predict, or interpret the raw measurement values to detect, predict, or interpret the levels of one or more analytes. Additional trained models can operate on the output of the machine learning models trained to interact with raw measurement values. As an example, models can be used to detect, predict, or recommend events based on the raw measurements and type of analyte(s) detected by the sensing hardware 5060. Events can include, initiation or completion of physical activity, meals, application of medical treatment or medication, emergent health events, and other events of a similar nature.

Models can be provided to the sensor control device 102, data receiving device 120, or multi-purpose data receiving device 130 during manufacture or during firmware or software updates. Models can be periodically refined, such as by the manufacturer of the sensor control device 102 or the operator of the analyte monitoring system 100, based on data received from the sensor control device 102 and data receiving devices of an individual user or multiple users collectively. In certain embodiments, the sensor control device 102 includes sufficient computational components to assist with further training or refinement of the machine learned models, such as based on unique features of the user to which the sensor control device 102 is attached. Machine learning models can include, by way of example and not limitation, models trained using or encompassing decision tree analysis, gradient boosting, ada boosting, artificial neural networks or variants thereof, linear discriminant analysis, nearest neighbor analysis, support vector machines, supervised or unsupervised classification, and others. The models can also include algorithmic or rules-based models in addition to machine learned models. Model-based processing can be performed by other devices, including the data receiving device 120 or multi-purpose data receiving device 130, upon receiving data from the sensor control device 102 (or other downstream devices).

Data transmitted between the sensor control device 102 and a data receiving device 120 can include raw or processed measurement values. Data transmitted between the sensor control device 102 and data receiving device 120 can further include alarms or notification for display to a user. The data receiving device 120 can display or otherwise convey notifications to the user based on the raw or processed measurement values or can display alarms when received from the sensor control device 102. Alarms that can be triggered for display to the user include alarms based on direct analyte values (e.g., one-time reading exceeding a threshold or failing to satisfy a threshold), analyte value trends (e.g., average reading over a set period of time exceeding a threshold or failing to satisfy a threshold; slope); analyte value predictions (e.g., algorithmic calculation based on analyte values exceeds a threshold or fails to satisfy a threshold), sensor alerts (e.g., suspected malfunction detected), communication alerts (e.g., no communication between sensor control device 102 and data receiving device 120 for a threshold period of time; unknown device attempting or failing to initiate a communication session with the sensor control device 102), reminders (e.g., reminder to charge data receiving device 120; reminder to take a medication or perform other activity), and other alerts of a similar nature. For purpose of illustration and not limitation, as embodied herein, the alarm parameters described herein can be configurable by a user or can be fixed during manufacture, or combinations of user-settable and non-user-settable parameters.

As described herein, a software library integrated within software executing on a receiving device can facilitate communicating with analyte sensors and permitting third party applications access to the sensor data for use in medically necessary applications or applications related to the well-being of the user. The software library can be implemented independently of the sensors and integrated within third party applications to allow access to the sensor data. A sensor control module can further communicate with the sensor assemblies in such a manner to receive data simultaneously or substantially simultaneously from a plurality of such sensor assemblies. The system further enables the transfer of sensor information from the sensor control module to a remote management module.

Figure 18:
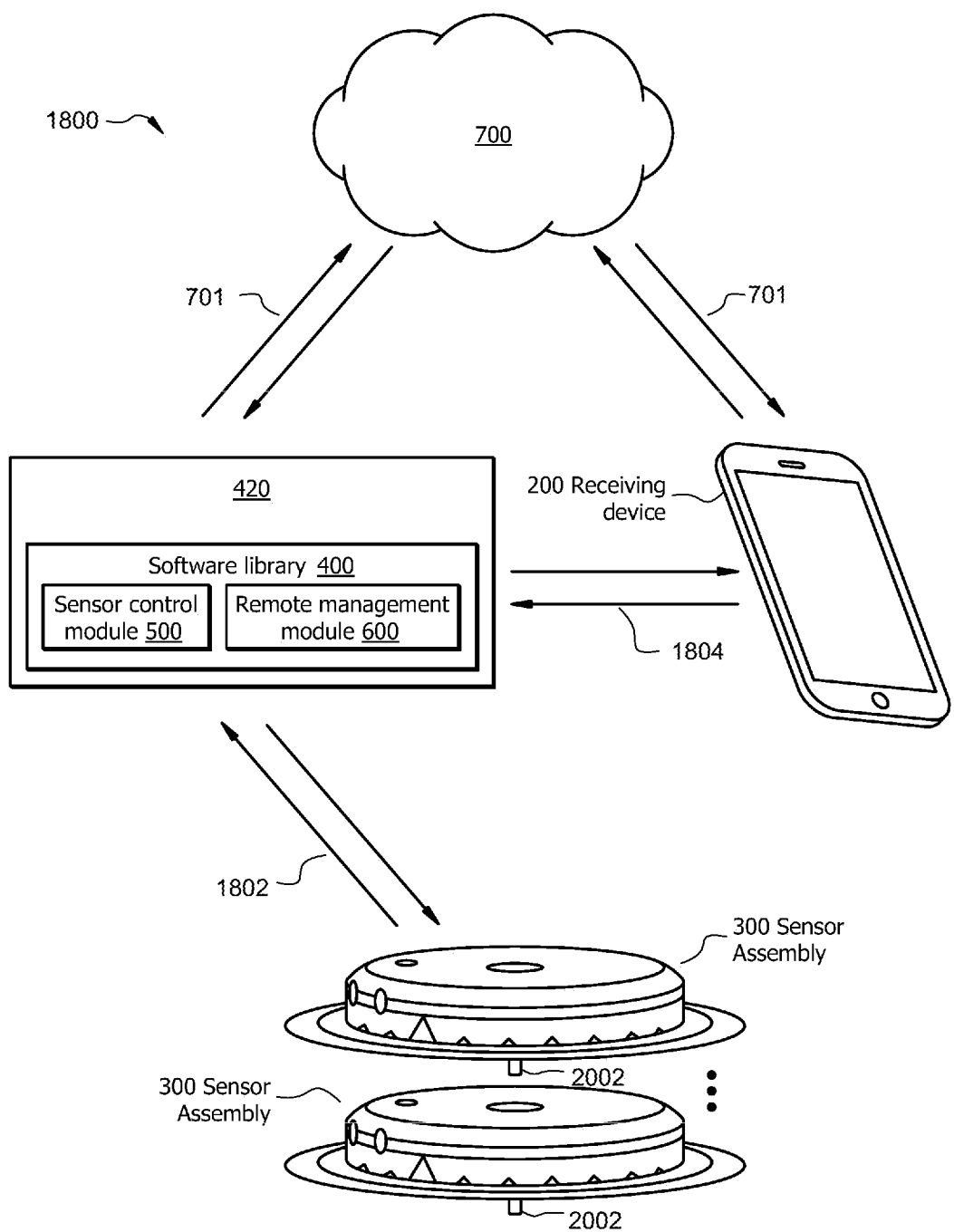
FIG. 18 is a system overview of a system that includes a software library, receiving device, and sensor assembly.

FIG. 18 is a schematic diagram depicting an example embodiment of a system 1800 that includes a modular connectivity framework using a software library 400, various applications 420, a sensor assembly 300, and a receiving device 200.

In accordance with the disclosed subject matter, a non-transitory computer-readable storage medium includes a software library for use by applications 420 on a receiving device 200, or standalone devices such as a pump, insulin pen, etc., to obtain sensor data. The software library can include a sensor control module, a remote management module, and include software logic for communication with a plurality of sensors and applications. The sensor control module can authenticate the receiving device to allow the receiving device to receive sensor data, including by enabling communication with each of the plurality of sensors to receive sensor data including data indicative of a different signal. The sensor control module can further store the sensor data in a memory of the computing device. The sensor control module can obtain an output indicative of the different signals from the sensor data of each of the plurality of sensors. The sensor control module can provide the output of the different signals from the sensors to the authenticated third party application running on the computing device.

The system 1800 includes a software library 400 that functions using a modular architecture enabling a sensor control module 500 to communicate with various applications 420 on the receiving device 200. Software library 400 can reside or operate within various applications 420 on the receiving device 200. As an example, the software library 400 can reside within an integrated application for analyte management, a special-purpose application configured to house and provide access to the software library 400, or as a standalone process or set of instructions accessible to other applications executing on the receiving device 200. Applications 420 can further interface with sensor assembly 300 through the sensor control module 500, and in particular, by providing the request to the communication control module 542 (on FIG. 22) to interface directly with the sensor assembly 300 via a communication link 1802. The sensor assembly 300 can also be one device with different sensor tails or one sensor tail designed to detect different multiple analytes.

The receiving device 200 includes one or more applications 420, with each application instance embedding software library 400. The receiving device 200 uses a modular connectivity framework for the applications 420. In particular, the applications 420 each include a software library 400 including a remote management module 600 and sensor control module 500 for communicating with the one or more sensor assemblies 300. The software library 400 can also run as a service that executes simultaneously with the underlying application allowing the sensor control module 500 or remote management module 600 to execute as a service alongside one or more applications.

Sensor control module 500 can further interface with the sensor data. The various modules within the software library 400 implemented within the application 420 can send and receive communication with the sensor assembly 300 via communication link 1802.

While the sensor control module 500 is within the application 420 in a receiving device 200, the sensor control module 500 could have base components in a second receiving device, such as a smartwatch, mobile device, or other wearable device. While such a device may allow for a user interface experience that can be provided by a smartphone or tablet or computer, the smartwatch or wearable device can incorporate the sensor control module 500 to permit direct communication through the sensor control module 500 on the smartwatch or mobile wearable device with the sensor assembly 300. This can allow for applications specific to wearable devices to use sensor data. The wearable devices can synch separately with the receiving device 200, which can be used to perform the majority of the user login, initialization, authentication, and consent features to implement and initiate the receipt of sensor data.

Communication link 1802 can be a wireless protocol including Bluetooth®, Bluetooth® Low Energy (BLE, BTLE, Bluetooth® SMART, etc.), Near-Field Communication (NFC) and others. The communication links 1802 can each use the same or different wireless protocols. The system 1800 can be configured to communicate over other wireless data communication links such as, but not limited to, RF communication link, infrared communication link, or any other type of suitable wireless communication connection between two or more electronic devices, which can further be uni-directional or bi-directional communication. Alternatively, the data communication link can include wired cable connection such as, for example, but not limited to, RS232 connection, USB connection, FireWire, Lightning, or serial cable connection.

For example, and as embodied herein, communication link 1802 can be configured to use a Bluetooth protocol, such as BLE, or communication link 1802 can be configured to use an NFC protocol. Additionally or alternatively, another communication link not shown can exist between a second sensor assembly and it can be configured to use BLE or both NFC and BLE. The communication links can be configured to perform different operations. For example, communication link 1802 can be configured to perform only activation of the sensor assembly. Furthermore, communication links can have different configurations depending on the overall system architecture or the components that are activated or being used in the system at a given time. For example, and as embodied herein, communication link 1802 can have a first communication configuration when the receiving device 200 is active in the system and a second communication configuration when the receiving device is not active or not included in the system.

In the first communication configuration, the communication link 1802 can be configured only to perform activation of the sensor using an NFC wireless protocol. In another configuration, BLE capability (if provided) can remain inactive between the sensor assembly 300 and the applications 420. The application 420 can activate the sensor assembly 300 using NFC wireless protocol and obtain sensor context information. Sensor context information can include authentication information for authenticating a communication session with the sensor assembly 300, encryption information to enable encrypted data communication over the communication links, and a BLE communication address to initiate a BLE connection with the sensor assembly 300. The software library 400 can also obtain the sensor context information from the sensor assembly 300 over BLE. Using the sensor context information, the software library 400 includes capabilities to allow a session to switch from an application 420 on the receiving device 200 such as a smartphone to another application 420 on another receiving device 200 such as a smartwatch. The sensor context information can be transmitted within the applications 420.

In accordance with the disclosed subject matter, the sensor assembly 300 as shown can include sensing elements for detecting different analytes within the same sensor assembly. The system 1800 can also include multiple sensor assemblies 300, as shown, connected via communication link 1802 having similar capabilities of communication to the communication link 1802 described herein. Two or more sensor assemblies 300 can also be used in conjunction by having multiple sensing elements that together produce the reading for an analyte, or separately produce readings for different analytes. Any number of sensor assemblies could be used together to measure any number of different analyte values, and two sensor assemblies are shown for illustration, not limitation, in this disclosure.

The application 420 can be configured to access the software library 400 through a remote cloud 700 infrastructure via wireless communication links 701. In certain embodiments, the communication link 701 includes a wireless communication section configured for bi-directional radio frequency (RF) communication with other devices to transmit and/or receive data to and from the system 1800. In addition, the communication link 701 can also be configured to include physical ports or interfaces such as one or more of a USB port, an RS-232 port, a serial port, a IEEE 1394 (Firewire) port, an Ethernet port or any other suitable electrical connection port to allow data communication between the remote cloud 700 and receiving device 200, such as a personal computer, a laptop computer, a notebook computer, an iPad, a tablet computing device, a cellular telephone, a smart phone, a personal data assistant, a workstation, a server, a mainframe computer, a cloud computing system, an external medical device, such as an infusion device, an analyte monitoring device, or including an insulin delivery device, or other devices that are configured for similar complementary data communication. In certain embodiments, communication link 701 can include a cellular communication protocol, a Wi-Fi (IEEE 802.1x) communication protocol, or an equivalent wireless communication protocol which can allow secure, wireless communication of several units (for example, per HIPPA requirements) while avoiding potential data collision and interference.

In other embodiments, the communication link 701 can be configured for infrared communication, Bluetooth communication, wireless USB communication, ZigBee communication, cellular communication, Wi-Fi (IEEE 802.11x) communication, RFID (passive or active) communication, or any other suitable wireless communication mechanism to enable the receiving device 200 to communicate with other devices such as infusion devices, analyte monitoring devices, computer terminals, servers, personal computers, laptop computers, notebook computers, iPads, tablet computers, cell phones, smart phones, workstations, mainframe computers, cloud computing systems, communication enabled mobile telephones, personal digital assistants, or any other communication devices with which the patient or user of the device can use in conjunction therewith, in managing the treatment of a health condition, such as diabetes.

In some embodiments, application 420 can communicate via a wireless link 1804 with receiving device 200. Communications between sensor assemblies 300, application 420, and receiving device 200 can be implemented consistent with IEEE Std. 11073-10425 and IEEE 11073-20601. For example, messages transmitted from and received by sensor assemblies 300 or application 420 can be implemented as an application protocol data unit (APDU). The size of messages is limited based on an implementation of the database 530 within sensor control module 500 (discussed in further detail with respect to FIG. 22). In some embodiments, sensor control module 500 can be configured to implement database 530 as a persistent data store. In such embodiments, the size of transmission messages can be limited to a first size (e.g., 64,512 octets). In embodiments where database 530 is not implemented as a persistent data store and where data from the sensor is automatically uploaded to a remote site or device without first being stored, the size of transmission messages can be limited to a second size (e.g., 896 octets). The size of the transmission messages can be larger for implementations involving a persistent data store because sensor data is transmitted in batches.

In some embodiments, association procedures between sensor assemblies 300 and receiving device 200 can be implemented consistent with IEEE Std. 11073-20601. In these embodiments, a sensor assembly can transmit an association request to the receiving device 200. The association request can include information for establishing the association including a version of the association procedure used by the sensor assembly and an identifier of the data protocol used by the sensor assembly. In response to the association request, receiving device 200 can transmit an association response, which can include an indication as to whether the receiving device 200 accepts the association request.

Upon receiving an association response indicating the receiving device 200 has accepted the association, sensor assembly 300 can enter a configuration state and initiate a configuration procedure in conjunction with the receiving device 200. Sensor assembly 300 can transmit to the receiving device 200 a configuration notification message that includes configuration information such as communication capability and analyte monitoring capability of the sensor assembly. In response to the configuration notification message, receiving device 200 can transmit a response that includes the configuration information of the receiving device 200 such as its communication capability.

The system 1800 can be configured to operate as an open loop system, a closed-loop system, and a hybrid closed-loop system. An open loop system requires manual user input to control certain functionalities related to the sensor assembly 300. A closed-loop system uses data from the sensor assembly 300 and algorithms to control the software library 400 without user input. In a hybrid system, input can be required from a user to control the application 420 and initiate the software library 400. A hybrid closed-loop system can be used in conjunction with, or in place of, a closed-loop system. As disclosed herein, regulatory clearance is limited to software library 400 irrespective of the type of system configuration used in the system 1800.

Figure 19:
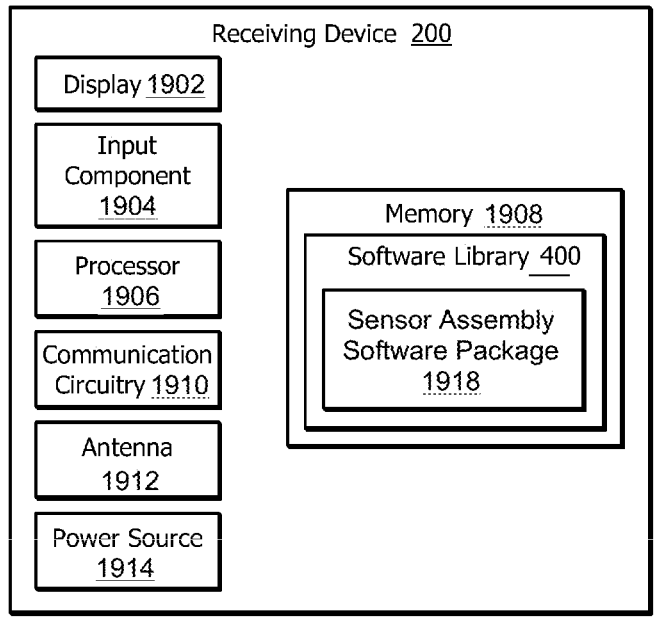
FIG. 19 is a block diagram depicting an example embodiment of a receiving device.

FIG. 19 is a block diagram depicting an example embodiment of a receiving device 200. A software library 400 can be provided to a third-party and incorporated within an application 420 for a multi-purpose receiving device 200, such as a mobile phone, tablet, personal receiving device, or other similar receiving device. Receiving device 200 embodying and executing device application software can also be referred to as a computing device or a multi-purpose device. Receiving device 200 refers to a suitably configured hardware device which is executing an application 420 that incorporates a software library 400 having a sensor assembly software package 1918 configured for communication with the sensor assembly 300. Here, receiving device 200 can include a display 1902, input component 1904, and a processor 1906 coupled with memory 1908. Also included can be communication circuity 1910 coupled with an antenna 1912, and power source 1914. As understood by one of skill in the art, these components are electrically and communicatively coupled in a manner to make a functional device. As embodied herein, the memory 1908 can include an application and a sensor assembly software package 1918 for the sensor assembly 300. The application 420 can also import a software library 400 including the sensor assembly software package 1918. The software library 400 and the sensor assembly software package 1918 can be developed by the provider of the sensor assembly 300.

The receiving device can have the majority of the processing capability of the system 1800 for rendering end-result data suitable for display to a user. The receiving device 200 can be a smartphone or a smartwatch.

The receiving device 200 can receive analyte data, such as glucose data and calculate low and high analyte level and generate corresponding alarms and messages. The receiving device 200 can also mirror an alert generated by another device, such as the sensor assembly 300. The receiving device 200 can process analyte data with the processor 1906 and render on the display 1902 analyte-related information as value, trend, and graph, and provide additional messaging and notification based on the received analyte level.

Figure 20:
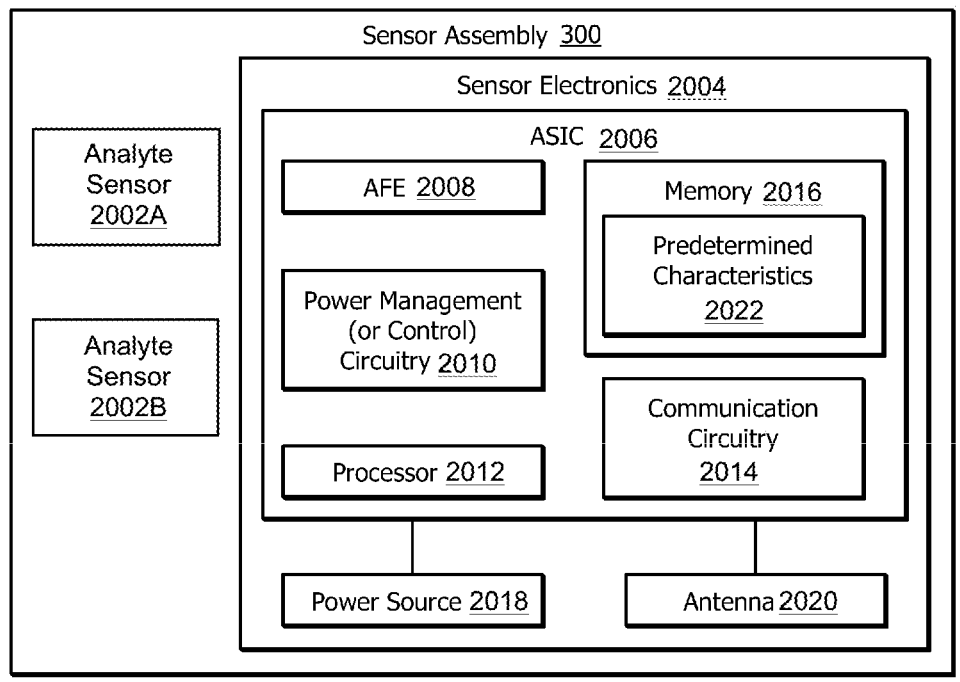
FIG. 20 is a block diagram depicting an example embodiment of a sensor assembly.

FIG. 20 is a block diagrams depicting an example embodiment of a sensor assembly 300 having sensor tails, such as analyte sensor 2002A, and sensor electronics 2004 (including analyte monitoring circuitry). Analyte sensors 2002A and 2002B are embodiments of sensor 2002. In some embodiments, sensor assembly 300 can be implemented with a single analyte sensor tail such as analyte sensor 2002A. In other embodiments, sensor assembly 300 can be configured as a dual-channel sensor with at least two sensor tails for processing different types of analytes such as glucose, ketone, and lactate, with one analyte sensor tail configured to process one type of analyte and another analyte sensor tail configured to process another type of analyte. For example, in one embodiment, analyte sensor 2002A can be configured as a glucose sensor and analyte sensor 2002B can be configured as a ketone sensor; as another example, analyte sensor 2002A can be configured as a ketone sensor and analyte sensor 2002B can be configured as a lactate sensor. Analyte sensor 2002A and 2002B can be implemented as in vivo analyte sensors and configured with a use period of about 5-30 days. In some embodiments, sensor assembly 300 can be configured without wide-area network communication capability.

Analyte sensors 2002A and 2002B can generate raw data signals for measurements of the patient's respective analyte levels. Sensor electronics 2004 are operatively coupled to the sensor 2002, the sensor electronics 2004 comprising a memory 2016 storing one or more predetermined characteristics 2022 associated with the sensor electronics 2004. The memory 2016 can be a so-called "one-time programmable" (OTP) memory, which can include supporting architectures or otherwise be configured to define the number times to which a particular address or region of the memory can be written, which can be one time or more than one time up to the defined number of times after which the memory can be marked as unusable or otherwise made unavailable for programming. Subject matter disclosed herein relate to systems and method for updating said OTP memories with new information.

The raw data signals from analyte sensor 2002A and analyte sensor 2002B can be provided to a corresponding plug-in associated with analyte sensor 2002A and analyte sensor 2002B where the data from each sensor can be converted from raw data signals into corresponding analyte data that can be utilized by a connected application. In some embodiments, the raw data signal is a transmitted as a byte stream and converting the raw data signal includes converting the byte stream into object instances which can then be transmitted to the connected application. Byte stream can include data that includes different data types such as a glucose value, sensor operations, sensor status, just to name a few examples. Converting the type stream includes converting the data related to these different types into corresponding object instances which are software representations of that data. For example, there can be separate object instances for glucose values, sensor operations, and sensor status data. Applications can then process the object instances including displaying or utilizing the object instance for other functions such as providing recommendations.

The sensor electronics 2004 can include a single semiconductor chip, as depicted, that can be a custom application specific integrated circuit (ASIC 2006). Shown within ASIC 2006 are certain high-level functional units, including an analog front end (AFE 2008), power management (or control) circuitry 2010, processor 2012, and communication circuitry 2014 (which can be implemented as a transmitter, receiver, transceiver, passive circuit, or otherwise according to the communication protocol). As an example only and not by way of limitation, example communication circuitry 2014 can include a Bluetooth Low-Energy ("BLE") chipset, Near-Field Communication ("NFC") chipset, or other chipsets for use with similar short-range communication schemes, such as a personal area network according to IEEE 802.15 protocols, IEEE 802.11 protocols, infrared communications according to the Infrared Data Association standards (IrDA), etc. The communication circuitry 2014 can transmit and receive data and commands via interaction with similarly-capable communication modules. Certain communication chipsets can be embedded in ASIC 2006 (e.g., an NFC antennae).

The sensor assembly 300 can use application layer encryption using one or more block ciphers to establish mutual authentication and encryption of other devices in the system 1800. The use of a non-standard encryption design implemented in the application layer has several benefits. One benefit of this approach is that in certain embodiments the user can complete the pairing of the sensor assembly 300 and another device with minimal interaction, e.g., using only an NFC scan and without requiring additional input, such as entering a security pin or confirming pairing. Sensor assembly 300 can be configured to dynamically generate authentication and encryption keys. Sensor assembly 300 can also be pre-programmed with a set of valid authentication and encryption keys to use with particular classes of devices. The ASIC 2006 can be further configured to perform authentication procedures with other devices (e.g., handshake, mutual authentication, etc.) using received data and apply the generated key to sensitive data prior to transmitting the sensitive data.

In this embodiment, both AFE 2008 and processor 2012 are used as analyte monitoring circuitry, but in other embodiments either circuit can perform the analyte monitoring function. Processor 2012 can include one or more processors, microprocessors, controllers, and/or microcontrollers, each of which can be a discrete chip or distributed amongst (and a portion of) a number of different chips.

Memory 2016 included within ASIC 2006 and can be shared by the various functional units present within ASIC 2006, or can be distributed amongst two or more of them. Memory 2016 can also be a separate chip. Memory 2016 can be volatile and/or non-volatile memory. In this embodiment, ASIC 2006 is coupled with a power source 2018, which can be a coin cell battery, or the like. AFE 2008 interfaces with sensor 2002 and receives measurement data therefrom and outputs the data to processor 2012 in digital form. This data can then be provided to communication circuitry 2014 for sending, by way of antenna 2020, to software library 400.

As previously noted, analyte sensor 2002A and analyte sensor 2002B can be configured to monitor different types of analytes, for example, acetyl choline, amylase, bilirubin, cholesterol, chorionic gonadotropin, creatine kinase (e.g., CK-MB), creatine, DNA, fructosamine, glutamine, growth hormones, hormones, ketones, lactate, peroxide, prostate-specific antigen, prothrombin, RNA, thyroid stimulating hormone, and troponin.

The sensor assembly 300 includes a sensor assembly embedded library (not pictured) configured for providing sensor assembly data to the software library 400 based on information received from the sensor assembly 300. Sensor assembly data can include glucose readings, data types, range, real time and historical glucose and trends, sensor operating information, and sensor system information.

In certain applications, sensor assembly can be regulated as a medical device. Certain standards pertain to regulation of blood glucose monitors including with ISO 15197:2013 "In vitro diagnostic test systems." Certain standards pertain to regulation of continuous glucose monitors including 7-307 CLSI POCT05, $2^{nd}$ Edition "Performance Metrics for Continuous Interstitial Glucose Monitoring," 13-72 IEEE Std 11073-10425-2017 "Health Informatics—Personal health device communication, Part 10425: Device Specialization—Continuous Glucose Monitor (CGM)", and 13-88 IEEE ISO 11073-10417 Third edition 2017-04 "Health informatics—Personal health device communication—Part 10417: Device specialization—Glucose meter."

Figure 21A:
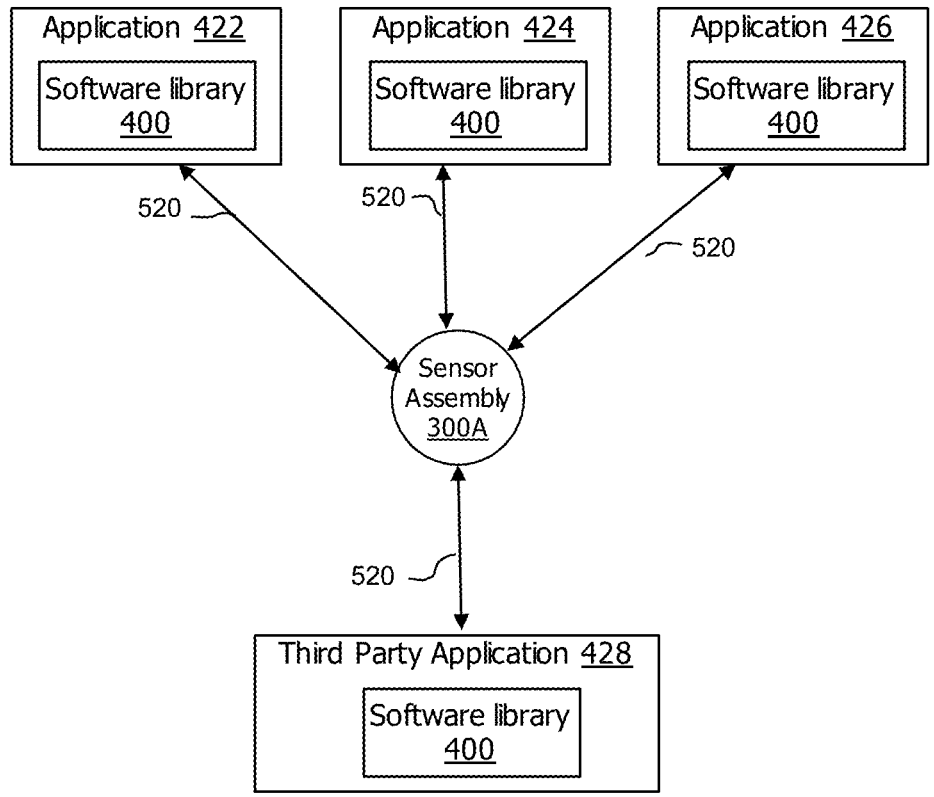
FIG. 21A is a block diagram depicting an example software library for facilitating communication between applications and a sensor assembly.

FIG. 21A is a block diagram depicting an example of a software library 400 integrated with applications 420, shown as applications 422, 424, 426, and third party application 428 and in communication with sensor assembly 300A. References to application 420 refers to one or more of the applications 422, 424, 426 or third party application 428. The number of applications 422, 424, 426, and 428 and sensor assembly 300A depicted in FIG. 21A is merely exemplary and it is understood that the system can be implemented with any number of applications and sensor assemblies. The software library 400 can be integrated with fewer than all of the applications 420 operating with the system and other applications 420 executing within an instance of the software library 400 can access an instance of the software library 400 executing within other applications 420.

Figure 21B:
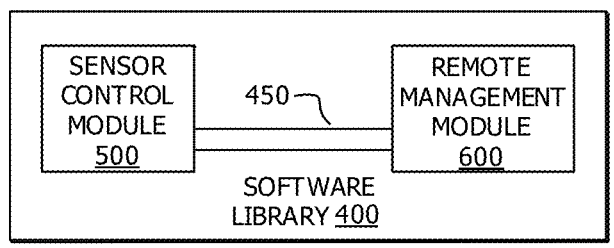
FIG. 21B is a block diagram depicting an example software library, including a sensor control module and a remote management module.

FIG. 21B is a block diagram depicting software library 400 which includes a sensor control module 500 and a remote management module 600, each of which is capable of independently communicating with sensor assembly 300 and remote cloud 700, respectively. In accordance with the disclosed subject matter, sensor control module 500 and a remote management module 600 can each provide a single uniform interface to communicate with the sensor assembly 300 and remote cloud 700, respectively.

Figure 21C:
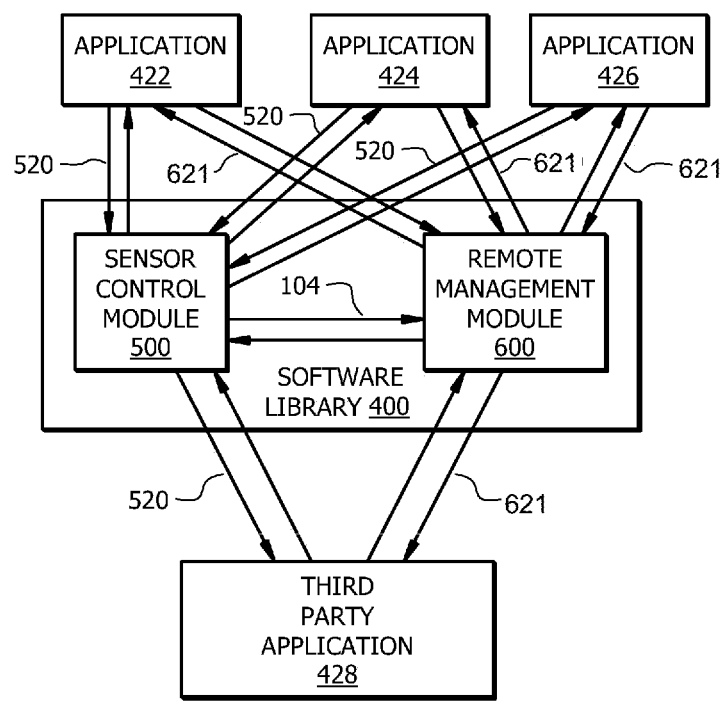
FIG. 21C is a block diagram depicting an example software library, including a sensor control module and a remote management module, for communication with applications.

FIG. 21C is a block diagram depicting another example of a block diagram depicting an example of a software library 400 for communication with applications 420, shown as applications 422, 424, 426, and third party application 428. References to application 420 refers to one or more of the applications 422, 424, 426 or third party application 428. Software library 400 includes a sensor control module 500 and a remote management module 600, each of which capable of independently communicating with applications 422, 424, 426 or third party application 428. In accordance with the disclosed subject matter, sensor control module 500 and a remote management module 600 may each provide a single uniform interface 520 and 621 respectively to communicate with the applications 422, 424, 426 or third party application 428.

The following discussion refers to both embodiments shown in FIGS. 21A-21B and 21C.

Software library 400 uses a modular architecture and is made available via a software development kit that can be made for inclusion into applications 420. The software library 400 can include two modules, each of which could be independently provided for use by applications 420. The first is a sensor control module 500. The sensor control module 500 communicates with the sensor assembly 300 via communication link 520 and receives sensor data from the sensor assembly 300 over the communication link 520. In some embodiments, communication link 520 can be implemented as an NFC or BLE connection. The sensor control module 500 can further facilitate communication between sensor assembly 300 and applications 422, 424, 426, or third party application 428 using a sensor control module interface.

Figure 23:
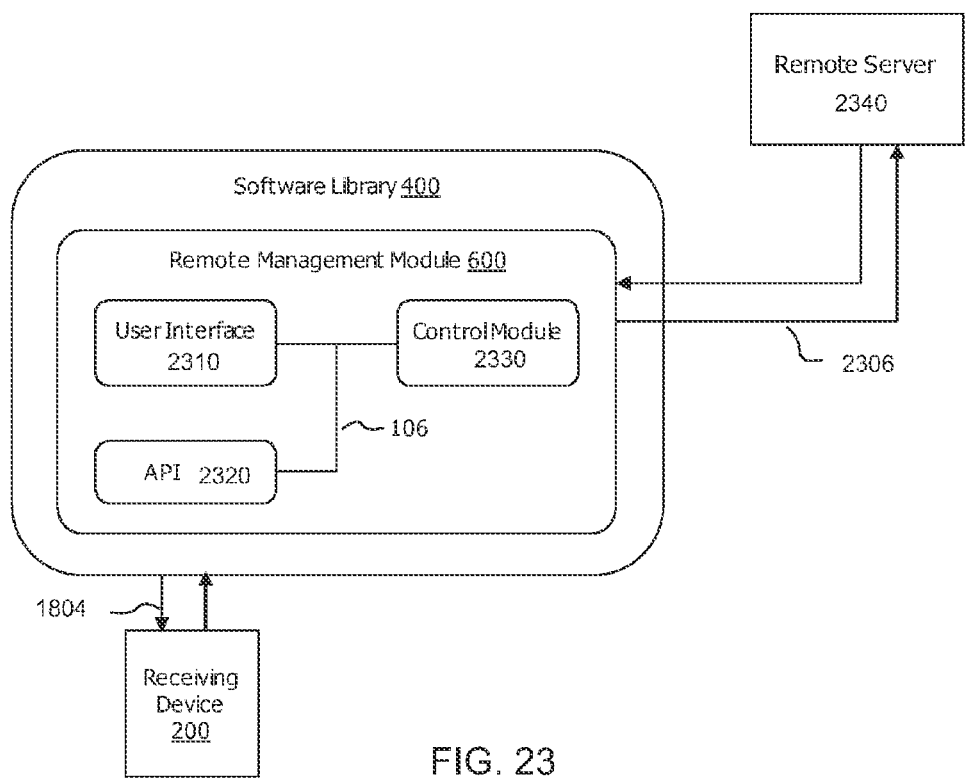
FIG. 23 is a block diagram depicting an example embodiment of the remote management module.

The software library 400 further includes a remote management module 600 that facilitates communication between applications 422, 424, 426, or third party application 428 and a remote location such as remote cloud 700 or remote server 2340 (shown in FIG. 23). Remote management module 600 can utilize a remote management module interface to facilitate the communication.

The remote management module 600 further receives the sensor data from the sensor control module 500 via an inter-module interface 450 and can further be used to store that data in a remote server 2340 for remote storage, such as in the cloud. By using a remote management module 600, an application developer can also take advantage of a consistent user interface for account management for a user across different applications including third party applications such as third-party application 428. Data privacy can further be integrated into the remote management module 600 for account management purposes.

The sensor control module 500 receives a request to initiate the sensor assembly 300. The sensor control module 500 includes logic to identify the particular type of receiving device 200 making the request, and can perform an authentication function for the receiving device 200. Authentication can use a three-pass design with different keys. Keys can be aligned with differential roles (e.g., manufacturer, application developer, etc.). Sensitive commands that could leak security information can trigger authenticated encryption using an authenticated additional keyset. The sensor data provided to the sensor control module 500 and sent to the application 422, 424, 426 or third party application is highly sensitive, and it can be beneficial to protect such data. Medical data associated with a patient is sensitive data, at least in part, because this information can be used for a variety of purposes, including for health monitoring and medication dosing decisions. As embodied herein, the various modules and applications 422, 424, 426, and third party application 428 can be configured to be compliant with a security interface designed to protect the Confidentiality, Integrity and Availability ("CIA") of this communication and associated data. To address these CIA concerns, and to facilitate the confidentiality of data, communication connections between the sensor assembly 300 and the sensor control module 500 can be mutually authenticated prior to transmitting sensitive data. The same can be done for communications between the sensor control module 500 and application 422, 424, 426, and third party application 428. Further details regarding different examples of authorization checks by sensor control module 500 are described below. Communication connections can be encrypted using a device-unique or session-unique encryption key. As embodied herein, the encryption parameters can be configured to change with every data block of the communication.

As embodied herein, to guarantee the integrity of data, encrypted communications between any two components (e.g., a sensor control module 500 and sensor assembly 300) can be verified with transmission integrity checks built into the communications. As embodied herein, session key information, which can be used to encrypt the communication, can be exchanged between two devices after the devices have each been authenticated. Encrypted communications between a sensor assembly 300 and a dedicated sensor control module 500 can be validated with an error detection code or error correction code, including as an example and not by way of limitation, non-secure error-detecting codes, minimum distance coding, repetition codes, parity bits, checksums, cyclic redundancy checks, cryptographic hash functions, error correction codes, and other suitable methods for detecting the presence of an error in a digital message.

The sensor control module 500 can further generate state information to maintain the active status for the receiving device 200 while waits for the sensor data from sensor assembly 300A. The sensor control module 500 can further maintain a state machine that tracks the states of devices connected to the sensor control module 500 and DCS 541.

The sensor control module 500 can further include a user interface 510 (shown in FIG. 22) that can enable data sharing for the applications, including necessary permissions to enable data sharing. The user interface 510 at the sensor control module 500 can also display the sensor data received from the sensor assembly 300 via the application in which the software library is integrated.

The user interface 510 of the software library 400 is disclosed herein as a modular user interface 510 that allows for sharing and display of the multiple different analytes that can be measured from the different sensor assemblies 300 such as sensor assembly 300A. In particular, as disclosed herein, by using a software library 400 and sensor control module 500, a uniform user interface can be developed for display of sensor data from different sensor assemblies 300. The user interface 510 could toggle between sensor data received from the different sensor assemblies 300, display sensor data on one screen via an application in which the software library 400 is integrated, or use multiple different combinations of screens to display the sensor data.

Communication between the sensor assembly 300A and applications 422, 424, 426, or third party application 428 occurs over a sensor control module interface 520. Communication between the applications 422, 424, 426, or third party application 428 and a remote location such as remote cloud 700 occurs over a remote management module interface 2320. In some embodiments, the communication can further be driven using an event notification or callback process. For example, when the sensor control module 500 receives a request from a third party application 428 for sensor data, the request can be communicated through the sensor control module interface 520 and an event can be generated at the user interface 510 of the sensor control module 500 to initiate authentication.

As another example, when sensor data is received over communication link 102 by the sensor control module 500, an event can be generated to notify other modules or components within the software architecture that data can be displayed by a user interface 510 of the sensor control module 500.

Because software library 400 has a modular architecture by virtue of the sensor control module 500, the system enables communication between applications 422, 424, 426 and third party application 428 and different types of sensor assemblies 300. In some embodiments, the sensor tails of sensor assemblies 300 can be configured to process different types of analytes. For example, sensor assemblies 300 can include an analyte sensor such as a sensor for glucose, a sensor for ketone, and a sensor for lactate. In particular, the device connectivity system (DCS) 541 can include a communication control module 542 that can include functionality specific to each of the sensor assemblies 300 and sensor tails within the system, and can simultaneously access and communicate with the various sensor assemblies 300 to receive different types of sensor data, such as glucose data, ketone data, and lactate data. Similarly, applications 422, 424, and 426 can be configured to process different types of sensor data. For example, application 422 can be implemented as a glucose application, application 424 can be implemented as a ketone application, and application 426 can be implemented as a lactate application.

In some embodiments, one or more sensors of sensor assemblies 300 can be implemented as a virtual sensor which is a software implementation of an actual sensor. The virtual sensor can be configured with software functions that emulate the functions of an actual sensor. Examples of such functions include a warm-up process, connect and disconnect functions, providing real-time data for reading, and providing historic or retrospective data for reading. In some embodiments, the virtual sensor can be utilized for testing applications without the use of actual sensors. A virtual sensor can simulate the events of an actual sensor such as warmup, connections, disconnects, real-time readings, and historic or retrospective readings. Virtual sensors can also include debugging functions such as a clock acceleration function for accelerating the clock of the virtual sensor in order to test the virtual sensor.

For applications 422, 424, 426, or third party application 428, a sensor control module interface 520 is used to provide data received from sensory assembly for display by the application (e.g., on a display of the mobile device on which the application is installed). By using the sensor control module interface 520, the applications 422, 424, 426 or third party application 428 can receive and display sensor data through the sensor control module 500.

As another example, a developer of a third party application 428 can elect to use certain modules of the software library 400 to support the functionalities within the third party application 428. For example, third party application 428 can use the sensor data as wellness data. Wellness data can generally include any type of data associated with a person's health, such as their weight, heart rate, blood pressure, blood glucose level, or the like. Sensor assemblies can provide resulting sensor data that can include such wellness data. To the extent a third party application desires to make use of the sensor data, the third party application can access the respective module from the software library 400 for the desired sensor data. With the software library 400, the third party application 428 does not need to directly interface with the sensor assembly 300 to receive sensor data. The software library 400 includes a sensor control module 500 that can receive the sensor data and provide that to the respective third party application 428. It should be understood that "third party" can correspond to an entity different than the manufacturer of the sensor assembly 300 or software library 400. The third party application 428 can have access to certain permitted data on database 530 accessible through sensor control module interface 520. Separately, third party application 428 can include its own database (not pictured) for storing the sensor data received through the sensor control module 500.

In some embodiments, applications 422, 424, 426, and third party application 428 can select which types of sensors to communicate with when the application is being compiled (i.e., build time) by including the respective plug-in modules for each sensor type into the software library 400. Plug-ins are discussed further with respect to FIG. 27.

In certain applications, software that operates in conjunction with a medical device such as a sensor assembly sensing data from a user interaction or user health information can be regulated as medical device software. Certain standards pertain to regulation of medical device software, including with reference to ISO 13485:2016 "Medical devices—Quality Management Systems—Requirements for regulatory purposes," ISO14971:2012 "Medical devices—Application of Risk Management to Medical Devices," and IEC 62304, Ed 1.1:2015 Medical Device Software—Software Lifecycle Processes." In particular, regulation requires that software that functions as a medical device (commonly referred to as Software as a Medical Device) is to be regulated by a regulatory agency, such as the Food and Drug Administration (FDA) in the United States. This regulation at least requires submitting the application for regulatory approval. Regulatory approval means that the application or device cannot run without first being provided regulatory clearance by the regulatory agency (e.g., FDA).

As described by the disclosed subject matter, the regulated portion of software as a medical device can be contained within the software library 400 and the sensor assembly 300. This will allow applications 422, 424, 426, or third party application 428 to not have to undergo regulatory approval and clearance when making use of the sensor data. In particular, third party applications could be developed by third party developers for one or more wellness purposes that will not require the third party developer to submit the application for approval based on definitions of software as a medical device as the regulated functionalities can all be contained within the software library 400. This will benefit users by allowing the creation of different wellness tracking applications or other uses of the sensor data than have originally been considered by the original manufacturer of the sensor assembly 300.

The sensor control module 500 can optionally include an alarm module (not pictured) to manage alarms and notifications triggered by the sensor data. In accordance with the disclosed subject matter, the alarm module can include logic to generate alarms for each type of sensor measured by the sensor assembly 300. In particular, the alarms can be triggered if an issue arises with the device hardware of the sensor assembly 300. Additionally, the alarms can be triggered indicating a particular condition with the user being monitored by the sensor assembly 300. In accordance with the modular framework, the alarm logic for the alarm module can be separately maintained within the sensor control module 500.

As described herein, for illustration purposes, the alarm module works with the application 422, 424, 426 or third party application 428 and the sensor control module 500. The sensor control module 500 receives sensor data from the sensor assembly 300 representing an analyte value. One such value could be a glucose reading. The sensor control module 500 and the alarm module can have threshold detection logic to identify the triggering conditions for an alarm based on a particular analyte value, such as a glucose reading.

During initialization, the third party application 428 or application 422, 424, 426 can also provide conditions that can require the triggering of an alarm as a callback function. The triggering can involve logic that factors in the value of the sensor data and a temporal relationship. For example, if the sensor assembly provides glucose data, a triggering value can be set to trigger the alarm along with a temporal relationship such as if the value increases by a certain number over a period of time, or remains above a certain value for a period of time. These triggering conditions can also include rate of change as a mechanism to trigger an alarm. By incorporating the alarm module within the sensor control module 500, alarm conditions that require regulatory review and approval can be incorporated within the sensor control module 500, further reducing the need to submit application 422, 424, 426, or third party application 428 for regulatory approval.

Figure 22:
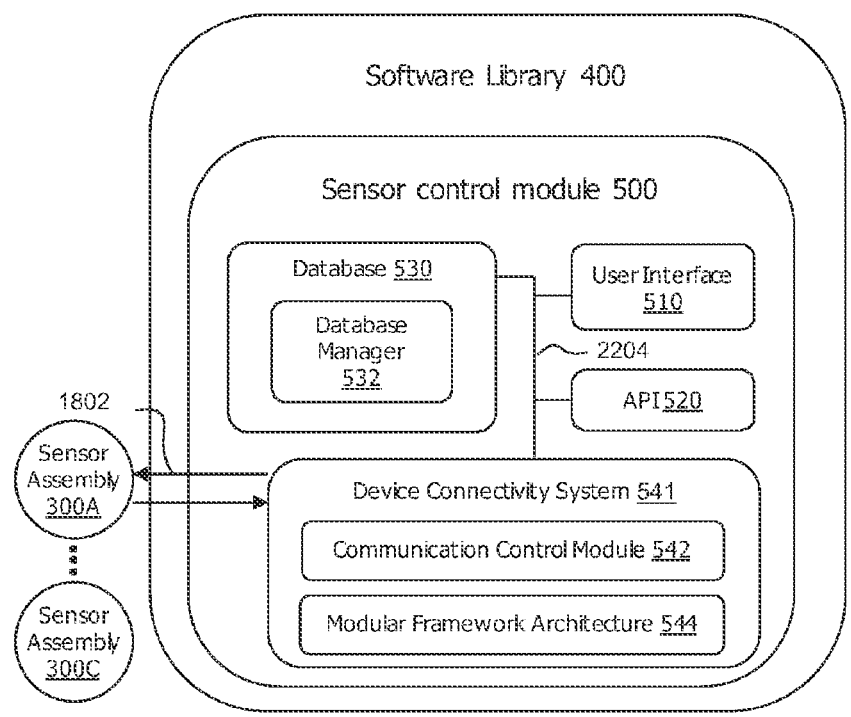
FIG. 22 is a block diagram depicting an example embodiment of the sensor control module.

FIG. 22 is a block diagram depicting an example embodiment of the sensor control module 500 within a software library 400.

In certain embodiments, the sensor control module 500 includes DCS 541 which can further include a communication control module 542 and a modular framework manager 544 that implements a uniform interface in user interface 510 for interacting with sensor assemblies 300.

The communication control module 542 includes logic to communicate over a communication link 1802 to the sensor assembly 300. The communication control module 542 includes further logic for receiving sensor data and displaying the sensor data at a user interface 510. In particular, each sensor assembly 300 includes control logic to perform operations related to sensor communications, especially those that are proprietary. For example, the sensor assembly 300 includes logic provided by the sensor control device's manufacturer to receive sensor measurements and perform complex algorithms on the measurements including data decryption and glucose calculations. In this regard, the communication control module 542 can only need to receive the result of the processing and calculation, with data accuracy and integrity for protection of complex proprietary algorithms occurring at the closed sensor assembly 300. The sensor assembly 300 further includes logic provided by the sensor control device's manufacturer to perform authentication. This allows the sensor assembly 300 to include functionality to provide sensor data that is the resulting data from the sensor measurements for a variety of sensors to the communication control module 542. By using a modular framework, the communication control module 542 includes logic to receive data from a plurality of sensor assemblies 300, enabling substantially simultaneous communication from multiple sensor assemblies 300. This allows authorized third parties to develop mobile apps without requiring that those third parties take on the significant responsibility of independently providing the same level of performance and results accuracy. The modular framework also allows the third party applications to be maintained separately from the software library 400. In this manner, the third party applications do not need to undergo regulatory approval. In some embodiments, user interface 510 can be implemented as an API. DCS 541 can be configured to provide, via the uniform interface, functions associated with interacting with sensor assemblies 300. A uniform interface provides the same set of functions to access the different types of sensor assemblies 300 that are connected to DCS 541. An application can therefore invoke the same function to retrieve sensor data from multiple sensor assemblies 300.

Non-limiting examples of these functions include a binding function for connecting to the selected sensor control modules, managing object instances and life cycles of activated sensors and devices, and a state machine framework. These functions enable DCS 541 to act as an intermediary between different types of sensors and different applications that process data provided by the sensors. In some embodiments, the uniform interface can expose these functions to an application, such as application 422 or third party application 428. The application can therefore use the uniform interface to invoke any functions that have been exposed to that particular interface.

Object instances are a software representation of hardware devices as well as data and functions associated with the hardware device. Object instances can be implemented consistent with IEEE 11073-10417 and 11073-10425. One example of an object instance is a glucose meter object which can include a glucose meter medical device system (MDS) object, a glucose numeric object, and an enumeration object. An object instance of a sensor can be implemented with a number of attributes, which represent information about the sensor, functions that can be invoked via the uniform interface, and events that can be generated by the object instance. Examples of attributes include sensor type, sensor model, sensor identifier, power status, and battery level. Additional examples of the functions include setting a real-time clock in the sensor assembly and setting a real-time clock with a base time and an offset.

In an embodiment where the object instance is implemented as a glucose meter object such as for a continuous glucose monitor (CGM), attributes can include one or more of a glucose concentration attribute (related to a measurement for patient glucose concentration), a sensor calibration attribute (related to a calibration status of the glucose sensor), a sensor run-time attribute (related to a total run-time of the glucose sensor), a glucose sampling interval attribute (related to a sampling interval for measuring glucose amounts), a glucose trend attribute (related to trends in glucose concentrations for a predetermined time period), a user threshold attribute (related to high and low acceptable patient concentration values), a device threshold attribute (related to a critical glucose concentration range), a glucose rate of change attribute (related to a maximum rate of glucose variation), and CGM status attribute (related to running status, calibration states, and any notifications for the CGM).

Attributes of object instances can be defined according to different metadata including whether an attribute is mandatory (i.e., required implementation with every object instance), conditional (i.e., conditional implementation based on a condition included in the metadata), recommended (i.e., attributes that should be implemented, but not required), not recommended (i.e., attributes that should not be implemented), or optional (i.e., can be implemented). Object instances can be extended to include additional metrics such as additional analyte measurements (e.g., lactate, ketone, cholesterol).

DCS 541 can further include control modules, or plug-ins, configured to support communications with sensor assemblies 300 (FIG. 26) where DCS 541 can include a plug-in corresponding to each type of sensor in sensor assemblies 300 including plug-ins for a glucose sensor, a ketone sensor, a lactate sensor, and a virtual sensor. In some embodiments, the virtual sensor can be associated with its own plug-in. In other embodiments, the virtual sensor can be associated with the plug-in as the actual sensor that corresponds to the virtual sensor; for example, a virtual sensor for a glucose sensor can share the same plug-in as the actual glucose sensor. Moreover, DCS 541 can be updated with new plug-ins for new sensors which allows DCS 541 to be upgraded as new types of sensors are created. Sensor plug-ins are discussed in further detail with respect to FIG. 26.

Various third-party companies can utilize the modular nature of DCS 541 develop their own mobile applications (e.g., third party application 428) that work with a manufacturer's sensor assemblies 300 through the software library 400 and the sensor control module 500. The software library 400 provides extensibility and flexibility for the third-party companies to implement use cases that are different from those currently supported by the manufacturer. The utilization of a modular architecture enables third parties to only implement a smaller number of interface calls and reference the respective modular components of the software library 400 for implementation. The software library 400 provides a uniform interface for all third-party companies to access to sensor assemblies 300 via a common set of commands and protocols. Although not depicted, software library 400 can also include a "kill-switch" capability that provides the ability to block one or more third-party companies from having further access to sensor assemblies 300 after they had been previously granted access.

Communication within the sensor control module 500 to various components occurs over a sensor control module messaging channel 2204. The user interface 510 can be used to display the sensor data once received over the sensor control module messaging channel 2204.

Applications 422, 424, 426, or third party application 428 include logic to communicate with the communication control module 542 over a sensor control module interface 520 and operate within the framework to enable receipt of sensor data. The application 420, 424, 426, or third party application 428 requests sensor control module 500 to perform activation functions by first initiating the sensor control module 500 followed by sending a request to obtain sensor data. The sensor control module 500 includes a sensor control module interface 520 to ensure consistency for overlapping functions required of various applications 422, 424, 426 or third party application 428. The sensor control module interface 520 is implemented as an application program interface (API) in the underlying application 422, 424, 426, or third party application 428. A standard interface for shared functions also allows the sensor control module 500 to be used for receipt of sensor data from multiple sensors substantially simultaneously. Logic is contained within the software library for managing the activation of various applications 422, 424, 426 or third party application 428 that have been authorized to receive sensor data. The sensor control module 500 can further include logic to control and manage the states of the various applications 422, 424, 426 or third party application 428 via the sensor control module interface 520.

The sensor control module 500 within the software library 400 is positioned as a software as a medical device for regulatory clearance in conjunction with the sensor assembly 300. By housing the components that trigger software as a medical device regulatory issues within the software library communicating with the sensor assembly, additional third party application 428 avoids the need to be submitted for regulatory approval. This further allows other application developers to build other use cases without having to submit the use-case for the application for regulatory review, and allows unregulated applications to take advantage of the sensor data. This advantage occurs by using the modular logic as described for the software library 400.

The user interface 510 provides a uniform interface for the applications 422, 424, 426 or third party application 428 to display received sensor data. A uniform interface can refer an interface that provides seamless communications between applications 422, 424, 426, or third party application 428, all of which can be provided by different providers and therefore have different formatting or communication requirements. DCS 541 can enable this functionality through its sensor control modules which can implemented as plug-in components corresponding to each application. When implemented in DCS 541, sensor control modules can convert and process sensor data as required for the corresponding application. The user interface 510 can perform a user consent and onboarding function for the applications 422, 424, 426 or third party application 428. Onboarding includes having a new user of the applications 422, 424, 426 or third party application 428 completing the necessary consents to have access to the sensor data. The user interface 510 can further include a ready check to determine through the communication control module 542 that the various sensor assemblies 300 are functioning properly. The user interface 510 can include a display functionality to display the sensor data. The user interface 510 can be used in common form for the applications 422, 424, 426 or third party application 428 for any number of shared functions, such as for account creation of a user, consents for data privacy and sharing, and other similar functions. In accordance with the disclosed embodiments, the sensor control module 500 can present a particular customized user interface 510 when application 422, 424, 426 developed by the manufacturer of the sensor assembly 300 is in operation, but a wholly different user interface 510 for a third party application 428 that is not developed by the manufacturer of the sensor assembly 300. The look and feel of the user interface 510 thus automatically adjusts depending on whether the applications 422, 424, 426 or third party application 428 has requested the sensor data. As disclosed herein, the sensor control module 500 could be implemented without a user interface 510 component. In this configuration, the sensor control module interface 520 functions to provide information directly to the display of the underlying applications 422, 424, 426 or third party application 428.

The sensor control module 500 can optionally perform one or more checks before allowing connectivity between an application and a sensor and/or access by an application to sensor-related data, (e.g., sensor data, alerts, and system errors). In many of the embodiments described herein, the one or more checks, which can be implemented independently or in combination, can include a licensing check and/or an integrity check.

According to some embodiments, a licensing check can be performed by sensor control module 500 when an application is launched. More specifically, applications 422, 424, 426 or third party application 428 can request initialization of sensor control module 500 upon start-up of applications 422, 424, 426, or third party application 428, by supplying identifying information and/or credentials, such as license information, to sensor control module 500. According to some embodiments, the licensing information can comprise a licensing file stored locally on receiving device 200. In some embodiments, the licensing information can be checked against a database residing on remote cloud 700 or remote server 2340. In other embodiments, the licensing information can be checked against a local database residing on receiving device 200. According to another aspect of the embodiments, the licensing information can include, for example, the type (or types) of sensors with which a third party application 428 is authorized to communicate with, and/or the type (or types) of sensor-related data a third party application 428 is authorized to access. According to another aspect of some embodiments, licensing information can comprise market-level information. For example, the licensing information can be checked to determine whether a third party application 428 is authorized to access data obtained from a sensor assembly sold in a specific geographic region.

According to another aspect of some embodiments, if a licensing file is successfully processed by sensor control module 500 and the third party application 428 is deemed authorized, the authorization provided can further include an expiration parameter. For example, if a licensing check is passed and an expiration parameter is set to two weeks, then the third party application 428 does not need to perform another licensing check during a two-week period after the last successful licensing check. In another embodiment, the expiration parameter can comprise a discrete number of start-up instances. For example, in some embodiments, if the licensing check is passed and the expiration parameter is set to five start-up instances, then the third party application 428 can be launched and utilized with sensor control module 500 without a licensing check for the next five start-up instances. In still other embodiments, sensor control module 500 can be configured to perform a licensing check every time the third party application 428 is launched and a connection with the remote cloud 700 or remove server 2340 can be established. In this regard, the licensing check will not prevent the use of third party application 428 if network connectivity is temporarily unavailable.

According to some embodiments, an integrity check can be performed by sensor control module 500 to determine whether third party application 428 is authorized to operate with sensor control module 500. Integrity checks can be performed at various times during the run-time life cycle of the third party application 428, including, for example, at launch (e.g., along with the licensing check). According to another aspect of the embodiments, integrity checks are executed locally by sensor control module 500.

If the integrity check fails, the sensor control module 500 will not allow for operation of that application 422, 424, 426 or third party application 428. For third party application 428, a remote management module 600 can be used to revoke access to the sensor control module 500 or remove authorization based on the manufacturer's current permissions and goals as determined by the connectivity between the remote management module 600 and the remote server 2340. The remote management module 600 can also initiate a process to revoke the authentication of the third party application 428 from the sensor control module 500 to prevent it from further operation. According to another aspect of some embodiments, if a licensing check or integrity check fails, sensor control module 500 can intentionally corrupt one or more assets, and continue to operate for a predetermined amount of time before causing either the sensor control module 500 or third party application 428 to crash. In some embodiments, the predetermined amount of time can be randomized, and no message is provided to the user upon termination of the third party application 428. After successful initialization, the sensor control module 500 initializes the remote management module 600 by providing identifying information and credentials for authentication.

The sensor control module 500 includes protections to ensure that a proper authenticated application 422, 424, 426 or third party application 428 had made requests for sensor data. In some embodiments, sensor control module 500 can implement hardening settings for each connected sensor. Hardening refers to securing a component from attacks such as hacking. Techniques for hardening refer include protecting against potential security vulnerabilities in the component such as protecting software code and encryption keys from being accessed or reversed engineered. Sensor control module 500 can implement different hardening settings for each connected sensor plug-in based on performance requirements of each sensor. For example, sensor control module 500 can monitor the performance of the sensor (e.g., glucose sensor), the corresponding sensor plug-in (e.g., glucose sensor plug, and the corresponding application and adjust the settings based on the monitored performance. Performance of these components can refer to the accuracy of the measured data and the speed at which the data is provided between the various components.

Evaluation of analyte monitoring including the sensor control module 500 can be implemented consistent with the guidelines described in 7-307 CLSI POCT05, $2^{nd}$ Edition "Performance Metrics for Continuous Interstitial Glucose Monitoring." Evaluation can include assessing the accuracy of the analyte monitoring. In some embodiments, methods for determining accuracy include determining a relative difference between the analyte reading and a reference value. For example, when an analyte reading that is below the reference value, the relative difference can be negative; when an analyte reading is above the reference value, the relative difference can be positive. The relative difference can be calculated as a percentage relative to the reference value. In other embodiments, an absolute relative difference can be calculated which only accounts for the difference between the analyte reading and the reference value and does not take into account whether the analyte reading is above or below the reference value.

Other metrics involved in the evaluation of the performance of an analyte monitor include sensor stability and trend accuracy. For sensor stability, evaluation of analyte monitoring performance can vary over the life of a sensor. In some embodiments, accuracy evaluation can include organizing performance evaluation based on time periods within the sensor life and ranking the time periods based on the accuracy within each time period. Time periods where accuracy was below a predetermined threshold can be reported to a remote server for further evaluation. Evaluation of sensor performance can be performed between calibrations of the sensor. In some embodiments, sensor performance can be evaluated in predetermined time periods within a recommended calibration period.

Trend accuracy, or time-dependent glucose changes and direction of change, can be determined based on a relationship between sensor measurements and reference values. Methods for evaluating trend accuracy include relying on a proximity between the sensor rate measurement and reference glucose values. The proximity can be determined by, for example, the mean rate deviation and the mean absolute rate deviation which reflect distance measures between the sensor rate measurement and the underlying rate of blood glucose fluctuations.

The communication control module 542 communicates through the communication link 1802 to the sensor assembly 300. Using a sensor control module messaging channel 2204, the sensor data received from sensor assembly 300 is provided to other components of the sensor control module 500. The sensor data can also communicate to the remote management module 600 via another inter-module interface 450 between the sensor control assembly 500 and the remote management module 600. The sensor data is further stored in database 530 managed by a database manager 532.

Because of the modular architecture of the software library 400, the communication control module 542 can receive data from any of the various types of sensors represented by sensor assembly 300. This allows for substantially simultaneous receipt of sensor data for the system. Support for multiple different types of sensors occurs at the system level in modular form allowing for future expansion as new sensors are built for tracking additional data by incorporating the necessary modules within the software library 400 and sensor control module 500.

The user interface 510 includes limited functionality to display the sensor data, such as glucose value, and is maintained in this form to allow for uniform use across multiple sensor readings for display of the sensor data. Processing and calculations occur at the sensor assembly 300, and the communication control module 542 receives that sensor data result as a value.

Once the communication control module 542 receives the sensor data, it can post an event by generating an event notification that will inform the respective application 422, 424, 426 that sensor data can be available and accessed through the sensor control module interface 520. The data can be stored in database 530 and accessed directly through the sensor control module interface 520. By using the sensor control module interface 520 and User Interface 510, the sensor control module 500 presents a uniform interface for the various applications 422, 424, 426 or a third party application 428 to activate and receive results of the sensor data. Additionally, the uniform interface includes software logic to identify and register various applications 422, 424, 426 or third party application 428 to receive certain types of sensor data via callbacks. As an example, if glucose sensor data is available, the uniform interface software logic through sensor control module interface 520 will invoke a callback within the applications 422, 424, 426, or third party applications 428 authorized to receive glucose sensor data. In some embodiments, applications can register the callback via the communication control module 542 such that applications can automatically receive event notifications when they are generated.

The uniform interface logic can use the unique identifier to identify the sensor assembly 300 for which the sensor data request is being made. Although not depicted, according to one aspect of the embodiments, a unique identifier object can be created as an initial step, if one does not already exist. In some embodiments, for example, the unique identifier object can be a user-specific identifier object (e.g., a username, a user profile, or a user account ID) that is inputted, generated, or facilitated by a software application, module, or routine within the software library 400 that is running on the application 420. In other embodiments, the unique identifier object can be associated with a physical device, e.g., a particular sensor assembly 300, and can comprise, for example, a serial number, a media access control (MAC) address, a public key, a private key, or a similar string of characters.

According to another aspect of the embodiments, each of the applications 422, 424, 426, or third party application 428 includes parameters that can be passed to the sensor control module 500 when a respective call is made by an application 422, 424, 426, or third party application 428. These various structures and data types can be made available to the sensor control module 500 to assist the sensor control module 500 in accessing the sensor assembly 300 to receive sensor data.

According to another aspect of the embodiments, the sensor control module 500 can store the metadata and state information associated with the sensor assemblies 300 or application 422, 424, 426 or a third party application 428. The sensor control module 500 can further store this data in encrypted form, such as by using the identifier related to the receiving device 200 or sensor assembly 300, state information, and any other information that is useful for establishing and maintaining a connection with the sensor assembly 300, application 422, 424, 426 or a third party application 428. This database can be separate from the database accessible by the application 422, 424, 426 or a third party application 428, despite being an active component (though generally inaccessible) component within the application 422, 424, 426 or a third party application 428. An application 422, 424, 426 or third party application 428 can also be deactivated or have its access removed from the sensor data. In some embodiments, sensor control module 500 can be restricted from storing certain types of data received from various sensors of the sensor assemblies 300. The types of data that can be restricted from being stored can be determined based on privacy rules associated with the data or the user associated with the sensor. For example, sensor control module 500 can be prevented from storing glucose data or events such as from a glucose sensor in order to maintain privacy of user data. In this manner, sensor control module 500 can act as a pass-through for the certain types of data while storing other types of data (e.g., metadata, state information) that do not implicate privacy concerns.

The sensor control module 500 as embodied herein can identify the application 422, 424, 426 or third party application 428 based on tag information. When a particular application 422, 424, 426 or third party application 428 requests access to the sensor data, the sensor control module 500 can identify the application because the sensor control module 500 can be pre-loaded with tagging information corresponding to the application 422, 424, 426 or third party application 428.

The current framework and system can be configured to be compatible with prior and future applications developed by manufacturers of the sensor assemblies 300. In particular, logic for converting sensor readings into usable data can be included within the sensor assembly 300 or within the respective application 422, 424, 426. In this manner, the system can take advantage of the framework to integrate prior developed applications into the framework of the system.

The sensor control module 500 also has logic to identify whether the request for sensor data comes from an application 422, 424, 426 or a third party application 428. The sensor control module can further communicate information regarding a sensor data request to a remote management module 600.

The sensor control module 500 also has logic to receive information regarding hardware issues with the sensor components of the sensor assembly 300. The sensor control module 500 can send a communication to the application 422, 424, 426 or a third party application 428 to display a status message about an issue with the sensor assembly 300, such as by alerting the user through the application 422, 424, 426 or a third party application 428 that a sensor is expiring, has a hardware malfunction, or some other problem that can interfere with providing sensor data related to the analyte being monitored by the sensor assembly 300. The sensor control module 500 can send a communication to the receiving device 200 operating system when the application 422, 424, 426 or third party application 428 is in the background to display a notification identifying an issue with the sensor assembly 300. These issues can include that a sensor is expiring, has a hardware malfunction, or some other issue that can interfere with providing sensor data relating to the analyte being monitored by the respective sensor assembly 300.

The application 422, 424, 426 or a third party application 428 can include a user interface (shown further at FIGS. 24A-24C below), including a touch or voice command input, that acts as an interface to receive commands from a user. These commands or input can include a user requesting a sensor reading, visually tapping a display to get sensor data, acknowledging an alarm, or any number of different operations that could be conducted on the display of sensor data.

The sensor control module 500 is coded in a modular fashion that allows for upgrading the software library 400 to add functionality to communicate with newly developed sensor assemblies. Variables are used in place of hard coded values to enable for modification of the sensor control module 500 to enable communication with newly developed sensor assemblies and to allow applications 422, 424, 426 or a third party application 428 to get sensor data from those newly developed sensor assemblies without having to submit the underlying application in a new submission or an amended filing for regulatory review and clearance.

FIG. 23 is a block diagram depicting an example embodiment of the remote management module 600.

The user interface 2310 of the remote management module 600 provides functionality for applications 422, 424, 426 or a third party application 428 to have a consistent interface for certain shared functions. As embodied herein, these features and functions can include activities such as data privacy, user consent, third party consent, application authorization, and more. The user interface 2310 of the remote management module 600 provides a consistent interface to allow various applications 422, 424, 426 or a third party application 428 access to these functions. Communication within the remote management module 600 to various software logic can occur using the remote management module messaging channel 106. The user interface 2310 also allows for consistent account management capabilities, allowing a user to create an account, set a password, or set profile related information.

The remote management module 600 further includes a remote control module 2330 that enables communication to a remote server 2340 along a communication channel 2306. The communication with the remote server 2340 can occur wirelessly using any available communication means, including BLE and NFC communication.

In an embodiment of the system, the remote management module 600 can further provide transport capabilities for enabling a backup of data stored in the various applications 422, 424, 426 or a third party application 428 in the event a user upgrades the smartphone or receiving device 200. The remote management module 600 can also communicate with the applications 422, 424, 426, or third party application 428 over a remote management module interface 620. In some embodiments, remote server 640 can be implemented as part of a cloud services system for receiving the data from the applications 422, 424, 426, and third party application 428. In such embodiments, remote management module 600 can include cloud-based functions for accessing cloud services provided by remote server 2340. Examples of the cloud-based functions include user interface features such as presenting sensor specific interfaces to connected applications, cloud account features such as setup, managing user accounts or profiles.

The software library 400 including the sensor control module 500 and remote management module 600 include secure coding layers to assist in the prevention of cyber threats, such hacking and remote access. In one example, protection against such threats can include the use of digital certificates or profile provisioning.

A sensor control module 500 can further identify whether the request for sensor data is generated by an application 422, 424, 426 or a third party application 428. The sensor control module as embodied herein can pass that information to a remote management module 600, and the remote management module 600 can further customize the user interface 2310 for that application 422, 424, 426 or a third party application 428 using the remote infrastructure. As part of the customized user interface, a custom user authentication interface can be presented to a user of the application 422, 424, 426 or a third party application 428. The remote management module 600 further includes logic to disable authentication for application 422, 424, 426 or a third party application 428. In particular, allowing the remote management module 600 to disable access by a third party application 428 by removing authorization for the third party application 428 improves monitoring and control over access to critical sensor data.

In some embodiments, like sensor control module 500, remote management module 600 can implement hardening settings for each connected sensor.

Figure 24C:
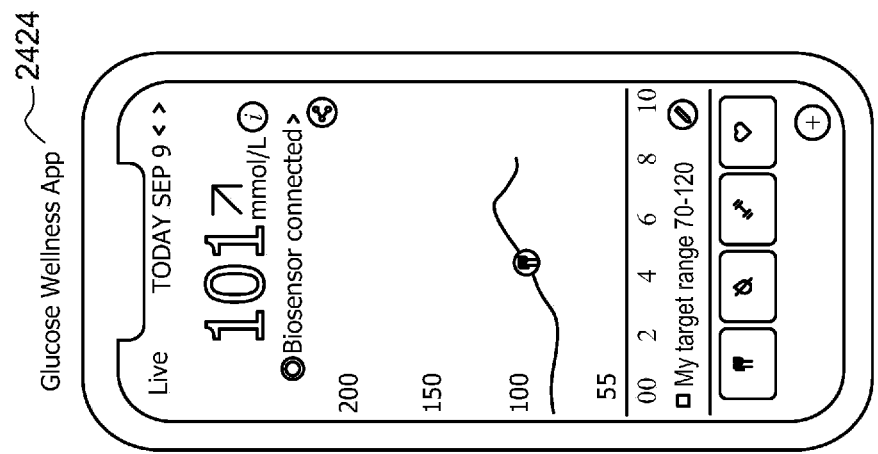
FIG. 24A-24C are exemplary embodiments of user interfaces of applications using the inventive architecture.
Figure 24B:
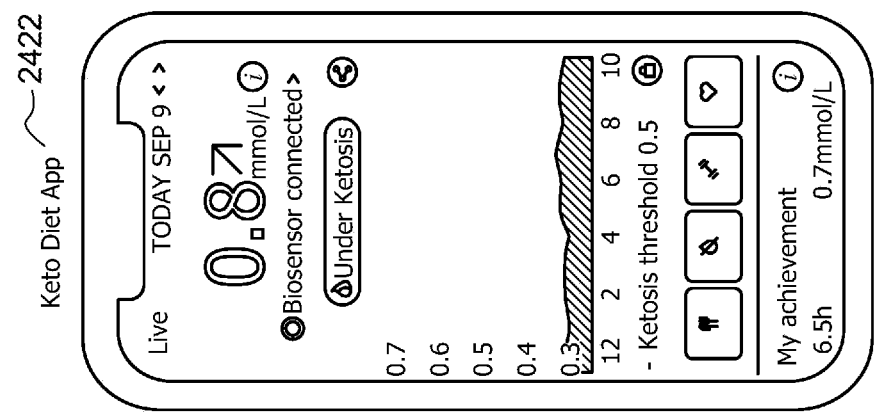
Figure 24A:
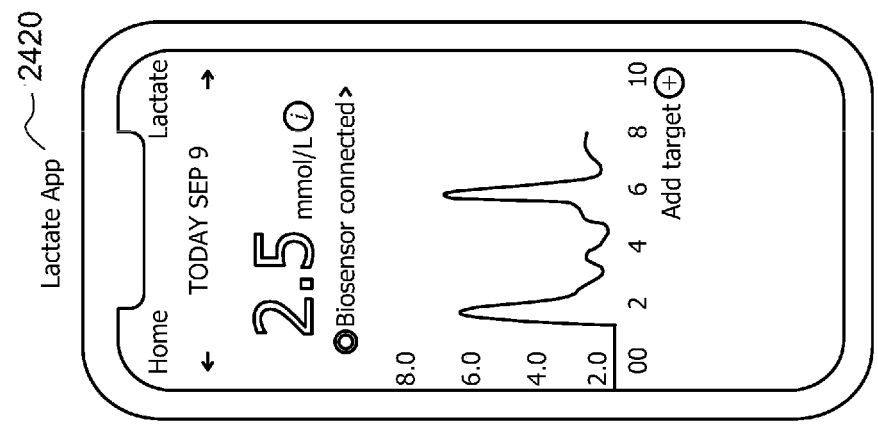

FIG. 24A-24C are exemplary embodiments of applications using the software library 400 and sensor control module 500.

In one example, application 420 can be an application to track analyte values such as lactate as shown in FIG. 7A, ketones such as shown in FIG. 7B, or glucose as shown in FIG. 7C. Part of the display can come from the sensor control module interface 520 and part can be displayed based on processing within the underlying application 420.

Furthermore, according to some embodiments, applications 2420, 2422, 2424 represent applications 422, 424, 426 to communicate with the sensor control module 500 to enable receipt of sensor data. By using the sensor control module 500 and remote management module 600, a consistent user experience can be provided for the different applications. Moreover, if an additional analyte value needs to be detected and sensed, that application can further integrate the software library 400 without having to develop the full architecture for communication, account management, user privacy, and consents.

Figure 25:
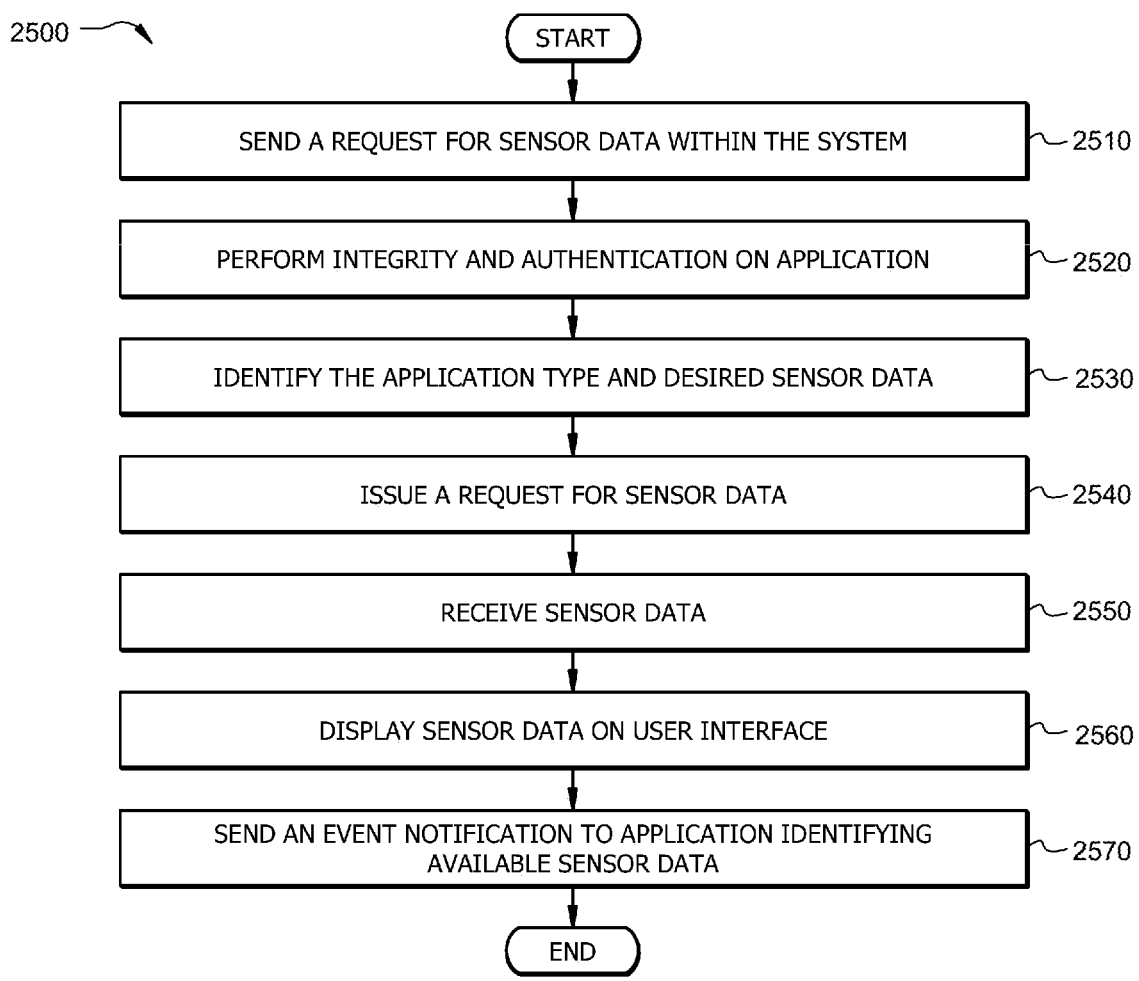
FIG. 25 is an example method for communicating sensor data from a sensor to an application or a third party application using the disclosed subject matter.

FIG. 25 depicts an example method for communicating sensor data from a sensor to a third party application 428. As an initial matter, it will be understood by those in the art that any or all of the method steps and/or routines described herein can comprise instructions (e.g., software, firmware, etc.) stored in non-volatile memory of a sensor control device, a remote device (e.g., smartphone, reader), and/or any other computing device that is part of, or in communication with, an analyte monitoring system. Furthermore, the instructions, when executed by the one or more processors of their respective computing device, can cause the one or more processors to perform any one or more of the method steps described herein. Computing device can be the receiving device 200. In addition, although one or more of the method steps and/or routines described herein can comprise software and/or firmware stored on a single computing device, those of skill in the art will recognize that, in certain embodiments, the software and/or firmware can be distributed across multiple similar or disparate computing devices or software modules.

According to one aspect of the embodiments, method 2500 can support an application 422, 424, 426 or a third party application 428 from receiving sensor data for use within the application. At step 2510, a third party application 428 sends a request for sensor data within the system. The request routes through communication channel and application control module to the communication control module 542 of the sensor control module 500. In other embodiments, the sensor assembly 300 automatically connects to the third party application 428 using, for example, a BLE connection by issuing a discovery request for BLE capable receiving devices 200 having the third party application 428.

At step 2520, the sensor control module 500 verifies the authenticity of the third party application 428 and integrity of the session. The sensor control module 500 can further communicate with the remote management module 600 to support user authentication and obtain content specific information for the third party application 428. These modules can be available within a software library 400 that a third party application 428 developer can integrate as a framework within the system of the third party application 428.

At step 2530, the sensor control module 500 using logic can identify the third party application type and desired sensor data to issue requests for the desired data. Optionally, because the session has been authenticated, the sensor assembly 300 can send sensor data through the communication control module 542 and sensor control module interface 520 without a request.

At step 2540, the sensor control module 500 can issue a request for sensor data to the sensor assembly. Alternatively, the sensor control module 500 can be in receipt of sensor data based on a predetermined transmission rate (e.g., every 30 seconds, every minute, every 5 minutes, etc.). According to some embodiments, the sensor data can comprise data indicative of an analyte level, such as, for example, a glucose level, a glucose rate-of-change, a glucose trend, or a glucose alarm condition, among others.

At step 2550, the sensor data is delivered through a communications link 1802 and stored at the database 530 of the sensor control module 500, and displayed at the user interface 510 as shown at step 2560. The sensor control module 500 receives the sensor data. As stated above, the sensor data can comprise data indicative of an analyte level, such as, for example, a glucose level, a glucose rate-of-change, a glucose trend, or a glucose alarm condition, among others.

The database 530 includes and can store sensor data separately for each value generated by the various sensor assemblies 300. Database manager 532 can control one or more databases 530 with each separately storing the different types of sensor data generated by the sensor assemblies 300. The data can also be stored together within a single database 530. The pictured database 530 is for illustration purposes, not limitation. Separate databases can also be dedicated to storing alarm conditions and triggered alarm results or notifications for each alarm at the sensor control module 500 database 530.

Database 530 can be implemented consistent with the data store model described in IEEE Std 11073-10417 and 11073-10425. In some embodiments, sensor data can be uploaded automatically to a remote device or site such as a personal computer, mobile device, or even cloud storage. In these embodiments, the sensor data can be stored in an alternative to database 530. In other embodiments, the sensor data can be stored initially in database 530 and uploaded to a remote device or site upon request or a scheduled time. In such embodiments, database 530 can be implemented as a persistent data store which stores different attributes of data as separate segments within the data store. These attributes can include analyte (e.g., glucose) data, sensor calibration data, sensor run-time data, sampling interval data, analyte trend data, user high/low threshold data, sensor thresholds, analyte rate of change threshold data, device status data, and analyte system status data (e.g., CGM). Sensors connected to sensor control module 500 can have a separate storage area in database 530 with each storage area storing segments associated with each sensor. Not all segments need to be generated for each sensor; only those categories of data that are supported by the sensor is generated and exists within the storage area corresponding to that sensor. For example, a sensor can monitor data other than analyte trend data and therefore a segment for that attribute is not generated in that sensor's storage area in database 530. The different categories of data can be represented in the database 530 as storage objects that can further include different attributes.

The analyte data attribute is a measurement of analyte concentration of a user as measured by a sensor. Attributes of the analyte attribute include, for example, an analyte numeric type, a measurement status, a measurement confidence. The analyte numeric type defines the type of fluid (e.g., blood, plasma, interstitial fluid) that that is sampled by the sensor and the body site from which the sensor is sampling. The measurement status qualifies the analyte measurement and provides additional operational conditions of the sensor such as whether a calibration is taking place, whether the sensor is uncalibrated, and whether the measured analyte value can be considered reliable or unreliable. The measurement confidence can specify upper and lower thresholds for a range within which a sensor manufacturer is confident of the actual measured analyte value provided by the sensor.

The sensor calibration data attribute is a measurement of the calibration status of the sensor which can include an attribute indicating either a calibrated or uncalibrated state as well as a body site of the calibration measurement. The sensor run-time data attribute is a measurement of the suggested run-time of the sensor and represents an indication of when the sensor should be replaced. A property of this attribute includes a time stamp value representing a start time of the sensor which, in some embodiments, is the time of sensor insertion into the user. The sampling interval data attribute is a measurement of the frequency of the sensor analyte measurements. The analyte trend data attribute is a measurement to indicate the change in analyte value over time. A property of this attribute includes, for example, a threshold and status attribute which reports whether an observed value provided by the sensor is outside of the threshold range. The user high/low threshold data attribute is a measurement to indicate a range of user acceptable glucose concentrations. The sensor threshold data attribute is a measurement to indicate the critical glucose concentration range. The analyte rate of change threshold data attribute is a measurement to indicate the maximum rate of glucose variation. A property of this attribute include, for example, a unit of measurement of the rate such as millimeters or moles. The device status data attribute is a measurement of device events to be recorded to track events associated with the user. Events can be stored for each component in system 1800 which includes sensor assemblies 300 and receiving device 200. A property of this attribute includes, for example, a device type attribute which specifies the type of device such as a sensor, transmitter, or receiver. The analyte system status data attribute is a measurement of analyte system status which can include calibration states, notifications and errors for the analyte system. Properties of this attribute are similar to the device status data attribute but are specific to the analyte system.

In some embodiments, database 530 stores data in segments in a contiguous time period and resets the time period after data from the contiguous time period has been uploaded. In some embodiments, database 530 can subdivide data from a contiguous time period into separate time periods which allows data to be clustered based on the separated time period. For example, data from a single data (i.e., a contiguous time period) can be subdivided into clusters of 8 hours (i.e., a separate time period).

The user interface 510 can also be used to generate alarm notifications to users for alarms that have been triggered based on the sensor data or based on the condition of the sensor assembly 300. The sensor control module 500 can alert a user concerning the presence of an alarm. That communication can occur through the sensor control module interface 520 and driven by the user interface 510.

The disclosed subject matter further includes that the remote management module 600 can store alarm notifications and events for the application 422, 424, 426, or third party application 428 as a backup at the remote server 2340. This can allow alarm events to be generated for application 422, 424, 426 or a third party application 428 that can be stored outside of a module that requires regulatory review and approval. In this manner, different applications developed to monitor a user's health and wellness can use the alarm events for wellness purposes that do not require regulatory clearance. The application 422, 424, 426 or a third party application 428 can also store sensor data, alarm conditions, or notifications within its own database or shared database separate from database 530 within the sensor control module 500.

As disclosed herein, one such benefit of the software library 400 and modular approach of using the sensor control module 500 is that it can allow users and application developers to identify and develop different wellness related applications for the sensor data. This can enable users that do not traditionally use tracking of analytes, such as glucose monitoring, to consider adding it for purposes of health and wellness such as food tracking, customizable diabetes management, and other unregulated uses. By having the modular sensor control module 500, third party applications 428 could use the sensor data in any unregulated manner without having to perform the regulatory clearance process. This in turn can expand the user-base for a manufacturer's sensor assemblies 300 by virtue of having more functions available for a user considering using the manufacturer's sensors. Those features can be implemented and improved on these third party applications 428 without having to submit the revised improvements for regulatory review and clearance, further demonstrating how this disclosure improves initiatives to target wellness for users.

This allows the software library to be expandable to use the sensor control module 500 to collect and provide sensor data for yet to be developed sensors. The modular approach disclosed herein can reduce the need to rewrite code for shared functions and approaches to reading data from the various existing sensors and newly developed sensors, minimizes costs for introducing new sensors, and increases the functions and options for use of that sensor data in a wellness application. The expandable configuration allows the overall system to be extendable to future generations of sensor assemblies 300 and applications of the sensor data to additionally promote wellness use cases. The modular configuration allows third party application 428 to use a mix and match approach to building and scaling the underlying third party application 428 and expanding the capabilities offered by third party application 428. The third party application 428 can choose which analytes to monitor and incorporate into a wellness program based on the sensor data.

The sensor control module can further at step 2570 issue an event notification to the third party application 428 identifying that the sensor data is available. The sensor data can be further transmitted using the sensor control module interface 520.

Figure 26:
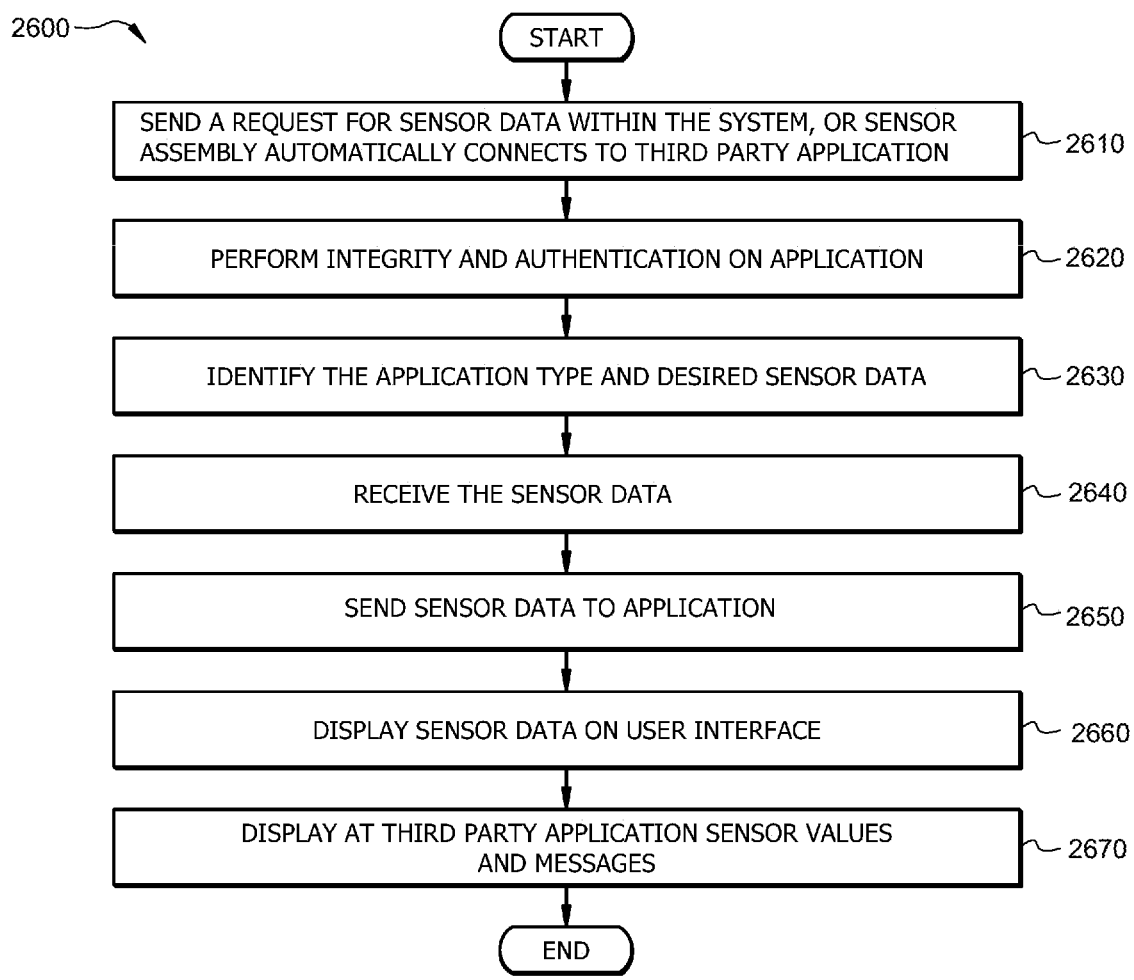
FIG. 26 is an example method for displaying sensor data at an application or third party application using the disclosed subject matter.

FIG. 26 illustrates an example method 2600 for displaying sensor data at an application or third party application. As an initial matter, it will be understood by those in the art that any or all of the method steps and/or routines described herein can comprise instructions (e.g., software, firmware, etc.) stored in non-volatile memory of a sensor control device, a remote device (e.g., smartphone, reader), and/or any other computing device that is part of, or in communication with, an analyte monitoring system. Furthermore, the instructions, when executed by the one or more processors of their respective computing device, can cause the one or more processors to perform any one or more of the method steps described herein. Computing device may be the receiving device 200. In addition, although one or more of the method steps and/or routines described herein may comprise software and/or firmware stored on a single computing device, those of skill in the art will recognize that, in certain embodiments, the software and/or firmware can be distributed across multiple similar or disparate computing devices or software modules.

At step 2610, a third party application 428 sends a request for sensor data within the system, or the sensor assembly 300 automatically connects to the third party application 428 using, for example, a BLE connection by issuing a discovery request for BLE capable receiving devices 200 having the third party application 428. At step 2620, the sensor control module 500 verifies the integrity and performs authentication of the third party application 428. The sensor control module 500 may further communicate with the remote management module 600 to support integrity and obtain content specific information for the third party application 428. These modules may be available within a software library 400 that a third party application 428 developer can integrate as a framework within the system of the third party application 428. At step 2630, the sensor control module 500 using logic can identify the third party application 428 type and desired sensor data to issue requests for the desired data. Optionally, because the session has been authenticated, the sensor assembly 300 may send sensor data through the communication control module 540 and sensor control module interface 520 without a request.

At step 2640, the sensor control module 500 receives the sensor data. As stated above, the sensor data can comprise data indicative of an analyte level, such as, for example, a glucose level, a glucose rate-of-change, a glucose trend, or a glucose alarm condition, among others.

At step 2650, the sensor data at the sensor control module 500 is sent to the third party application through the sensor control module interface 520. At step 2660, the sensor data is displayed on the user interface 520 of the sensor control module.

At step 2670, the third party application 428 displays any additional messaging related to the sensor assembly 300. The third party application 428 can display any additional messaging related to the sensor assembly 300, including the sensor data relating to analyte levels, notifications, alarms, a message, or other issue regarding the sensors or meal and exercise recommendations based on received sensor data from step 2650. Thus, part of the display is via sensor control module 500 regarding analyte levels, whereas another portion of the display on the third party application 428 is done specifically by the third party application 428 outside of the control of the sensor control module 500.

The software library 400 and sensor control module 500 as disclosed herein can be used with applications 422, 424, 426. Applications 422, 424, 426 can include various current applications, such as glucose sensor for diabetic monitoring, glucose and ketone sensor for diabetic monitoring, glucose sensor and an insulin delivery device for diabetic monitoring and closed-loop insulin delivery system. As disclosed herein, these applications require various regulated functions and thus need to be submitted in full for regulatory clearance. As disclosed herein, various modifications and functionalities can be added to these applications that do not fall within the core functions for diabetic monitoring and insulin delivery, allowing for unregulated expansion of functions provided by applications based on the sensor data. As further disclosed herein, additional functions can be implemented by applications 422, 424, 426 or third party applications 428 for wellness, such as glucose sensor for sports or fitness monitoring or for wellness and diet, ketone sensor for wellness or diet plan, such as a keto diet plan, lactate sensor for sports and fitness monitoring, or any number of other applications including alcohol monitoring for treatment and compliance, sST2, Calprotectin, HNL, NT-pro-BNP. Such functionalities can be performed by applications 422, 424, 426 or by third party applications 428 and reside outside of the core functionality necessary for regulatory review. Thus, enhancements to these functionalities are not submitted for regulatory clearance before introducing the functionalities to the consumer market by use of the modular framework as disclosed herein.

Figure 27:
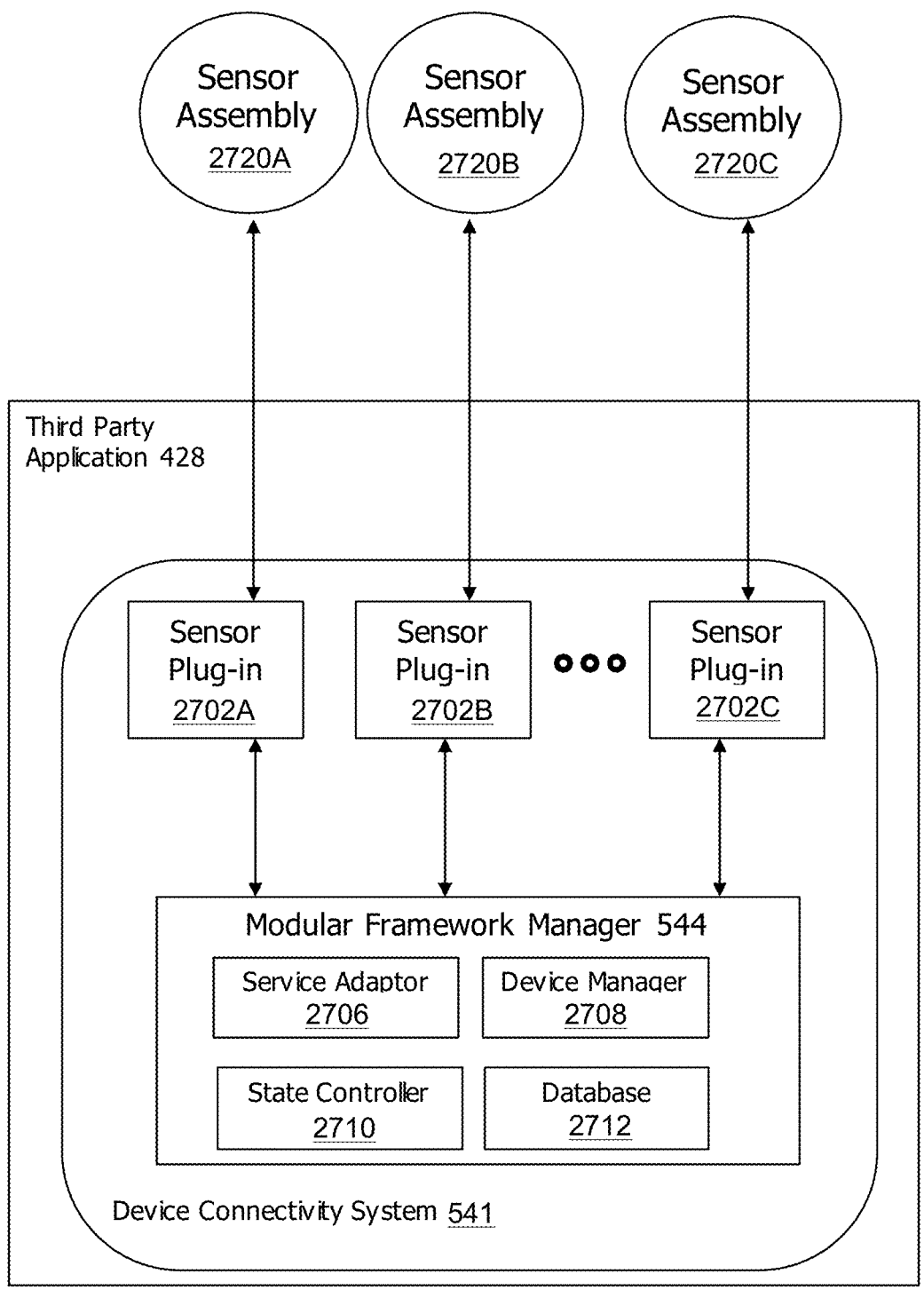
FIG. 27 is a block diagram depicting an example embodiment of a device connectivity system.

FIG. 27 is a block diagram depicting an example embodiment of DCS 541 implemented in a modular manner where different software components associated with different physiological sensors can be bound to the DCS 541 to increase communication capabilities of the DCS 541. DCS 541 can be configured with a plurality of sensor plug-ins 2702A-C that have been programmed in accordance with the protocols needed to communicate with various sensors including sensor assemblies 2720A-C. Although only three sensor plug-ins and three sensor assemblies and one third-party application are depicted, DCS 541 can be configured to bind any number of sensor plug-ins and communicate with any number of sensor assemblies and third-party applications. For example, as new types of sensors are developed, new sensor plug-ins can be created and bound to DCS 541.

DCS 541 provides a uniform application program interface (API) to all sensor assemblies 2720A-C such that third-party application 428 is provided the same set of commands to interact with each sensor assembly that is connected to DCS 541. Through the plug-ins, DCS 541 provides a modular and extensible architecture allowing third-party application 428 to communicate with different types and generations of biosensors.

In some embodiments, DCS 541 includes at least one of an NFC interface and a BLE interface to communicate with sensor assemblies 2720A-C and third-party application 428.

In some embodiments, DCS 541 can utilize an event-based communication scheme to relay communications between sensor assemblies 2720A-C and third-party application 428. For example, third-party application 428 can register or subscribe for events generated by sensor assemblies 2720A-C. Examples of these events include sensor data, errors, and alerts associated with sensor data and thresholds.

The protocols provided by each sensor plug-in define sensor-specific commands that can be invoked to communicate, via the modular framework manager 544, with sensor assemblies 2720A-C. In order to provide this functionality, sensor plug-ins 2704A-C can bind to the modular framework manager 544. Once bound, modular framework manager 544 generates a uniform API with a common set of commands that can be invoked by third-party application 428 to communicate (e.g., receive events) with any of sensor assemblies 2720A-C.

In some embodiments, sensor plug-ins 2702A-C can be configured as individual frameworks each supporting a single sensor type (e.g., ketone, lactate, glucose) or dual-sensor types (e.g., ketone/lactate, ketone/glucose, glucose/lactate), a physical sensor, or a virtual sensor, and configured to communicate with third-party application 428. In some embodiments, third-party application 428 can be implemented as mobile applications and installed on a mobile device.

Modular framework manager 544 is the base framework for DCS 541 and is used by all applications to communicate with connected sensors. Module framework manager 544 can include a service adaptor 2706, a device manager 2708, a state controller 2710, and a database 2712. Service adaptor 2706 generates the uniform API that is utilized for communications between third-party applications and sensor assemblies. Service adaptor 2708 provides the common set of functions that can be invoked by the third-party applications to communicate with the selected sensor assemblies. Functions that can be performed using service adaptor 2708 include binding sensor plug-ins 2704A-C to the modular framework manager 544, allowing applications to subscribe to callbacks for receiving sensor events, activating and deactivating new sensor assemblies, and connecting or disconnecting to sensors (e.g., via Bluetooth Low-Energy). Device manager 2708 manages sensor instances of activated sensors when they are connected to the modular framework manager 544. Sensor instances are software representations of sensors that are connected to the modular framework manager 544. A sensor instance includes all the associated functions that can be invoked to communicate with and manage the corresponding sensor. State controller 2710 is a state machine framework that is utilized by sensor plug-ins 2704A-C that monitors the state information associated with each sensor assembly.

In some embodiments, modular framework manager 544 can be configured to not store sensor data or events to maintain user privacy. In some embodiments, database 2712 of the modular framework manager 544 can be configured as a secure database for storing sensor metadata and state information for active sensors and can include at least one of an encryption context of the stored data, sensor address information, and any other context variables for communicating with any active sensors. Database 2712 can store only the sensor metadata and state information separately from any other stored data (such as application data). In some embodiments, database 2712 is encrypted for use only by modular framework manager 544 in order to protect the privacy of the stored data. When a sensor is disconnected from modular framework manager 544, database 2712 can be configured to remove any data associated with the disconnected sensor. In some embodiments, modular framework manager 544 can be configured to provide an interface for applications to add or update data, such as sensor metadata, in database 2712.

Figure 28:
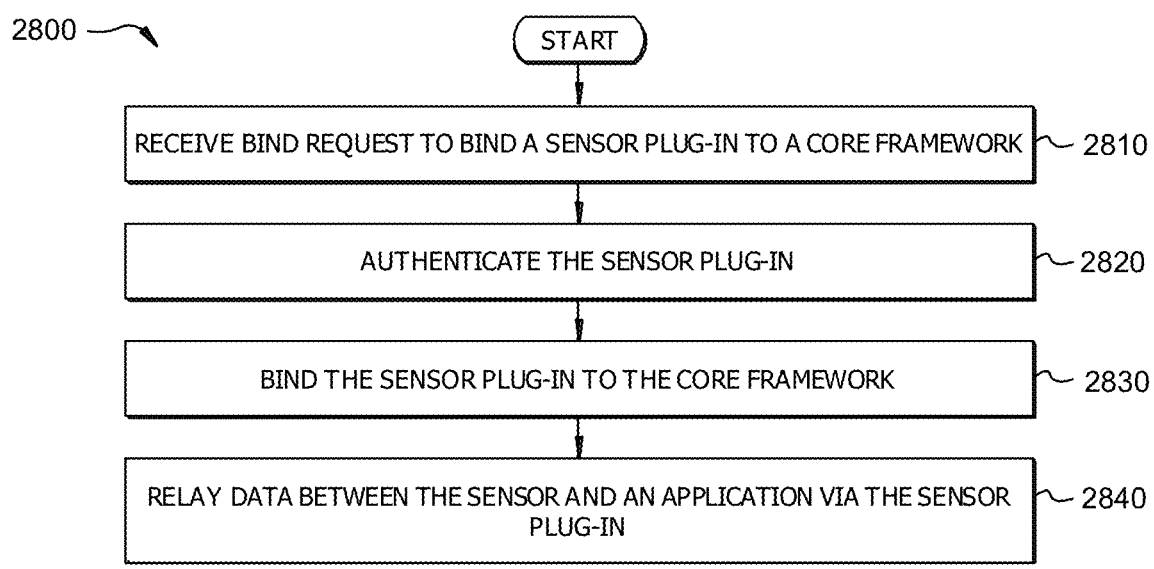
FIG. 28 is an example method for binding sensor plug-ins to a device connectivity system.

FIG. 28 depicts an example method for binding sensor plug-ins to a device connectivity system. As an initial matter, it will be understood by those in the art that any or all of the method steps and/or routines described herein can comprise instructions (e.g., software, firmware, etc.) stored in non-volatile memory of a sensor control device, a remote device (e.g., smartphone, reader), and/or any other computing device that is part of, or in communication with, an analyte monitoring system. Furthermore, the instructions, when executed by the one or more processors of their respective computing device, can cause the one or more processors to perform any one or more of the method steps described herein. Computing device can be the DCS 541. In addition, although one or more of the method steps and/or routines described herein can comprise software and/or firmware stored on a single computing device, those of skill in the art will recognize that, in certain embodiments, the software and/or firmware can be distributed across multiple similar or disparate computing devices or software modules.

According to one aspect of the embodiments, method 2800 can support an application 422, 424, 426 or a third party application 428 receiving sensor data for use within the application. At step 2810, DCS 541 receives a bind request to bind a sensor plug-in to a core framework (e.g., modular framework manager 544). The bind request can include an identifier of the sensor plug-in and information about the associated sensor such as the sensor type.

At step 2820, the DCS 541 authenticates the sensor plug-in that is to be bound to the core framework of DCS 541. This authentication can be based on information in the bind request such as plug-in identifier where DCS 541 communicates with remote management module 600 to support plug-in authentication and obtain sensor-specific information for the sensor assembly associated with the sensor plug-in. These modules can be available within a software library 400 that a third party application 428 developer can integrate as a framework within the system of the third party application 428.

At step 2830, the DCS 541 binds the sensor plug-in to the core framework. Responsive to the binding, DCS 541 can provide an application programming interface that exposes at least one function (or command) for controlling the sensor via the sensor plug-in. In some embodiments, part of the binding includes DCS 541 generating an object instance representing the sensor. The object instance can comprise attributes associated with the sensor such as those discussed above including sensor type, sensor model, sensor identifier, power status, and battery level.

At step 2840, DCS 541 is configured to relay sensor data and other communications between the sensor and the application via the bound sensor plug-in. Sensor data provided by the sensor can be received first by the bound sensor plug-in which includes a processing library for translating the sensor data. In some embodiments, the sensor data can be raw or unprocessed received directly from the sensor which can be translated to object instances to be transmitted to the requesting application or to a database for storage.

The processing library also receives commands or other instructions such as from the application or from the DCS 541 and translates them into commands that are understood by and can be carried out by the sensor. The sensor receives commands in the form of a byte stream. When DCS 541 receives a command from an application (e.g., retrieve historical data), the processing library of DCS 541 translates the command into a byte stream, which can include sensor-specific operations and parameters for that sensor, and transmits the byte stream to the sensor for execution. DCS 541 can then receive a response from the sensor, translates the response into corresponding object instances, and transmits the object instances to the requesting application.

In additional embodiments, method 2800 can include steps where DCS 541 receives another bind request to bind a different sensor plug-in to the core framework. DCS 541 can then repeat steps 2820-2840 with respect to the different sensor plug-in including authenticating the different sensor plug-in, binding the second physiological sensor plug-in to the core framework, and relaying additional analyte data from the second sensor to any connected applications.

As described herein, the software library 400 and sensor control module 500 can be provided to a third-party developer to be integrated into an application such as applications

422, 424, and 426 and third-party application 428. The software library 400 can be provided with several versions, including versions intended for use during application development, debugging, or testing ("non-production versions"), and in a production environment (e.g., for integration into a final build of an application). All versions of the software library 400 can be provided in a system-hardened form (e.g., provided in machine-executable format instead of a human-interpretable) to reduce susceptibility of tampering, reverse-engineering, or inspection by third parties.

Each of the several versions can include specific functions to facilitate their use in specific stages of the development cycle. Additionally or alternatively, each of the several versions can include variations on the specific functions to facilitate their use in specific stages of the development cycle. As an example, a version of the software library 400 intended for use during development or debugging of an application integrating the software library 400 can include more or different functions from a production version of the software library 400 so that the production version of the software library 400 can compile or execute more efficiently. As another example, both the debugging version of the software library and the production version of the software library 400 can include the same command, but the debugging version can include additional sub-functions (e.g., logging, reporting, parameter checking) to facilitate debugging the operation of the application integrating the software library 400. Non-production versions of the software library 400 can include processes to prevent the integration of the non-production versions of the software library 400 with production versions of third-party applications.

Debug or other developmental versions of the software library 400 can include the ability to operate or communicate with a virtual sensor. The virtual sensor can be a software emulation that is designed to operate, as a baseline, in a manner similar to a physical sensor. The use of the virtual sensor allows a developer to test the capabilities of their application with the software library 400 or with the sensor without involving use or maintenance of a physical sensor. The virtual sensor can, for example, create an instance of a software emulation of a sensor to test inputs and functions specified by an application or application developer for proper operation and compatibility with the software library or physical sensors.

As an example, the virtual sensor can read data from a locally or remotely stored data file. The data file can store, for example, sample sensor information values, sample analyte readings (or processed data), or controls for simulating various errors or other irregular processing events. The virtual sensor can, automatically or at developer instruction, customize the processing the data to validate calculations by the software library 400 and passed to the application in development or validate calculations by the software library 400 directly. As embodied herein, the virtual sensor can, for example, validate operations of user interfaces associated with the software library 400 or presented by the application integrating the software library. Such user interfaces can include, by way of non-limiting example, graphs based on analyte readings, tables presenting analyte values, or interactive components of the software library 400 or application. As embodied herein, the debug version of the software library 400 can also be configured to operate with a physical sensor for certain functions.

As embodied herein, the virtual sensor can include functions not available with a physical sensor. As an example, at least in part because the virtual sensor is a software emulation operating on simulated data, the virtual sensor can "process" or "read" that data from the simulated subject faster than a physical sensor could process or read data from a physical subject. As an example, the virtual sensor can include settings or parameters that sets the virtual sensor to operate in an accelerated mode in which hours- or days-worth of data can be processed in a matter of minutes. This can enable the virtual sensor to facilitate faster iteration of development of applications integrating the software library 400 by reducing downtime caused by waiting for data to be read from a physical subject to test for errors or edge cases. As embodied herein, the virtual sensor can be set to execute from or at certain instructions in a set sequence of instructions or to begin processing from or at certain data in a data file. The virtual sensor can therefore facilitate targeted testing of specific stages of execution of an application integrating the software library 400.

The operations of a virtual sensor can be specified according to the format of the data file or the data within the data file. As an example, the data file can include information such as identification information for the virtual sensor (e.g., serial number, unique identifier, MAC address, BLE address), a sensor type, generation strategy, localization information (e.g., corresponding to the intended market for the sensor), a simulated hardware version of the sensor, a simulated firmware version of the sensor, a simulated record of manufacture, a total or current wear duration, a total or current warmup duration (corresponding to the amount of time between sensor activation and when the sensor can accurately provide data to the subject or a monitor), activation date (specified by a calendar-based format, lifecount-based format) or time since activation, time zone of activation, current time zone, time zone changes, and other similar information. The data file can specify virtual operation details, including, by way of non-limiting example, timer acceleration, operational interrupt points, or scheduled errors. The data file can include data capable of being produced by the sensor of the specified sensor type, including, by way of non-limiting example, instant analyte readings, historical analyte readings, average analyte readings, calculated analyte trends, calculated projections of analyte values, analyte values determined as actionable, and other similar values.

As embodied herein, the virtual sensor can be integrated into a test suite for use with or by the application into which the software library 400 is integrated. The test suite can be used to simplify or even automate the test of the application in response to a series of conditions presented to the application. These conditions, or test cases, can be specified with or separate from the datafile specifying the operations of the virtual sensor. The test cases can be created by the developer of the application, which may be a third-party developer not affiliated with the manufacturer of the sensor. The test cases can be provided by the manufacturer of the sensor so that the developer of the application can ensure compliance with operational guidelines regarding physical sensors. The virtual sensor, its operational characteristics, and the related test cases can be rapidly developed and expanded, allowing for faster development of the application integrating the software library 400 than might be found in developmental environments relying solely on physical sensors.

As embodied herein, the software library 400 can include a variety of functions made available to an application integrating the software library 400 through an application programming interface (API). The API can specify, by way of non-limiting example, how the application can call the function, the type of the software library 400 that can execute the function (e.g., development, debugging, or testing), parameters that the API will expect to provide with the function call, parameters that the API will return with the function call, whether the function call can operate with a virtual or physical sensor, or other similar information.

As an example, a software library 400 function can be used to initialize the software library 400 for use by the application. Initializing the software library 400 can involve specifying credentials for using the application, such as user credentials associating the application with a specific user or sensor or license credentials identifying the developer of the application. Initializing the software library 400 can involve specifying whether the software library 400 is to operate in a developer, debug, or production mode. Initializing the software library 400 can involve specifying internal application communication channels such as a callback hooks or event handlers. In response to the initializing function, the software library 400 can provide to the application a response containing identification of any errors or notices based on initialization.

As embodied herein, certain software library 400 functions can be restricted to only non-production initializations of the software library 400 such as for development, debugging, or testing purposes. As an example, a software library 400 function can be used to start operations of a virtual sensor. Requesting the operation of a virtual sensor can involve specifying, for example, the location of the data file from which the virtual sensor will read, the starting point of operations of the virtual sensor, a selected acceleration of reading the data file, a type of virtual sensor, a type of data contained within the data file, specification of errors or irregular operations the virtual sensor will encounter (e.g., for testing response to errors), configuration parameters, and other similar parameters. In response to the request for the operation of the virtual sensor, the software library 400 can provide to the application a response, which can include error flags or other identification of errors encountered during initialization or the mechanism to track operations of the virtual sensor. As another example, a software library 400 function can be used to start operations of a physical sensor. As embodied herein, operations of a physical sensor can be started automatically upon detection of insertion of the physical sensor. For testing purposes, however, a non-production version of the software library 400 can call for manual initialization of the physical sensor to enable testing of, communication with, and operation of a physical sensor (which can include, for example, a specially-configured debugging compatible version of the physical sensor). Requesting the operation of the physical sensor can involve specifying, for example, the location or discovery process for finding and communicating with the physical sensor, the communication protocol to be used to communicate with the physical sensor, a type of the physical sensor, a type of data provided by the physical sensor, sensor configuration parameters, and other similar parameters. In response to the request for the operation of the physical sensor, the software library 400 can provide to the application a response which can contain errors encountered during initialization or the mechanism to track operations of the physical sensor. As another example, a software library function can be used to stop operation of a virtual sensor or a physical sensor. As embodied herein, under standard operation, the operations of a physical sensor can be stopped automatically upon detection of end of life conditions (e.g., battery levels reaching one or more critical thresholds, an execution counter reaching a specified threshold time, detection of removal of the sensor, errors in execution). Therefore, this function can be disabled or not included in the set of functions available for production versions of the software library 400. However, in non-production versions of the software library 400, a stop operation for a virtual sensor or a physical sensor can be used to cease operations immediately without waiting for normal termination conditions. Instructions to stop sensor operations can include specifying the virtual sensor or physical sensor and any stop conditions to be provided to the sensor prior to stopping operations. In response to the request to stop operations, the software library 400 can provide a confirmation that operations of the sensor have stopped and a report of any errors encountered.

As embodied herein, certain software library 400 functions can be used by non-production initializations of the software library 400 as well as production initializations of the software library 400. As an example, a software library 400 function can be used to retrieve details of one or more sensors that are currently in communication with the software library 400. The retrieved details can include identification information for the sensor (e.g., a unique identification or an assigned or nickname identification), identification information for the user(s) registered with the sensor (e.g., a subject of the sensor, an authorized monitor of the sensor), identification information for the application or receiving devices with which the sensor is paired, and other identification information. The retrieved details can include configuration information for the sensor, including, but not limited to, the type of data provided by the sensor (e.g., the type of analyte monitored by the sensor, whether data provided by the sensor is provided in a processed format or a raw format), communication protocols used by or accessible to the sensor, an indication of how the sensor was activated or the authorized monitors of the sensor, and other similar information.

As an example, a software library 400 function can be used to request a process to initialize a sensor. In production initializations of the software library 400, the process to initialize a sensor can involve initializing a series of user interfaces that facilitate a user activating and or attaching a sensor. In non-production initializations of the software library 400, the process to initialize a sensor can further involve user interfaces that facilitate a user activating a virtual sensor as described herein.

As an example, a software library 400 function can be used to request current sensor data from available sensors or to display sensor data through the application user interface using the techniques described herein. The software library 400 function can be used to poll available sensors or to request a value from a specified sensor. If the specified sensor is not available, the software library 400 function can indicate that the sensor is not available and provide current data once the sensor becomes available (e.g., reconnects with the software library 400). The software library 400 function can further provide the data in a restricted user interface format such as by providing the elements to be shown in a user interface of the application integrating the software library 400 without permitting the application to modify the elements.

As an example, a software library 400 function can be used to request data from a virtual sensor or a physical sensor corresponding to a specified point of time or range of time. The specified point of time or range of time can be included as parameters with the software library 400 function. In response to the request, the software library 400 function can return available data matching the specified criteria, an error indicating that data matching the specified criteria is not available, or an explanation that only partial data matching the criteria could be found. In addition to specifying data based on the time of the reading, data can be requested according to other parameters, including, but not limited to type of analyte (or other sensed material), data trends, alerts or urgency of data value (e.g., for data values exceeding a threshold value), whether the data has previously be reported by the sensor to the software library 400 or by the software library 400 to the application integrating the software library 400, a specified previous number of data values matching other criteria (e.g., the previous 50 data values of a specified analyte, the previous 25 historical average values), and other similar parameters. In addition to functions initiated by the application into which the software library 400 is integrated, the software library 400 can support several functions that are initialized by the software library in response to the detection of certain events or the calculation of certain values. As an example, the software library 400 can report to the application into which the software library 400 is integrated when one or more sensors communicate current data values. The software library 400 can further report rolling average values (e.g., a value calculated from the last 3, 5, 10, 30 minutes of readings from the sensor) or average values at benchmark times (e.g., the value averaged over the last hour, reported every hour on the hour). The software library 400 can report when a new sensor is activated and communicates with the software library 400 for the first time. The software library 400 can report when a sensor connects or disconnects from the software library 400 (e.g., via a communication link 1802). The software library 400 can report when a sensor indicates that it is at or approaching end of life conditions, such as a battery level that has passed one or more threshold values of remaining voltage or estimated battery life or a projected sensor sensitivity level below a threshold value (e.g., where sensor sensitivity decays over time). The report of approaching end of life can be used to alert a subject or other user so that they can replace the sensor in a timely manner. The software library 400 can report when a sensor has encountered an error in operation, such as processing, memory, or communication errors or sensing errors (e.g., an extended period of time during which the sensor is unable to detect the analyte of interest). The report of the error from the software library 400 to the application integrating the software library can include details of the error such as expected or likely sources of the error and potential approaches to correct the error. The software library 400 can report sensor termination, resulting either from a normal shutdown notice issued by the software library 400 to the sensor or when the sensor reaches a critical battery level. If the sensor termination results from an abnormal shutdown, the report from the software library 400 to the application integrating the software library 400 can indicate the likely source of the abnormal shutdown condition.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. Thus, the foregoing description of specific embodiments of the disclosed subject matter has been presented for purposes of illustration and description. It is explicitly acknowledged that express recitation of every possible combination and substitution is overly burdensome, especially given that the permissibility of each and every such combination and substitution will be readily recognized by those of ordinary skill in the art.

While the embodiments are susceptible to various modifications and alternative forms, specific examples thereof have been shown in the drawings and are herein described in detail. It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents. Furthermore, any features, functions, steps, or elements of the embodiments may be recited in or added to the claims, as well as negative limitations that define the inventive scope of the claims by features, functions, steps, or elements that are not within that scope.

Also disclosed are the following clauses:

1. A method for relaying analyte data from a physiological sensor to at least one application via a physiological sensor framework module, the method comprising:
    receiving a bind request to bind a physiological sensor plug-in to a core framework in the physiological sensor framework module;
    performing, responsive to the bind request, an authentication of the physiological sensor plug-in;
    binding, responsive to the authentication, the physiological sensor plug-in to the core framework; and
    relaying, responsive to binding the physiological sensor plug-in, analyte data from the physiological sensor to the at least one application.

2. The method of clause 1, wherein the physiological sensor is a dual-channel physiological sensor.

3. The method of clauses 1-2, wherein the physiological sensor is a physical sensor.

4. The method of clauses 1-3, wherein the physiological sensor is a virtual sensor.

5. The method of clauses 1-4, further comprising:
    provide, responsive to the binding, an application programming interface to the at least one application, wherein the application programming interface is configured to expose at least one function for controlling the physiological sensor via the physiological sensor plug-in.

6. The method of clauses 1-5, wherein the physiological sensor comprises any one of a glucose sensor, lactate sensor, or ketone sensor.

7. The method of clauses 1-6, wherein the physiological sensor comprises any one of a glucose sensor, lactate sensor, or ketone sensor.

8. The method of clauses 1-7, further comprising: receiving a second bind request to bind a second physiological sensor plug-in to the core framework in the physiological sensor framework module;
    performing, responsive to the second bind request, a second authentication of the second physiological sensor plug-in;

binding, responsive to the second authentication, the second physiological sensor plug-in to the core framework; and relaying, responsive to binding the second physiological sensor plug-in, second analyte data from the second physiological sensor to the at least one application.

9. The method of clauses 1-8, further comprising:

generate, responsive to binding the physiological sensor plug-in, an object instance associated with the physiological sensor, wherein the object instance comprises a plurality of attributes associated with the physiological sensor.

10. A physiological sensor framework module comprising:

a user interface module configured to communicate user interface information to a physiological sensor application;

an analyte device connectivity system comprising:
a physiological sensor plug-in configured to relay communications between a physiological sensor and the at least one application;
a core framework configured to:
receive a bind request to bind the physiological sensor plug-in to the core framework;
perform, responsive to the bind request, an authentication of the physiological sensor plug-in;
bind, responsive to the authentication, the physiological sensor plug-in to the core framework; and
relay, responsive to binding the physiological sensor plug-in, analyte data from the physiological sensor to the at least one application.

11. The physiological sensor framework module of clause 10, wherein the physiological sensor is a dual-channel physiological sensor.

12. The physiological sensor framework module of clauses 10-11, wherein the physiological sensor is a physical sensor.

13. The physiological sensor framework module of clauses 10-12, wherein the physiological sensor is a virtual sensor.

14. The physiological sensor framework module of clauses 10-14, wherein the core framework is further configured to:

generate, responsive to binding the physiological sensor plug-in, an object instance associated with the physiological sensor, wherein the object instance comprises a plurality of attributes associated with the physiological sensor.

15. The physiological sensor framework module of clause 14, wherein the plurality of attributes comprises at least one of: a glucose concentration attribute, a sensor calibration attribute, a sensor run-time attribute, a glucose sampling interval attribute, and a glucose trend attribute.

16. The physiological sensor framework module of clauses 14-15, wherein the plurality of attributes comprises a mandatory attribute, a conditional attribute, a recommended attribute, a non-recommended attribute, and an optional attribute.

17. A device connectivity system in communication with an authenticated application and a physiological sensor, the device connectivity system comprising:

a plurality of sensor plug-ins, wherein a sensor plug-in of the plurality of sensor plug-ins is configured to relay sensor data between the authenticated application and the physiological sensor, wherein the authentication application includes first portion managed by a third-party and second portion managed by a manufacturer of the physiological sensor, wherein the second portion includes a software library for communicating with the plurality of sensor plug-ins, and wherein the first portion is not subject to regulatory approval and the second portion and the physiological sensor are subject to regulatory approval; and a modular framework comprising a service adaptor configured to provide an application programming interface for binding the sensor plug-in to the authenticated application.

18. The device connectivity system of clause 17, further in communication with a second physiological sensor, the device connectivity system comprising:

a second sensor plug-in of the plurality of sensor plug-ins configured to relay second sensor data between the authentication application and the second physiological sensor, wherein the second physiological sensor is subject to regulatory approval.

19. The device connectivity system of clauses 17-18, wherein the application programming interface comprises at least one of a callback function configured to register a callback to receive an event from the physiological sensor, a sensor activation function configured to activate or deactivate the physiological sensor, and a sensor connection function configured to connect or disconnect the authentication application from the physiological sensor.

20. The device connectivity system of clauses 17-19, wherein the sensor plug-in is subject to regulatory approval.

21. The device connectivity system of clauses 17-20, wherein the physiological sensor is a dual channel sensor.

22. The device connectivity system of clauses 17-21, wherein the sensor data from the physiological sensor is subject to regulatory approval, and wherein the sensor plug-in is further configured to:

provide the sensor data from the physiological sensor to the authenticated application.

23. The device connectivity system of clauses 17-22, wherein the authenticated application comprises a third-party application.

24. The device connectivity system of clauses 17-23, wherein the sensor data comprises different physiological signals.

25. The device connectivity system of clause 24, wherein the different physiological signals are subject to regulatory approval.

26. The device connectivity system of clauses 17-25, wherein the sensor data comprises a glucose trend, historical glucose data, time in range of target glucose, or a glucose system alert.

27. The device connectivity system of clauses 17-26, wherein the software library comprises a remote data management module including instructions to transmit the sensor data to a remote server over a network.

28. The device connectivity system of clause 27, wherein the remote data management module is configured to communicate with the remote server to authenticate the authentication application.

29. The device connectivity system of clauses 27-28, wherein the authentication further comprises a user authentication, an application authentication, or a session authentication.

30. The device connectivity system of clauses 27-29, wherein the authenticated application comprises a third party application, and the remote management module further comprises a user interface specific to the third party application to perform data privacy, data sharing, or third party consent for the third party application.

31. The device connectivity system of clauses 17-30, wherein the physiological sensor comprises any one of a glucose sensor, lactate sensor, or ketone sensor.

32. The device connectivity system of clauses 17-31, wherein the software library comprises a sensor control module including a user interface, wherein the user interface is customizable for the authenticated application based on whether or not the authenticated application is a third party application.

33. A non-transitory computer-readable storage medium storing a software library configured to be executed by one or more processors of a computing device, the software library comprising a sensor control module including instructions to:
  authenticate the computing device with a plurality of physiological sensors;
  enable a communication session with each of the plurality of physiological sensors to receive data including data indicative of a different physiological signal from each of the plurality of physiological sensors;
  store the data acquired from each of the plurality of physiological sensors in a memory of the computing device;
  obtain an output indicative of the different physiological signal from the data of each of the plurality of physiological sensors; and
  provide the output indicative of the different physiological signal from each of the plurality of physiological sensors to an authenticated application running on the computing device.

34. The non-transitory computer-readable storage medium of clause 33, wherein the authenticated application comprises a third party application.

35. The non-transitory computer-readable storage medium of clauses 33-34, wherein the plurality of physiological sensors comprise an analyte sensor configured to detect an analyte level in a bodily fluid of a user.

36. The non-transitory computer-readable storage medium of clauses 33-35, wherein the communication session comprises a near-field communication (NFC) communication session.

37. The non-transitory computer-readable storage medium of clauses 33-36, wherein the communication session comprises a Bluetooth low energy (BLE) communication session.

38. The non-transitory computer-readable storage medium of clauses 33-37, wherein the output indicative of the different physiological signal comprises an analyte value.

39. The non-transitory computer-readable storage medium of clauses 33-38, wherein the output indicative of the different physiological signal comprises a notification of a physiological condition.

40. The non-transitory computer-readable storage medium of clauses 33-39, wherein the output indicative of the different physiological signal comprises information about delivery of a medicament to a user.

41. The non-transitory computer-readable storage medium of clauses 33-40, wherein the sensor control module includes instructions to authenticate the authenticated third-party application for use with at least one of the plurality of physiological sensors.

42. The non-transitory computer-readable storage medium of clauses 33-41, further comprising a remote data management module including instructions to transmit the data to a remote server over a network.

43. The non-transitory computer-readable storage medium of clause 42, wherein the remote data management module is configured to communicate with the remote server to authenticate the sensor control module.

44. The non-transitory computer-readable storage medium of clauses 33-43, wherein the plurality of physiological sensors are subject to regulatory approval.

45. The non-transitory computer-readable storage medium of clauses 33-44, wherein the software library is subject to regulatory approval.

46. The non-transitory computer-readable storage medium of clauses 33-45, wherein the output indicative of the different physiological signal from each of the plurality of physiological sensors is subject to regulatory approval.

47. The non-transitory computer-readable storage medium of clauses 33-46, wherein the authenticated third-party application running on the computing device is not subject to regulatory approval.

48. The non-transitory computer-readable storage medium of clauses 33-47, wherein the software library is configured to be implemented as a component of the authenticated third-party application.

49. The non-transitory computer-readable storage medium of clauses 33-48, wherein the data is received substantially simultaneously from each of the plurality of physiological sensors.

50. A physiological sensor and communication interface comprising:
  an on-body unit configured to attach to a body of a user and comprising at least two of a plurality of one or more physiological sensors, each of the plurality of physiological sensors configured to generate data including data indicative of a different physiological signal; and
  a non-transitory computer-readable storage medium storing a software library configured to be executed by one or more processors of a computing device, the software library comprising a sensor control module including instructions to:
    authenticate the computing device with the on-body unit,
    enable a communication session with the on-body unit to substantially simultaneously receive the data from each of the at least two physiological sensors,
    store the data acquired from each of the plurality of physiological sensors in a memory of the computing device,
    obtain an output indicative of the physiological signal from the data of each of the at least two physiological sensors, and
    provide the output indicative of the different physiological signal from each of the at least two physiological sensors to an authenticated third-party application running on the computing device.

51. The physiological sensor and communication interface of clause 50, wherein the plurality of physiological sensors comprise at least two analyte sensors configured to detect different types of analyte levels.

52. A non-transitory computer-readable storage medium storing a software library configured to be executed by one or more processors of a computing device, the software library comprising a sensor control module including instructions to:
  authenticate an application on the computing device with one or more physiological sensors, wherein the one or more physiological sensors are subject to regulatory approval;

enable a communication session with the one or more physiological sensors to receive data including data indicative of a physiological signal from the one or more physiological sensors;

store the data acquired from the one or more physiological sensors in a memory of the computing device;

obtain an output indicative of the physiological signal from the data of the one or more physiological sensors, wherein the output indicative of the physiological signal from the one or more physiological sensors is subject to regulatory approval; and provide the output indicative of the physiological signal from the one or more physiological sensors to the authenticated application running on the computing device, wherein the authenticated application running on the computing device is not subject to regulatory approval.

53. The non-transitory computer-readable storage medium of clause 52, wherein the application comprises a third-party application.

54. The non-transitory computer-readable storage medium of clauses 52-53, wherein the software library is subject to regulatory approval.

55. The non-transitory computer-readable storage medium of clauses 52-54, wherein the output indicative of the physiological signal from the data of the one or more physiological sensors comprise different physiological signals.

56. The non-transitory computer-readable storage medium of clause 55, wherein the different physiological signals are subject to regulatory approval.

57. The non-transitory computer-readable storage medium of clauses 52-56, wherein the software library is configured to be implemented as a component of the authenticated third-party application.

58. The non-transitory computer-readable storage medium of clauses 52-57, wherein the output indicative of the physiological signal further comprises a glucose trend, historical glucose data, time in range of target glucose, or a glucose system alert.

59. The non-transitory computer-readable storage medium of clauses 52-58, further comprising a remote data management module including instructions to transmit the data to a remote server over a network.

60. The non-transitory computer-readable storage medium of clause 59, wherein the remote data management module is configured to communicate with the remote server to authenticate the application.

61. The non-transitory computer-readable storage medium of clause 60, wherein the authentication further comprises a user authentication, an application authentication, or a session authentication.

62. The non-transitory computer-readable storage medium of clauses 59-61, wherein the remote management module performs data privacy, data sharing, or third party consent for the authorized application.

63. The non-transitory computer-readable storage medium of clause 62, wherein the remote management module further comprises a user interface specific to the application to perform data privacy, data sharing, or third party consent for the authorized application.

64. The non-transitory computer-readable storage medium of clauses 59-63, wherein the application comprises a third party application, and the remote management module further comprises a user interface specific to the third party application to perform data privacy, data sharing, or third party consent for the third party application.

65. The non-transitory computer-readable storage medium of clauses 52-64, wherein the one or more physiological sensors comprise any one or more of a glucose sensor, lactate sensor, or ketone sensor.

66. The non-transitory computer-readable storage medium of clauses 52-65, wherein the sensor control module comprises a user interface, wherein the user interface is customizable for the application based on whether or not the application is a third party application.

67. A method of providing a physiological output in an analyte monitoring system, the method comprising:

causing, by a software library comprising a sensor control module, authentication of an application on a computing device with one or more physiological sensors, wherein the physiological sensors are subject to regulatory approval;

enabling a communication session with one or more physiological sensors to receive data indicative of a physiological signal from the one or more physiological sensors;

storing the data acquired from the one or more physiological sensors in a memory of the computing device;

obtaining an output indicative of the physiological signal from the data of the one or more physiological sensors, wherein the output indicative of the physiological signal from the one or more physiological sensors is subject to regulatory approval; and providing the output indicative of the physiological signal from the one or more physiological sensors to the authenticated application running on the computing device, wherein the authenticated application running on the computing device is not subject to regulatory approval.

68. A non-transitory computer-readable storage medium storing a software library configured to be executed by one or more processors of a computing device, the computing device including instructions to:

authenticate an application on the computing device with one or more physiological sensors using a sensor control module, wherein the sensor control module and the one or more physiological sensors are subject to regulatory approval;

request the sensor control module to enable a communication session with the one or more physiological sensors to receive data including data indicative of a physiological signal from the one or more physiological sensors;

store the data acquired from the one or more physiological sensors in a memory of the computing device;

obtain from the sensor control module an output indicative of the physiological signal from the data of the one or more physiological sensors, wherein the output indicative of the physiological signal from the one or more physiological sensors is subject to regulatory approval, wherein the output is received at the authenticated application running on the computing device, and wherein the authenticated application running on the computing device is not subject to regulatory approval.

We claim:

1. A method for relaying analyte data from a physiological sensor to at least one application via a physiological sensor framework module, the method comprising:

receiving a bind request to bind a physiological sensor plug-in associated with a type of physiological sensor to a core framework in the physiological sensor framework module, wherein the physiological sensor plug-in is included in a software library that is subject to regulatory approval as a medical device;

performing, responsive to the bind request, an authentication of the physiological sensor plug-in;

binding, responsive to the authentication, the physiological sensor plug-in to the core framework; and relaying, responsive to binding the physiological sensor plug-in, analyte data from the physiological sensor to the at least one application, wherein the at least one application is not subject to regulatory approval.

2. The method of claim 1, wherein the physiological sensor is a dual-channel physiological sensor.

3. The method of claim 1, wherein the physiological sensor is a physical sensor.

4. The method of claim 1, wherein the physiological sensor is a virtual sensor.

5. The method of claim 1, further comprising:

providing, responsive to the binding, an application programming interface to the at least one application, wherein the application programming interface is configured to expose at least one function for controlling the physiological sensor via the physiological sensor plug-in.

6. The method of claim 1, wherein the physiological sensor comprises any one of a glucose sensor, lactate sensor, or ketone sensor.

7. The method of claim 1, further comprising:

receiving a second bind request to bind a second physiological sensor plug-in associated with a second type of a second physiological sensor to the core framework in the physiological sensor framework module, wherein the second type of the second physiological sensor is different from the type of the physiological sensor, and the second physiological sensor plug-in is included in the software library;

performing, responsive to the second bind request, a second authentication of the second physiological sensor plug-in;

binding, responsive to the second authentication, the second physiological sensor plug-in to the core framework; and relaying, responsive to binding the second physiological sensor plug-in, second analyte data from the second physiological sensor to the at least one application, wherein the second analyte data corresponds to a second analyte that is different from a first analyte corresponding to the analyte data.

8. The method of claim 1, further comprising:

generate, responsive to binding the physiological sensor plug-in, an object instance associated with the physiological sensor, wherein the object instance comprises a plurality of attributes associated with the physiological sensor.

9. A physiological sensor framework module comprising:

a user interface module configured to communicate user interface information to at least one physiological sensor application; and an analyte device connectivity system comprising:

a physiological sensor plug-in configured to relay communications between a physiological sensor and the at least one physiological sensor application, wherein:

the physiological sensor plug-in is associated with a type of physiological sensor, includes a set of sensor-specific commands for communicating with the physiological sensor, and is included in a software library that is subject to regulatory approval as a medical device, and the at least one physiological sensor application is not subject to regulatory approval; and a core framework configured to:

receive a bind request to bind the physiological sensor plug-in to the core framework;

perform, responsive to the bind request, an authentication of the physiological sensor plug-in;

bind, responsive to the authentication, the physiological sensor plug-in to the core framework; and relay, responsive to binding the physiological sensor plug-in, analyte data from the physiological sensor to the at least one physiological sensor application.

10. The physiological sensor framework module of claim 9, wherein the physiological sensor is a dual-channel physiological sensor.

11. The physiological sensor framework module of claim 9, wherein the physiological sensor is a physical sensor.

12. The physiological sensor framework module of claim 9, wherein the physiological sensor is a virtual sensor.

13. The physiological sensor framework module of claim 9, wherein the core framework is further configured to:

generate, responsive to binding the physiological sensor plug-in, an object instance associated with the physiological sensor, wherein the object instance comprises a plurality of attributes associated with the physiological sensor.

14. The physiological sensor framework module of claim 13, wherein the plurality of attributes comprises at least one of: a glucose concentration attribute, a sensor calibration attribute, a sensor run-time attribute, a glucose sampling interval attribute, and a glucose trend attribute.

15. The physiological sensor framework module of claim 13, wherein the plurality of attributes comprises a mandatory attribute, a conditional attribute, a recommended attribute, a non-recommended attribute, and an optional attribute.

16. A physiological sensor and communication interface comprising:

an on-body unit configured to attach to a body of a user and comprising at least two physiological sensors, each of the at least two physiological sensors configured to generate data including data indicative of a different physiological signal; and a non-transitory computer-readable storage medium storing a software library configured to be executed by one or more processors of a computing device, wherein the software library is subject to regulatory approval as a medical device, wherein the software library comprises a sensor control module including instructions to:

bind a first physiological sensor plug-in associated with a first type of physiological sensor to a core framework in the sensor control module, the first physiological sensor plug-in including a first set of sensor-specific commands for communicating with a first physiological sensor of the at least two physiological sensors;

bind a second physiological sensor plug-in associated with a second type of physiological sensor to the core framework, the second physiological sensor plug-in including a second set of sensor-specific commands for communicating with a second physiological sensor of the at least two physiological sensors, wherein the second type of physiological sensor is different from the first type of physiological sensor, and the second set of sensor-specific commands is different from the first set of sensor-specific commands;
authenticate the computing device with the on-body unit,
enable a communication session with the on-body unit to substantially simultaneously receive the data from each of the at least two physiological sensors,
store the data acquired from each of the at least two physiological sensors in a memory of the computing device,
obtain an output indicative of the physiological signal from the data of each of the at least two physiological sensors, and
provide the output indicative of the different physiological signal from each of the at least two physiological sensors to an authenticated third-party application running on the computing device, wherein the authenticated third-party application is not subject to regulatory approval.

17. The physiological sensor and communication interface of claim 16, wherein the at least two physiological sensors comprise at least two analyte sensors configured to detect different types of analyte levels.

18. The physiological sensor and communication interface of claim 16, wherein the data acquired from at least one of the at least two physiological sensors is subject to regulatory approval.

19. The physiological sensor and communication interface of claim 16, wherein the at least two physiological sensors comprise any one or more of a glucose sensor, lactate sensor, or ketone sensor.

20. The physiological sensor and communication interface of claim 16, wherein at least one of the at least two physiological sensors is a glucose sensor and wherein the output indicative of the physiological signal further comprises a glucose trend, historical glucose data, time in range of target glucose, or a glucose system alert.

21. The method of claim 7, wherein:
relaying the analyte data from the physiological sensor to the at least one application comprises relaying the analyte data to a first application; and
relaying the second analyte data from the second physiological sensor to the at least one application comprises relaying the analyte data to a second application.

* * * * *